US006982710B2

(12) United States Patent
Salomie

(10) Patent No.: US 6,982,710 B2
(45) Date of Patent: Jan. 3, 2006

(54) SYSTEM AND METHOD TO OBTAIN SURFACE STRUCTURES OF MULTI-DIMENSIONAL OBJECTS, AND TO REPRESENT THOSE SURFACE STRUCTURES FOR ANIMATION, TRANSMISSION AND DISPLAY

(75) Inventor: Ioan Alexandru Salomie, Brussels (BE)

(73) Assignee: Interuniversitair Micro-Elektronica Centrum (IMEC vzw), Leuven (BE)

( * ) Notice: Subject to any disclaimer, the term of this patent is extended or adjusted under 35 U.S.C. 154(b) by 293 days.

(21) Appl. No.: 10/041,515

(22) Filed: Jan. 7, 2002

(65) Prior Publication Data

US 2003/0052875 A1 Mar. 20, 2003

Related U.S. Application Data

(60) Provisional application No. 60/303,680, filed on Jul. 6, 2001, and provisional application No. 60/260,006, filed on Jan. 5, 2001.

(30) Foreign Application Priority Data

Jul. 16, 2001 (GB) .............................................. 0117157

(51) Int. Cl.
*G06T 17/00* (2006.01)

(52) U.S. Cl. .................................................... 345/420
(58) Field of Classification Search ................ 345/418, 345/419, 420, 421, 423, 441, 442; 382/236, 382/232
See application file for complete search history.

(56) References Cited

U.S. PATENT DOCUMENTS 4,710,876 A    12/1987  Cline et al. .................. 364/414
4,729,098 A     3/1988  Cline et al. .................. 364/414
6,263,108 B1 *  7/2001  Kondo et al. ................ 382/232
6,415,295 B1 *  7/2002  Feinberg .................. 707/104.1
6,483,945 B1 * 11/2002  Kato .......................... 382/236
6,563,500 B1 *  5/2003  Kim et al. ................... 345/423
6,583,787 B1 *  6/2003  Pfister et al. ............... 345/441

FOREIGN PATENT DOCUMENTS

EP       99200105.7      1/1999

OTHER PUBLICATIONS

Huang, R.S., et al., "Multiresolution 3D Facial Model Compression," *Image Processing*, pp. 881–885, 1998.
European Search Report of EP 02075006.3, 3 pages, Aug. 6, 2003.

(Continued)

*Primary Examiner*—Don Wong
*Assistant Examiner*—Huedung X. Cao
(74) *Attorney, Agent, or Firm*—Knobbe, Martens, Olson & Bear, LLP

(57) ABSTRACT

Four related but independent aspects are described: (1) a method and a system to derive mesh surface descriptions (also called connectivity-wireframes) from objects represented as a scalar field (e.g. discrete multi-dimensional data), scalar functions (e.g. implicit surfaces) or any other surface description, (2) a compact, optionally multi-scalable, optionally view-dependent, optionally animation-friendly, multi-dimensional surface representation method and system comprising a combination of a surface mesh description associated with a reference grid, (3) a digital coding and decoding method and system of a combined surface mesh representation with connectivity information and a reference grid, and (4) a method and system for conversion of other surface descriptions to the combined surface mesh representation and reference grid. The presentation of the surface of an object may be transmitted across a communications channel by means of a bit stream.

30 Claims, 60 Drawing Sheets

OTHER PUBLICATIONS

Bajaj, et al., "Arbitrary Topology Shape Reconstruction from Planar Cross Sections," *Graphical Models and Image Processing*, 58(6):524–543, 1996.

H.H. Baker, "Building Surfaces of Evolution: The Weaving Wall," Int. J. Comp. Vision 3 (1989), pp. 51–57.

M. Bister, et al., "A Critical View On Pyramid Segmentation Algorithms," *Pattern Recognition Letters* 11, 1990, pp. 605–617, North Holland.

Christiansen, et al., "Conversion of Complex Contour Line Definitions Into Polygonal Element Mosaics," *Computer Graphics*, 12:187–192, Aug. 1978.

Eck et al., "Multiresolution Analysis of Arbitrary Meshes."

Fuchs, et al., "Optimal Surface Reconstruction from Planar Contours," *Communications of the ACM*, 20(10):693–702, Oct. 1977.

H. Hoppe, "View–Dependent Refinement of Progressive Meshes," SIGGRAPH 97, *Computer Graphics Proceedings*, Aug. 3–8, 1997.

H. Hoppe, "Efficient Implementation of Progressive Meshes," *Comput. &Graphics*, vol. 22, No. 1, pp. 27–36, 1998.

H. Hoppe, "Progressive Meshes," SIGGRAPH 96, *Computer Graphics Proceedings*, Aug. 4–9, 1996.

E. Keppel, "Approximating Complex Surfaces By Triangulation of Contour Lines," *IBM Journal Of Research and Development*, 19(1):2–11, Jan. 1975.

J.O. Lachaud, "Extraction de Surfaces à Partir d'images Tridimentionnelles: Approche Discrète et Approche Par Modèle Déformable," *Ph.D. Thesis*, Jul. 1998.

Lorensen, et al., "Marching Cubes: A High Resolution 3D Surface Construction Algorithm," M.C. Stone, editor, *Computer Graphics* (SIGGRAPH '87 Proceedings), vol. 21, pp. 163–169, 1987.

Meyers, "Reconstruction of Surfaces from Planar Contours," *PhD thesis*, University of Washington, 1994.

Meyers, "Surfaces from Contours," ACM Transactions on Graphics, 11(3): 228–258, Jul. 1992.

C. Montani, et al., "Discretized Marching Cubes," in R.D. Bergeron and A.E. Kaufman, editors, *Proceedings of IEEE Visualization '94*, pp. 281–287, 1994.

Nielson et al., "The Asymptotic Decider: Resolving the Ambiguity in Marching Cubes," *Proceedings of Visualization '91*, pp. 83–90 (1991).

Ning, et al., "An Evaluation of Implicit Surface Tilers," *IEEE Computer Graphics & Applications*, 13(6):33–41, Nov. 1993.

Popovich et al,. "Progressive Simplicial Complexes".

Poston, et al., "Multiresolution Isosurface Extraction With Adaptive Skeleton Climbing," *Computer Graphics Forum*, 17(3):137–148, Sep. 1998.

Poston, et al., "Skeleton Climbing: Fast Isosurface with Fewer Triangles," Proceedings of Pacific Graphics '97, pp. 117–126, Seoul, Korea, Oct. 1997.

P. Shelkens et al., "Compression of Medical Volumetric Data," ISO/IEC JTC 1/SC29/WG 1, Arles, France N 1 7 1 2, Jul. 2–7, 2000.

Van Gelder, et al., "Topological Considerations in ISO–Surface Generation," *ACM Transactions on Graphics*, vol. 13, No. 4, Oct. 1994, pp. 337–375.

A. Wallin et al., "Constructing Isosurfaces from CT Data," IEEE Computer Graphics and Applications, 11: pp. 605–617, 1990, North Holland.

Wyvill, et al., "Data Structures For Soft Objects," *The Visual Computer*, 2:227–234, 1986.

* cited by examiner

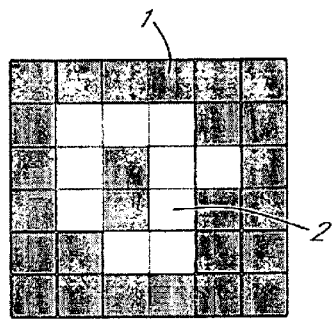
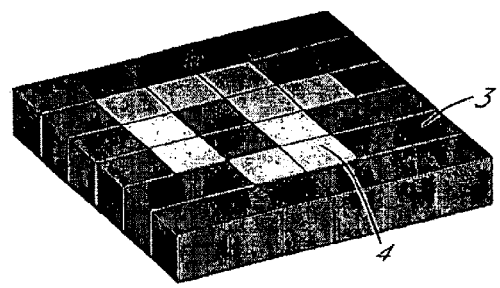
FIG. 1A  FIG. 1B
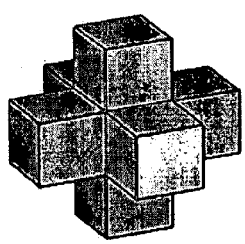
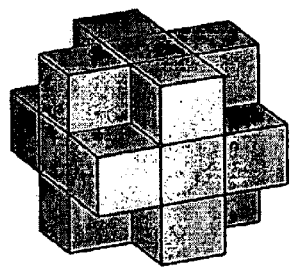
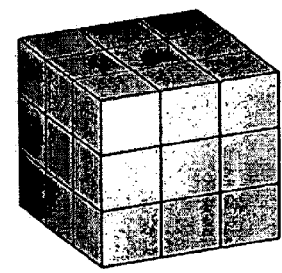
FIG. 2A  FIG. 2B  FIG. 2C
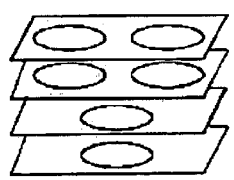
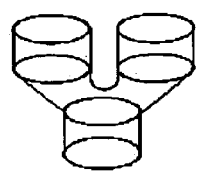
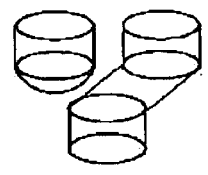
FIG. 3A  FIG. 3B  FIG. 3C
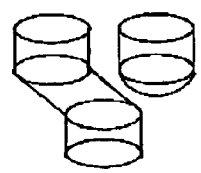
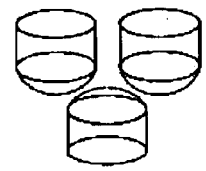
FIG. 3D  FIG. 3E

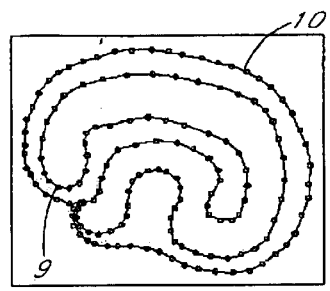
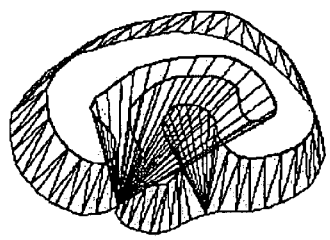
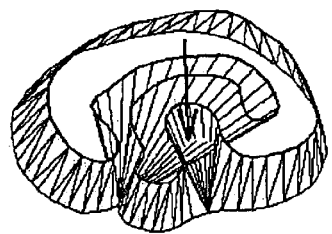
FIG. 6A             FIG. 6B             FIG. 6C
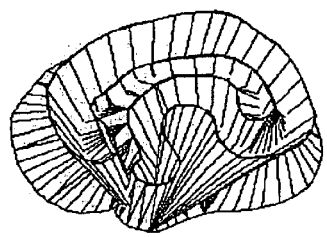
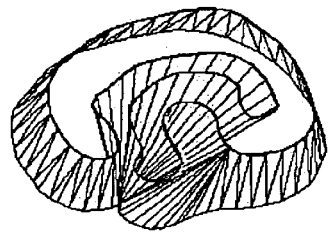
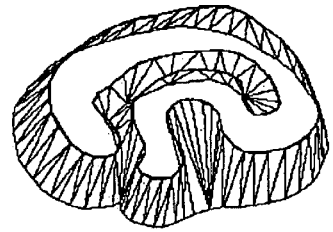
FIG. 6D             FIG. 6E             FIG. 6F
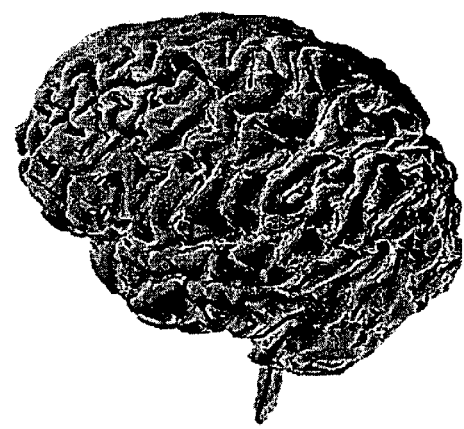
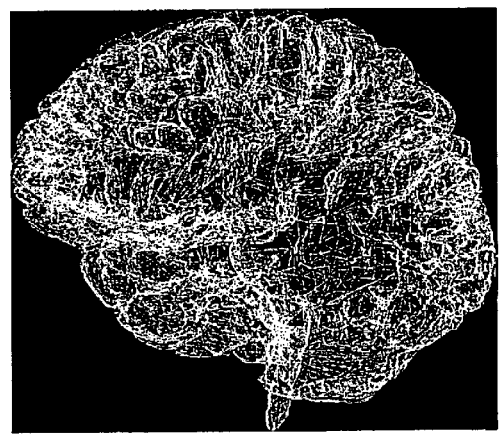
FIG. 10A            FIG. 10B

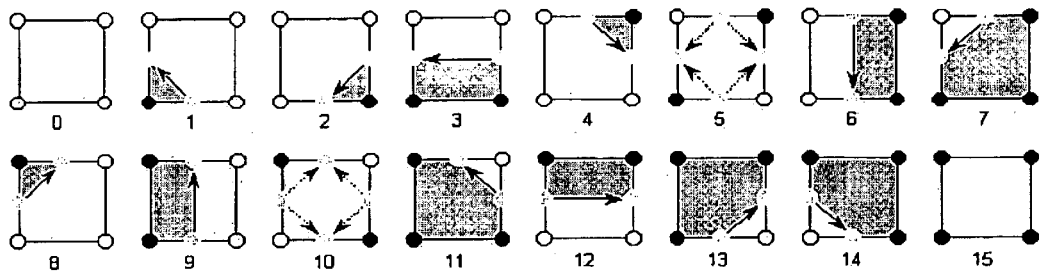
FIG. 21
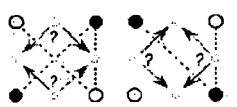 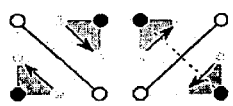 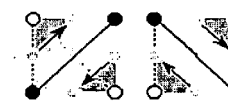 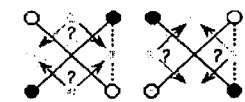
FIG. 22A    FIG. 22B    FIG. 22C    FIG. 22D
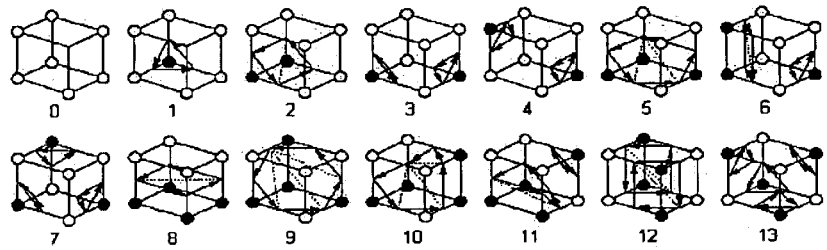
FIG. 23D
FIG. 23A
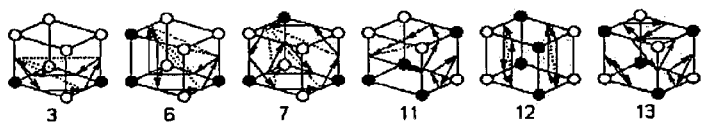 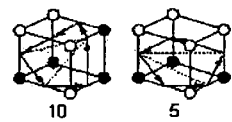
FIG. 23B      FIG. 23C
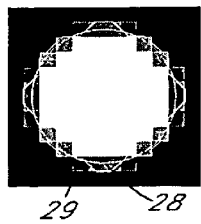 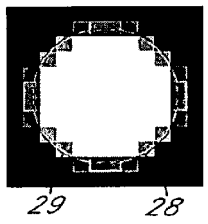 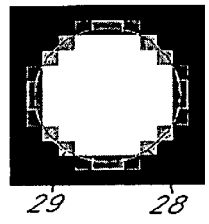 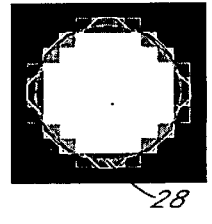
FIG. 29A    FIG. 29B    FIG. 29C    FIG. 29D

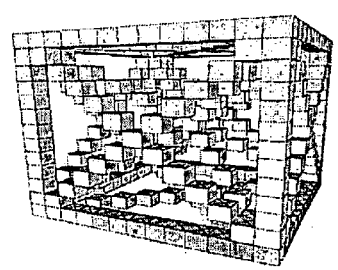
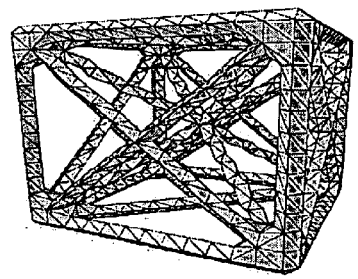
FIG. 24A  FIG. 24B
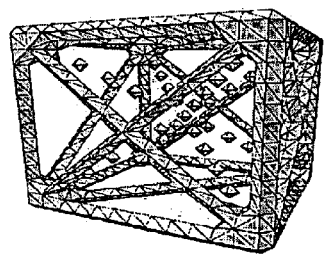
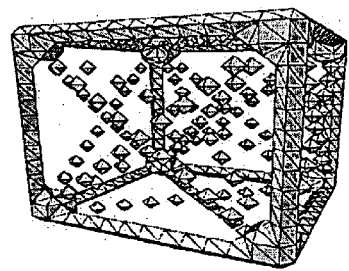
FIG. 24C  FIG. 24D
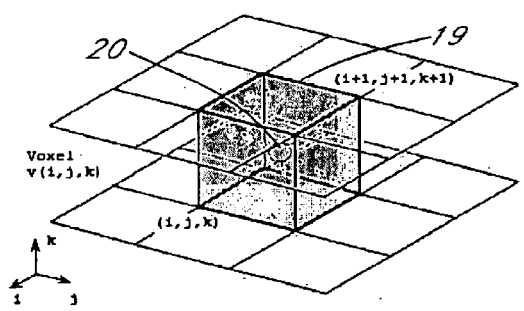
FIG. 25A
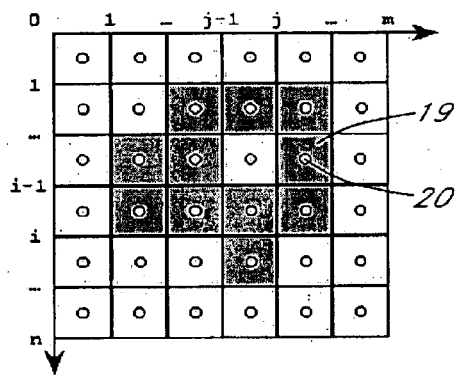
FIG. 25B

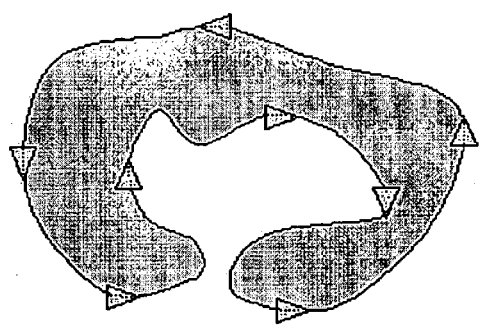
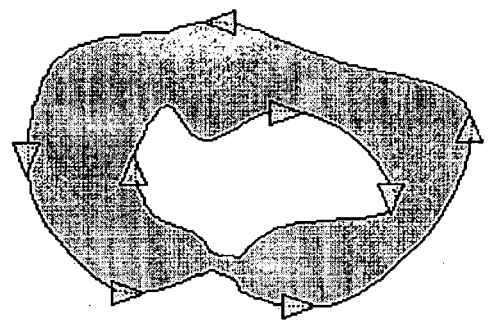
FIG. 31A  FIG. 31B
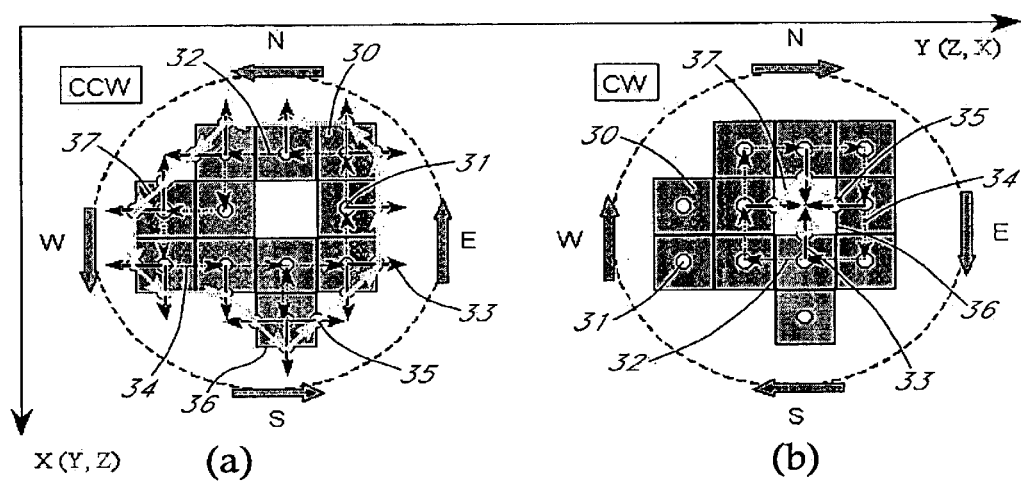
FIG. 32
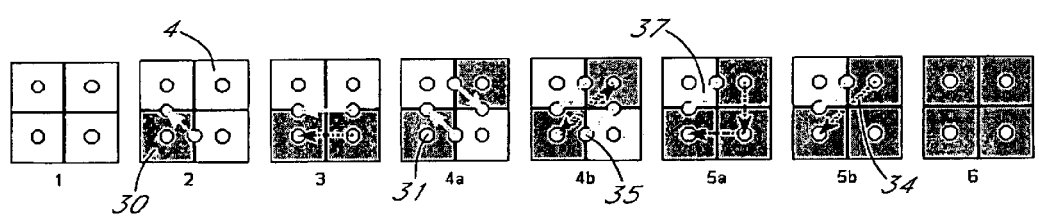
FIG. 34

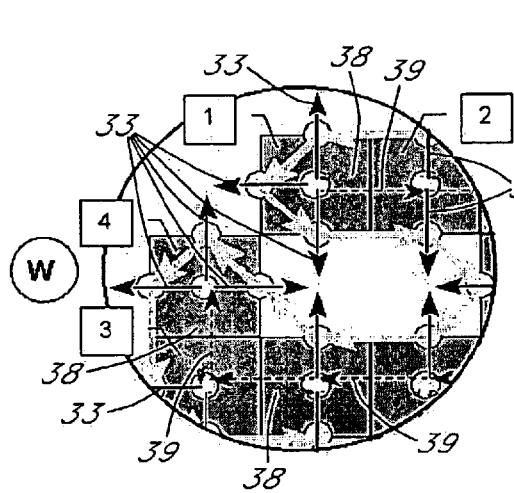
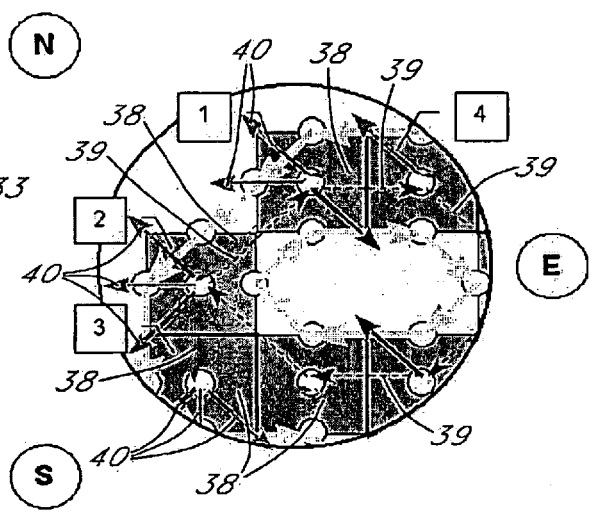
FIG. 36A   FIG. 36B
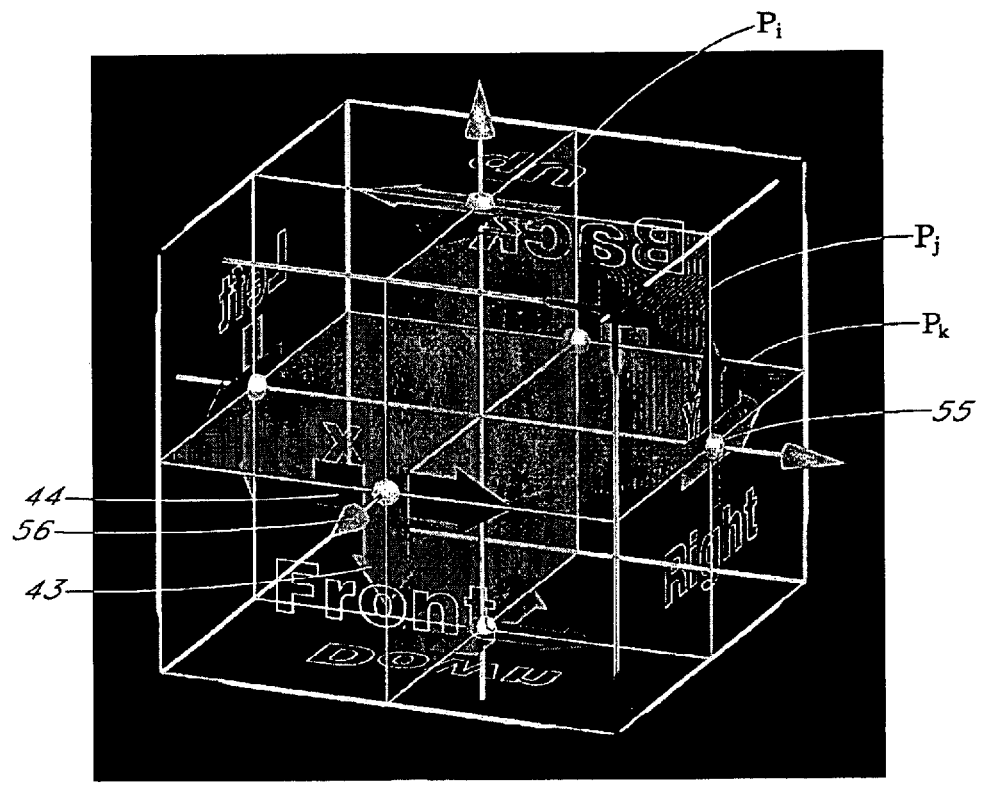
FIG. 38

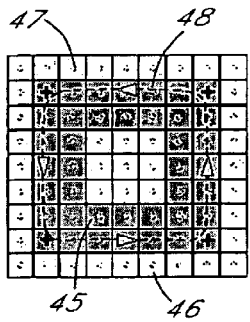 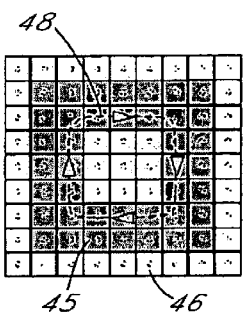 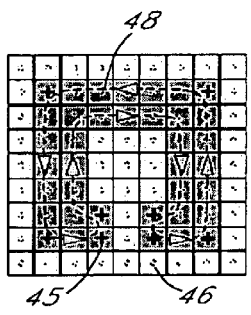 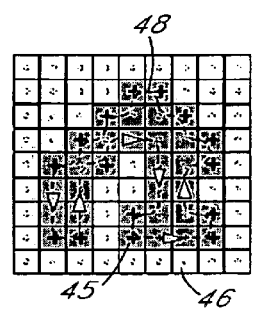
FIG. 39A    FIG. 39B    FIG. 39C    FIG. 39D
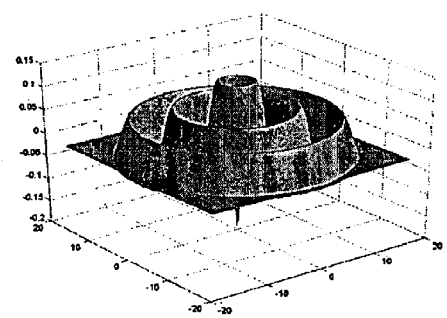 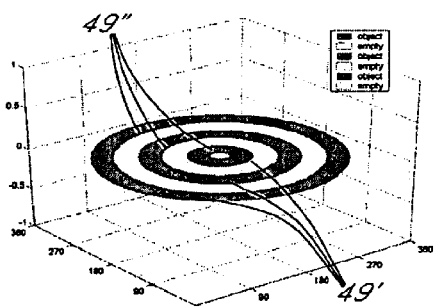
FIG. 40A              FIG. 40B
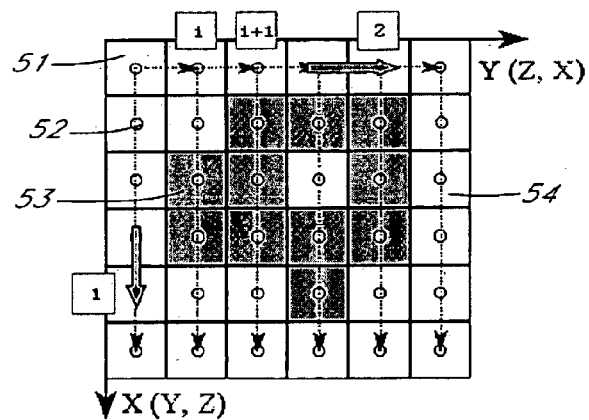
FIG. 42

Case 0

Case 1

Case 2

Case 3a

Case 3b

Case 4

Case 5a

Case 5b

Case 6

Case 7a

Case 7b

Case 8a

Case 13a

Case 8b

Case 9

Case 10

Case 11

Case 12a

Case 12b

Case 13b

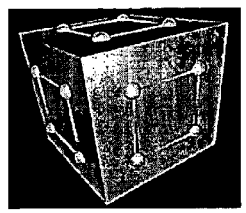
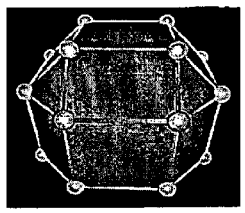
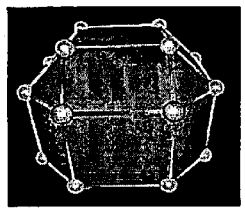
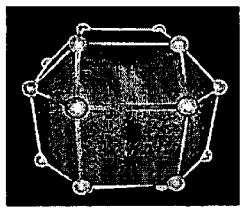
Voxel Model
FIG. 51D    FIG. 51A    FIG. 51B    FIG. 51C
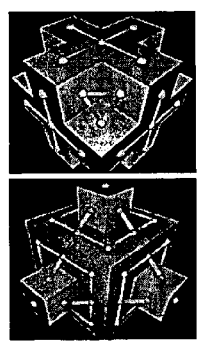
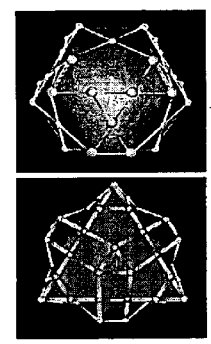
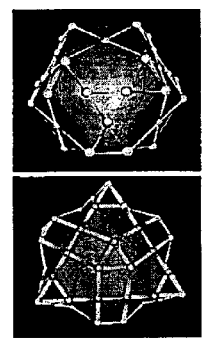
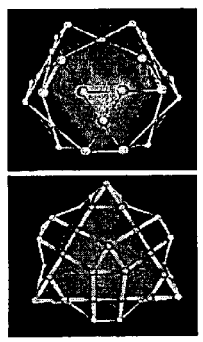
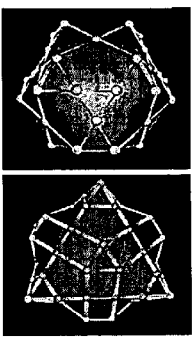
Voxel Model
FIG. 52E   FIG. 52A   FIG. 52B   FIG. 52C   FIG. 52D
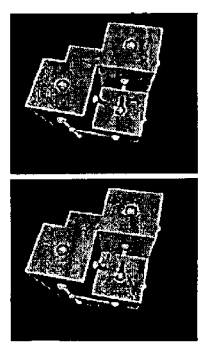
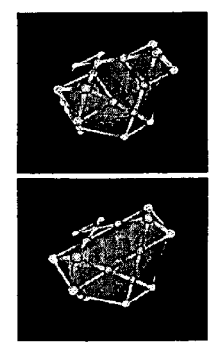
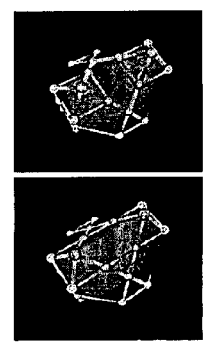
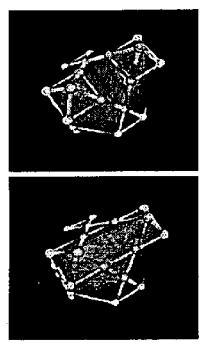
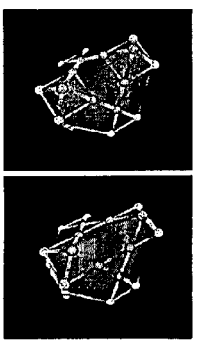
Voxel Model
FIG. 53A(i)  FIG. 53A(e)  FIG. 53A(f)  FIG. 53A(g)  FIG. 53A(h)

Voxel Model

Voxel Model
FIG. 53C    FIG. 53C(c,d)    FIG. 53C(b,b)

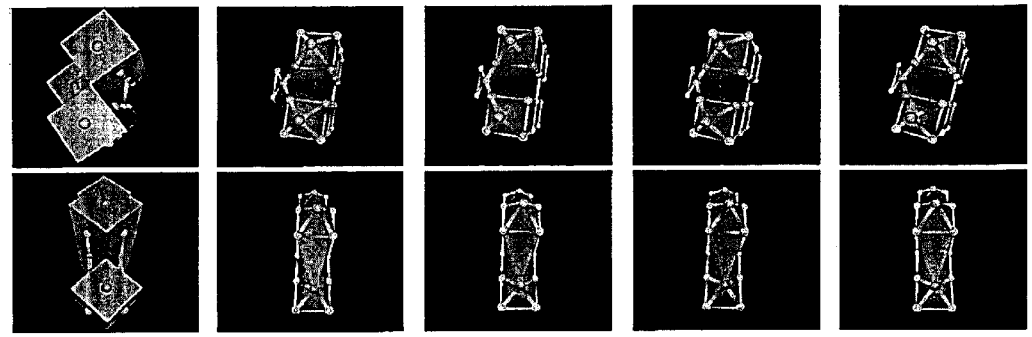
Voxel Model  FIG. 54E  FIG. 54A  FIG. 54B  FIG. 54C  FIG. 54D
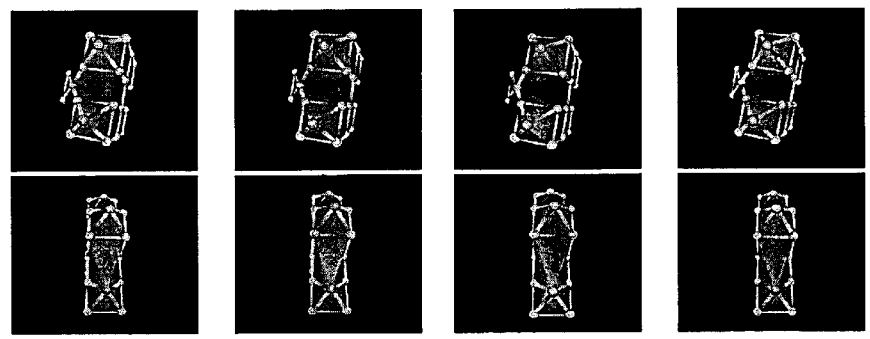
FIG. 54E  FIG. 54F  FIG. 54G  FIG. 54H
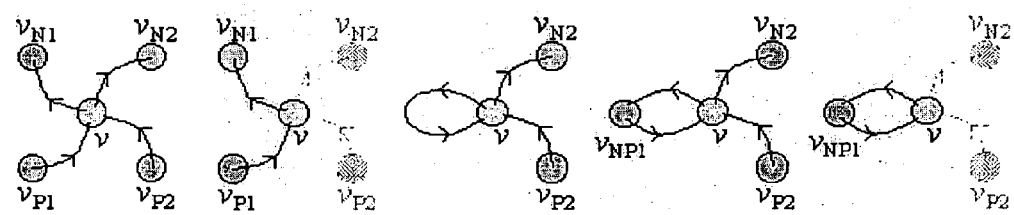
FIG. 66A  FIG. 66B  FIG. 66C  FIG. 66D  FIG. 66E Resolution 6

Resolution 5

Resolution 4

Resolution 3

Resolution 2

Resolution 1

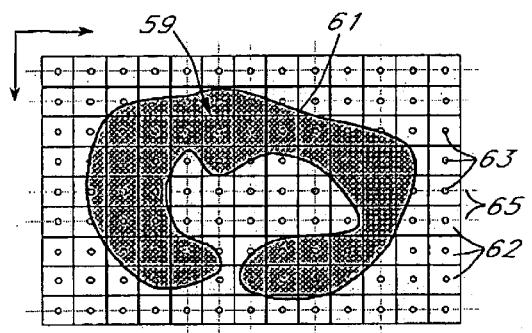
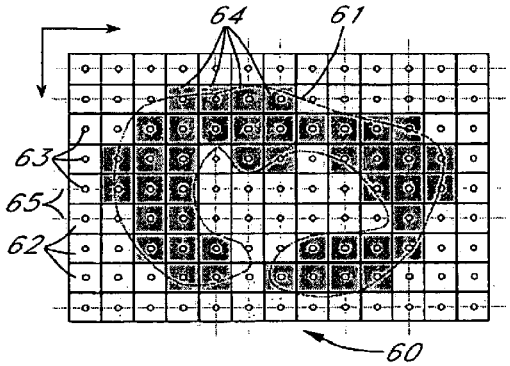
FIG. 63A    FIG. 63B
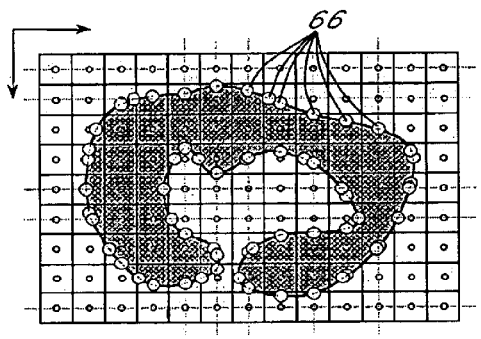
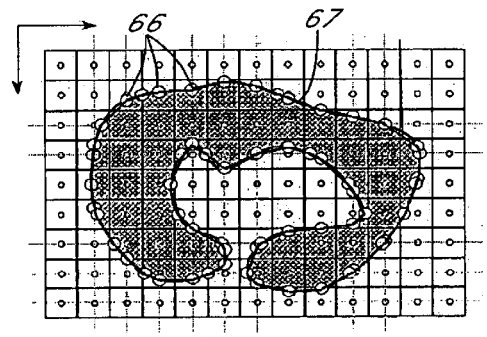
FIG. 63C    FIG. 63D
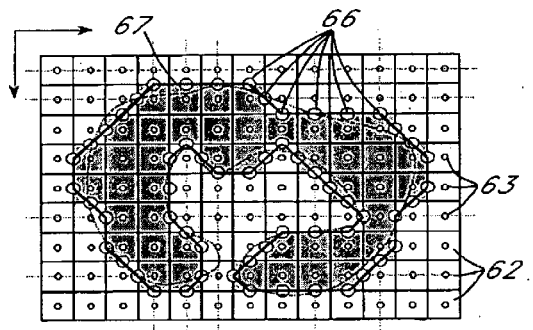
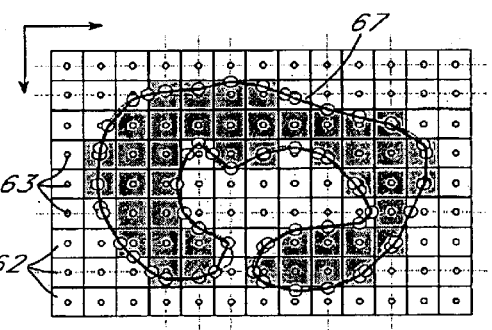
FIG. 63E    FIG. 63F

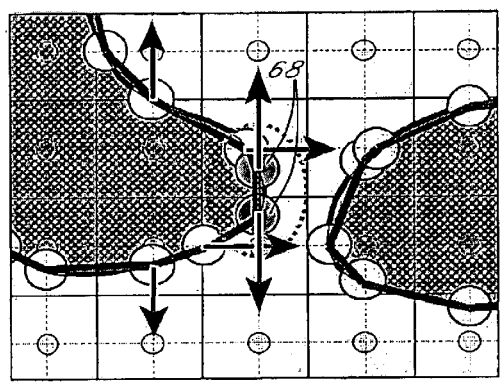 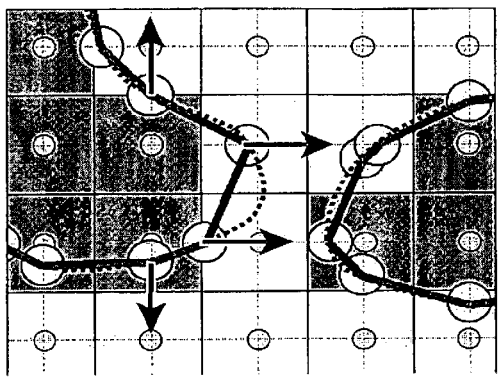
FIG. 64A    FIG. 64B
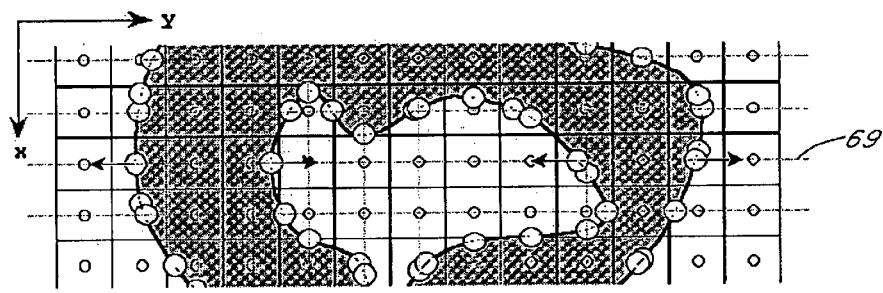
FIG. 65A
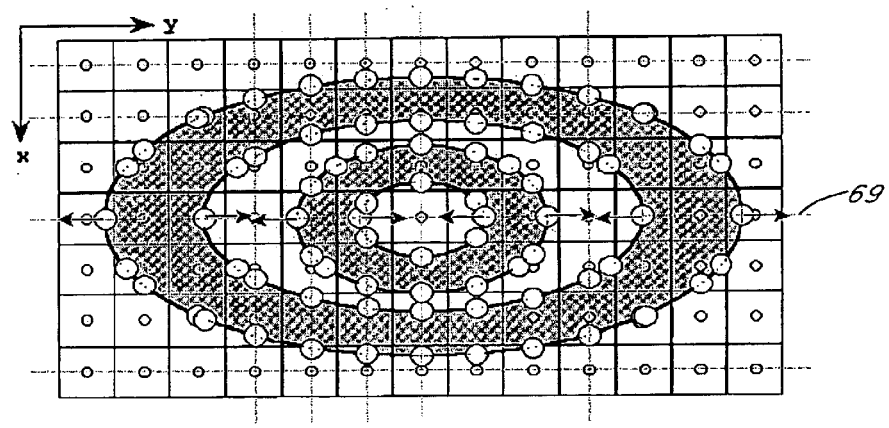
FIG. 65B

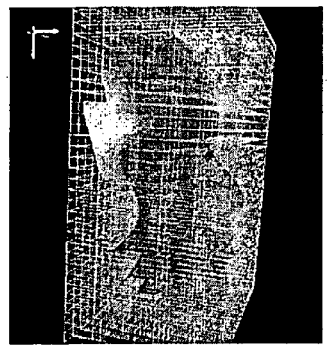
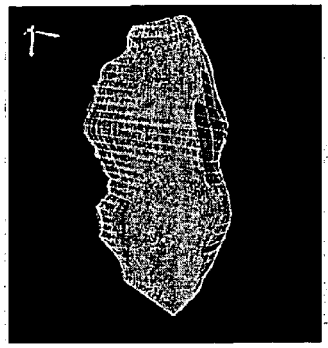
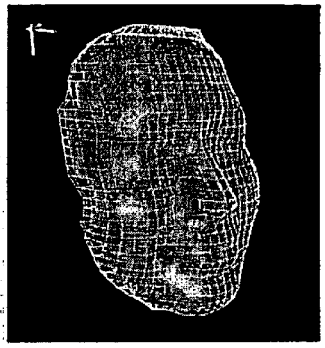
FIG. 83A     FIG. 83B     FIG. 83C
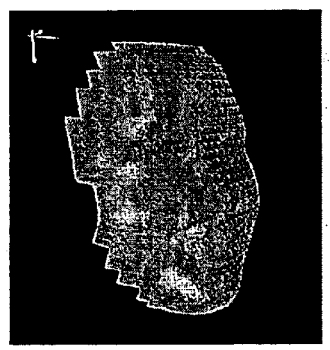
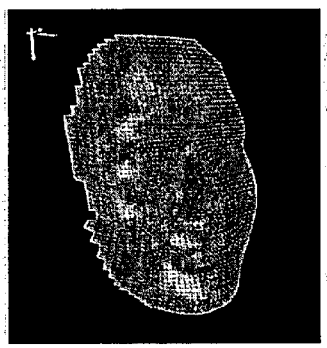
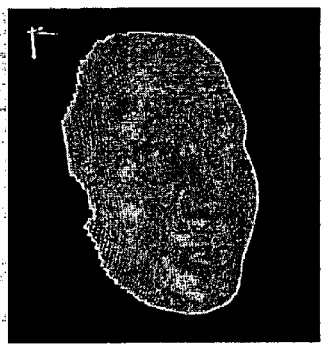
FIG. 84A     FIG. 84B     FIG. 84C
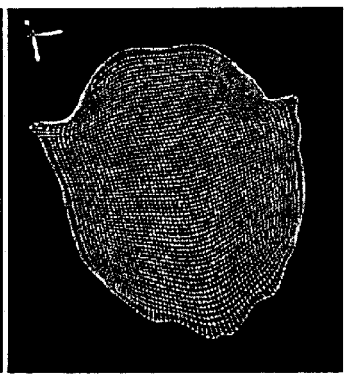
FIG. 85A     FIG. 85B 0 bits      1 bit      2 bits      5 bits

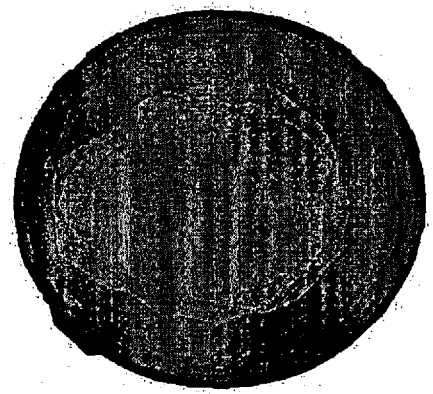
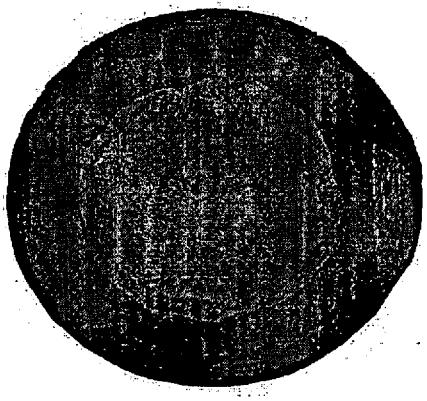
FIG. 94A            FIG. 94B
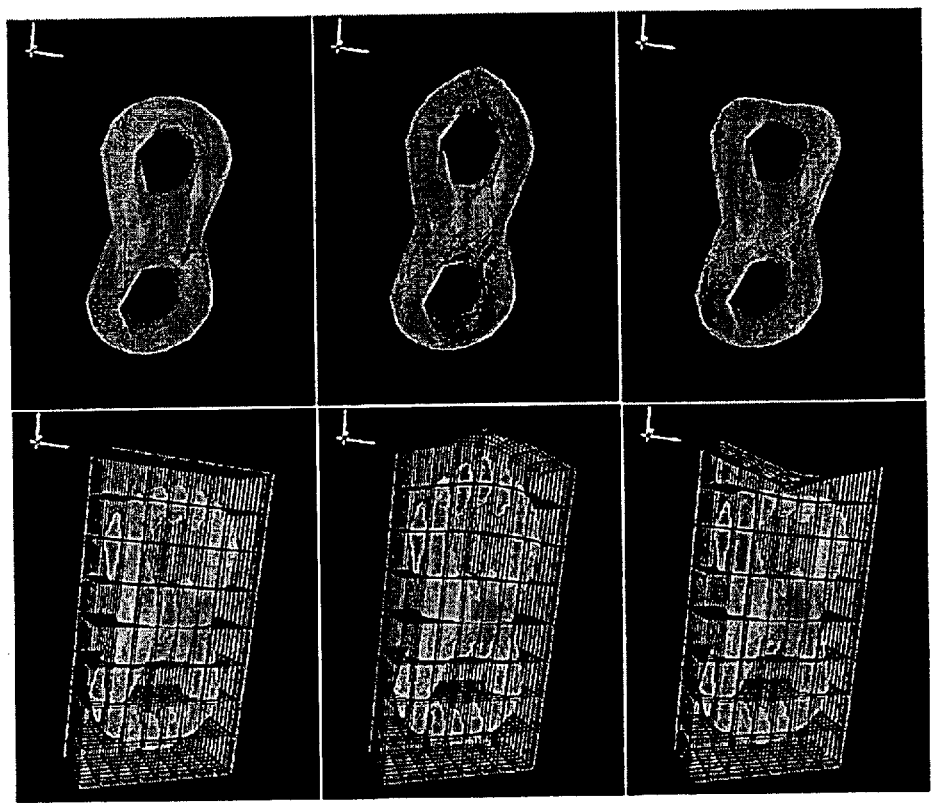
FIG. 95A    FIG. 95B    FIG. 95C

SYSTEM AND METHOD TO OBTAIN SURFACE STRUCTURES OF MULTI-DIMENSIONAL OBJECTS, AND TO REPRESENT THOSE SURFACE STRUCTURES FOR ANIMATION, TRANSMISSION AND DISPLAY

RELATED APPLICATIONS

This application claims priority to, and incorporates by reference, in each of their entirety: U.S. Provisional Application No. 60/260,006, filed Jan. 5, 2001, entitled "SYSTEM AND METHOD FOR THE TRANSMISSION AND DISPLAY OF SURFACE STRUCTURES OF THREE-DIMENSIONAL OBJECTS", and U.S. Provisional Application No. 60/303,680 filed Jul. 6, 2001, entitled "SYSTEM AND METHOD FOR THE TRANSMISSION AND DISPLAY OF SURFACE STRUCTURES OF THREE-DIMENSIONAL OBJECTS", and Great Britain Patent Application No. 0117157.8, filed Jul. 16, 2001.

BACKGROUND OF THE INVENTION

1. Field of the Invention

The present invention relates to digital coding of multi-dimensional representations of shapes and objects especially to the representations of three-dimensional shapes or objects and how to acquire such shapes from a plurality of sections through these shapes or objects. The present invention may find advantageous use in the generation, storing and recall of surface representations of multi-dimensional objects, in the transmission of these representations over bandwidth limited transmission channels, in view-dependent decoding or visualization scenarios to adapt the complexity of the scene depending on the processing power in order to satisfy the Quality of Service (QoS), and in editing and animation operations.

2. Description of the Related Technology

Modern medicine cannot be envisaged without the aid of digital imaging. Daily, large amounts of images are obtained from two-dimensional (2D), three-dimensional (3D), four-dimensional (4D—time/space), and multidimensional acquisition devices (i.e. X-ray computed tomography (CT), magnetic resonance imaging (MRI), confocal microscopy, ultrasound imaging, single photon emission computed tomography (SPECT) and positron emission tomography (PET)). While CT and MR acquisition devices still represent a big investment, ultrasound equipment is more accessible for home practitioners and will probably become more and more popular. All these digital images need to be efficiently stored, exchanged and processed. Therefore recently high performance lossless and lossy compression (decompression) algorithms have been developed. Most of these algorithms are based on wavelets and have been tuned in terms of speed and quality with respect to compression ratio.

With these algorithms, compressed images can be exchanged more efficiently, i.e. more data can be available for the same storage capacity, and faster transfer can be achieved via a network channel. Compression schemes, which produce an embedded stream that supports progressive refinement of the decompressed image up to the lossless stage, are well suited for telematics applications that require fast tele-browsing of large image databases while retaining the option of lossless transmission, visualization and archiving of images. This approach permits, in a first step to display only low resolution or low quality images (by sending only a part of the coded stream) in order to get an overview of the contents, and then to request in a second step only the relevant information (i.e. certain slices from a 3D data set or regions of interest) at full image size or full quality by sending the remaining data in the stream without duplication. A tele-medicine environment that enables such a scenario may for example be set up.

The current and future visualization standards go beyond 2D visualization (i.e. orthogonal or arbitrary cross-sections through the 3D data set): they foresee the ability to display 3D models of the objects contained in the images. 3D visualization methods can be divided into two categories: volume rendering approaches and polygonal surface visualization methods. Although the latter methods require an extra surface extraction step, in addition to the segmentation of the objects, they certainly offer a number of benefits:

A better visual quality can be obtained from a shaded surface than from a volume rendering, especially when zooming in for detail.

Shading the surface's triangles is faster than volume rendering when using specialized hardware, making surface rendering more suited for interactive visualization. As an example, graphic boards available for workstations have affordable prices, and currently have the potential to display more than 30 million triangles per second by integrating on the same board engines to compute the geometric transform of the mesh vertices, the lighting calculations and the rasterization.

The meshes of the objects can be exploited in finite element analysis and structure analysis, or inside a CAD package for design, animation and manufacturing purposes. A finite element analysis has been applied for example in M. A. Perzl, H. Schulz, H. G. Paretzke, K. H. Englmeier and J. Heyder, "Reconstruction of the Lung Geometry for the Simulation of Aerosol Transport", Journal of Aerosol Medicine, 9(3):409–418, 1996, where the mesh representation of a dog's lungs has been used for the simulation of aerosol transport.

A number of mesh editing and post-processing techniques can be applied, such as: simplification, smoothing, intersection or union of meshes, removal of certain parts, etc.

In the medical field, surgery planning is a hot topic. For instance for patients suffering from a brain tumor, usually before surgical intervention several 3D data sets are acquired with different parameters and/or different equipments (MR, CT, . . . ), in order to enhance the geometrical accuracy, visual quality and the automatic segmentation of relevant image structures, such as: tumors, blood vessels, tissue, bones, etc. These data sets have to be co-registered first, so that each position in a certain set can be related to a corresponding position in another set. Since different structures might be visible in different data sets, one has to be able to display them as overlapping images (e.g. displaying the contours of the arteries from a data set on top of the images of another data set) or to generate a 3D view of the brain structures of interest. By first extracting the meshes for the objects of interest from different data sets, and by loading all these meshes together thereafter, one has the ability to visualize in 3D only the relevant information and to plan and simulate the surgical procedure. Also several examples in prosthesis design and placement are currently making use of surface extraction from measured image data sets, mesh generation and visualization (e.g. in dentistry, artificial joints, . . . )

Progressive transmission or refinement of meshes involves coding the mesh description and its vertices in such a way that several resolutions of the same objects can be retrieved from the resulting stream without having redundant information (i.e. each vertex is available only once in the stream and all the vertices from the stream belong to the final resolution object). Such a coding scheme has several applications. For instance, in real-time animations, the complexity of the objects can be adapted depending on the processing power. For some objects not all details are visible. In some situations (e.g. when zooming out image scenes or when dealing with objects located far away from the viewer in a scene with a considerable perspective angle), objects are displayed with a scale factor significantly less than 100%, so that it makes sense to display a coarser (less resource consuming) version of the object's mesh. Progressive transmission of meshes over a network has the benefit that the user at the receiver site does not have to wait until the complete mesh description is downloaded. He/she can start visualizing the object as soon as enough data are available for a coarse level display, and he/she can watch how the model improves while receiving the rest, or he/she may just decide to stop the transfer when he/she sees enough detail.

Since different authors in the field of the present invention use their own notations, the notations used in the present invention (discrete geometry) are given hereinafter for sake of clarity.

First, the notion of a discrete space and a digital image will be defined, and the difference between a digital and a binary image will be shown. Next, iso-contouring is defined and its relation to a binary image is expressed. A digital image consists of voxels, which can be classified either as belonging to the background or to the foreground. The adjacency relation between voxels is introduced and the impact on iso-surface extraction is described.

Let $\psi_D = [1, \ldots, \delta_1] \times [1, \ldots, \delta_2] \times \ldots \times [1, \ldots, \delta_n]$ be an n-dimentional discrete space of size $\delta_1, \delta_2, \ldots, \delta_n$. Such a discrete space is called an n-dimensional bounded grid and abbreviated as n-grid. A digital image I (or short image) is an application $\psi_D \rightarrow D(I)$ where $D(I)$ is the value domain of the image, obtained from sampling a scalar field $\sigma(x)$ over the n-grid $x \in \Re^n$. Typically $D(I)=\{0,1$ for a black and white image (also called binary image), $D(I)=[0, \ldots, 255]$ for 8-bit gray level images, and $D(I)=[0, \ldots, 255] \times [0, \ldots, 255] \times [0, \ldots, 255]$ for 24-bit color images. An n-voxel v is an element of $\psi_D$, and the value of v in the image I is defined as $I(v)$.

A common strategy for visualizing a scalar field $\overline{\omega}(x)$ over an n-grid is to render a (n−1)-dimensional surface satisfying the condition $\Phi(x)=$const for $x \in \Re^n$. The visualization technique is called iso-contouring. An iso-contour is defined as $C(\tau): \{x|\Phi(x)-\tau=0\}$ with $\tau$ representing a specified threshold value and $\Phi(x)$ representing a computed feature for the n-voxel $v_x$. Such a feature could be the scalar field value $\sigma(x)$ or any other property extracted from the neighborhood of the n-voxel $v_x$.

For a specified threshold $\tau$, any digital image generally defined as I: $D(I)=[a, \ldots, b]$ can be converted to a binary image defined as I': $D(I')=\{0,1\}$, by classifying the n-voxels of the n-grid into two groups: one containing all n-voxels having $\Phi(x)$ above or equal to $\tau$, and the second containing the remaining n-voxels having $\Phi(x)$ below $\tau$.

Since any digital image can be reduced to a binary image, or to several ones for different computed features $\Phi_i(x)$, the description of the present invention can refer binary images without loosing generality. All the following definitions are valid within a binary picture:

The inverse picture $\overline{I}$ of an image I can be defined as $\overline{I}(v)=1-I(v)$ with $v \in \psi_D$.

The background $N(I)$ of an image can be defined as $N(I)=\{v \in \psi_D | I(v)=0\}$, and the foreground $U(I)$ of an image as: $U(I)=\{v \in \psi_D | I(v)=1\}$.

An object O is a subset of $U(I)$.

Background n-voxels are referred to as o-voxels, respectively foreground n-voxels as •-voxels.

A voxel can be classified as belonging to the object, and located inside the surface, marked as a black dot or •, and referred to as •-voxel, or it can be classified as belonging to the background, and located outside the surface, marked as a white dot or o, and referred to as o-voxel. This is called the state of the voxel.

For the particular case of a 2-dimensional (2D) image, v is called a pixel, and is identified by its two coordinates $(i,j) \in \psi_D$. A pixel can be displayed as a square of unit size. Similar for a 3-dimensional (3D) volume, v is called a voxel and is identified by its three coordinates $(i,j,k) \in \psi_D$.

A voxel can be visualized as a cube of unit size, having 6 faces that are called upper, lower, right, left, front and back, and each face has 4 edges. One is able to slice a 3D volume in orthogonal planes, thus obtaining sequences of 2D images. Since a 2D image consists of pixels, the analogy can be made that each face of a voxel represents a pixel in an orthogonal slice through the volume, as shown in FIG. 1. In FIG. 1(a) an image is shown, containing both background pixels (gray pixels 1) and foreground pixels (white pixels 2). The same image is shown in FIG. 1b as a slice through the volume and containing voxels, gray voxels 3 and white voxels 4. A pixel can be viewed as a voxel's face.

A 3D volume can be created artificially, containing experimental or simulated data for example, or it can be the result of a stack of planar cross-sectional slices produced by an image acquisition device (e.g. MR, CT, confocal microscope, ultrasound, etc.). The pixels within the slices usually have the same resolution in both directions. The slices, however, in many cases are acquired at a different resolution than the pixels within the slice, which results in an anisotropic voxel. For anisotropic volumes, some interpolation within the data set can be done in an extra pre-processing step to achieve the isotropy, or this problem can be solved at display time by applying different scaling factors, which are proportional to the voxel's resolution in $\{x,y,z\}$, for the 3D surface vertices.

Two •-voxels are $\kappa$-adjacent for $\kappa=\{6,18,26\}$ if their coordinates differ of $\pm 1$:

$\kappa=6$: exactly one coordinate (face adjacency) is different, as shown in FIG. 2(a), $\kappa=18$: one or two coordinates (face or edge adjacency) are different, as shown in FIG. 2(b), $\kappa=26$: one, two or three coordinates (face, edge or vertex adjacency) are different, as shown in FIG. 2(c).

Two •-voxels are said to be strictly $\kappa$-adjacent if they are adjacent only for this $\kappa$. Two $\kappa$-adjacent voxels u and v are denoted $\kappa(u,v)$ and $\kappa$ is called an adjacency relation. In order to define objects, the transitive closure of this relation, called the connectedness, is used: two •-voxels $v_1$ and $v_n$ are $\kappa$-connected (in the set $\psi_D$) if there exists a sequence of •-voxels $v_1, v_2, \ldots, v_n$ such that for any $1 \leq i < n$, $v_i$ is $\kappa$-adjacent to $v_{i+1}$. An object O is $\kappa$-connected if all pairs of voxels of O are $\kappa$-connected.

If $\kappa$ is specified for a •-voxel, then a similar adjacency relation $\lambda$ and connectiveness is available for a o-voxel (a description of connectedness couples $(\kappa,\lambda)$ is given below).

The $\kappa$-neighborhood of a voxel v is a set of voxels that are $\kappa$-adjacent with voxel v. Based on this definition, a more general classification of the voxels can be stated. They can be classified into three groups:

Voxels are belonging to the background when their κ-neighborhood contains only o-voxels.

Voxels are belonging to the object when their κ-neighborhood contains only •-voxels.

Voxels are belonging to the border when their κ-neighborhood contains both •-voxels and o-voxels.

The oldest methods to construct polygonal meshes, for the surface representation of a three-dimensional solid, are contour based approaches, which try to connect contours in adjacent 2D slices to form triangular meshes. Usually a lot of user interaction is needed for specifying, in ambiguous cases (i.e. branching), the contours that have to be connected.

These algorithms face three major problems:

The correspondence issue involves finding the correct connections between the contours of adjacent slices.

The tiling problem has two related issues. The first is how to accomplish optimal tiling in terms of certain metrics such as surface area and enclosed volume. The second one is the topological correctness of the tiling, and the detection and tiling of dissimilar portions of contours.

The branching problem occurs when a contour in one slice can correspond to more than one contour in an adjacent slice.

In E. Keppel, "Approximating complex surfaces by triangulation of contour lines", IBM Journal of Research and Development, 19(1):2–11, January 1975, Keppel provides a solution for building the mesh by triangulation based on randomly distributed points along contour lines. The number of chosen contour points depends on the desired accuracy. The combinatorial problem T of finding the best arrangement of triangles between two contour lines consisting of n and m points can be computed as: $T(m,n)=[(m-1)+(n-1)]!/[(m-1)!(n-1)!]$, which in case of $n=m=12$, for example, provides $10^7$ combinations and thus different surface shapes.

Keppel's strategy for finding the optimal arrangement of triangles approximating the unknown surface is to decompose the given set of contour points into subsets, according to their position and the shape of the contour, convex or concave, such that a proper objective function may be stated separately for each subset. The objective function is formulated as: The triangulation which maximizes the volumes of the polyhedron gives the optimal approximation of the surface provided by a pair of closed convex contour lines. The objective function can be extended to concave contour point sets as well. The optimal triangulation is found by using classical methods of graph theory. The main unsolved problem is the ambiguity of how to triangulate when branching structures cause splitting of one contour into several ones in the neighboring slice.

In H. Fuchs, Z. M. Kedem, and S. P. Uselton, "Optimal Surface Reconstruction from Planar Contours", Communications of the ACM, 20(10):693–702, October 1977, Fuchs et al. determine the optimal surface for each pair of consecutive contours by reducing the problem of finding certain minimum cost cycles in a directed toroidal graph. Their algorithm has a time complexity of $O(n^2 \log n)$, where n is the total number of vertices on the contours bounding the triangles.

In D. Meyers, S. Skinner, and K. Sloan, "Surfaces from contours", ACM Transactions on Graphics, 11(3):228–258, July 1992, Meyers et al. extend previous work and focus on the correspondence problem (finding the correct connections between the contours of adjacent slices) and on the branching problem. They describe a new approach for solving the correspondence problem using a Minimum Spanning Tree generated from the contours. They approximate the contours by ellipses and then assemble them into cylinders to determine the correspondence. Their branching method handles cases where m contours in one section merge into n contours in an adjacent section. Another improvement is the reduction of the user interventions required to determine where the cross-links between the contours should be. They also discuss a scheme to tile canyons between contours. While their branching method works reasonably well for identifying the openings of canyons between branching contours, it does not handle cases where a contour is enclosed within another and the object interior is in between.

In C. Bajaj, E. Coyle, and K. Lin., "Arbitrary Topology Shape Reconstruction from Planar Cross Sections", Graphical Models and Image Processing, 58(6):524–543, 1996, Bajaj et al. provide a good survey of previous approaches. In their approach, Bajaj et al. tackle all three problems (correspondence, tiling and branching) simultaneously by imposing three constraints on the reconstructed surface and then deriving precise correspondence and tiling rules from these constraints. In their approach, Bajaj et al. use the 2D marching cubes algorithm as described in W. E. Lorensen and H. E. Cline, "Marching Cubes: A high resolution 3D surface construction algorithm", in M. C. Stone, editor, Computer Graphics (SIGGRAPH '87 Proceedings), volume 21, pages 163–169, 1987, to generate contour segments from an image slice.

Bajaj et al. give an example of the correspondence problem, shown in FIG. 3. It is to be noticed that four different joint topologies as shown in FIG. 3(b) to (e) may result from the same cross section as in FIG. 3(a). If the distance between slices is large, a priori knowledge or global information is required to determine the correct correspondence.

Tiling means using slice chords to triangulate the strip lying between contours of two adjacent slices into tiling triangles 5, as shown in FIG. 4. A slice chord 6 connects a vertex 7 of a given contour 8 to a vertex 7' of the contour in an adjacent slice 8'. Each tiling triangle 5 consists of exactly two slice chords 6 and one contour segment.

An example with dissimilar contours 9, 10 located on two adjacent slices is shown in FIG. 5(a). FIG. 5(b) shows a tiling in which all vertices of the top contour 9 tile to vertices of the bottom contour 10. In the vertical cross section shown in FIG. 5(c), which is a cross section passing through the point P of the solid in FIG. 5(b) of a reconstruction as in FIG. 5(b), it is noticed that the scalar data (value) along the vertical line L flips (from outside the surface to inside, or vice versa) twice between two adjacent slices because the surface is intersected twice by L. This is an unlikely topology, especially when the distance between the two slices is small. Another tiling possibility is shown in FIG. 5(d), with the vertical cross section displayed in FIG. 5(e), in which the vertices of the dissimilar portion of the contour tile to the medial axis 11, 11' of that dissimilar portion, resulting in a highly likely topology.

Bajaj et al. compare their tiling algorithm with previous approaches, taking an example of two dissimilar contours 9, 10 as shown in FIG. 6, which causes many tiling algorithms to fail. A top view of the two contours 9, 10 is illustrated in FIG. 6(a). The thicker contour is the top contour 9, and small circles represent vertices. The result of the minimum surface area-optimizing algorithm described in D. Meyers, "Reconstruction of Surfaces from Planar Contours", PhD thesis, University of Washington, 1994, is shown as a wire frame in FIG. 6(b) and the same in FIG. 6(c) with hidden lines removed. The arrow points to the abnormality where triangles intersect non-adjacent triangles. It is noticed that the minimum surface-optimizing algorithm generates non-polyhedral surfaces. The result of the shortest slice cord heuristic algorithm as described in H. N. Christiansen and T. W. Sederberg, "Conversion of complex contour line definitions into polygonal element mosaics", Computer Grapics, 12:187–192, August 1978, is shown in FIG. 6(d), which fails as well. Even when the tiling result is a polyhedron, it might be physically unlikely, as shown in FIG. 6(e), where there exists a non-self intersecting surface. One polyhedron correct solution obtained by the algorithm of Bajaj et al. is shown in FIG. 6(f).

A branching problem is shown in FIG. 7, where one contour C3 of slice S2 branches into two contours C1 and C2 of slice S1 (see FIG. 7(a)). FIGS. 7(b) and 7(c) show that a curve L or a point is added between the two slices S1, S2 to model the valley or saddle point formed by the branching. This method is used by Bajaj et al. and is described in C. Bajaj, E. Coyle, and K. Lin., "Arbitrary Topology Shape Reconstruction from Planar Cross Sections", Graphical Models and Image Processing, 58(6):524–543, 1996. In H. N. Christiansen and T. W. Sederberg, "Conversion of complex contour line definitions into polygonal element mosaics", Computer Grapics, 12:187–192, August 1978, Christiansen et al. use the method as shown in FIG. 7(d). This approach works well only in simple branching cases. In D. Meyers, S. Skinner, and K. Sloan, "Surfaces from contours", ACM Transactions on Graphics, 11 (3):228–258, July 1992, Meyers et al. use the scheme as shown in FIG. 7(e), and afterwards they improve the horizontal triangle problem associated with this approach by feeding the triangulation mesh into a surface-fitting program to regenerate the surface.

The handling of branching according to Bajaj et al. is shown in FIG. 8. Branching regions that are not complex, as in the top view shown in FIG. 8(a), can be tiled by adding a vertex to model the saddle point, as shown in FIG. 8(b). The thicker line segments in FIG. 8(a) are top contours 9, 9', and small circles represent vertices. Alternatively, for example for the branching contours 9, 9', 9", 10 shown in top view in FIG. 8(c) (again the thicker line segments are top contours 9, 9', 9", and small circles represent vertices), one could use line segments 13 to model canyons between the contours, as shown in FIG. 8(d).

The constraints imposed by Bajaj et al., ensure that the regions tiled by these rules have a natural appearance and the surfaces produced correspond well with expected physical models. For regions that cannot be tiled by these rules without violating one or more constraints, the medial axis of the region is considered and the tiling is done correspondingly.

The surface reconstruction criteria defined by Bajaj et al. are the following:

Criterion 1: The reconstructed surface and solid regions form piecewise closed surfaces of polyhedra.

Criterion 2: Any vertical line (a line perpendicular to a slice) between two slices intersects the reconstructed surface at zero points, at one point, or along one line segment.

Criterion 3: Resampling of the reconstructed surface on the slice should produce the original contours.

These criteria are used to derive correspondence and tiling rules. The correspondence rules are local (data in adjacent slices are used to determine the correspondence between contours). The tiling rules prohibit those undesired tilings or nonsensical surfaces, and allow detection of branching regions and dissimilar portions of contours. In conjunction with the rules, the method combines a multipass tiling algorithm that first constructs tilings for all regions not violating any of the tiling rules, and in a second and third pass, processes regions that violate these rules (holes, branching regions and dissimilar portions of contours), by tiling to their medial axes. Topologies that violate criterion 2 due to under-sampling of the original data might generate distorted results, as shown in FIG. 9, where examples of topologies are shown that cannot be processed because they violate criterion 2 by having two points of intersection with a line L perpendicular to the slice. An example of surface reconstruction of the brain hemisphere produced by the algorithm of Bajaj et al. is shown in FIG. 10. It is generated from a set of contour data that has been manually traced from 52 MRI image slices. The approach produces significantly fewer triangles than the marching cubes approach as described in W. E. Lorensen and H. E. Cline, "Marching Cubes: A high resolution 3D surface construction algorithm", in M. C. Stone, editor, Computer Graphics (SIGGRAPH '87 Proceedings), volume 21, pages 163–169, 1987, and as described in U.S. Pat. No. 4,710,876, but is much slower. FIG. 10(a) represents a Gouraud shading and FIG. 10(b) represents a wire frame of a reconstructed brain hemisphere.

The current standard technique for extracting iso-surfaces ($\Sigma$) from a 3D grid of data is the Marching-Cubes algorithm (MC), revealed in the patents U.S. Pat. No. 4,710,876 and U.S. Pat. No. 4,729,098, and the related paper W. E. Lorensen and H. E. Cline, "Marching Cubes: A high resolution 3D surface construction algorithm", in M. C. Stone, editor, Computer Graphics (SIGGRAPH '87 Proceedings), volume 21, pages 163–169, 1987.

MC is based on the idea of combining interpolation, segmentation, and surface construction in one single step, but this implicit segmentation is sometimes very difficult, if not impossible, e.g. with noisy data.

At the time of the MC algorithm introduction, existing $\Sigma$ extraction algorithms lacked in detail and sometimes introduced artifacts, as discussed in E. Keppel, "Approximating complex surfaces by triangulation of contour lines", IBM Journal of Research and Development, 19(1):2–11, January 1975, and in H. Fuchs, Z. M. Kedem, and S. P. Uselton, "Optimal Surface Reconstruction from Planar Contours", Communications of the ACM, 20(10):693–702, October 1977. MC creates a polygonal representation of constant density surfaces from a 3D grid data, producing models with "unprecedented detail", as described by the authors. The original MC algorithm has been modified by various fixes for its failure to construct a true separating surface. This has been described in H. H. Baker, "Building surfaces of evolution: The weaving wall", Int. J. Comp. Vision 3 (1989), 51–71; in A. Van Gelder and J. Wilhelms, "Topological Considerations in Iso-surface Generation", to appear in ACM Transactions on Graphics; in A. D. Kalvin, "Segmentation and surface-based modeling of objects in three-dimensional biomedical images", PhD thesis, New York University, 1991; in G. M. Nielson and B. Hermann, "The asymptotic decider: resolving the ambiguity in marching cubes", Proceedings of Visualization '91 (1991), 83–90; in P. Ning and J. Bloomenthal, "An Evaluation of Implicit Surface Tilers", IEEE Computer Graphics & Applications, 13(6):33–41, November 1993; and in B. Wyvill and D. Jevans, "Table Driven Polygonization", SIG-GRAPH 1990 course notes 23, 7-1–7-6.

The "original" MC algorithm as described in U.S. Pat. No. 4,710,876 and U.S. Pat. No. 4,729,098 is based on the tabulation of 256 different configurations, thus it falls into the category of methods that are based on a lookup table to decide how to connect the iso-surface vertices. It allows a local iso-surface extraction inside an 8-cube defined by eight voxels. The global iso-surface is the union of these small pieces of surface computed on each set of eight connected voxels of the image.

An 8-cube as shown in FIG. 11(a), is a cube 14 lying between two image slices 15, 16 and consisting of 8 neighboring voxels (4 in each slice). A new grid is formed by identifying the image voxels as discrete 3D points. For a 3D image I with size M×N×P, there are (M−1)(N−1)(P−1) 8-cubes in I. The voxels, or corners, of the 8-cube 14 are either located inside (•-voxel) or outside (o-voxel) of the object 17. Whenever there are two corners with different states (inside and outside) along an edge of the 8-cube 14, there must be an intersection with the surface of the object 17. Since there are 8 corners (voxels) in each 8-cube 14, and two states, inside and outside, there are $2^8$=256 ways a surface can intersect the 8-cube 14. Triangulating these 256 cases is possible but tedious and error-prone. That is why these cases are further reduced to 15, first by eliminating complementary cases (interchanging •-voxels with o-voxels and vice versa) and second by omitting symmetrical cases (obtained by rotating the 8-cube). FIG. 12 shows the basic 8-cube configurations for MC.

In order to speed-up the identification of triangles that are built inside an 8-cube, a lookup table with 256 entries has been generated from these 15 cases. The lookup table contains a list of 8-cube edge intersections with a description stating how these intersections should be connected in order to build the triangles. For each case, an index into the lookup is computed using the corner numbering of the 8-cube as shown in FIG. 11(b), by associating each corner with one bit in an 8-digit number, and assigning a one to each •-voxel and a zero to each o-voxel belonging to the 8-cube. For the example shown in FIG. 11(b), which corresponds to case 5 of FIG. 12, giving rise to three triangles, the computed index=01100100 binary (100 decimal), and the connectivity of the triangles, described in terms of edges intersected by $\Sigma$, is $\{e_3e_5e_7,e_2e_3e_5,e_2e_5e_{10}\}$.

The position of each triangle vertex, where the iso-surfaces $\Sigma$ intersects the 8-cube's edge, is found by linear interpolation of the density (e.g. gray value) between the edge corners. The computed offset from the •-voxel towards the o-voxel for a specified threshold $\tau$ is equal to:

$$\mathit{offset} = \frac{(D(\bullet - \mathit{voxel}) - \tau)}{(D(\bullet - \mathit{voxel}) - D(\circ - \mathit{voxel}))} \quad \text{(eq. 1)}$$

where D is the density value at the corner voxel. The offset is in the range=[0 . . . 1].

For visualization purposes, a unit normal is computed for each triangle vertex using the gradient information available in the 3D data. First, the gradient vector at the corners of the 8-cube is estimated and then the vectors are linearly interpolated at the point of intersection of the triangle vertices with the 8-cube edges. The gradient at the 8-cube corner (x,y,z), is estimated using central differences along the three coordinate axes by:

$G_x(x,y,z)=[D(x+1,y,z)-D(x-1,y,z)]/2\Delta x$ $G_y(x,y,z)=[D(x,y+1,z)-D(x,y-1,z)]/2\Delta y$ $G_z(x,y,z)=[D(x,y,z+1)-D(x,y,z-1)]/2\Delta z$ where D(x,y,z) is the density at voxel (x,y,z) and $\{\Delta x,\Delta y,\Delta z\}$ are the lengths of the 8-cube edges.

The MC algorithm has been intensively used for rendering purposes but has shown its limitations in other applications, because the extracted iso-surface is in general not a "simple" surface. Some authors have noticed that the iso-surface does not always have the same topology as an underlying continuous surface defining the image. Many authors have contributed to solve this problem, but they have often provided an empirical solution or a visual justification.

There are some ambiguous cases that might lead to the generation of holes, i.e. inconsistencies in the produced mesh. In case the resulting mesh is aimed at direct rendering, inconsistencies might not be an issue, as long as one is not zooming in for details. In a different context, for instance if the goal is to use the mesh as a CAD model or for a finite element analysis, as in M. A. Perzl, H. Schultz, H. G. Paretzke, K. H. Engimeier, and J. Heyder, "Reconstruction of the Lung Geometry for the Simulation of Aerosol Transport", Journal of Aerosol Medicine, 9(3):409–418, 1996, one might encounter serious problems.

The ambiguous cases occur on any 8-cube face that has adjacent vertices with different states, while diagonal vertices are in the same state. There are six of these cases as shown in FIG. 12: cases 3, 6, 7, 9, 10 and 13. An example of inconsistent reconstruction of the local surface and of a correct solution are shown in FIG. 13. In the left image, an inconsistent choice is shown. Case 6 of FIG. 12 is applied for the complementary configuration that, combined with the triangles generated by case 3, will result in holes, as triangles generated by case 3 do not match the ones generated by case 6 (actually the complement of case 6). A correct triangulation is shown in the right image where case 6 has been modified, a configuration that is not available in the 15 basic cases.

A first fix to the MC algorithm, is constructing iso-surfaces from CT data, as described in A. Wallin, "Constructing isosurfaces from CT data", IEEE Computer Graphics and Applications, 11(6)28–33, November 1991.

Similar to MC, this method uses the 8-cube approach to extract a local surface. The main difference is that the configuration table is built for a 4-face instead of an 8-cube. The ambiguous cases found in MC are solved by using the density value (interpolated) at the center of the 4-face to determine if that point lies inside or outside the $\Sigma$, as described in G. Wyvill, C. McPheeters, and B. Wyvill, "Data structures for soft objects", The Visual Computer, 2:227–234, 1986.

Some new concepts are introduced. A polygon is a connected set of edges that forms an iso-surface. The ordering of a polygon is the path taken by the vertices describing it $(v_0 \to v_1 \to v_2 \to \ldots \to v_0)$. Two neighboring polygons are coherently ordered if the path of an edge shared by the two is opposite. A surface is coherently connected if all edges occur twice in opposite directions (two complementary edges) and if no polygon touches another polygon except at the common edge.

The algorithm guarantees that the obtained polygons are coherently ordered and connected, with no polygon occurring more than once, and that each surface is complete, that is, no holes due to surface generation errors occur. The generated $\Sigma$ consists of either the minimum number of (non-planar) polygons with 3 to 12 vertices or a minimum number of triangles.

The surface generation process has two phases that are: the edge generation and connection, and polygon generation.

In the first step, for each 8-cube three 4-faces (for example the front, right and top 4-faces) are considered and the edges intersected by $\Sigma$ are determined. The other three of the six 4-faces (for example the back, left and bottom 4-faces) will be examined when the adjacent 8-cube are considered. With four voxels at the corners of the 4-face, 16 cases of edge configurations must be considered, as shown in FIG. 14. White dots represent the o-voxels, black dots represent the •-voxels, and gray dots represent the vertices of the Σ. For configurations 5 and 10, either the dashed or the solid lines connecting grey dots indicate which edges are used, depending on the (interpolated) value at the center of the face. In contrast to MC, the cases are not reduced by symmetry or complementariness.

When one intersection occurs, the algorithm produces two edges (case 1 to 4, 6 to 9, and 11 to 14), one directed in each direction. Both of these edges must be kept in memory to produce a coherent surface later. When two intersections occur (as in case 5 and 10), the algorithm can use the (interpolated) value at the center of the face to determine if that point lies inside or outside the iso-surface, as described in G. Wyvill, C. McPheeters, and B. Wyvill, "Data structures for soft objects", The Visual Computer, 2:227–234, 1986. The generated surface differs slightly depending on whether the face's center is considered or not. Either way the obtained surface is valid and coherent.

Similar to MC, the position of the triangle vertex, where the iso-surfaces Σ intersect the 4-face's edge, is linearly interpolated between the edge corners.

In the second step, the scanning of the edges list to obtain a correct surface is more complex than the generation of edges. The possible polygon configurations that can be detected are triangles (one case), rectangles (two cases), pentagons (one case), hexagons (three cases), heptagons (one case), octagons (two cases), nonagons (one case), and 12 edges (two cases). In general, the polygons formed by connecting the edges are non-planar and the triangulation problem is not trivial since the number of possible (although not all valid) configurations is:

$$N = \frac{2^{n-2}}{(n-1)!} \prod_{k=1}^{n-3} (2k+1)$$

where n is the number of vertices in the polygon. For n=4 the number is 2, for n=6, it is 14, but for n=12 it is 16796.

A second fix to the MC algorithm is skeleton climbing (SC), as described in T. Poston, H. T. Nguyen, P.-A. Heng, and T.-T. Wong, "Skeleton Climbing: Fast Isosurfaces with Fewer Triangles", Proceedings of Pacific Graphics'97, pages 117–126, Seoul, Korea, October, 1997, and in T. Poston, T.-T. Wong and P.-A. Heng, "Multiresolution Isosurface Extraction with Adaptive Skeleton Climbing", Computer Graphics Forum, 17(3):137–148, September 1998.

Similar to the Marching Cubes algorithm (MC), SC uses the 8-cube approach to visit the data volume and to build triangulated iso-surfaces (Σ) in 3D grid data. It is based on a 4-step approach to construct the surface:

First, surface vertices (0-skeleton of the Σ) are chosen just as MC does, i.e. one on each cube edge joining a o to a •, positioned by linear interpolation. An edge is called occupied if it contains a surface vertex. As an auxiliary for the triangle building step, thick edges 18 as shown in FIG. 15 are introduced and defined in the following way: in z-direction the ones with x and y even, in y-direction the ones with x odd and z even, and in x-direction the ones with y and z odd.

Rather than to look directly at the configuration of the cubes like MC does, triangle sides (1-skeleton of the Σ) are constructed in the second step between vertices that share a cube's face. A simple rule, "do not cross o—o diagonals", which yields five different cases for the face as shown in FIG. 15, is specified. Gray dots represent the vertices located between a o- and a •-voxel, which are connected by oriented edges. One can notice that SC does not reduce the number of cases by symmetry and complementariness, so that in configurations similar to case 4 in FIG. 15 mismatching edges can be avoided, a problem that the original MC algorithm faces, resulting in holes in the surface. Each side has an orientation such that the neighboring •'s stay on the left side.

In a third step, polygons are retrieved in each cube of the cubical grid and split into triangles (2-skeleton of the Σ) according to the following rule: whenever the edge E of a cube is occupied, the set of sides is shrunk by merging the two sides that end on E, and a triangle is generated with the orientation given by these two sides, as shown in FIG. 16.

After the third step, the triangulated surface is fully defined. The fourth step is only supposed to reduce the number of triangles: for each occupied thick edge 18, the four triangles that meet on it, are replaced by two triangles with the same boundary, as shown in FIG. 17. The four triangles in FIG. 17(a), resp. FIG. 17(c), that meet on the thick edge 18 are replaced by two triangles with the same boundary in FIG. 17(b), resp. FIG. 17(d). FIGS. 17(c) and (d) show the same configuration and procedure as in the FIGS. 17(a) resp. (b), but in the context of the full mesh. The method allows still to obtain truly separated surfaces without gaps while reducing the number of triangles by 25%. The time overhead introduced by this step is 4% on average, yielding globally a time comparable with MC, but that is however significantly smaller than the time needed by current mesh decimation algorithms.

The authors emphasize that they do not reduce the cases by symmetry and complementarity in the SC algorithm as MC does. It is possible to derive 256 configurations from the five face cases shown in FIG. 15, but to make a comparison possible with MC, it suffices to only look at the basic configurations (each one representing equivalent cases by reflection and rotation) in FIG. 18, which shows typical SC step 3 triangle sets and side patterns in cube faces for the "do not cross o—o diagonals" rule. The numbering and views are kept similar to those in W. E. Lorensen and H. E. Cline, "Marching Cubes: A high-resolution 3D surface construction algorithm", in M. C. Stone, editor, Computer Graphics (SIGGRAPH '87 Proceedings), volume 21, pages 163–169, 1987 (Case 14 in the MC literature, identical to case 11 by reflection in a diagonal plane, is omitted here). It is to be noticed that for the cases 3 versus 3a, respectively 6 versus 6a, and 7 versus 7a, complementation gives a different triangulation pattern, an aspect that MC is not taking into account. The other cases are similar to the ones in MC.

Some results that compare the SC algorithm with MC are shown in FIG. 19 and FIG. 20. FIG. 19 is an example of a knotted torus sampled at 64×64 resolution, whereby FIG. 19(a) is extracted by MC (13968 triangles), FIG. 19(b) is extracted by SC without step 4 (13968 triangles), and FIG. 19(c) is extracted by SC with step 4 (10464 triangles). Without step 4, SC obtains similar results as MC in terms of number of triangles, speed and visual quality, except for the cases where MC fails to correctly approximate Σ. SC with step 4 reduces the number of triangles by 25%, and gives as a result a smoother surface, as also shown in FIG. 20, except for fine details, which are approximated less accurately; see FIG. 19(c) where step 4 preserves the topology, but for an analytic function, some smoothness is lost in the finest part of the tube. FIG. 20 shows surfaces extracted from a 128×128×57 CT scan, with a threshold distinguishing bone from non-bone. Again FIG. 20(a) is extracted by MC (100830 triangles), FIG. 19(b) is extracted by SC without step 4 (100066 triangles), and FIG. 19(c) is extracted by SC with step 4 (75318 triangles). SC with step 4 gives a smoother forehead region, and equally good detail.

As described in T. Poston, T.-T. Wong and P.-A. Heng, "Multiresolution Isosurface Extraction with Adaptive Skeleton Climbing", Computer Graphics Forum, 17(3):137–148, September 1998, Poston et al. have implemented a new SC algorithm called adaptive skeleton climbing (ASC) that is able to generate directly multi-resolution iso-surfaces from volume data, with between 4 to 25 times fewer triangles than MC, and in comparable processing times. The basic idea is to group voxels first in 1D (segments), then in 2D (rectangles) and finally in 3D (boxes) that are adapted to the geometry of the true iso-surface. In ASC, the triangular mesh is generated from these boxes instead of the cubes as in SC. The coarseness of the generated meshes is controlled by a specified maximum size (N) of the boxes. When N=1, the largest box contains 2×2×2 voxels, like in MC. When a larger block size is used, larger boxes will be generated when the iso-surface can be respected, resulting in larger-triangles.

The proposed on-the-fly triangle reduction approach can generate meshes that are more accurate because it directly makes use of the voxel values in the volume. The algorithm has the advantage that the construction of coarser iso-surfaces requires less computation time, which is contrary to mesh optimization approaches, generally requiring a longer time to generate coarser meshes. Hence, ASC allows the user to obtain rapidly a low-resolution mesh for interactive preview purposes and to delay the decision for the more time-consuming generation of the detailed high-resolution mesh until optimal parameter settings (threshold, viewing angle, . . . ) have been found.

Although the triangles in the meshes may not be optimally reduced, ASC is much faster than post-processing triangle reduction algorithms. Therefore, the coarse meshes ASC produces can be used as the starting point for mesh optimization algorithms, if mesh optimality is the main concern. Similar to SC, ASC does not suffer from the gap-filling problem.

A third fix to the MC algorithm is topologically defined iso-surfaces, as described in J. O. Lachaud, "Extraction de surfaces à partir d'images tridimensionnelles: approches discretes et approche par modèle deformable", Ph.D. Thesis, July 1998.

In this approach, the authors have focused on modifying the table of configurations for MC, while the algorithm itself remained unchanged. They exploit the underlying discrete topology of voxels, especially their adjacency and connectedness to extract a topologically correct iso-surface from a volumetric image.

Their main contribution is to provide a formal proof of the validity of the generated iso-surface according to the chosen connectedness. Furthermore, they demonstrate the coherence of the iso-surface (closedness, orientability, no singularity, no self-intersection) along with fundamental properties:

For a specified connectedness couple $(\kappa,\lambda)$, the obtained iso-surface is opposite (in terms of orientation) of the iso-surface extracted for the opposite image with inverse connectedness couple $(\lambda,\kappa)$ (next paragraphs explain the meaning of $(\kappa,\lambda)$ and which are the valid connectedness couples).

The •-voxel with a given connectedness is inside the surface and the o-voxel (with another connectedness) is outside the surface.

As shown in FIG. 2, there are three types of adjacencies between image voxels. The adjacency relation can be specified for both •-voxel and o-voxel, call it $\kappa$ respectively $\lambda$.

The orientation of the polygon's edge is important in defining the orientation of the surface. The concept of the orientation of the edges is demonstrated in FIG. 21 for the 16 cases of a 4-face, while the generalization for the 8-cube is shown in FIG. 23. The inner part of the surface (see FIG. 21), displayed in gray, is located on the left side of the oriented edge. Two cases (case 5 and 10) are ambiguous, and the choice of the right connectedness couple $(\kappa,\lambda)$ is essential.

A correct solution cannot be obtained for every couple $(\kappa,\lambda)$ as shown in FIG. 22. The case of FIG. 22(b) where $(\kappa,\lambda)=(6,18)$ or $(6,26)$ and the case of FIG. 22(c) where $(\kappa,\lambda)=(18,6)$ or $(26,6)$ generate a coherent iso-surface, while for the case of FIG. 22(a) where $(\kappa,\lambda)=(6,6)$, and for the case of FIG. 22(d) where $(\kappa,\lambda)=(18,18)$, $(18,26)$, $(26,18)$, or $(26,26)$, an arbitrary choice would provide a locally different surface in the inverse picture. The connectedness couples $(6,18)$, $(6,26)$, $(18,6)$ and $(26,6)$ are called valid couples. It is to be noticed that no distinction can be made between the 18-connectedness and 26-connectedness for a 4-face, but the difference is visible for the 8-cube. The conclusion is that one could build four different tables of configurations for each of the valid couples.

The modified MC configurations for the 14 cases and the valid connectedness couples are shown in FIG. 23. Similar to original MC, cases that can be obtained via rotation or symmetry are not displayed. FIG. 23(a) shows all possible cases obtained for the couples $\{(\kappa=6,\lambda=18), (\kappa=6,\lambda=26)\}$. In FIGS. 23(b) and (c) only the cases that differ from FIG. 23(a) for the couple $\{(\kappa=18,\lambda=6)$ are displayed, with in FIG. 23(c) only cases different from FIG. 23(a) in the way the generated polygon is split into triangles are given. Finally in FIG. 23(d) are shown only the cases different from FIG. 23(b) and FIG. 23(c) for the couple $\{(\kappa=26,\lambda=6)$.

The result of the modified MC algorithm for different connectedness couples $(\kappa,\lambda)$ on a test image is shown in FIG. 24. FIG. 24(a) displays a 3D surface rendering of the individual voxels, whereby each voxel is shown as a box. FIG. 24(b) shows the result obtained for a connectedness couple $(\kappa=26,\lambda=6)$, while FIG. 24(c) is obtained for $(\kappa=18, \lambda=6)$, and FIG. 24(d) for $(\kappa=6,\lambda=18)$ or $(\kappa=6,\lambda=26)$.

It is an object of the present invention to provide a method and a system to acquire surface descriptions from a plurality of sections through multi-dimensional representations of objects, especially through three-dimensional representations of objects.

It is a further object of the present invention to provide a compact, optionally multi-scalable, optionally view-dependent, optionally animation-friendly multi-dimensional surface representation method and system.

It is still a further object of the present invention to provide a digital coding of a surface representation which may be transmitted over bandwidth limited communication channels.

SUMMARY OF THE INVENTION

The present invention relates to four related but independent aspects: (1) an embodiment (called for brevity's sake TriScan™) providing a method and a system to derive mesh surface descriptions (also called connectivity-wireframes) from objects represented as a scalar field (e.g. discrete multi-dimensional data), scalar functions (e.g. implicit surfaces) or any other surface description that differs from the surface description obtained by the TriScan™ method, (2) a further embodiment comprising a compact, optionally multi-scalable, optionally view-dependent, optionally animation-friendly, multi-dimensional surface representation method and system—called for brevity's sake MeshGrid™—of a surface mesh description associated with a reference grid, (3) an embodiment providing digital coding of the MeshGrid™ surface representation, and (4) an embodiment providing a method and system for conversion of other surface descriptions to the MeshGrid™ surface representation.

The TriScan™ and MeshGrid™ terminologies are used to make the distinction between two concepts, namely the surface structure extraction and the surface structure representation in the form of a combined surface mesh description attached to a reference grid, however these terms are not limiting on the invention. It should be understood that the terms TriScan™ and MeshGrid™ are each shorthand for a series of embodiments of the present invention.

The TriScan™ method is a surface extraction method that generates a surface description in discrete mesh form, called a connectivity-wireframe for convenience sake, whch can be stored. It can optionally be brought to a grid representation to form a combined surface mesh description attached to a reference grid, e.g. the MeshGrid™ representation. The connectivity-wireframe obtained with TriScan™ comprises a set of connected vertices or nodes, and for each vertex its (typically four) neighbors and its coordinates are specified. The connectivity-wireframe obtained with TriScan™ may contain for each vertex extra information, such as: a discrete border direction and an appropriate discrete position given by the indices of the sections cutting through the object, defining the discrete grid of points, the reference-grid.

The MeshGrid™ representation exploits the fact that each discrete position of the reference-grid has its own coordinates and that a vertex of the surface mesh representation can be attached to its appropriate discrete position in the reference grid by specifying a scalar offset for each vertex instead of its coordinates in the grid. In the MeshGrid™ representation a vertex is located on the grid-segment connecting two grid-points (discrete positions), and the vertex offset is a number, preferably between 0 and 1, preferably specifying the relative position of the vertex on that grid-segment. The coordinate of a vertex can be expressed as the coordinates of the discrete position to which it is attached to, plus an offset vector defined as the multiplication between the scalar offset and the vector of the grid-segment defined in the direction of the border.

A MeshGrid™ representation is independent of the TriScan™ method and can be used with a surface meash representation of a an object obtained by other means than the TriScan™ method. Any mesh can be attached to a reference-grid, but for efficient coding the mesh should follow the same connectivity constraints as imposed by the TriScan™ method. The representation of MeshGrid™ can be stored, e.g. on a CD-ROM or hard drive of a general purpose computer or transmitted to a remote location.

The TriScan Method

One aspect of the invention (of which the TriScan method is one example) includes a method of deriving and preparing data for display of a n−1 dimensional surface description in the form of a mesh, called a connectivity-wireframe, of an n-dimensional object, n being at least 3, the surface mesh description to be derived by the method comprising a plurality of boundary nodes (or vertices), each boundary node lying on or adjacent to the surface to be described, each boundary node being associated with connectivity information. The connectivity information can comprise representations of up to (n−1) incoming and/or (n−1) outgoing directions towards 2*(n−1) adjacent boundary nodes adjacent to the said boundary node, the orientation of the incoming or outgoing directions being defined in such a way that the cross product of the up to (n−1) incoming directions or (n−1) outgoing directions associated with any boundary node gives a vector which points away from the surface at that boundary node. In an additional step a polygonal representation may be generated from the connectivity-wireframe of the object, e.g. from the plurality of boundary nodes and the connectivity information of those boundary nodes.

The step for obtaining the mesh representation of the surface, i.e. the connectivity-wireframe, from an n-dimensional object can comprise defining n sets of (n−1)-dimensional reference-surfaces; the reference-surfaces of one set keeping their initial ordering at the surface of the object. Typically (at least during generation of the representations), no two reference surfaces of one set will intersect within the object and no single reference surface intersects itself within the object.

Another step for obtaining the connectivity-wireframe from an n-dimensional object comprises determining contours of the surface, each contour lying in a reference surface of n−1 lower dimensions.

In another aspect of the invention, a contour can be defined as an iso-contour of a physical property of the object. The property may be the gray level, for example.

In yet another aspect of the invention, the iso-contours are defined by at least two values of the property (e.g. −1, 1), i.e. a value labeling the inside of the object, and a value labeling the outside of the object for the specified property.

In yet another aspect of the invention, a third value of the property (e.g. 0), i.e. the value identifying the precise position of the border for the specified property for the object. The third value of the property improves the precision of the contouring of the object with respect to the specified property.

In another aspect of the invention, a polygonal representation of the surface of the object is obtained from the connectivity information of the connectivity-wireframe.

Yet in another aspect of the invention, the polygonal representation of the surface of the object consists of a union of a set of surface primitives.

Yet in another aspect of the invention, the surface primitives are identified from the connectivity information of the connectivity-wireframe on the bases of a set of connectivity rules.

In another aspect of the invention, the method comprises rendering the surface from the polygonal representation. The rendered surface can then be displayed.

In another aspect of the invention the intersection points of n sets of further reference-surfaces define a grid called the reference-grid.

Yet in another aspect of the invention, a reference-grid point has a coordinate and it can be identified by the indices of the reference-surfaces intersecting in that point.

Yet in another aspect of the invention, the boundary node description contains at least the coordinates of a vertex of the mesh representation and the connectivity to other boundary nodes.

Yet in another aspect of the invention, the boundary node description may contain in addition the direction vector of the border and the position of a reference-grid point, identified by the indices of the reference-surfaces intersecting in that point; the reference-grid point the boundary node is referring to, is located inside or outside the object, closest to the boundary node in the direction of the border specified for the boundary node.

In another aspect of the invention, the connectivity-wireframe obtained from the TriScan™ method can further be decomposed into a hierarchical or non-hierarchical multi-resolution representation; the highest resolution of the connectivity-wireframe can be imposed identical with the initial non multi-resolution connectivity-wireframe. The hierarchical feature of the multi-resolution connectivity-wireframe implies that any boundary node from a lower resolution connectivity-wireframe will be found in all the higher resolution connectivity-wireframes. The connectivity information associated with the boundary node may change between successive resolutions of the connectivity-wireframe.

The step in building the hierarchical or non-hierarchical multi-resolution connectivity-wireframe consists in obtaining successive lower resolution connectivity-wireframe from an immediate higher connectivity-wireframe by removing some of the reference-surfaces of the immediate higher connectivity-wireframe.

A different approach in building the hierarchical or non-hierarchical multi-resolution connectivity-wireframe consists in obtaining successive higher resolution connectivity-wireframes from an immediate lower connectivity-wireframe by adding some of the reference-surfaces to the immediate lower connectivity-wireframe.

Another aspect of the invention is that hierarchical multi-resolution connectivity-wireframes may consist of at least one hierarchical node description to a plurality of other hierarchical node descriptions.

In another aspect, the hierarchical node description is a node description that has associated a hierarchical connectivity information comprising representations of up to (n−1) incoming and (n−1) outgoing directions towards 2*(n−1) adjacent boundary nodes adjacent to the said boundary node, for each resolution of the connectivity-wireframe the said boundary node exists.

In another aspect of the invention, the connectivity-wireframe obtained with the TriScan™ method can be stored as it is.

The present invention also includes a system for carrying out the above methods as well as a computer program product which when executed on a computing device executes one or more of the above methods, i.e. includes code segments able to execute one of the above methods. The present invention also includes the computer program product stored on a suitable data carrier, which when inserted into a computing device exexcutes one of the above methods.

The MeshGrid™ Representation

Another aspect of the invention is a compact, optionally multi-scalable, optionally view-dependent, optionally animation-friendly multi-dimensional surface representation method—called MeshGrid™ which is a combination of a reference grid and a surface mesh representation of an object (connectivity wireframe) attached thereto in which connectivity information is provided.

Yet another aspect of the invention is the representation of the TriScan™ connectivity-wireframe in the MeshGrid representation.

The step for obtaining the MeshGrid™ representation, of the surface of an n-dimensional object comprises specifying n sets of reference-surfaces; the reference-surfaces of one set keeping their initial ordering at the surface of the object.

Another step for obtaining the MeshGrid™ representation, of the surface of an n-dimensional object comprises deriving a surface mesh description (the connectivity-wireframe) of the object having specific connectivity properties. Such a connectivity-wireframe can be obtained using the TriScan method.

In another aspect, a polygonal surface mesh representation may be used, e.g. a quadrilateral mesh having, e.g. a 4-connectivity property of the connectivity-wireframe, yet the connectivities between the mesh vertices have to be rearranged to the specificity of the connectivity-wireframe.

Yet another step of obtaining the MeshGrid™ representation, of the surface of an n-dimensional object comprises obtaining the reference-grid description of the n-dimensional object, the reference-grid being defined by the intersection points of the specified reference-surfaces.

Yet another step of obtaining the MeshGrid™ representation, of the surface of an n-dimensional object comprises defining the offsets for the boundary nodes of the connectivity-wireframe.

In another aspect of the invention, a boundary node will be attached to a reference-grid point, identified by the indices of the reference-surfaces intersecting in that point; the boundary node may be located on the grid-line segment connecting the reference-grid point it is attached to, with another reference-grid point.

Yet in another aspect of the invention, the offset of a boundary node is computed in relation with the reference-grid point it is attached to, and offset calculation may yield any value preferably between 0 and 1, including 0; in this case the offset is preferably defined as a relative value.

In yet another aspect of the invention, the method consists in attaching the connectivity-wireframe of a n-dimensional object to the reference-grid and storing a plurality of boundary node descriptions, each description being at least a definition of an intersection point in the grid and an associated offset.

Yet in another aspect of the present invention a MeshGrid representation consists of at least one boundary node, defined by a reference-grid point and an offset.

In another aspect of the present invention, the coordinate of a boundary node (vertex) can be expressed as the coordinates of the reference-grid position to which it is attached to, plus an offset vector defined as the multiplication of the scalar offset and the vector of the grid-segment, the boundary node is located on, defined in the direction of the border.

In another aspect of the invention, the polygonal representation of the surface of the n-dimensional object is obtained from the connectivity information of the connectivity-wireframe attached to reference-grid in the MeshGrid representation.

In another aspect of the current invention, the surface description of a n-dimensional object is defined in the MeshGrid representation via a connectivity-wireframe comprising the description of the boundary nodes, and via the reference-grid description comprising the reference-grid points. The connectivity-wireframe is the connectivity layer that can be attached to a plurality of reference-grid descriptions compatible with the reference-surfaces used to generate the surface-description, respectively the connectivity-wireframe (e.g. different compatible reference-grid descriptions can be obtained when deforming or animating an existing reference-grid). The reference-grid description gives the volumetric or spatial distribution of an object.

Another aspect of the invention, is the MeshGrid representation of surface descriptions different from the ones obtained via the TriScan method.

In another aspect of the invention, other polygonal meshes such as Qadrilateral meshes, may be stored in the MeshGrid representation.

In another aspect of the invention, the step of obtaining a MeshGrid representation from a polygonal mesh such as a quadrilateral mesh comprises defining a constrained reference-grid based on the number of polygons e.g. quadrilaterals, in the mesh.

Another step for obtaining a MeshGrid representation from a polygonal mesh, e.g. a quadrilateral mesh, may comprise deforming or uniformly distributing the reference-grid to fit the volume of the polygonal mesh, e.g. quadrilateral mesh; the vertices of the polygonal mesh, e.g. quadrilateral mesh, can be used as boundary conditions for the distribution of the reference-grid points.

Yet another step for obtaining a MeshGrid representation from a polygonal mesh, e.g. a quadrilateral mesh, comprises deriving the connectivity information between the vertices of the polygonal, e.g. quadrilateral mesh, to build the mesh description.

Yet another step for obtaining a MeshGrid representation from a polygonal mesh, e.g. a quadrilateral mesh comprises attaching the vertices of the polygonal, e.g. quadrilateral mesh to reference-grid points, and specifying the offset for each vertex.

An aspect of the method is that the reference-grid points can be distributed in such a way that the vertices or the boundary nodes lie at an arbitrary position, e.g. at half the distance, between two grid points, thus yielding an offset of 0.5, the default value, which does not need to be stored.

In another aspect of the invention, the MeshGrid representation may have a hierarchical multi-resolution structure. The highest resolution MeshGrid representation contains all the reference-grid points. The hierarchical feature of the multi-resolution MeshGrid representation implies that any reference-grid point from a lower resolution MeshGrid representation will be found in all the higher resolution MeshGrid representations. Consequently the mesh description attached to the reference-grid in the hierarchical MeshGrid representation will follow the same hierarchical description.

In another aspect of the invention, the step in building the hierarchical multi-resolution MeshGrid representation consists in obtaining successive lower resolution MeshGrid representations from an immediate higher MeshGrid representation by removing some of the reference-surfaces or the equivalent reference-grid points of the immediate higher MeshGrid representation.

In another aspect of the invention, a different approach in building the hierarchical MeshGrid representation consists in obtaining successive higher resolution MeshGrid representations from an immediate lower MeshGrid representation by adding some of the reference-surfaces or the equivalent reference-grid points to the immediate lower MeshGrid representation.

In another aspect of the invention, after obtaining the MeshGrid representation, the reference-surface spacings may be changed locally or globally to provide re-sizing of the surface mesh or, for instance, animation. Reference surfaces may touch each other or pass through each other in these circumstances. Parts of the mesh may be "cut" or deformed.

In another aspect of the invention, three types of scalability can be exploited simultaneously in progressive transmission schemes with variable detail that depend on the bandwidth of the connection and the capabilities of the terminal equipment, in both view-dependent and view-independent scenarios. The view-dependent scenario is implemented by means of regions-of-interest (ROIs). A ROI is defined as a part of the reference-grid. ROI based coding implies subdividing the entire MeshGrid in smaller parts and encoding the connectivity-wireframe and reference-grid description of each of these parts separately. The three types of scalability are: (1) mesh resolution scalability, i.e. adapting the number of transmitted vertices on a ROI basis in view-dependent mode or globally otherwise, and (2) shape precision i.e. adaptive reconstruction of the reference-grid positions on a ROI basis in view-dependent mode or globally otherwise, (3) vertex position scalability, i.e. increasing the precision of known vertex positions with relation to the reference-grid (the value of the offset) on a ROI basis in view-dependent mode or globally otherwise.

In another aspect of the invention, in addition to the vertex-based animation, typical for polygonal meshes, the MeshGrid representation supports specific animation capabilities, such as (1) rippling effects by changing the position of the vertices relative to corresponding reference-grid points (the offset), and (2) reshaping the regular reference-grid and its attached vertices, which can be done on a hierarchical or non-hierarchical basis; When reshaping or animating the reference-grid on a hierarchical basis, any changes applied to the reference-grid points, corresponding to a lower resolution of the mesh, will be propagated to the reference-grid points, corresponding to the higher resolutions of the mesh, while applying a similar deformation to the reference-grid points corresponding to a higher resolution of the mesh will only have a local impact.

In another aspect of the invention, for the vertex-based animation, each vertex will retrieve its 3D coordinates from the coordinates of the grid points it is attached to, and from the specified offset.

The present invention also includes a system for carrying out the above methods as well as a computer program product which when executed on a computing device executes one or more of the above methods. The present invention also includes the computer program product stored on a suitable data carrier.

The Coding Method and the Stream it Produces

In yet another aspect of the invention, the method comprises transmitting a combined surface mesh representation with a reference grid attached thereto, e.g. the MeshGrid representation, of the surface to a remote location.

In another aspect of the invention, the transmission step comprises the step of generating a bit-stream from the combined, e.g. MeshGrid representation.

As an aspect of the invention, the bit-stream will in general consist of three parts: (1) a description of the mesh describing the surface, i.e. the connectivity-wireframe description, (2) optionally, a reference-grid description, and (3) optionally, a vertices (node)-refinement description (i.e. refining the position of the vertices relative to the reference-grid—the offsets). Each of these parts can be specified according to the type of bit-stream in single-resolution, multi-resolution, view-dependent or view-independent modes. A minimal bit-stream may however only consist of the description of the connectivity-wireframe, which is mandatory for every stream. In that case the 8 corners of the reference-grid have to be specified in the header of the bit-stream. All remaining details are set by default values As an aspect of the invention, due to its regular nature, it is possible to divide this reference-grid into a number of 3D blocks (called ROIs), and it is possible to encode the surface locally in each of these ROIs. The ROIs are defined in such a way such that the entire volume is covered. Two ROIs may share a face but they do not overlap. The view-dependent coding consists in coding the MeshGrid representation for each ROI independently.

As an aspect of the invention, the coding of the single-resolution connectivity-wireframe consists of coding of at least one boundary node and the connectivity information of a plurality of boundary nodes as a list of directions starting from at least one boundary node to reach the plurality of other boundary nodes.

In another aspect, the coding of a multi-resolution connectivity-wireframe in a bit-stream consists of coding each resolution of the connectivity-wireframe separately in the bit-stream.

In another aspect, for view-dependent coding, the connectivity-wireframe is split into regions of interest (ROI) and the description of the connectivity-wireframe from each ROI is coded separately, consisting of at least one boundary node and the connectivity information of a plurality of boundary nodes as a list of directions starting from at least one boundary node to reach the plurality of other boundary nodes.

In another aspect, each resolution of the multi-resolution connectivity-wireframe can be coded either in a view-independent or view-dependent way.

Another aspect of the invention, the coding of the single-resolution reference-grid description consists of coding the description of the n sets of reference-surfaces; the reference-surfaces keep their initial ordering at the surface of the object, and they do not self-intersect.

In another aspect of the invention, the coding of the multi-resolution reference-grid description in a bit-stream consists of coding each resolution of the reference-grid description separately in the bit-stream.

In another aspect, for view-dependent coding, the reference-grid description is split into regions of interest (ROI) and the reference-grid description from each ROI is coded separately.

In another aspect, each resolution of the multi-resolution reference-grid description can be coded either in a view-independent or view-dependent way.

Another aspect of the invention, the generating step includes obtaining from the offset of each boundary node a set of refinement bits.

In another aspect of the invention, each refinement bit is one of a set of discrete values that may include zero.

In yet another aspect of the invention, the refinement values are a set of successively diminishing values, e.g. a set of relative values between 0 and 1 whereby at least one value, e.g. 0.5 may be omitted as an assumed default value.

In another aspect of the invention, the coding of the single-resolution vertices-refinement description consists of coding of at least one offset corresponding to a boundary node.

In another aspect of the invention, the coding of the multi-resolution vertices-refinement description in a bit-stream consists of coding each resolution of the vertices-refinement description separately in the bit-stream.

In another aspect, for view-dependent coding, the vertices-refinement description is split into regions of interest (ROI) and the description of the vertices-refinement description from each ROI is coded separately, consisting of at least one offset corresponding to a boundary node.

In another aspect, each resolution of the multi-resolution vertices-refinement description can be coded either in a view-independent or view-dependent way.

In yet another aspect of the invention, the method comprises transmitting a bit-stream.

In yet another aspect of the invention, the method comprises decoding the bit-stream and generating the polygonal representation.

The Decoding Method

As an aspect of the invention, for the same multi-resolution stream, the view-independent scenario consists of decoding all the view-dependent information for a certain resolution level, while in the view-dependent scenario, one can retrieve the description of parts from a certain resolution level and decode them. In this case, different parts of the recovered combined surface mesh representation attached to the reference grid, e.g. MeshGrid, may have different resolution levels. From the same multi-resolution stream, single resolution decoding relies on locating the appropriate resolution level of the MeshGrid description in the stream and decoding it. In the multi-resolution scenario the decoding will start at a certain resolution level (it does not have to be the first resolution level) and continue from that level on till a certain higher resolution level. This approach is very different from classical multi-resolution representations that typically need the decoding of the lower resolution versions of a mesh, before being able of enhancing some portions of it by incrementally decoding additional parts of the bit-stream.

Another aspect of the invention, is that a minimal stream may however only consist of the description of the surface mesh representation with connectivity information, i.e. the connectivity-wireframe, which is mandatory for every stream. In that case a default equally distributed reference-grid, upon which the MeshGrid is based, can be derived from its 8 corners that where specified in the header of the stream.

In another aspect of the invention, the method comprises initializing a reference-grid at a first resolution, by reading at least the description of the eight corners, for instance.

As another aspect of the invention, the method comprises initializing the MeshGrid from the reference-grid description and from the representation of an empty connectivity-wireframe.

In another aspect of the invention, the method comprises initializing the connectivity-wireframe by reading the connectivity information of a first number of boundary nodes, and initializing nodes of the connectivity-wireframe in accordance with the connectivity information.

In another aspect of the invention, the minimal information that has to be read for the connectivity information for decoding, is the description of a single connectivity information from one node to another. In this case the state of the decoding of the connectivity-wireframe has to be kept between successive reading and decoding steps. The state has no longer to be kept when the entire connectivity information belonging to a certain resolution level of the connectivity-wireframe, in view-independent mode, or to a certain region of interest of the connectivity-wireframe, in view-dependent mode, has been read.

In another aspect of the invention, the minimal information that has to be read for the reference-grid description for decoding, is the description of a update for a single reference-grid point. In this case the state of the decoding of the reference-grid has to be kept between successive reading and decoding steps. The state has no longer to be kept when the entire description of the reference-grid belonging to a certain resolution level, in view-independent mode, or to a certain region of interest, in view-dependent mode, has been read.

In yet another aspect of the invention, the method comprises receiving a progressive description of the n sets of reference-surfaces for updating the reference-grid of the MeshGrid representation. This description may contain the information for the entire resolution level of the reference-grid, or a local information to update the reference-grid inside a region of interest (for view-dependent decoding).

In yet another aspect of the invention, the method allows the progressive refinement of the reference-grid such that a lossy to lossless reconstruction of the coordinates of the reference-grid points is feasible. The progressive refinement of the reference-grid can be done for the reference-grid points of a certain resolution level, in view-independent mode, or to a certain region of interest, in view-dependent mode.

In yet another aspect of the invention, since the multi-resolution reference-grid has a hierarchical structure the method allows to refine the coordinates of the reference-grid points of the higher resolution levels based on the coordinates of the reference-grid points from lower resolution levels by means of interpolation methods.

In yet another aspect of the invention, the method comprises receiving a description of a connectivity-wireframe to a higher resolution level, consisting of at least one boundary node description to a further set of boundary nodes, and initializing a further set of boundary nodes in the connectivity-wireframe (and MeshGrid) to allow a higher resolution display of the surface.

In yet another aspect of the invention, the method comprises receiving connectivity information of a second number of boundary nodes and a definition of the used reference surfaces, and initializing a further set of boundary nodes in the connectivity-wireframe MeshGrid to allow a higher resolution display of the surface.

In yet another aspect of the invention, the method comprises receiving a progressive description of the vertices' refinement bits (the offset) for at least one boundary node. This description may contain the information for all the nodes of the connectivity-wireframe at a certain resolution level, in view-independent mode, or only for those nodes lying inside a region of interest, in view-dependent mode.

In another aspect of the invention, the minimal information that has to be read for the vertices' refinement description for decoding, is the description of a update for a single node from the connectivity-wireframe. In this case the state of the decoding of the reference-grid has to be kept between successive reading and decoding steps. The state has no longer to be kept when the entire vertices' refinement description belonging to a certain resolution level, in view-independent mode, or to a certain region of interest, in view-dependent mode, has been read.

In yet another aspect of the invention, the method comprises generating a polygonal representation from the decoded connectivity-wireframe of the object.

In yet another aspect of the invention, the method comprises obtaining surface primitives from the polygonal representation of the surface.

Description of the System

Another aspect of the invention includes a system for preparing data for displaying a surface of an n-dimensional body, n being at least 3, the system comprising means for providing an n-dimensional discrete mesh representation of the surface, the mesh representation comprising a plurality of boundary nodes, each boundary node lying on or adjacent to the surface, each boundary node being associated with connectivity information and means for generating a polygonal representation of the surface of the object from the plurality of boundary nodes and the connectivity information of those boundary nodes. The connectivity information may comprise representations of up to (n−1) incoming and/or (n−1) outgoing directions towards 2*(n−1) adjacent boundary nodes adjacent to the said boundary node, the directions being defined in such a way that the cross product of the up to n−1 incoming or outgoing directions associated with any boundary node represents a further vector which points away from the surface at that boundary node.

In yet another aspect of the invention, the means for obtaining a mesh representation of the surface comprises means for obtaining a reference-grid description of the n-dimensional body, the reference-grid being defined by the intersection points of n sets of reference surfaces; the reference-surfaces keep their initial ordering at the surface of the object, and they do not self-intersect.

As an aspect of the invention, after obtaining the reference-grid, the system comprises means for changing the spacing between the reference-grid points locally or globally to provide resizing and reshaping of the surface or, for instance, animation; reference-surfaces may touch each other or pass through each other in these circumstances. Parts of the mesh may be "cut" or deformed.

As an aspect of the invention, the system allows means for three types of scalability simultaneously in progressive transmission schemes with variable detail that can depend on the bandwidth of the connection and the capabilities of the terminal equipment, in both view-dependent and view-independent scenarios. The view-dependent scenario is implemented by means of regions-of-interest (ROIs). A ROI is defined as a part of the reference-grid. ROI based coding implies means for subdividing the entire MeshGrid in smaller parts and encoding the connectivity-wireframe and reference-grid description of each of these parts separately. The three types of means for scalability are: (1) means for mesh resolution scalability, i.e. means for adapting the number of transmitted vertices on a ROI basis in view-dependent mode or globally otherwise, and (2) means for shape precision i.e. adaptive reconstruction of the reference-grid positions on a ROI basis in view-dependent mode or globally otherwise, (3) means for vertex position scalability, i.e. increasing the precision of known vertex positions with relation to the reference-grid (the value of the offset) on a ROI basis in view-dependent mode or globally otherwise.

In another aspect of the invention, in addition to the vertex-based animation, typical for polygonal meshes, the means for animation are provided, such as (1) means for rippling effects by changing the position of the vertices relative to corresponding reference-grid points (the offset), and (2) means for reshaping the regular reference-grid and its attached vertices, which can be done on a hierarchical or non-hierarchical basis. The system is adapted so that when reshaping or animating the reference-grid on a hierarchical basis, any changes applied to the reference-grid points, corresponding to a lower resolution of the mesh, will be propagated to the reference-grid points, corresponding to the higher resolutions of the mesh, while applying a similar deformation to the reference-grid points corresponding to a higher resolution of the mesh will only have a local impact.

In another aspect of the invention, the means for the vertex-based animation, further includes means for each vertex to retrieve its 3D coordinates from the coordinates of the grid points it is attached to and from the specified offset.

In yet another aspect of the invention, the system further comprises means for generating a bit-stream from at least one boundary node and the connectivity information of a plurality of boundary nodes as a list of directions starting from at least one boundary node to reach the plurality of other boundary nodes.

As another aspect of the invention, the system includes a bit-stream coder, coding an n-dimensional discrete mesh representation of a surface, the mesh representation of the surface comprising a plurality of boundary nodes, each boundary node lying on or adjacent to the surface, each boundary node being associated with connectivity information. The connectivity information may comprise representations of up to n−1 directions towards n-adjacent boundary nodes adjacent to the said boundary node, the directions being defined in such a way that the cross product of the up to n−1 directions associated with any boundary node represents a further vector which points away from the surface at that boundary node; the reference-grid being defined by the intersection points of n sets of reference surfaces; the reference-surfaces keep their initial ordering at the surface of the object, and they do not self-intersect. The bit-stream may comprise a representation of at least one boundary node and the connectivity information of a plurality of boundary nodes as a list of directions starting from at least one boundary node to reach the plurality of other boundary nodes. In addition the bit-stream may comprise the description of the reference-grid, and the description of vertices' refinement information.

In yet another aspect of the invention, the system comprises a decoder for receiving a data bit-stream representing a surface of an n-dimensional body, n being at least 3, comprising means for receiving a bit-stream comprising a representation of n sets of reference surfaces, one set comprising a plurality of reference surfaces for one of the n dimensions, the reference-surfaces keeping their initial ordering at the surface of the object, and they do not self-intersect. Further the system comprises a representation of at least one boundary node, and connectivity information as a list of directions starting from at least one boundary node to reach a plurality of other boundary nodes, means for initializing an n-dimensional reference-grid at a first resolution, means for reading the representation of at least one boundary node, means for reading the connectivity information of a first number of boundary nodes and for initializing nodes of the connectivity-wireframe in accordance with the connectivity information.

In yet another aspect of the invention, the decoder further comprises means for receiving a description with one boundary node, that may already exist in the connectivity-wireframe description of a lower or current resolution level, to a description of a further set of boundary nodes, that may already exist in the connectivity-wireframe description of a lower or current resolution level, and means for initializing a further set of boundary nodes in the connectivity-wireframe, to allow a higher resolution display of the surface. In yet another aspect of the invention, the decoder further comprises means for receiving connectivity information of a second number of boundary nodes and a definition of the used reference-surfaces, and means for initializing a further set of boundary nodes in the connectivity-wireframe to allow a higher resolution display of the surface.

In yet another aspect of the invention, the system comprises a method for generating a connectivity-wireframe of the surface, the connectivity-wireframe comprising a set of boundary nodes defined by intersection points in the reference-grid and offsets from this grid.

In yet another aspect of the invention, the system comprises a method for obtaining a polygonal representation of the surface from the connectivity-wireframe; the polygonal representation consisting of the union of a set of surface primitives.

In yet another aspect of the invention, the system comprises a method for rendering the surface from the union of the surface primitives.

In yet another aspect of the invention, the system comprises a method for receiving in the bit-stream for at least one reference-grid point, an update description, and modifying the coordinates of those reference-grid points.

In yet another aspect of the invention, the system comprises a method for progressive refinement of the coordinates of a reference-grid point by successively reading a larger part of the reference-grid description.

In yet another aspect of the invention, the system comprises a method for receiving in the bit-stream for at least one node, a refinement description, and modifying the position of at least one boundary node relative to the reference-grid in accordance with at least a part of the vertices' refinement description.

In yet another aspect of the invention, the system comprises a method for progressive refinement of the position of the boundary node relative to the reference-grid by successively reading a larger part of the vertices' refinement description.

BRIEF DESCRIPTION OF THE DRAWINGS

FIG. 1(*a*) shows an image containing both background and foreground pixels; FIG. 1(*b*) shows the same image as a slice through the volume and containing voxels.

FIG. 2 illustrates voxel adjacency, FIG. 2(*a*) for κ=6, FIG. 2(*b*) for κ=18, and FIG. 2(*c*) κ=26.

FIG. 3 illustrates the correspondence problem according to the prior art, with FIG. 3(*a*) illustrating cross section contours and FIGS. 3(*b*)–(*e*) illustrating different topologies with the same cross section as in FIG. 3(*a*).

FIG. 5(*a*) shows the contours of two adjacent slices; FIG. 5(*b*) shows a tiling in which all vertices of the top contours tile to vertices of the bottom contour; FIG. 5(*c*) shows the vertical section passing through the point P of the solid in FIG. 5(*b*); FIG. 5(*d*) shows a tiling in which the dissimilar portion of the top contour tiles to its medial axis located in between two slices; and FIG. 5(*e*) shows a vertical section through the solid shown in FIG. 5(*d*).

FIG. 6 illustrates tiling of two dissimilar contours according to the prior art; FIG. 6(*a*) is a top view of two contours; FIG. 6(*b*) illustrates the result of minimum surface area tiling; FIG. 6(*c*) is the same as FIG. 6(*b*) with hidden lines removed; FIG. 6(*d*) shows the result of a shortest slice chord heuristic algorithm; FIG. 6(*e*) illustrates the existence of a non-self intersecting surface; and FIG. 6(*f*) shows the result of the Bajaj et al. algorithm.

FIG. 10 is a visualization of a reconstructed brain hemisphere, with FIG. 10(*a*) being Gouraud shading and FIG. 10(*b*) being a wire frame.

FIG. 21 shows the 16 different configurations for a 4-face.

FIG. 22 shows indeterminate cases and different solutions according to the connectedness (from J. O. Lachaud. Extraction de surfaces à partir d'images tridimensionnelles: approches discrete et approche par modèle deformable. Ph.D. Thesis. July 1998).

FIG. 23 is a table of configurations generated for different connectedness graphs (from J. O. Lachaud. Extraction de surfaces à partir d'images tridimensionnelles: approches discrete et approche par modèle deformable. Ph.D. Thesis. July 1998).

FIG. 24 illustrates the result of the modified MC algorithm for different connectedness couples ($\kappa$, $\lambda$) on a test image (from J. O . Lachaud. Extraction de surfaces à partir d'images tridimensionnelles: approches discrete et approche par modèle deformable. Ph.D. Thesis. July 1998): FIG. 24(*a*) displays the image, FIG. 24(*b*) is the result of MC with ($\kappa$=26, $\lambda$=6), FIG. 24(*c*) with ($\kappa$=18, $\lambda$=6), and FIG. 24(*d*) with ($\kappa$=6, $\lambda$=18) or ($\kappa$=6, $\lambda$=26).

FIG. 25 represents the voxel model; FIG. 25(*a*) shows a voxel v; and in FIG. 25(*b*) a slice through the volume is taken.

In FIG. 27(*a*) and FIG. 27(*b*) the 4-connectivity (2D approach), respectively the 6-connectivity (3D approach) model was used. A slightly different shape, in FIG. 27(*c*) and FIG. 27(*d*), was generated when the 8-connectivity (2D approach), respectively the 18-connectivity (3D approach) model was used instead.

FIGS. 28(*a*), (*b*) and (*c*) are obtained for a continuous space, while FIGS. 28(*d*), (*e*) and (*f*) correspond to a discrete space.

FIG. 29 shows tracking the border of a digitized circle.

FIG. 31 shows external and internal contours obtained with the same contouring algorithm (same conventions).

FIG. 32 illustrates the Orthogonal Tracking Engine applied on a slice through a 3D volume for both external and internal contours.

FIG. 34 gives a case table for the 90° and 45° 2D border-tracking algorithms.

FIGS. 36(*a*) and (*b*) show contouring details for the orthogonal respectively the ortho-diagonal tracking engine.

FIG. 38 shows the 6 discrete border directions corresponding to the 6 faces of a 3D Volume box.

FIG. 39 illustrates computing the sign for an external and internal contour.

FIG. 40(*a*) shows an example of a folded surface of an object and FIG. 40(*b*) shows a cross-section through the surface at a certain height.

FIG. 42 illustrates scanning the slice for a label.

FIG. 48(*b*) illustrates that increasing the zooming factor of the scene reveals the openings into the connectivity-wireframe.

FIG. 51 shows images for the connectivity cases corresponding to the rectangle primitive.

FIG. 52 shows images for the connectivity cases corresponding to the pentagon primitive.

FIG. 53A shows images for the connectivity cases corresponding to the folded hexagon primitive.

FIG. 53C shows images for the connectivity cases corresponding to the arbitrary hexagon primitive.

FIG. 54 shows images for the connectivity cases corresponding to heptagon primitive.

FIG. 63(a) shows a cross-section through an object defined in a continuous space, on top of a voxel layer and FIG. 63(b) shows its discrete version.

FIG. 64(a) shows an analytical contour with an inconsistent description according to the border-tracking strategy, while FIG. 64(b) shows a consistent contouring that was obtained with the border-tracking engine.

FIG. 65 illustrates deriving the direction of the border in case of analytical contours using a scanning strategy, which is applied for each grid line on the ordered set of vertices.

FIG. 66 shows vertex connectivity in the connectivity-wireframe. The valid connectivity is shown in FIG. 66(a), while the other cases FIGS. 66(b)–(d) introduce inconsistencies and have to be removed.

FIG. 83 shows the steps for converting quadrilateral meshes to the MeshGrid representation.

FIG. 84 shows the converted quadrilateral mesh as a multi-resolution MeshGrid representation FIG. 85 shows the distribution of the reference-grid during the conversion of quadrilateral meshes to the MeshGrid representation.

FIG. 94 illustrates the animation at the level of the vertices' offset.

FIG. 95 illustrates animation at the level of the reference-grid.

DESCRIPTION OF THE PREFERRED EMBODIMENTS

Figure 4:
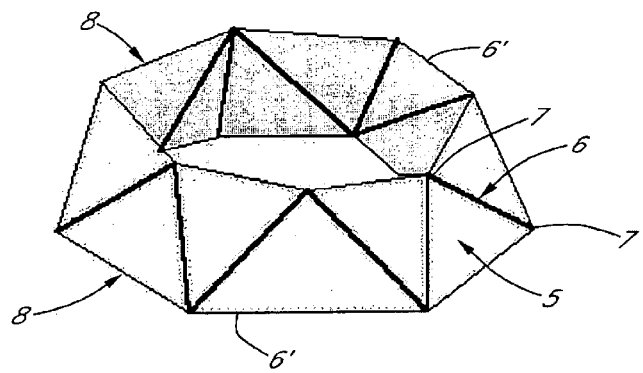
FIG. 4 shows a prior art example of tiling.
Figures 5A, 5B, 5C, 5D, 5E:
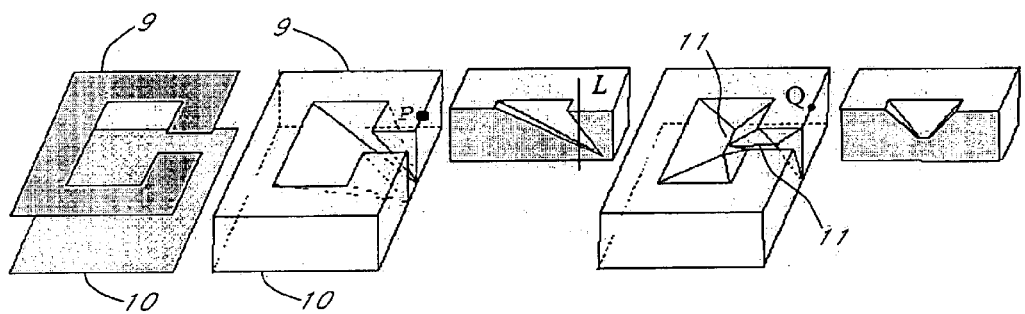
FIG. 5 illustrates tiling of dissimilar contours.
Figures 7A, 7B, 7C, 7D, 7E:
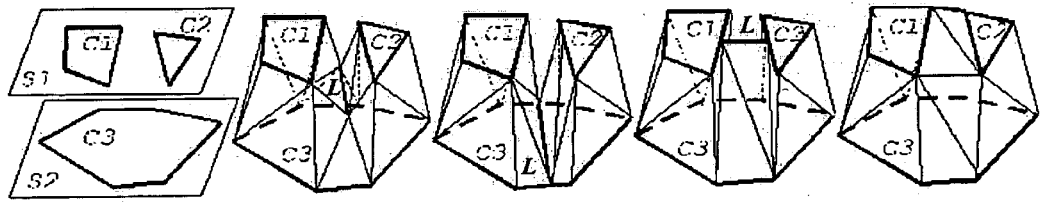
FIG. 7 shows different reconstructions for branching contours of two adjacent slices, with FIG. 7(*a*) branching contours on adjacent slices and FIGS. 7(*b*)–(*e*) illustrating different surface reconstructions.
Figures 9A, 9B, 9C, 9D:
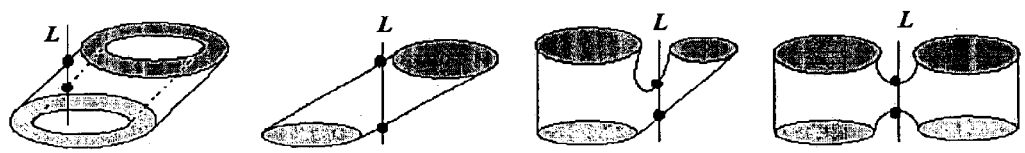
FIG. 9 shows some examples of topologies that cannot be processed because they violate Criterion 2—defined by Bajaj et al.—by having two points of intersection with a line perpendicular to the slice.
Figure 8A:
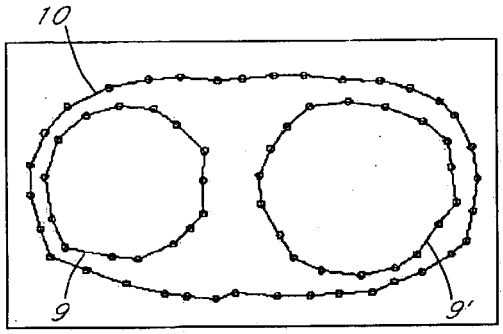
FIG. 8 illustrates tiling in the presence of branching, FIGS. 8(*a*) and (*c*) being a top view of two different cases of branching contours, and FIGS. 8(*b*) and (*d*) being the result with hidden lines removed.
Figure 8B:
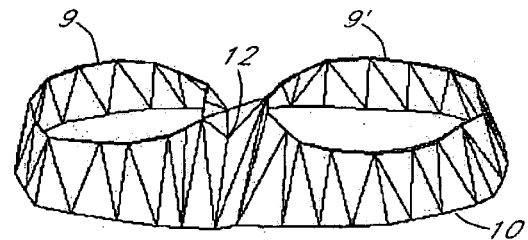
Figure 8C:
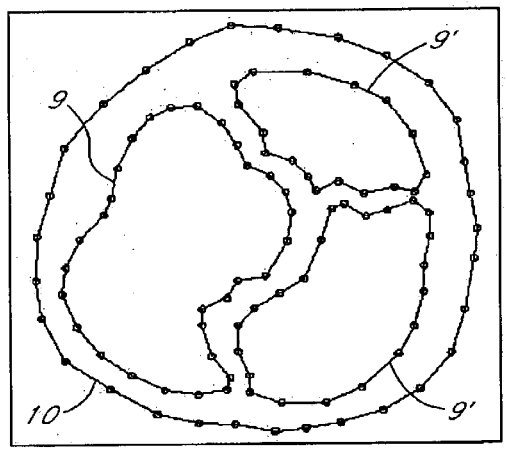
Figure 8D:
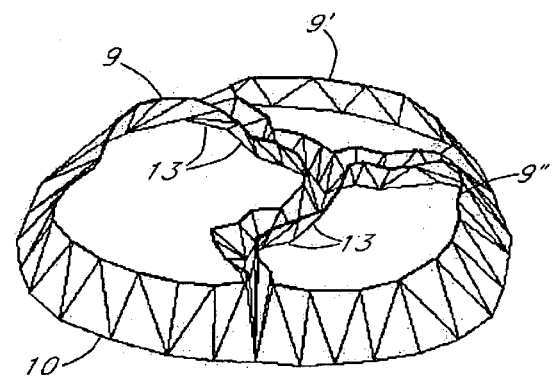
Figure 12:
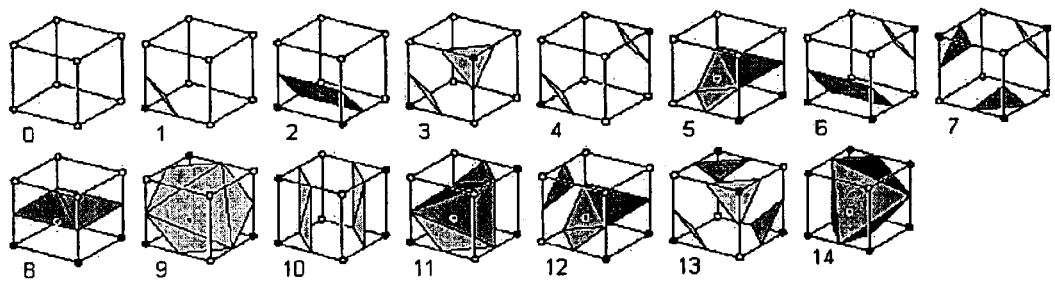
FIG. 12 illustrates the basic 8-cube triangle configurations for MC.
Figures 11A, 11B:
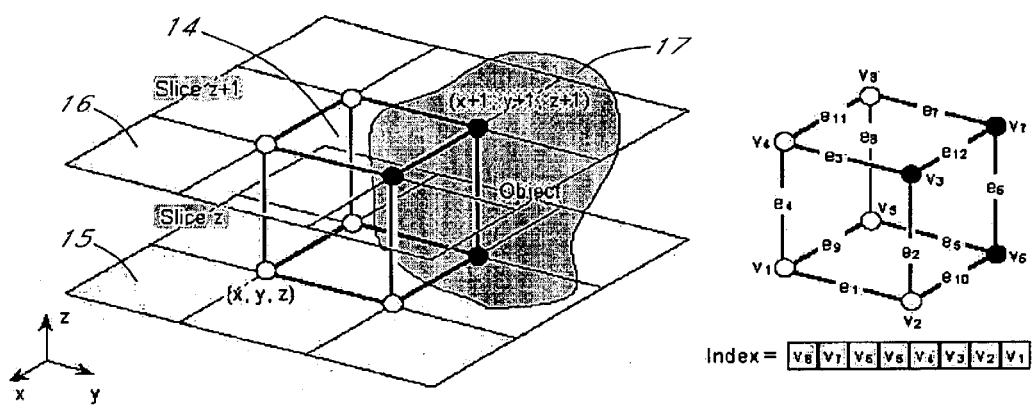
FIG. 11(*a*) illustrates an 8-Cube model and intersection with an object, FIG. 11(*b*) illustrates cube numbering.
Figure 13:
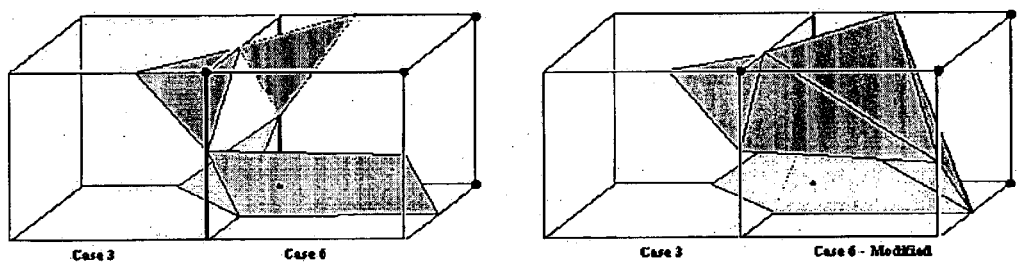
FIG. 13 shows in the left part an inconsistent choice for the local surface reconstruction, and in the right part a consistent choice for the local surface reconstruction.
Figure 14:
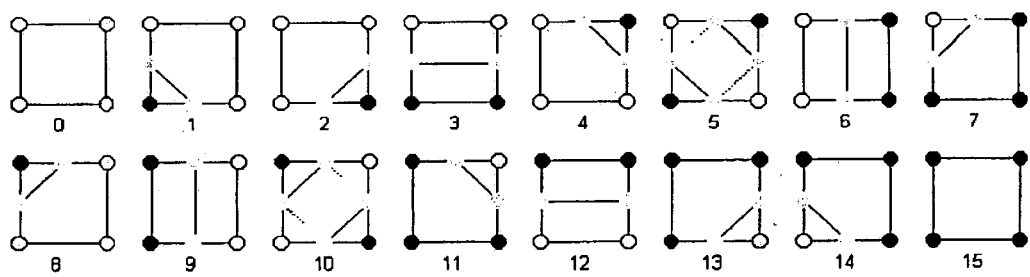
FIG. 14 illustrates the 16 cases of iso-surface/face intersections.
Figure 15:
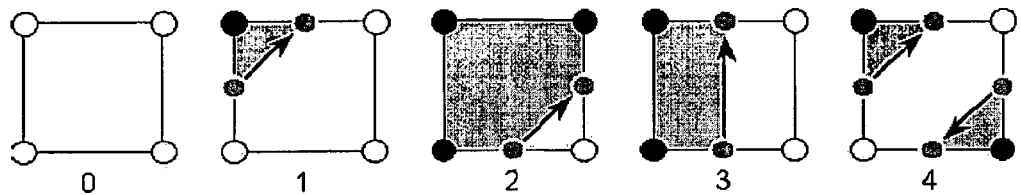
FIG. 15 illustrates the 5 cases of a face (from Tim Poston, H. T. Nguyen, Pheng-Ann Heng, and Tien-Tsin Wong. Skeleton Climbing: Fast Isosurfaces with Fewer Triangles. In *Proceedings of Pacific Graphics'97*, pages 117–126, Seoul, Korea, October, 1997).
Figures 16A, 16B, 16C, 16D, 16E:
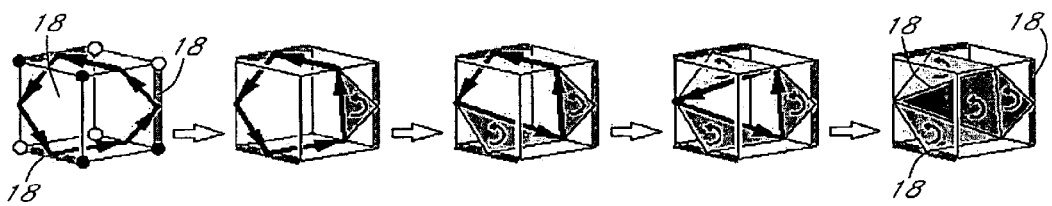
FIG. 16 shows different steps in searching for triangles in a cube of the cubical grid (from Tim Poston, H. T. Nguyen, Pheng-Ann Heng, and Tien-Tsin Wong. Skeleton Climbing: Fast Isosurfaces with Fewer Triangles. In *Proceedings of Pacific Graphics'97*, pages 117–126, Seoul, Korea, October, 1997).
Figures 17A, 17B:
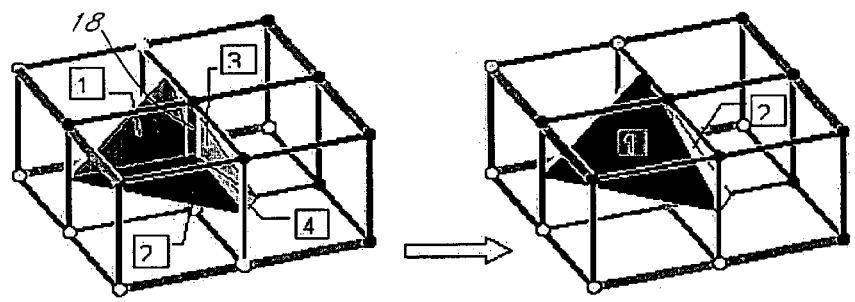
FIG. 17 illustrates simplifying the mesh (from Tim Poston, H. T. Nguyen, Pheng-Ann Heng, and Tien-Tsin Wong. Skeleton Climbing: Fast Isosurfaces with Fewer Triangles. In *Proceedings of Pacific Graphics'97*, pages 117–126, Seoul, Korea, October, 1997).
Figures 17C, 17D:
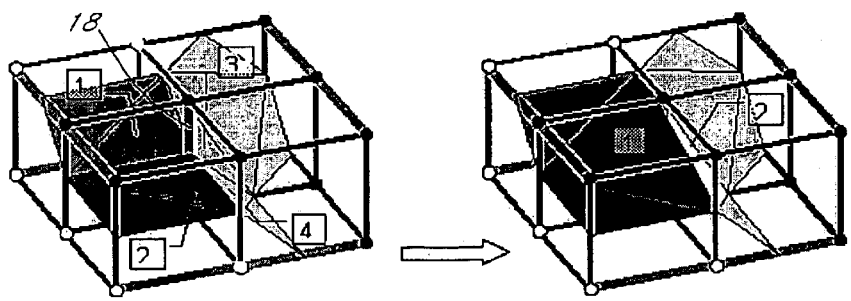
Figure 18:
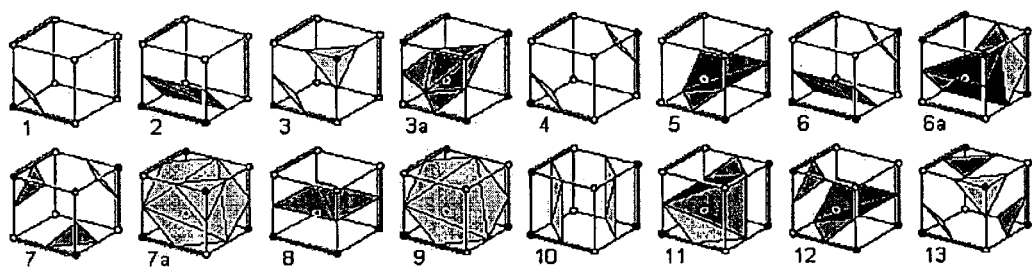
FIG. 18 illustrates typical SC step 3 triangle sets and side patterns in cube faces for the "do not cross o—o diagonals" rule.
Figure 19A:
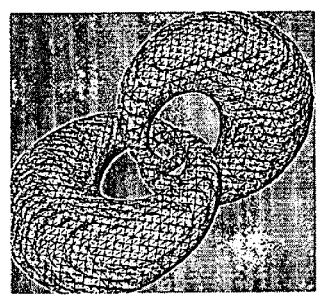
FIG. 19 shows an example of a knotted torus sampled at 64×64×64 resolution (from Tim Poston, H. T. Nguyen, Pheng-Ann Heng, and Tien-Tsin Wong. Skeleton Climbing: Fast Isosurfaces with Fewer Triangles. In *Proceedings of Pacific Graphics'97*, pages 117–126, Seoul, Korea, October, 1997), extracted by MC in FIG. 19(*a*), by SC without Step 4 in FIG. 19(*b*), and with Step 4 in FIG. 19(*c*).
Figure 19B:
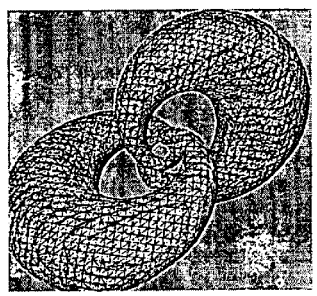
Figure 19C:
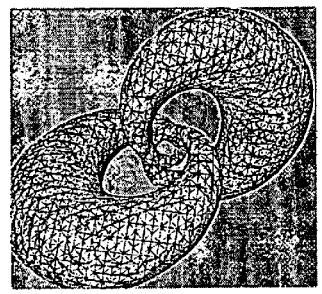
Figure 20A:
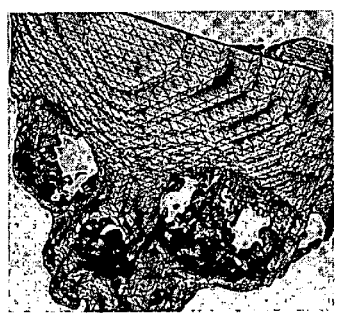
FIG. 20 illustrates surfaces extracted from a 128×128×57 CT scan, with a threshold distinguishing bone from non-bone.
Figure 20B:
Figure 20C:
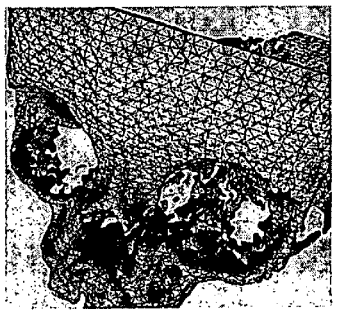

The present invention will be described with reference to certain embodiments and drawings but the present invention is not limited thereto but only by the claims.

The present invention discusses three related topics: (1) a method—called TriScan™—which is an embodiment of the present invention—to acquire surface descriptions from a plurality of sections through multi-dimensional representations of objects, especially through the three-dimensional representations of objects (2) a compact, optionally multi-scalable, optionally view-dependent, optionally animation-friendly multi-dimensional surface representation method—called MeshGrid™ which is also en embodiment of the present invention—of these surface descriptions and the digital coding of the MeshGrid™ surface representation (3) and the conversion of other surface descriptions to the MeshGrid surface representation which are also embodiments of the present invention. In the present invention, the object can be expressed as a scalar field (e.g. discrete multi-dimensional data), scalar functions (e.g. implicit surfaces) or any other surface description that is different from the surface description obtained by the TriScan™ method.

The TriScan™ Method

The primary targets for this algorithm are volumetric data (discrete representation of objects), but the principle upon which the method works can as well be applied to objects defined, for example, in a continuous space (analytical representation of objects).

The idea behind the TriScan™ method of the present invention is to retrieve a surface description in the form of a mesh, which, for convenience only, is called the 3D connectivity wireframe, of an object such that a polygonization of the surface description can be derived, preferably without ambiguity, from the its connectivity information. The obtained polygonal representation of the object's surface comprises a union of surface primitives such as: triangles, quadrilaterals, pentagons, hexagons and heptagons. The resulting surface, is closed and without self-intersections and it respects the topology of the underlying object. No surface primitives overlap, and there are no holes in the final surface. The surface is the complementary of the surface obtained from the inverse object. The algorithm is fully automatic, although some user interaction is not excluded to identify the initial position of the object as explained hereinafter. Its applicability goes beyond plain rendering: i.e. the algorithm can be exploited for structure and finite element analysis. The approach of such a method of the present invention can be classified in the category of contour oriented surface extraction methods.

There are two main issues that have to be solved: the first is how to obtain the surface description of an object, and the second is how to design the rules to derive the surface primitives from the connectivity-wireframe. The approach of the TriScan method of the present invention will be explained in the context of the discrete and continuous 3D space but it can be generalized to an n-dimensional space as well.

The surface description has a regular structure, since each vertex from the connectivity-wireframe is connected to 4 other vertices. Each vertex is located on the estimated surface of an object. Any vertex knows which are its 4 neighbors in two perpendicular paths given by the direction of the reference-surfaces, explained later, passing through those vertices. Moreover, the path followed by migrating from one vertex to its neighbor, always in the same direction, will finally close. Therefore it is concluded that from each vertex one can navigate to any other vertex inside the same connectivity-wireframe. Using this architecture one is able to store besides the coordinates of the vertices, positioned on the object's surface, the connectivity information between them.

The surface primitives are aimed to fill in the openings in the connectivity-wireframe (the patches), one surface primitive for each patch. There are preferably 5 groups of surface primitives when classified by the number of laterals: triangles, rectangles, pentagons, hexagons, and heptagons. Some groups consist of several shapes (e.g. hexagons), while some of them are not coplanar and need to be split into triangles. In order to match the right surface primitive for an opening, a set of rules has been designed that use the connectivity information from the surface description to track and identify an opening, and then generate the surface primitive that fits into it. Since each vertex has 4 distinct neighbors, and a patch has in average 4 nodes, the total number of patches and implicitly the number of surface primitives will approximately be equal to the number of vertices from the connectivity-wireframe.

The surface extraction algorithm of the present invention is a contour oriented method since it describes the surface of an object as a connected frame of vertices. When applied to the 2D space, the method generates (a) contour(s), thus by adding an extra dimension a connectivity-wireframe is obtained. Since the approach is based on deriving contours from an object and on the geometrical properties of these contours, the following definitions may be used:

A contour is an ordered chain of vertices $\{p_1, p_2, \ldots, p_n\}$ where each vertex pair $(p_i, p_{i+1})$ is connected by an edge, and every intermediate vertex $p_i$ $(0 \leq i \leq n)$ is common to exactly two edges. In a closed contour $p_0$ is the same as $p_n$. A contour is called a digital contour when the previous definition is -applied on a digital layer (e.g. digital image). An iso-contour is a particular case of a contour when all vertices connect points, or voxels in case of a discrete space, with equal property, e.g. the property of gray level.

The connectivity-wireframe approximates the "real" surface of the object with a certain precision that depends on the number of vertices in the surface description (the resolution) and their distribution. Therefore a slicing set-up is needed to impose the positions where the information about the object's surface is required. The slicing set-up can be visualized as 3 sets of reference-surfaces. Each reference-surface has a certain ordering inside the set. The reference-surfaces from one set keep their ordering at the surface of the object, and do not self-intersect. The reference-surfaces from one set intersect the reference-surfaces from the other sets. The intersection of these reference-surfaces define a 3D grid of points, and the distance between two grid points define the slicing step(s) in the 3 sets of reference-surfaces.

In a particular case these 3 sets of reference-surfaces are mutually perpendicular, and each reference-surface is planar.

The strategy applied to generate the surface-description is conditioned by the way the objects are defined (i.e. discrete or continuous space) and represented (e.g. voxel mode, f(x,y,z), analytical contours). For discrete objects or in case their surface can be expressed as a function f(x,y,z), one could design a border-tracking algorithm that makes the contouring of the object for the positions specified in the slicing set-up. The border-tracking algorithm would use a decision function, which computes some property of the object (e.g. gray level of the voxel, evaluate f(x,y,z)), to locate the position of the boundary. The surface extraction method can be applied on objects defined by analytical contours as well. Each contour has to be defined as a series of connected vertices. Since the resolution of the resulting contours is usually much higher than imposed by the slicing set-up, some of the vertices that do not satisfy some connectivity constraints have to be removed as described later. In order to have a more intuitive model for the explanations, the reference-surfaces are considered to be planar, the 3 sets are mutually perpendicular, and the normal direction of the reference-surfaces are aligned to the axes of the orthogonal coordinate system, although the same conclusions are obtained when employing non planar, non-orthogonal reference-surfaces.

Two border-tracking engines have been designed which allow building the surface description in the following way:
The 2D border-tracking method generates the contouring of the object in a cross-section. To obtain the connectivity-wireframe, the 2D border tracking has to be applied in all the reference-surfaces, as specified by the slicing set-up. This approach can be called "Multiple 2D border tracking", and there are two steps involved.
STEP 1 generates contours of the object in all slices (where the object can be identified) of each set of reference-surfaces. Several contours can be found inside a slice, since an object might have branching structures or cavities.
STEP 2 merges the 2D connectivities of each contour into a 3D connectivity model, the 3D connectivity-wireframe.
The second approach, which can be called "3D border tracking", combines the two steps of the previous approach in one single step. It is a generalization towards 3D of the previous method. The algorithm tracks the borders of the object by applying iteratively the contouring in two perpendicular directions for each new vertex that is found lying on the object's surface in a previous iteration. It generates the connectivity-wireframe progressively.

Both border-tracking approaches generate the same connectivity-wireframe for a specified slicing set-up. Further a polygonal representation of the connectivity-wireframe of the object can be obtained.

The TriScan™ method of the present invention has the advantage that different resolutions of the object can be obtained by choosing different slicing steps within or between perpendicular slices through the object, this for both continuous and discrete spaces. The larger the step, the coarser the generated object's model will be. Irregular slicing steps through the object may improve the approximated model by selecting the most appropriate positions to cut the object into slices (e.g. where the shape of the object changes dramatically, or in areas with high curvature). An example of a connectivity-wireframe approximating a continuous, respectively discrete sphere, obtained with an irregular slicing step in the first case, respectively a regular slicing step in the second case, is shown in FIG. 28. The multi-resolution issues are discussed later.

The TriScan™ method of the present invention will be explained in what follows by means of discrete models, because the whole procedure of the TriScan method, including the border-tracking engines, was primarily designed to work on discrete volumetric models. Another reason is that it is much more intuitive to explain the method on discrete objects, than on continuous objects. However, it is to be kept in mind that the TriScan method of the present invention can also be applied on models defined in the continuous space.

When dealing with discrete spaces, it is considered that the voxels have a dimension of their own, i.e. contain a certain volume. This is a different approach than the one used in Marching Cubes (MC), where the voxels are visualized as the nodes of a regular 3D grid, with a distance between adjacent nodes equal to 1 unit. In the present approach (see FIG. 25(a)), each voxel 19 is represented as a cube of unit size and, consequently, has its own faces and edges. Voxel v situated at position (i,j,k) in the 3D grid has the coordinates of its center 20 at (i+0.5,j+0.5, k+0.5). There is no distance between adjacent voxels. Two 6-adjacent voxels share a face, two 18-adjacent voxels may share a face or an edge, and two 26-adjacent voxel may share a face, an edge or a vertex (see also FIG. 2). Voxel 19 is delimited by six planes of coordinates {i, i+1, j, j+1, k, k+1}. Each of the six faces of a voxel $v_k$ is shared with another voxel $v_l$ that is 6-adjacent with $v_k$. A face shared between a background voxel (o-voxels) and a foreground or object voxel (•-voxels) is called a border face. In FIG. 25(b) a slice through the volume is taken.

Figure 26A:
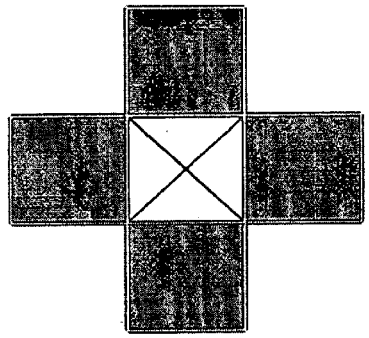
FIG. 26 illustrates voxel adjacency in the 2D case for FIG. 26(*a*) $\kappa$=4 and FIG. 26(*b*) $\kappa$=8.
Figure 26B:
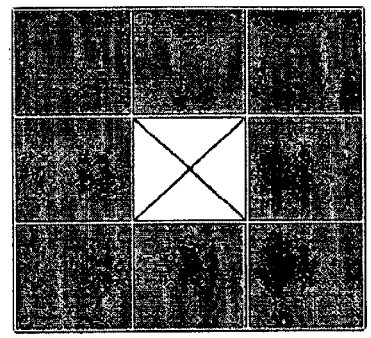

Similar to the 3D adjacency model for a volume, a 2D adjacency model for a slice can be specified, as shown in FIG. 26. The correspondence of the 6-connectivity in 3D, as shown in FIG. 2(a) is the 4-connectivity in 2D, as shown in FIG. 26(a). The 18-connectivity in 3D, as shown in FIG. 2(b) corresponds to the 8-connectivity in 2D, as shown in FIG. 26(b). For the 26-connectivity in 3D, as shown in FIG. 2(c) there is no corresponding case in 2D.

Figure 27A:
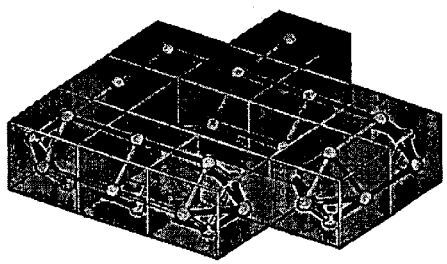
FIG. 27 illustrates contouring a discrete object.
Figure 27B:
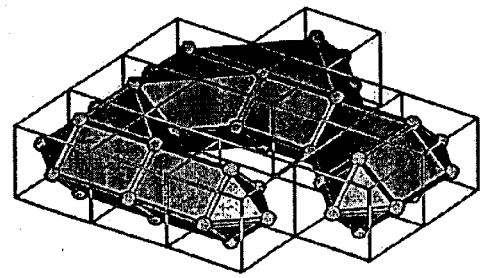
Figure 27C:
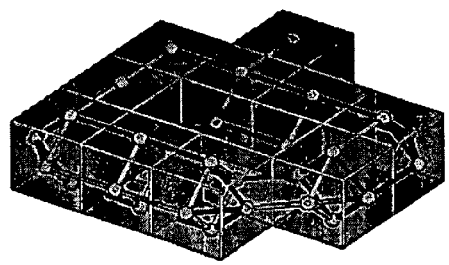
Figure 27D:
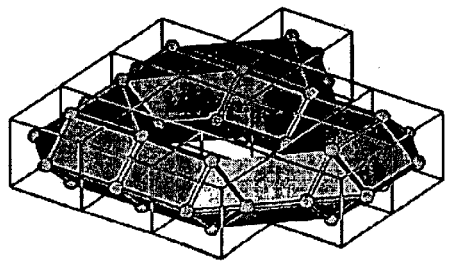
Figure 28A:
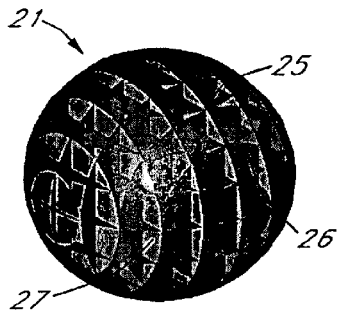
FIGS. 28(*a*)–(*f*) illustrate slicing an image space containing a sphere in three mutually perpendicular directions, and contouring the borders of the object for each slice.
Figure 28B:
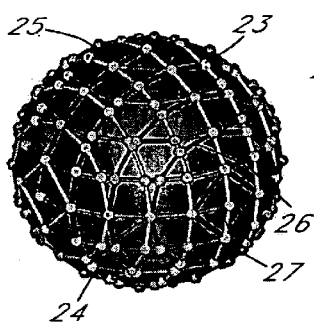
Figure 28C:
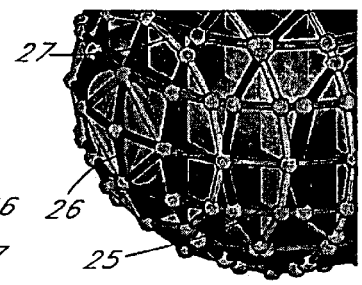
Figure 28D:
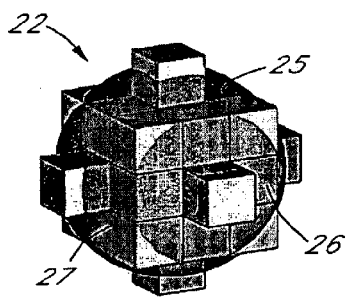
Figure 28E:
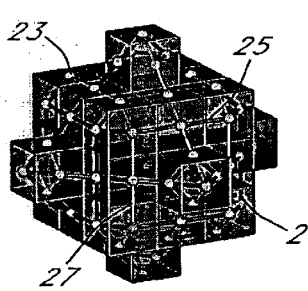
Figure 28F:
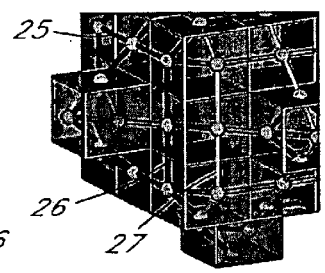

The shape of a contour extracted from a slice through the object, respectively the shape of a connectivity-wireframe extracted from the object's volume, depends on the 2D, respectively 3D connectivity model chosen when tracking the object's border. For the 2D contouring both 4 and 8-connectivity models can be used, while for the 3D approach the 6 and 18-connectivity model can be implemented, and is preferred because it is based on three 2D mutually perpendicular scans. In FIG. 27, the influence of different connectivity models on the resulting connectivity-wireframe can be noticed. In FIGS. 27(a) and (b), the 4-connectivity (2D approach), respectively the 6-connectivity (3D approach) model was used. A slightly different shape, in FIGS. 27(c) and (d) was generated when the 8-connectivity (2D approach), respectively the 18-connectivity (3D approach) was used instead.

Figure 30A:
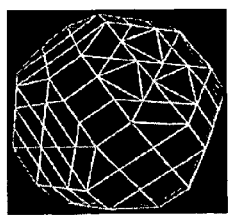
FIG. 30 shows tracking the border of a digitized sphere.

An example of surfaces extracted with the TriScan method of the present invention from a sphere defined in the continuous and discrete space is shown in FIG. 28. An image space containing a sphere (FIGS. 28(a) and (c)) is sliced in three mutually perpendicular directions, and the borders are contoured for each slice. A variable step is used for slicing the continuous version of the sphere 21 of FIG. 28(a), and a constant step for slicing the discrete version of the sphere 22 of FIG. 28(d). The slices and contours are indicated by 25, 26, 27, one number for each reference-surface. Vertices are displayed as dots 23 in FIGS. 28(b) and (e) and result from the intersection of two mutually perpendicular contours. In the continuous space, several vertices 23 will overlap if more than two contours that are perpendicular to each other intersect in the same position 24, as shown in FIG. 28(c), and can be eliminated in a post-processing step. For the discrete space, this situation does not occur if the vertices are located away from the center of the border voxel (e.g. center of the border face). For the discrete version, the sphere 22 (or any object in general) has first to be sampled over a uniform 3D grid of voxels, as shown in FIG. 28(d). Successive slices through the 3D volume, for all three mutually perpendicular directions, are considered and for each slice a contour (or several contours in general) is generated, as shown in FIG. 28(e). The resulting vertices are located in the centers of the border faces, as shown in FIG. 28(f), and the connectivity is known in two perpendicular directions for each vertex. Positioning the vertices in the centers of the border faces, which means at half the distance between the centers of two border voxels (one belonging to the background $v_b$ and one belonging to the object $v_o$), sharing that face, has its own benefits and drawbacks (see FIGS. 30(a) and (c)):

It is a simple and fast approach, since it involves integer arithmetic calculations.

The maximum error is half a voxel size, which is acceptable for medium to high-resolution images.

It generates a very uniform connectivity-wireframe of the object and the generated facets lie on a limited set of planes, as described in C. Montani, R. Scateni, and R. Scopigno, "Discretized marching cubes", in R. D. Bergeron and A. E. Kaufman, editors, Proceedings of IEEE Visualisation '94, pages 281–287, 1994, resulting in large planar regions which are more easily joined to produce a simplified model of the iso-surface for rapid rendering and compact representation.

The drawback is that the sampling effects, resulting in sharp transitions, are visible when zooming in.

Figure 30B:
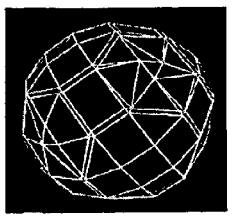
Figure 30C:
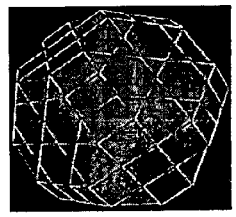
Figure 30D:
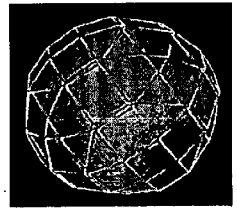

A smoother mesh grid, but with less uniform distributed vertices can be obtained if the position of each vertex is interpolated between the centers of the border voxels $v_b$ and $v_o$ (see FIGS. 30(b) and (d)). The method proposed by Lorensen and Cline for the Marching Cubes algorithm, linearly interpolates the position of a vertex based on the scalar value of the border voxels $v_b$ and $v_o$ and a specified threshold value $\tau$ that was used to classify the voxels as belonging to the object (foreground) or the background (see eq. 1). Another method is proposed for the interpolation of a vertex position, described later, which gives a more precise approximation of the object. Some of the drawbacks of using interpolation is that it is quite computing intensive compared to the iso-contouring itself, and as data sizes increase and relative sizes of voxels decrease, the effect of interpolation between the centers of border voxels becomes less noticeable.

The results of contouring a circle 28, which has been digitized over a uniform 2D image grid, with and without the interpolation of the vertices' positions are shown in FIG. 29. FIGS. 29(a), (b) and (c) show the same contouring: FIG. 29(a) without interpolation of the vertices' positions, whereby the resulting contour has the vertices positioned at half the distance between the centers of corresponding border voxels; in FIG. 29(b) the position of each vertex is adjusted via linear interpolation using the MC interpolation method, and in FIG. 29(c) the interpolation method of the present invention is used. The image of FIG. 29(d) shows the contouring result of all three methods superimposed.

Performing a 3D contouring of a sphere, digitized over a uniform 3D image grid, gives the results shown in FIG. 30. In the resulting mesh, polygons larger than four laterals (pentagons and hexagons) have been split into triangles. Positioning the vertices of the mesh in the center of the border faces produces the result shown in FIG. 30(a) as a wire-frame and in FIG. 30(c) as a shaded surface. In that case the generated mesh grid is uniform, quite large planar surfaces containing several polygons are formed, which are easy to simplify during a polygon reduction step. For very small objects, or when zooming in, the sampling effects are visible. A mesh closer to the original shape has been obtained by MC interpolating the position of the vertices between the centers of two corresponding border voxels, as shown in FIG. 30(b) as a wire-frame and in FIG. 30(d) as a shaded surface. For images sampled without noise, similar results can be obtained for both vertex position interpolation methods, i.e. the MC method and the method of the present invention. More discussion about these two interpolation methods can be found later.

Hereinafter, all these steps and aspects involved in the procedure of the TriScan method will be discussed in detail. First the 2D and 3D boundary location and tracking will be explained, while thereafter a further elaboration is given on the retrieval of the connectivity information and the extraction of surface primitives.

For digital images, direct extraction of iso-contours by implicit segmentation (e.g. using thresholding) is sometimes very difficult, if not impossible (e.g. due to noisy data). For the TriScan algorithm of the present invention, it is presumed that the segmentation has been done in a pre-processing step and that the input to the algorithm is a binary (only black and white), or a labeled (containing only a small set of discrete values) 3D image data set consisting of isotropic voxels, (i.e. all edges of the voxels have the same length). Otherwise, some interpolation within the data can be done in an extra pre-processing step to achieve this isotropy. In case the surface mesh is derived from an anisotropic data set it is possible to scale its vertices to conform to the real size ratios but nevertheless the quality of this mesh will be inferior to the one that would be obtained when an isotropic data set is available.

In case the object is touching the 3D volume border (i.e. the object is not completely surrounded by the background), the algorithm of the present invention considers, for those positions, that the boundary of the object ends at the image border.

Locating and Tracking Boundaries of Objects in Volumetric Data

Two groups of algorithms will be described: border-locating methods that detect boundaries of objects in volumetric data, and border-tracking methods. Both border-locating and border-tracking algorithms work hand in hand. The border-locating algorithms give the initial starting position and the direction of the border relative to the starting position as input for the border-tracking algorithms, while border-tracking algorithms mark the visited border voxels to avoid that the same border is located twice, and to allow the border-locating algorithm to distinguish, when necessary, external boundaries from internal ones (cavities). The same scenario, i.e. locate and track the boundary, can be repeated several times or performed only once, depending on whether a 2D or 3D border tracking approach is used, or on the final goal (e.g. track only one boundary, find all boundaries or only internal or external ones, etc.).

Although logically the border location is performed before the tracking, first a detailed description of the border-tracking approaches in both 2D and 3D is given to better understand the border-locating problem that will be discussed later on.

Border-tracking methods are iterative algorithms that, starting from an initial position on the object's surface, follow the object's boundary such that, in the 2D approach a complete revolution around the object has been performed, and respectively in the 3D approach the whole object's surface has been covered. For each iteration, the algorithm checks the neighborhood of the last position on the object's boundary and decides which direction to take and which step size to move with, such that the best approximation of the original boundary is obtained by connecting the successive border positions visited and stored during the procedure.

The principle upon which the border-tracking methods are based was already known by the ancient Greeks: keep always right when walking through a labyrinth and you will always find the exit (entrance). The rule states that one should always turn in the same direction, be it right or left, when the followed path offers the choice, and that one should always keep the border at the same side of the path.

It can be concluded that in order to make the border tracking algorithms work, a priori three conventions need to be specified:

C1: It has to be decided whether the algorithm will track the border from outside or from inside the object. If the object is considered to be the labyrinth than it would make sense to track the border from a path inside the object.

C2: The position of the boundary relative to the direction followed by the path has to be set. In the present implementation the border is kept at the right side of the followed path.

C3: The neighborhood where the algorithm traces the border has to be set according to an adjacency model, as shown in FIG. 2 or in FIG. 26.

For each new boundary that has to be detected, the algorithm has to be initialized with the position of a border voxel belonging to the object, and with the direction of the boundary relative to the center of the specified border voxel.

The same border-tracking algorithm with a priori specified conventions (i.e. follow the boundary along a path inside the object, and the boundary is located at the right side of the path) can handle both external and internal contours or surfaces. It only needs a correct initialization as specified. The path followed for an external contour gives a global circumrotation CCW (counter clockwise), while for an internal contour it is CW (clockwise), see FIGS. 31(a) and (b) respectively. Although in FIG. 31(a) the global scanning of the contour occurs in CCW direction, this still may locally result in a opposite scanning direction. In FIG. 31(b), the scanning direction of the interior contour is globally CW. The inner and outer contours are scanned with the same strategy, namely: an observer inside the object looking in the direction of the scanning should see the contour on its right side.

The path followed by the border-tracking algorithm consists of successive steps connecting the centers of voxels belonging to the object. For each of these border voxels belonging to the path, the position of the border face, satisfying convention C2, is located and a new vertex positioned in the center of that face is added to the final contouring. The contour obtained in this way is defined at a sub-voxel level, since it links the centers of the border faces of the border voxels (see FIG. 27). The method even works for thin branches of one voxel thickness or at the limit for a single voxel. In the case of a single voxel the contouring result in 2D consists of four vertices that generate a contour around the voxel, while in 3D the result is a mesh consisting of six vertices (hexahedron), regardless of the adjacency model, which is similar to performing the 2D contouring in three mutually perpendicular reference-surfaces passing through the middle of the voxel (see FIG. 38).

Two fully automatic border tracking algorithms, the 2D and the 3D approaches, are now described followed by automatic and semiautomatic scenarios for locating the object's border (i.e. locating the initial starting point for the border tracking methods).

2D Border Tracking Approach

The 2D border-tracking algorithm generates a planar closed contour of the object contained in a 2D image or in a slice taken from a 3D volume. Starting from the center of a border voxel v belonging to the object, and knowing the position of the border relative to the center of the voxel v, the algorithm decides upon a set of rules, in which direction to search for the next border voxel, and stores a contour vertex in the center of each new border face encountered on its path. The border-tracking rules are derived from a specified connectedness couple foreground, background (i.e. ($\kappa$=4 ,$\lambda$=8) or ($\kappa$=8 ,$\lambda$=4), see FIGS. 26(a) and (b)) and border constraint (e.g. border should be located on the right (left) side of the path followed by the algorithm). The algorithm ends when the starting position has been reached again. The step used by the border-tracking algorithm to move or jump from one voxel to another, which located in the search direction can be larger than one, or variable. In that case a coarser approximation of the boundary can be obtained.

In order to be able to differentiate internal from external contours, and to avoid duplicated contours, a dirty-bit-buffer is used to mark for each visited border voxel the code of the border face that contributed to the contour. The dirty-bit-buffer has the size of the image slice and reserves three bits per slice voxel to store the code of a border face, identified for example as: "North" -N-, "West" -W-, "South" -S- and "East" -E-.

Based on the chosen connectedness, two border tracking algorithms (the orthogonal tracking engine and the ortho-diagonal tracking engine) are now explained.

The rules for the orthogonal (90°) tracking engine are based on the ($\kappa$=4 ,$\lambda$=8) connectedness model with the convention that the border is located on the right side of the followed path, and can be expressed as:

R1: Store the first contour vertex on the border corresponding to the starting position, and begin the search, jumping to a voxel located in a direction rotated 90° CCW relative to the starting direction of the border.

R2: When arriving to a background voxel $v_b$ as result of a step from a object voxel $v_o$, store a contour vertex on the border face located between $v_b$ and $v_o$, and return back to $v_o$, rotate the search direction 90° CCW and jump to the next voxel.

R3: When arriving to an object voxel $v_o$ as result of a step from another object voxel $v_o$, rotate the search direction 90° CW and jump to the next voxel.

R4: Finish the contouring when the starting border position has been reached again.

A description of the algorithm and the border-tracking rules in pseudo-code can look as follows:

ASSIGN Step EQUAL to S (S can be larger than 1)
ASSIGN SearchDirection EQUAL to initial BorderDirection ROTATED 90° CCW
STORE Initial ContourVertex and MARK BorderDirection in the DirtyBitBuffer
LOOP
   MOVE CurrentPosition in the SearchDirection with Step
   IF Current Voxel belongs to the Object THEN
      ROTATE SearchDirection 90° CW
   END of IF ELSE (Current Voxel belongs to the Background)
    ASSIGN New ContourVertex EQUAL to the position of the Border located between Current and Previous Voxel
    IF New ContourVertex is EQUAL to Initial ContourVertex AND SearchDirection is SAME as the BorderDirection from DirtyBitBuffer
    THEN
        FINISH (return from the procedure)
    END of IF
    STORE New ContourVertex and MARK BorderDirection in the DirtyBitBuffer
    MOVE Current Position Back with Step in opposite SearchDirection
    ROTATE SearchDirection 90° CCW
END of ELSE
END of LOOP An example of contouring of an object with a cavity, with the orthogonal scanning engine, is shown in FIG. 32. It is to be noted that FIG. 32 is representing a cut through the middle of a slice of one voxel thickness as shown in FIG. 27. The voxels belonging to the object are displayed in the 2D slice as gray squares 30. The center positions of the voxels are marked as white circular areas 31. The path followed by the border-tracking algorithm is shown with a dotted line 32 passing through the centers 31 of the voxels 30. The successive steps in tracking the border are shown by the black arrows 33, 34. Each arrow 33, 34 indicates a new step, and its orientation shows the search directions for the boundary. Continuous black arrows 33 reveal that the border is located in that direction, while dotted arrows 34 are the steps in the followed path 32. The contour vertices are displayed as circular areas 35 and are positioned in the centers of border faces 36. The final contour 37 is shown in gray, with arrows connecting the successive vertices 35, one for each border face 36 encountered in the followed path 32. In FIG. 32(a) the algorithm tracks the external boundary of the object, while in FIG. 32(b) the same algorithm tracks the internal boundary. The global circular direction resulting from the tracking determines whether the algorithm found an external (CCW) or internal (CW) contour.

Any of the border voxels belonging to the object can be the starting point of the border-tracking algorithm. In order to avoid the ambiguity of which boundary to track, in case the initial border voxel v has two opposite border faces located on different boundaries (e.g. thin walls being one voxel thick), it is necessary to specify the position of the border face with respect to the center of voxel v in addition to voxel v itself.

The rules for the ortho-diagonal (45°) tracking engine are based on the ($\kappa=8$, $\lambda=4$) connectedness model and on the same conventions as the orthogonal (90°) tracking engine. A slightly more complex set of rules (it has in addition to the orthogonal scanning engine four diagonal search directions), optimized in terms of speed, is the following:

R1: Store the first contour vertex on the border corresponding to the starting position, and begin the search, jumping to a voxel located in a direction rotated 45° CCW relative to the starting direction of the border.

R2: When arriving to a background voxel $v_b$ as result of a step in a diagonal direction (i.e. -NW-, -SW-, -SE-, -NE-) from an object voxel $v_o$, return back to $v_o$. Rotate the search direction 45° CCW and jump to the next voxel.

R3: When arriving to a background voxel $v_b$ as result of a step in an orthogonal direction (i.e. -N-, -W-, -S- or -E-) from an object voxel $v_o$, store a contour vertex on the border face located between $v_b$ and $v_o$, and return back to $v_o$. Rotate the search direction 45° CCW and jump to the next voxel.

R4: When arriving to an object voxel $v_o$ as result of a step in a diagonal direction (i.e. -NW-, -SW-, -SE-, -NE-) from another object voxel then store a contour vertex on the border face located between $v_b$ and $v_o$, where $v_b$ is positioned a step away from $v_o$ in a direction rotated 135° CW from the current search direction. Voxel $v_b$ has already been detected in a previous iteration. Continue the procedure by rotating the search direction 90° CW and jumping to the next voxel.

R5: When arriving to an object voxel $v_o$ as result of a step in an orthogonal direction (i.e. -N-, -W-, -S-, -E-) from another object voxel then store a contour vertex on the border face located between $v_b$ and $v_o$, where $v_b$ is positioned a step away from $v_o$ in a direction rotated 90° CW from the current search direction. Voxel $v_b$ has already been detected in a previous iteration. Continue the procedure by rotating the search direction 45° CW and jumping to the next voxel.

R6: Finish the contouring when the starting border position has been reached again.

A description of the algorithm and the border-tracking rules in pseudo-code can look as follows:

```
ASSIGN Step EQUAL to S (S can be larger than 1)
ASSIGN SearchDirection EQUAL to initial BorderDirection ROTATED 45°
    CCW
STORE Initial ContourVertex and MARK BorderDirection in the
    DirtyBitBuffer
LOOP
    MOVE CurrentPosition in the SearchDirection with Step
    IF Current Voxel belongs to the Object THEN
        IF SearchDirection is Orthogonal THEN
            ASSIGN BorderDirection EQUAL to SearchDirection ROTATED
                90° CW
            ROTATE SearchDirection 45°CW
        END of IF
        ELSE (SearchDirection is Diagonal)
            ASSIGN BorderDirection EQUAL to SearchDirection ROTATED
                135° CW
            ROTATE SearchDirection 90° CW
        END of ELSE
        (for both Orthogonal and Diagonal directions)
        ASSIGN New ContourVertex EQUAL to the position of the Border
            located between Current Object Voxel and the Background Voxel
```

```
            in the direction of the BorderDirection
        IF New Contour Vertex is EQUAL to Initial Contour Vertex AND
            BorderDirection is SAME as the BorderDirection from DirtyBitBuffer
                THEN
            FINISH (return from the procedure)
        END of IF
        STORE New ContourVertex and MARK BorderDirection in the
            DirtyBitBuffer
    END of IF
    ELSE (Current Voxel belongs to the Background)
        IF SearchDirection is Orthogonal THEN
            ASSIGN New ContourVertex EQUAL to the position of the Border
                located between Current and Previous Voxel
            IF New ContourVertex is EQUAL to Initial Contour Vertex AND
                SearchDirection is SAME as the BorderDirection from
                    DirtyBitBuffer THEN
                FINISH (return from the procedure)
            END of IF
            STORE New ContourVertex and MARK BorderDirection in the
                DirtyBitBuffer
        END of IF
        (for both Orthogonal and Diagonal directions)
        MOVE Current Position Back with Step in opposite SearchDirection
        ROTATE SearchDirection 45° CCW
    END of ELSE
END of LOOP
```

Figure 33:
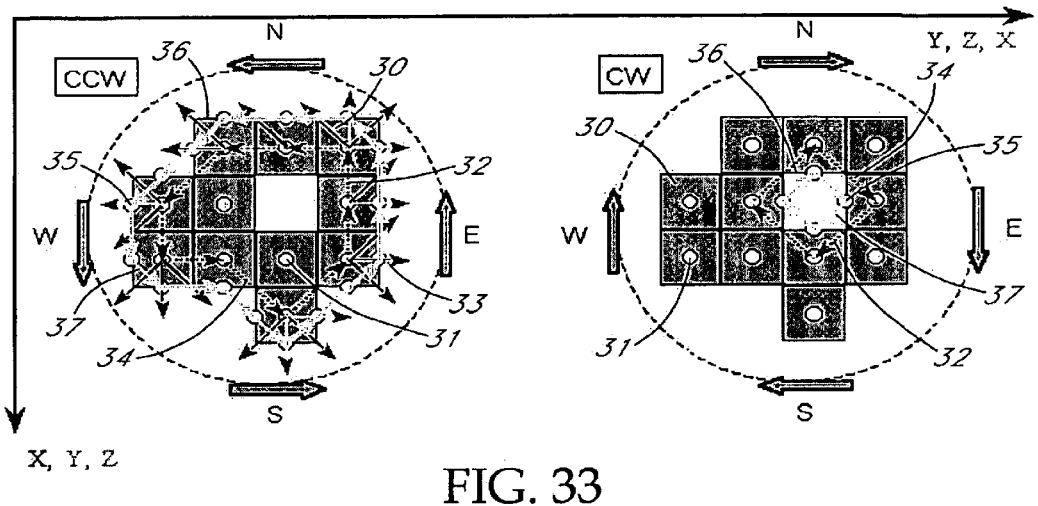
FIG. 33 illustrates the Ortho-Diagonal Tracking Engine applied on a slice through a 3D volume for both external and internal contours.

Contouring the same object as for the orthogonal case (see FIG. 32), but now with the ortho-diagonal scanning engine, is shown in FIG. 33. Next section will make a comparison between both 2D border-tracking approaches.

FIG. 33 is representing a cut through the middle of a slice of one voxel thickness as shown in FIG. 27. The voxels belonging to the object are displayed in the 2D slice as gray squares 30. The center positions of the voxels are marked as white circular areas 31. The path followed by the border-tracking algorithm is shown with a dotted line 32 passing through the centers 31 of the voxels 30. The successive steps in tracking the border are shown by the black arrows 33, 34. Each arrow 33, 34 indicates a new step, and its orientation shows the search directions for the boundary. Continuous black arrows 33 reveal that the border is located in that direction, while dotted arrows 34 are the steps in the followed path 32. The contour vertices are displayed as circular areas 35 and are positioned in the centers of border faces 36. The final contour 37 is shown in gray, with arrows connecting the successive vertices 35, one for each border face 36 encountered in the followed path 32. In FIG. 33(a) the algorithm tracks the external boundary of the object, while in FIG. 33(b) the same algorithm tracks the internal boundary. The global circular direction resulting from the tracking determines whether the algorithm found an external (CCW) or internal (CW) contour.

Comparison between the 90° and 45° Tracking Engines

Both mentioned 2D border-tracking algorithms are based on the same principle. They use the same conventions, but apply different rules for tracking the border. For the orthogonal tracking engine the rules are based on the (κ=4 ,λ=8) connectedness model, while for the ortho-diagonal tracking engine they are based on the (κ=8 ,λ=4) connectedness model. These two algorithms obtain identical contouring results, as shown in FIGS. 32 and 33, except if a particular case is encountered.

A case table, similar to the ones discussed for the prior art surface extracting algorithms, can be derived for the 2D border-tracking engines. The cases are built around a group of four adjacent voxels, which result in 16 (=$2^4$) possible arrangements. Further only unique cases are kept (see FIG. 34), since configurations that can be obtained by rotating the unique ones do not reveal any new contouring possibilities. The same color and symbol conventions as the ones previously used are now used again (i.e. object voxels are gray squares 30, background voxels are white squares 4, the center of a voxel is marked with a white circular area (dot 31), contour vertices are also white circular areas (dots 35), gray arrows 37 are parts of the contour connecting two successive vertices 35, dotted arrows 34 show the path triggered by the tracking rules). Cases 4a and 5a have been contoured with the 90° approach, while 4b and 5b have been contoured with the 45° approach. The rest of the cases give similar contouring results for both algorithms.

Cases where no border voxel is present (i.e. all voxels belong to the object or all belong to the background) do not contribute to the contouring (case 1 and 6 of FIG. 34). Cases 2, 3 and 5 yield the same contouring result (gray arrow 37) for both 2D border-tracking engines. In case 5, a different path (black dotted arrow 34) is followed by the orthogonal tracking engine (5a) with respect to the ortho-diagonal tracking engine (5b), yet still obtaining the same contouring result. The particular case that is handled completely different by the two border-tracking approaches is number 4. The reason for this is that the voxels in configuration 4 are considered by the 4-neighbourhood rule as being disconnected, while the 8-neighbourhood rule regards them as being connected. The result of the orthogonal tracking engine (4-neighbourhood) is case 4a, while the result of the ortho-diagonal tracking engine (8-neighbourhood) is case 4b.

Figure 35A:
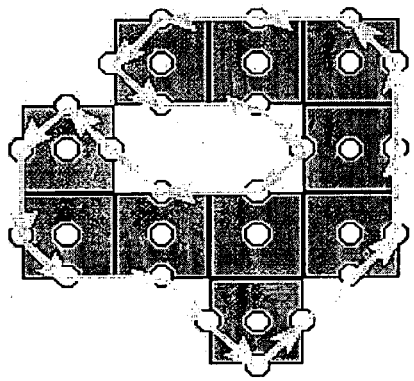
FIG. 35(*a*) gives an example of contouring with the orthogonal tracking engine, and FIG. 35(*b*) gives an example of contouring with the ortho-diagonal tracking engine.
Figure 35B:
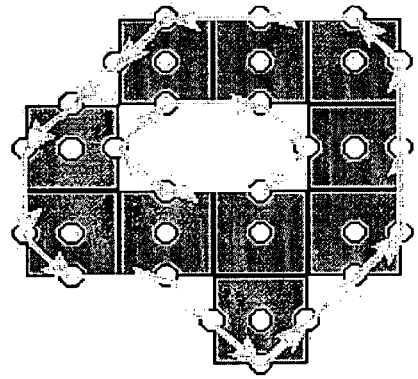

An example illustrating the difference between the contours obtained with both approaches when the particular voxel configuration of case 4 of FIG. 34 is present, is shown in FIG. 35. It is to be noticed that the orthogonal tracking engine sees only one contour, as shown in FIG. 35(a), while the ortho-diagonal tracking engine generates an external and an internal contour for the same object, as shown in FIG. 35(b).

A more detailed view of the particular voxel configuration (case 4 of FIG. 34) from the example of FIG. 35 is shown in FIG. 36. The dotted arrows, lighter gray colored arrow 38 and darker gray colored arrow 39, indicate the path followed by the algorithm. For each step, the search directions for the border are displayed as solid black arrows 33 in FIG. 36(*a*) and solid light gray arrows 40 and solid dark gray arrows 41 in FIG. 36(*b*).

The result of the orthogonal border-tracking algorithm is shown in FIG. 36(*a*). Considering as starting point of the algorithm voxel -1- with the border located direction -N-, the algorithm tracks the border as follows:

Store a contour vertex on the border face of voxel -1- direction -N- (black arrow 33). Set the border search direction to -W- (black arrow 33) and test for the border in that direction.

A new border position is found. Store the new contour vertex on the border face of voxel -1- direction -W- (black arrow 33). Set the border search direction to -S- (black arrow 33) and test for the border in that direction.

A new border position is found. Store the new contour vertex on the border face of voxel -1- direction -S- (black arrow 33). Set the border search direction to -E- (dark gray dotted arrow 39) and test for the border in that direction.

No border is found and the current position is voxel -2-. Set the border search direction to -S- (black arrow 33) and test for the border in that direction.

. . .

Arrive at voxel -3-. Set the border search direction to -N- (dark gray dotted arrow 39) and test for the border in that direction.

No border is found and the current position is voxel -4-. Set the border search direction to -E- (black arrow 33) and test for the border in that direction.

A new border position is found. Store the new contour vertex on the border face of voxel -4- direction -E- (black arrow 33). Set the border search direction to -N- (black arrow 33) and test for the border in that direction.

A new border position is found. Store the new contour vertex on the border face of voxel -4- direction -N- (black arrow 33). Set the border search direction to -W- (black arrow 33) and test for the border in that direction.

A new border position is found. Store the new contour vertex on the border face of voxel -4- direction -W- (black arrow 33). Set the border search direction to -S- (light gray dotted arrow 38) and test for the border in that direction.

No border is found and the current position is voxel -3-. Set the border search direction to -W- (black arrow 33) and test for the border in that direction.

. . .

Arrive back to voxel -2- and store the new contour vertex on the border face of voxel -2- direction -N- (black arrow 33). Set the border search direction to -W- (light gray dotted arrow 38) and test for the border in that direction.

No border is found and the current position is voxel -1-. Set the border search direction to -N- (black arrow 33) and test for the border in that direction.

A border position is found. Finish the contouring since the contour vertex found on the border face of voxel -1- direction -N- is the same as the starting point.

Using the same starting point and border position (voxel -1- and direction -N-), the border-tracking scenario of the ortho-diagonal algorithm (see FIG. 36(*b*)) for tracking the external object's boundary is the following:

Store a contour vertex on the border face of voxel -1- direction -N-. Set the border search direction to -NW- (light gray arrow 40) and test for the border in that direction.

No object voxel is found. Set the border search direction to -W- (light gray arrow 40) and test for the border in that direction.

A new border position is found. Store the new contour vertex on the border face of voxel -1- direction -W- (light gray arrow 40). Set the border search direction to -SW- (light gray dotted arrow 38) and test for the border in that direction.

No border is found and the current position is voxel -2-. Store the new contour vertex on the border face of voxel -2- direction -N-, border that was detected in the previous step. Set the border search direction to -NW- (light gray arrow 40) and test for the border in that direction.

No object voxel is found. Set the border search direction to -W- (light gray arrow 40) and test for the border in that direction.

A new border position is found. Store the new contour vertex on the border face of voxel -2- direction -W- (light gray arrow 40). Set the border search direction to -SW- (light gray arrow 40) and test for the border in that direction.

No object voxel is found. Set the border search direction to -S- (light gray dotted arrow 38) and test for the border in that direction.

No border is found and the current position is voxel -3-. Store the new contour vertex on the border face of voxel -2- direction -W-, border that was detected in the previous step. Set the border search direction to -SW- (light gray arrow 40) and test for the border in that direction.

. . .

Arrive at voxel 4-. Store the new contour vertex on the border face of voxel -4- direction -N-, i.e. the border that was detected in the previous step. Set the border search direction to -W- (light gray dotted arrow 38) and test for the border in that direction.

No border is found and the current position is voxel -1-. Finish the contouring since the contour vertex found on the border face of voxel -1- direction -N- is the same as the starting point.

To track the boundary of the cavity inside the object using the ortho-diagonal algorithm (see FIG. 36(*b*)) the same starting point (e.g. voxel -1-) is kept and the border position in the direction -S- is specified. The scenario is the following:

Store a contour vertex on the border face of voxel -1- direction -S-. Set the border search direction to -SE- (dark gray arrow 41) and test for the border in that direction.

No object voxel found. Set the border search direction to -E- (dark gray dotted arrow 39) and test for the border in that direction.

No border is found and the current position is voxel -4-. Store the new contour vertex on the border face of voxel -4- direction -S-, border that was detected in the previous step. Set the border search direction to -SE- (dark gray dotted arrow 39) and test for the border in that direction.

. . .

The path will not pass via voxel -3-, it will arrive at voxel -2-. Store the new contour vertex on the border face of voxel -2- direction -E-, border that was detected in one of the previous steps. Set the border search direction to -NE- (dark gray dotted arrow 39) and test for the border in that direction.

No border is found and the current position is voxel -1-. Finish the contouring since the contour vertex found on the border face of voxel -1- direction -S- is the same as the starting point.

In general the contouring with the ortho-diagonal tracking engine yields smoother results, with more contours than the orthogonal method. The total length of the contours is the same for both approaches.

In the previous examples, each contour vertex has been stored in the center of a border face, which means at half the distance between two corresponding border voxels sharing that face, one voxel belonging to the object ($v_o$), and the other one belonging to the background ($v_b$). A more precise position of the contoured boundary can be obtained by interpolating the position of the contour vertices between the border voxels $v_b$ and $v_o$. This option can be added to both the orthogonal and ortho-diagonal border-tracking algorithm.

Figure 37:
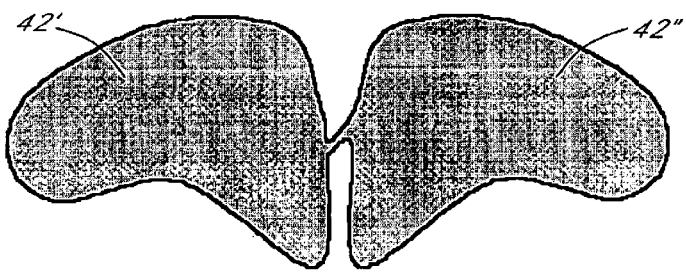
FIG. 37 shows an example illustrating that the definition of connectivity is resolution-dependent.

The answer to the question, which contouring approach extracts the topology and geometry of the original object with the least errors, lies actually in the following puzzle: which approach to use when one encounters case 4 of the configuration table shown in FIG. 34. In the literature, several authors have proposed different solutions to the topological problem, but all of them have their shortcomings, since due to sampling effects, no approach can state with certainty where the real border intersects the voxel model. Bister et al. (M. Bister, J. Cornelis, A. Rosenfeld, "A Critical view on Pyramid Segmentation Algorithms," Pattern Recognition Letters 11 1990, pp. 605–617, North Holland) shows that connectivity is a typical resolution-dependent property as illustrated by FIG. 37. At low resolution, the separation between both lobes is not detected. The figure seems to consist of one object. At medium resolution one may detect the separation, but not the tiny bridge between both lobes. Hence the connectivity between the lobes disappears and two objects will be obtained. Yet, this small interconnection will become apparent at high resolution and again the result is seen as one object. The idea suggested by Bister et al. is that the connectivity has to be considered as a semantic interpretation problem rather than a segmentation or surface extraction problem based on measured data only. Another example that illustrates the previous statement is the one in FIG. 31. The inner and outer contours, in the lower part of FIG. 31(b), will intersect each other as in FIG. 31(a) when the sampling resolution is insufficient.

One can apply an adaptive tracking engine, which according to a topology estimation criterion will decide to either connect the voxels for the configuration 4 of FIG. 34 by applying the ortho-diagonal method or to fall back to the orthogonal method when they should be disconnected.

The adaptive tracking engine can be based on the rules of the ortho-diagonal method, but rule R4 should be changed in the following way:

R4: When arriving to an object voxel $v_o$ as result of a step in a diagonal direction (i.e. -NW-, -SW-, -SE-, -NE-) from another object voxel v, then check whether configuration 4 of the case table is encountered. When configuration 4 is not present or the topology estimation criterion votes for connecting the voxels v and $v_o$ then continue with the same strategy as the ortho-diagonal method (store a contour vertex on the border face located between $v_b$ and $v_o$, where $v_b$ is positioned a step away from $v_o$ in a direction rotated 135° CW from the current search direction, continue the procedure by rotating the search direction 90° CW and jump to the next voxel). In the opposite case act as if the voxel $v_o$ belongs to the background and apply rule R2 of the ortho-diagonal tracking engine (return back to v, rotate the search direction 45° CCW and jump to the next voxel).

If the goal is just to obtain a smooth contour, than the ortho-diagonal scanning engine is the best choice.

3D Border Tracking Approach

This section will focus on how to obtain the vertices describing the surface, and will not discuss the issue what to do with them.

In order to facilitate the explanations, the faces of the surrounding box of the 3D volume are named as: "Left" -L-, "Right" -R-, "Front" -F-, "Back" -B-, "Up" -U- and "Down" -D-. For the present set-up, a left-handed coordinate system is used with: faces -L- and -R- parallel to the yoz plane, respectively -F- and -B- to the zox, and -U- and -D- to the xoy plane, as shown in FIG. 38.

For external contours a global scanning direction CCW is assigned for each of the main planes (xoy, yoz and zox), resulting in an opposite (CW) direction for internal contours (see FIG. 31, FIG. 32 and FIG. 33).

For the time being, the significance of the light gray and dark gray color assigned to the arrows 43, 44 in FIG. 38 is ignored, it will be discussed later. Both arrows show the path followed by the tracking algorithm as described in the following paragraphs.

The 3D border-tracking algorithm is a generalization of the 2D approach previously described, and it generates a closed mesh of the object contained in a 3D volume (at the limit it can be one slice thick). Similar to the 2D border tracking approach, the algorithm is initialized with the position of a border voxel $v_o$ belonging to the object and the location of the border relative to the center of $v_o$. From the starting position, the algorithm starts by selecting a set of rules, decides which are the next two, which are the next two mutually orthogonal directions to search for the next border voxel, and stores a mesh vertex in the center of each new border face encountered on its path. The border-tracking rules are derived from a specified connectedness couple foreground, background (i.e. ($\kappa=6$, $\lambda=18$) or ($\kappa=18$, $\lambda=6$), see FIGS. 2(a) and (b)) and border constraint (e.g. border should be located on the right (left) side of the path followed by the algorithm). The algorithm ends when the entire 3D path has been explored.

Visited border positions are marked in a dirty-bit-buffer (DBB) in order to differentiate internal from external contours, and to avoid duplicated contours. The DBB has the same size as the 3D image volume and reserves three bits per voxel to store the code of a border face, identified as: -L-, -R-, -F-, -B-, -U- and -D-.

Similar to the 2D border-tracking algorithm, the step used to move or jump from one voxel to another one located in the search direction can be larger than one, or variable. In that case a coarser approximation of the boundary can be obtained.

The complexity of the 3D tracking algorithm is much higher than its 2D version, and to avoid a chaotic search, one has to choose a primary tracking plane (e.g. xoy) and consider the other two (e.g. yoz and zox) as secondary tracking planes. This approach results in a two-phase scanning strategy.

In the first phase, if the primary tracking plane is xoy, then only valid search directions for the border are those tangential to the xoy plane (-L-, -R-, -F- and -B- for the orthogonal method and -FL-, -FR-, -BL- and -BR- in extra for the ortho-diagonal method) even if a border exists in the directions -U- or -D- in case of the orthogonal method or -UL-, -UR-, -UF-, -UB-, -DL-, -DR-, -DF- and -DB- in extra for the ortho-diagonal approach. Similar rules apply for the secondary tracking planes.

The algorithm can either be implemented recursively (each new step in tracking the border is called from within the previous step) or in an iterative way. The recursive implementation is more resource consuming and slower than the later one since the stack implementation has a first-in-last-out (FILO) strategy that may require a large amount of memory to be available. Therefore an iterative implementation has been chosen that stores the intermediate results in a first-in-first-out (FIFO) buffer, making a more efficiently use of the memory. The iterative method does not have the overhead of the repetitive procedure call, encountered in the recursive implementation, thus being faster.

The algorithm works as follows: In the first phase a search in the primary plane P (e.g. xoy) starting from an object voxel $v_o$ is initiated, using the same tracking rules as for the 2D approach (applied to the xoy plane). The result will be one or several closed 2D contour(s) of the cross-section of the object with the plane P. The 2D contour consists of vertex descrptors, which store the position of the border voxel and the code of the border face (-L-, -R-, -F- or -B- for the xoy plane). It is to be noted that in a 2D contour a certain border voxel may occur more than once but each time with a different border face code (e.g. a corner voxel will have at least two border faces). Each vertex descriptor of the 2D contour is stored into the FIFO buffer. In the second phase a vertex descriptor is removed from the FIFO buffer and a new search in one of the secondary planes is initiated starting from the position of the border voxel stored in the vertex descriptor. The memory allocated for the removed vertex descriptors is progressively freed. The choice of the secondary plane (yoz or zox) depends on the border face code stored in the vertex descriptor. A border code of -L- or -R- implies a search in the yoz plane, respectively a border code of -F- or -B- in the zox plane. The search rules for the secondary planes are the same as for the 2D case, applied to the corresponding plane. In the second phase the tracking algorithm finishes once the first border face $f_o$ is encountered. If the border face $f_o$ has not been scanned yet (according to the DBB) then again a first phase search in the primary plane is performed starting from that position. Otherwise, another second phase search is started. The cycle repeats until the FIFO buffer is empty.

2D Versus 3D—Discussions and Features

It is obvious that the 3D border tracking approach cannot be used if only a 2D outline of the object is needed, while the 2D border tracking approach can be used to obtain the 3D outline of the object by performing the 2D border tracking in series of mutually orthogonal reference-surfaces as shown later.

When considering a single slice, the 2D approach is a distributed method (the connectivity information is known between the contour vertices) but it becomes a local method when applied to a 3D volume. Any 2D contour obtained in a slice has no knowledge about similar procedures going-on in parallel or perpendicular reference-surfaces to the current slice, except in the same slice using the 2D DBB.

Figure 41:
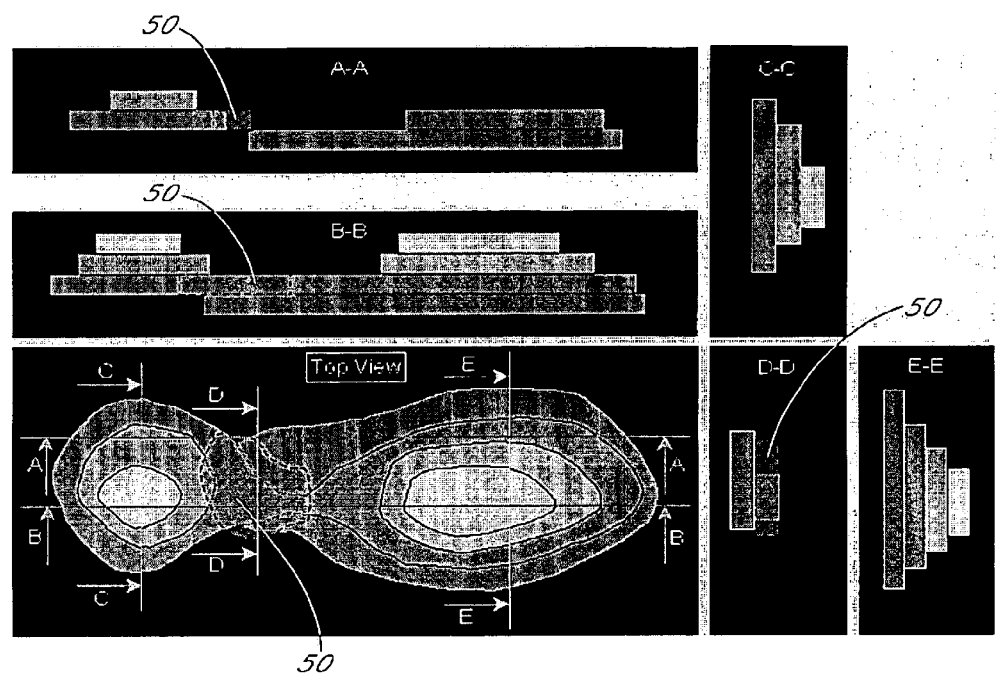
FIG. 41 shows an example that illustrates how to mark a constraint in the dirty-bit-buffer (DBB).

In contrast to the 2D approach, the 3D method has a spatial distribution and the 3D connectivity structure of the mesh grows progressively during the procedure. This is actually its strongest feature, i.e. the ability to develop as a single entity whose spatial connectivity is known at each moment in time. Since the spatial connectivity is known, it is feasible to specify constraints inside the volume to avoid that the mesh grows beyond the constraints (e.g. do not cross a certain line or area), as shown in FIG. 41. It will be shown later in the next paragraphs that constraints can be set for the 2D approach as well. The constraints can be marked in the DBB, which in extra will serve as a template.

It is possible to compute the sign of a contour using the 2D approach. Previously, it has been discussed that an external contour is scanned globally in a CCW direction, while for an internal contour an opposite direction (CW) is obtained, even though local direction changes are possible (see FIG. 31(a) and FIG. 39(c)). The convention can be made that an external contour is positive and an internal one is negative, which means that a rotation in CCW direction yields a positive value, while one in CW direction yields a negative value. It has been seen that the intermediate steps in tracking the border consist in locating the next border voxel by rotating the search direction CCW or CW according to the scanning rules. This suggests that one could compute the sign of a contour by incrementing a counter each time an intermediate search direction changed CCW, and decrement the counter in an opposite case. According to this method, an external contour always yields a positive sign, while an internal contour always yields a negative sign. These affirmations can be proven by the examples in FIG. 39. There are three cases of tracking external contours, as shown in FIGS. 39(a), (b) and (d), and one for an internal contour, as show in FIG. 39(c). In FIG. 39, the object 45 is shown in gray color on a white slice 46. The voxels are displayed as squares with their centers marked by dots 47. The path followed by the border-tracking algorithm is visible as a dotted line 48 with arrows showing the tracking direction. Each change in the path direction is marked by a "+" or a "−" sign depending whether the direction change was in CCW or CW direction. Counting the number of "+" and "−" signs, +4 is obtained for an external contour and −4 for an internal contour, which proves the previous statement. The sign of a surface can be obtained in a similar way with the 3D border-tracking approach by counting the sign obtained for all phase1 contours.

The following drawbacks of the 3D border-tracking approach can be identified compared with the 2D approach:

The major drawback is the fact that the 3D method needs a dirty-bit-buffer (DBB) of size equal to the 3D volume to be scanned, allocating three bits per voxel to store for each border face that was found during the scanning, the direction code of that border face. This means the allocated memory for the DBB is equal to (sizeX×sizeY×sizeZ)×3/8 where sizeX, sizeY and sizeZ are the dimension of the 3D volume. This amount is considerably larger than the one needed for the 2D approach (in general), i.e. (sizeX×sizeY)×3/8. There are situations (e.g. necessity to specify constraints with a 3D shape in the volume in order to limit the scanned area) when it is more suitable for the approach of the present invention to allocate the same buffer size as the 3D approach, as will be shown later.

The complexity of the 3D algorithm has not to be underestimated. Compared to the 2D approach, the complexity of the 3D method is a factor of three higher.

It is possible to write a parallel implementation of the TriScan method based on the 3D approach, but it would not be as efficient as a similar implementation of the TriScan method based on the 2D approach, because in case of the 3D approach each new step depends on some of the previous steps that introduces some extra overhead, locking mechanism and wait states, while for the method of the present invention, since there is no interdependence between contours in parallel slices, a parallel implementation is straightforward, while for a parallel implementation in mutually orthogonal slices some locking mechanism has to be specified. The TriScan based on the 2D approach takes full advantage of multiprocessing.

The use of the DBB is meant to speed-up the algorithm, but it is not mandatory. To identify whether a certain border face has been scanned or not, instead of looking into the DBB, one could search the list of vertices found during the tracking to identify whether a certain position has been scanned, but the performance of the algorithm will dramatically drop. The overhead introduced by searching into the vertex list is (n×(n+1))/2, where n is the total number of vertices found during the scanning.

It seems that the 3D approach has more drawbacks than the method of the present invention, which might raise the question: does the 3D approach have any practical usage or is it only a more sophisticated implementation? Actually there are particular situations that are difficult to be solved by the TriScan method based on the 2D approach, but feasible for the TriScan method based on the 3D approach, just because the first method does not know the spatial connectivity of the object, it is only a 2D approach.

The cases encountered while extracting the surface from volumetric data can be classified into the following groups: scanning a region inside the 3D volume, tracking only internal or external boundaries of the object, tracking only one object from a group of disjoint objects with similar features, tracking only a part of an object or one object from a connected set of objects (e.g. branching structures). It is to be noticed that in some cases, in order to obtain the desired result one has to specify constraints:

One can specify a region of interest to limit the mesh extraction procedure inside or outside the indicated region. The shape of the region can vary, e.g. box, arbitrary shape, etc. If the shape of the region is a box (at the limit the 3D volume box) then the border tracking limits have to be adjusted inside the region. Everything that would go behind the region limits is considered to be a border. An arbitrary shaped region can be considered if it can be expressed as a continuous discrete surface such that the limits are known for each row or column inside a slice through the volume. The region's boundary will be marked as a constraint (or a border) inside the DBB and will serve as a template for the tracking algorithm that interprets the information found in the DBB. If there are holes in the boundary of the digitized representation of the region, the tracking algorithm might escape through the boundary gaps. Both the 2D and the 3D approaches can be used without user interaction if the entire area inside or outside the specified region has to be scanned.

Tracking only internal or external surfaces of an object is another special case. When speaking about an internal surface there is referred to a 3D boundary that is completely inside of an external surface and there is no contact between them. In a 2D cross-section it is impossible to specify whether a locally appearing internal contour belongs to an internal or external surface (the same applies for an external contour). This is illustrated in an example in FIG. 40, FIG. 40(*a*) showing a folded surface of an object, and FIG. 40(*b*) showing a cross-section through the surface at a certain height. Without a complete 3D knowledge, it is impossible to specify whether a certain contour, e.g. 49' or 49" belongs to an internal or external surface. According to the 2D visual perception or to the computed sign (with the 2D border-tracking approach) the boundaries 49' are considered as external, while the boundaries 49" are considered as internal borders as shown in FIG. 40(*b*), but this is wrong in this case since all boundaries belong to an external surface as shown in the 3D view of FIG. 40(*a*). In a general case, an external 2D contour can belong to an external surface of the same or of a different object (one object can be inside another object), while an internal contour can belong to an internal or external surface. This means that if the goal is to obtain only the external or internal surface, the TriScan method cannot use the 2D approach in an automatic way, only in a supervised mode. A highly qualified user has to locate in each slice the right boundary (or boundaries) that further can be tracked automatically by the algorithm. Since the user may locate wrong boundaries, inter-slice inconsistencies might occur, which will lead to an incomplete 3D connectivity model, and the impossibility to build the entire mesh. The TriScan method based on the 3D approach tracks an entire 3D boundary from a specified starting position, that can be anywhere on the boundary. To track several boundaries one needs to apply the 3D approach on each boundary of interest. Locating the boundaries and specifying the initial starting position can be done either automatically as explained later, or interactively by the user. Applying the 3D approach for an internal or external surface is more a problem of locating an initial position on the right boundary. If the problem has to be solved in an automatic way that all the distinct boundaries have to be located and for each new boundary, according to the DBB, the 3D approach is applied and the sign of the partial or final mesh is computed. A positive sign means that the surface is an external one, otherwise it is an internal one. If the tracked surface does not correspond to the specifications, then it has to be discarded. The automatic way is a trial and error approach. Only the TriScan method based on the 3D approach can guarantee to solve these situations correctly.

Tracking only one object from a group of disjoint objects with similar features resembles the case of the second point. Usually it is impossible to specify a region around the object to be processed, which means that the TriScan method based on the 2D approach cannot be applied in an automatic way, while in supervised mode it might result in a inconsistent surface as mentioned in the previous point. Similar to what has been explained in the second point, the TriScan method based on the 3D approach can generate the surface of the object in supervised mode with the user specifying a starting position on the surface of the correct object.

A different situation is when only a part of the object has to be tracked (e.g. one part of branching structures as the arteries). Considering the ability to generate an arbitrary 3D region to solve the problem would not be realistic, because the complexity of the region might be of the same magnitude as the object itself. To solve the problem one has to specify internal constraints to separate the part of the object that has to be processed from the rest. Such an example is shown in FIG. 41. The "Top View" displays object slices overlapped, with brighter colors for higher slices. Different cross-sections through the object are displayed on the top and the right side of the "Top View". On slice 2 has been marked a constraint area 50, to separate the right branch of the object from the left one, having as goal to track only the right branch of the object. Since the object has a 3D connectivity, the constraint has to be indicated in such a way that the 3D connectivity is broken, as shown by the cross-sections. The constraint has been marked into the DBB, which serves as a template, to indicate an artificial border in that position. The TriScan method based on the 2D approach has the same drawbacks as mentioned in the previous points. The TriScan method based on the 3D border-tracking approach can be used in supervised mode, having the user specify an initial position inside the area to be tracked. In the first step the algorithm will locate the boundary by moving in a straight line, in a predefined direction, and in the second step it will track all border voxels connected to each other starting from the position on the object's boundary. The combination of box shaped region of interest and isolated constraints can be used to limit the extent of the mesh.

In summary, the TriScan method can be based either on the 2D border-tracking approach or on the 3D border-tracking approach. The 2D border-tracking approach can be used in an automatic way if the entire region has to be scanned and all objects located in the region with their internal and external surfaces have to be processed. If there are special situations when not the entire area has to be scanned or 3D connectivity is essential in deriving the right surface then the 3D border-tracking approach should be used, because the 2D border-tracking approach would require a lot of input from the user and still will not guarantee the correct result. The major drawbacks of the 3D approach are the amount of memory that has to be allocated for the DBB, which is higher than for the method of the present invention, but still 2.666 times less than the size of the 3D volume containing the data. Another drawback is the difficulty to write an efficient parallel implementation of the 3D algorithm to take advantage of multiprocessing. The major advantage of the 3D border-tracking approach is that it can be used in any situation when extracting a surface is required.

Strategies for Locating the Border of the Object

As explained previously, border-locating algorithms are designed to work together with the border-tracking approaches in order to extract the contour(s) (or surface(s)) of (an) object(s) located in a 2D/3D data set. The border-locating method is aimed to provide the border-tracking methods with a boundary position and direction. The 2D (respectively 3D) border-tracking approaches (as explained before) will extract the contour (respectively surface) starting from the initial position that was specified by the border-locating algorithm. This whole scenario works in an automatic way. Both the tracking and locating algorithms share the same dirty-bit-buffer (DBB), the first algorithm marks the visited border voxels and the second one retrieves the information in order to avoid tracking the same area, and to be able to make distinction between internal and external contours if necessary.

Depending on the type of the data set (e.g. binary image or labeled image) and the goal, different scenarios for locating the border can be envisaged:

Contouring multiple labels by scanning the whole slice (volume).

Contouring a specified label by scanning the whole slice (volume).

Contouring a specified label starting from a position inside the label.

The scanning strategy for the whole slice or a region inside a slice is shown in FIG. 42. The slice voxels are displayed as squares 51 with their centers marked by dots 52. The object voxels 53 have a darker color to be distinguished from the background. Dotted lines 54 with arrows indicate the scanning directions. The search region is scanned in column order: scan columns along direction 1. When finished with column i return to the beginning of the current column and jump to column i+1 along direction 2. When finished with one slice move to next if the procedure is applied to a 3D data set.

For each border located during the scanning that has not been tracked yet, according to the information stored in the DBB, call the tracking algorithm (the 2D or 3D approach) to obtain the contouring of the located border.

As said above, a first scenario for locating the border is scanning the slice for multiple labels. The algorithm may look as follows in pseudo-code:

```
SET the Flag to External Contour
SET Current Voxel Value equal to Background
FOR all Columns DO
    FOR all Rows DO
        IF Voxel Value is different from Current Voxel Value THEN
            IF Flag is equal to External Contour THEN
                SET Current Voxel Value equal to Voxel Value
                IF the Voxel has not been scanned yet THEN
                    Track the new External Contour (or Surface)
                END of IF
                SET Flag to Internal Contour
            END of IF
            ELSE (Flag is equal to Internal Contour)
                IF the Voxel has not been scanned yet while tracking
                an External Contour THEN
                    Track the new Internal Contour (or Surface)
                    GO one step behind
                    SET Flag to External Contour
                    SET Current Voxel Value equal to Background
                END of IF
            END of ELSE
        END of IF
    END of FOR
END of FOR
```

A second scenario for locating the border is scanning the slice for a specified label. The algorithm may look as follows in pseudo-code:

```
SET the Flag to External Contour
FOR all Columns DO
    FOR all Rows DO
        IF Voxel Value is equal to Label Value THEN
            IF Flag is equal to External Contour THEN
                IF the Voxel has not been scanned yet THEN
                    Track the new External Contour (or Surface)
                END of IF
                SET Flag to Internal Contour
            END of IF
        END of IF
        ELSE (Voxel Value is different from Label Value)
            IF Flag is equal to Internal Contour AND the Voxel has not been
            scanned yet while tracking an External Contour THEN
                Track the new Internal Contour (or Surface)
            END of IF
            SET Flag to External Contour
        END of ELSE
    END of FOR
END of FOR
```

A third scenario for locating the border is scanning from inside a label. This approach is useful when the contouring of a precise area has to be performed, e.g. track an external or an internal contour (surface). While the previous two scanning methods are fully automatic, this method requires the user to specify a position (e.g. a click with the mouse) inside the label for which the contouring has to be performed. To locate the border, from the position specified by the user, the border-locating algorithm scans in a straight predefined (configurable) direction until the border is found. The scanning rule is quite simple: as long as the voxel value is equal to the label, move to next voxel in a predefined direction. Once the border is found, use one of the border tracking algorithms to perform the contouring.

The algorithm may look as follows in pseudo-code:

```
BEGIN
    WHILE Voxel Value is equal to Label Value DO
        Move to next voxel
    END of WHILE
    Track the new Contour (or Surface)
END
```

Deriving the Surface from the Connectivity

The aim of the TriScan method for surface construction is to generate the 3D connectivity-wireframe of the object such that the polygonal representation, and the surface primitives of this representation, can be derived from the obtained connectivity-wireframe.

Section "Locating and tracking boundaries of objects in volumetric data" explained which are the different strategies involved in the TriScan method to derive the outline of an object, represented in a digital form inside a 3D volume. Both 2D and 3D approaches were presented. The 3D approach directly generates the 3D connectivity-wireframe of the object for any slicing set-up. In order to obtain the 3D connectivity-wireframe using the 2D approach a scanning strategy is required in each set of reference-surfaces from the slicing set-up. The strategy is to make the contouring of the object in these reference-surfaces, and then to merge the connectivity information of each contour to obtain the 3D connectivity-wireframe.

In case the contour description of the object can be obtained in an analytical way, the resolution (number of vertices describing the contour) of individual contours might be higher than required for a specified coarseness of the surface. As explained later, this situation can be solved by a pre-processing step that eliminates those vertices that do not contribute to the final surface (by retaining only a limited set of vertices). The pre-processing step can be designed to obtain multiple resolutions of the mesh.

Deriving the polygonal representation of an object from the 3D connectivity-wireframe of that object, has the benefit that the surface primitives of the polygonal representation can be correctly identified for each "opening" in the connectivity-wireframe such that no discontinuities occur in the resulting surface. It has been shown previously that prior art surface extraction methods based on local information may fail, in certain ambiguous cases, to correctly identify the surface primitives. Having the full 3D connectivity information, one is able to traverse the surface nodes in any direction and always get a closed path, feature that can be exploited when different resolution of the surface are being retrieved, or by mesh decimation algorithms.

Current section will focus on the following two topics:
Obtaining the 3D connectivity information (the so-called 3D connectivity-wireframe) of the object either by means of the "Multiple 2D border tracking" approach, or the "3D border tracking" approach.

Extracting the surface primitives from the 3D connectivity information.

Retrieving the 3D Connectivity Information

The connectivity of the surface/contour vertices is referred to as the relation between adjacent vertices.

A vertex belonging to the surface can be expressed in a parametric form as $v_{i,j,k}=F(i,j,k)$. Since each reference-surface has one of the i, j or k parameters constant, a vertex could be referred to as: $v_{m,n}(i,j,k)$ with m≠n and m,n∈{i,j,k}.

In order to obtain the 3D connectivity information that is required for building the surface description (3D connectivity-wireframe) of the object, one needs to know the connectivity information in two directions $d_1$ and $d_2$ with $d_1,d_2 \in \{i,j,k\}$ and $d_1 \neq d_2$ for each vertex $v_{m,n}(i,j,k)$ lying on or adjacent to the surface. This means that for each vertex $v_{m,n}(i,j,k)$, the following relations have to be known: $v_{m-1,n} \rightarrow v_{m,n} \rightarrow v_{m+1,n}$ and $v_{m,n-1} \rightarrow v_{m,n} \rightarrow v_{m,n+1}$.

By performing the 3D border tracking approach one directly obtains the required 3D connectivity information. In case the 2D border tracking approach is used, only the 2D connectivity information can be obtained for each of the reference-surfaces P∈{i,j,k} with i≠j≠k, and therefore one has to perform the contouring of the object in all three sets of reference-surfaces.

The set-up configuration for building the surface is shown in FIG. 38. The three sets of reference surfaces are mutually orthogonal, all the reference-surfaces from one set are planar, parallel to each other, and aligned with the orthogonal coordinate system. It is not imperative that the mutually orthogonal reference-surfaces are parallel to the faces of the 3D volume box: (i,j,k)∈{xoy,yoz,zox}; they may have an arbitrary orientation as long as arbitrary oriented slices can be interpolated from the 3D volume: (i,j,k)∉{xoy,yoz,zox} with ($\vec{i} \times \vec{j} = 0$, $\vec{j} \times \vec{k} = 0$ and $\vec{k} \times \vec{i} = 0$). In the general case the reference-surfaces can be arbitrary shaped as explained in the beginning of section "The TriScan method", but as previously mentioned, using a generalized slicing set-up would make the examples less intuitive.

If the image from FIG. 38 is considered representing a single voxel that is sliced by three orthogonal planes, $P_i$, $P_j$ and $P_k$, it is noticed that each of the voxel's faces are intersected by exactly two planes, $P_iP_j$, $P_jP_k$ or $P_kP_i$. Furthermore, a vertex can be defined, displayed by a white sphere 55, in the center of each face F, resulting from the intersection between two orthogonal scanning planes $P_i$, $P_j$, $P_k$ and voxel face F. The position of the vertices 55 is coherent with the 2D/3D border tracking strategy previously explained. To improve the visual quality of the resulting (shaded) mesh, instead of positioning the vertex in the center of the border face, it is possible to interpolate the position of the vertex between the centers of the two border voxels sharing that face.

From this observation, the following can be concluded:

By applying the 2D border tracking strategy in three mutually orthogonal sets of reference-surfaces, it is ensured that each border face F is scanned twice in two orthogonal reference-surfaces. For each border face, two identical (overlapping) vertices $v_m$ and $v_n$ can be identified, one for each scanning plane passing through border face F. By merging the 2D connectivity information available for both $v_m$ and $v_n$, vertex $v_{m,n}$ is obtained that fulfils the requirements (connectivity information known in two mutually orthogonal directions).

By performing a 3D border tracking, during the two-phase approach the required connectivity for vertex $v_{m,n}$ is obtained (each phase adds a connectivity information).

The connectivity vector is defined as the link pointing from the current vertex $v_n$ to another vertex $v_{n+1}$ with which vertex $v_n$ is directly connected. For each vertex there are two incoming connectivity vectors called "Link previous" (-$L_{P1}$- and -$L_{P2}$-), and two outgoing connectivity vectors called "Link next" (-$L_{N1}$- and -$L_{N2}$-).

Since the goal is to be able to generate the surface primitives from the connectivity-wireframe, and to be able to visualize the result as a smooth shaded surface, the following needs to be ensured:

The surface primitives (polygons), generated by following the connectivity vectors between the vertices until a closed circuit is formed, have to be expressed in the same CW or CCW direction. The orientation consistency is necessary in order to be able to distinguish between front and back faces (e.g. for consistent surface shading).

Correct and fast computation of normal vectors for each mesh vertex for smooth shading or to be used in other applications.

The possibilities for retrieving the direction of the normal vector for each vertex are the following:

One of the solutions to retrieving the direction of the normal vector for each vertex is to look back at the voxel model of the binary image and compute the direction of the gradient vector for each vertex position using the discrete mathematics. The direction of the normal vector is parallel to the gradient vector. A more accurate normal direction can be obtained if instead of using the binary dataset the original scalar dataset is used (e.g. gray level images) for computing the gradient vector. In order to have consistently defined polygons, it is needed, for each polygon, to compute the scalar product between the polygon's circuit normal vector and the average normal vector of the involved vertices, and to make sure that all the scalar products yield the same sign for all polygons. A positive sign means that a polygon is defined CCW, while a negative value indicates a CW oriented polygon. Both computation of normal vectors and checking for consistent definition of polygons is more time consuming than then next described solutions.

Another option would be to store the normal direction of the border face found while tracking the border. In this case, the possible normal directions are limited to six, i.e. the positive or negative direction of axes OX, OY or OZ. While this solution is straightforward, it is not very accurate with the topology of the surface. It will work for flat shading purpose. Another drawback is the computation overhead to obtain consistent defined polygons, as described in the previous case.

The preferred solution is to be able to directly obtain both the normal vector for each node (vertex) and the consistent polygon description from the 3D connectivity information of the connectivity-wireframe with minimum computation. The solution is to store the 3D connectivity information in such a way that the external normal direction for any vertex can be computed by the cross product between the link vectors as follows:

$$\vec{N} = (\vec{L}_{N1} - \vec{L}_{P1}) \times (\vec{L}_{N2} - \vec{L}_{P2}) \quad \text{(eq. 2)}$$

The normal vector computed in this way follows accurately the topology. More over if the previous statement can be achieved, then generating consistent polygons is straightforward. Starting the polygon definition, from any node, via -$L_{N1}$- yields a CCW circuit, while starting a similar polygon definition via -$L_{N2}$-, yields a CW defined circuit.

To visually distinguish the -$L_{N1}$- and -$L_{P1}$- from -$L_{N2}$- and -$L_{P2}$- vectors from each other, the first ones are displayed in light gray and the second ones in dark gray, as shown in FIG. 38. It is to be noticed that the cross product between the light gray arrow 43 and the dark gray one 44 gives as result a normal direction 56 towards the outside of the volume.

Figure 43:
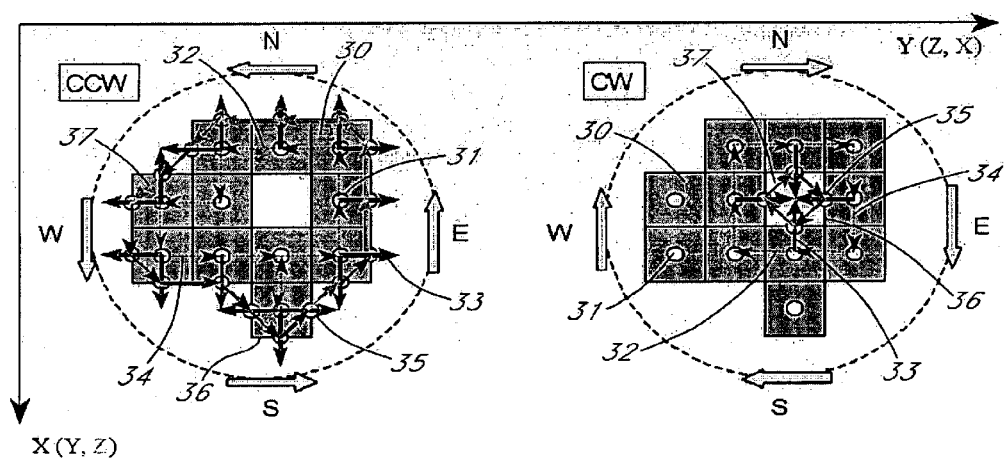
FIGS. 43(*a*) and (*b*) illustrate the Orthogonal Tracking Engine applied on a slice through a 3D volume; tracking an external contour in CCW direction, and an internal contour in CW direction respectively.
Figure 44:
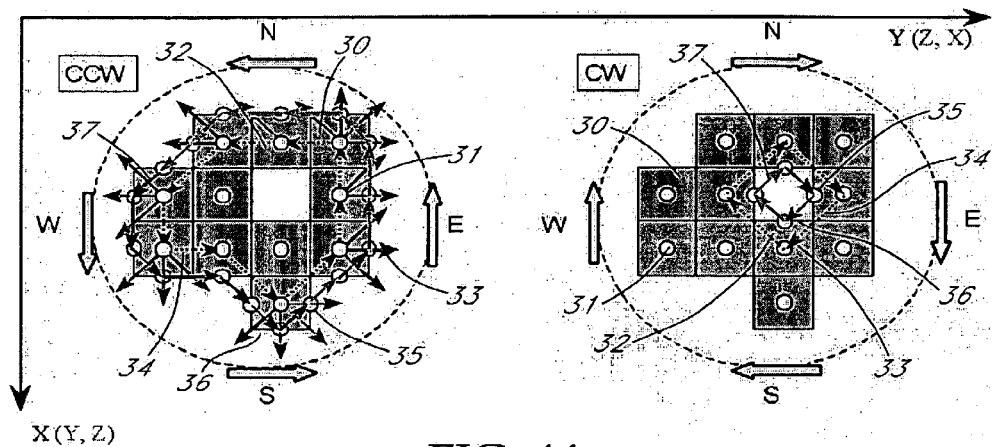
FIGS. 44(*a*) and (*b*) illustrate the Ortho-Diagonal Tracking Engine applied on a slice through a 3D volume; tracking an external contour in CCW direction, and an internal contour in CW direction respectively.

With the convention that the global scanning direction is CCW for an external contour and CW for an internal contour (see FIG. 31), the following rules can be defined:

For all borders found in direction -N- or -E- (both external and internal contours), the corresponding nodes will save the connectivity information towards the next/previous node on -$L_1$- (see the modified FIG. 43 and FIG. 44 compared to previous FIG. 32 and FIG. 33).

For all borders found in direction -S- or -W- (both external and internal contours), the corresponding nodes will save the connectivity information towards the next/previous node on -$L_2$- (see the modified FIG. 43 and FIG. 44 compared to previous FIG. 32 and FIG. 33).

FIG. 43, which is very similar to FIG. 32 and uses the same notations, illustrates the orthogonal tracking engine applied on a slice through a 3D volume, whereby FIG. 43(a) shows tracking an external contour in CCW direction, and FIG. 43(b) shows tracking an internal contour in CW direction. FIG. 44, which is very similar to FIG. 33 and uses the same notations, illustrates the ortho-diagonal tracking engine applied on a slice through a 3D volume, whereby FIG. 44(a) shows tracking an external contour in CCW direction, and FIG. 44(b) shows tracking an internal contour in CW direction. The difference between FIG. 32 and FIG. 43, respectively FIG. 33 and FIG. 44 is the coloring of the final contour 37. In the case of FIG. 33 and FIG. 34, the final contour 37 consists of a connected set of light gray and dark gray arrows (the connectivity links associated with each node), the light gray arrows corresponding to the -$L_1$- connectivity vector, respectively the dark gray arrows to the -$L_2$- connectivity vector.

Figure 45:
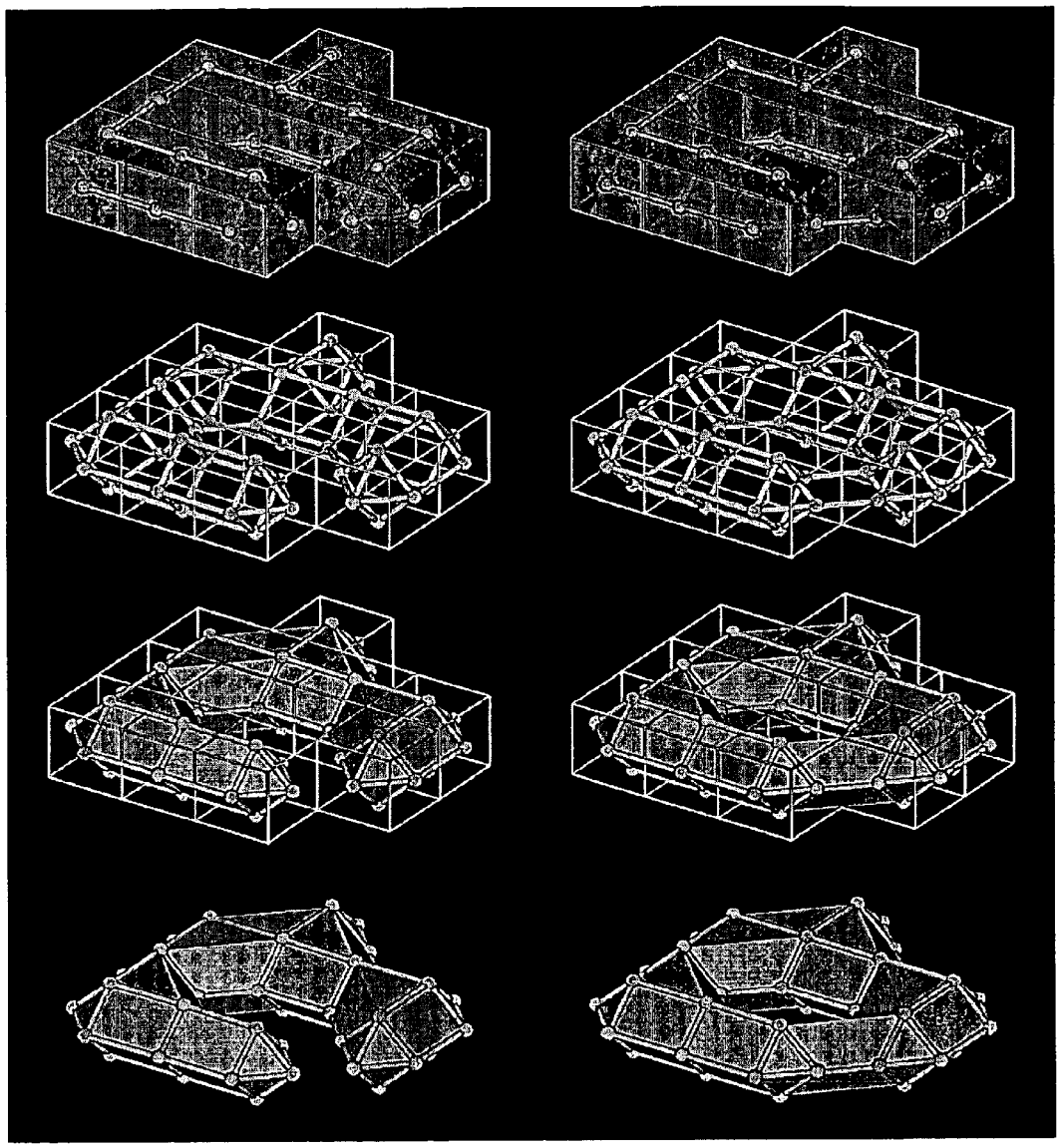
FIG. 45 illustrates connecting voxel's faces using the Orthogonal Tracking Engine in the left column, respectively the Ortho-Diagonal Tracking Engine in the right column.
Figure 46:
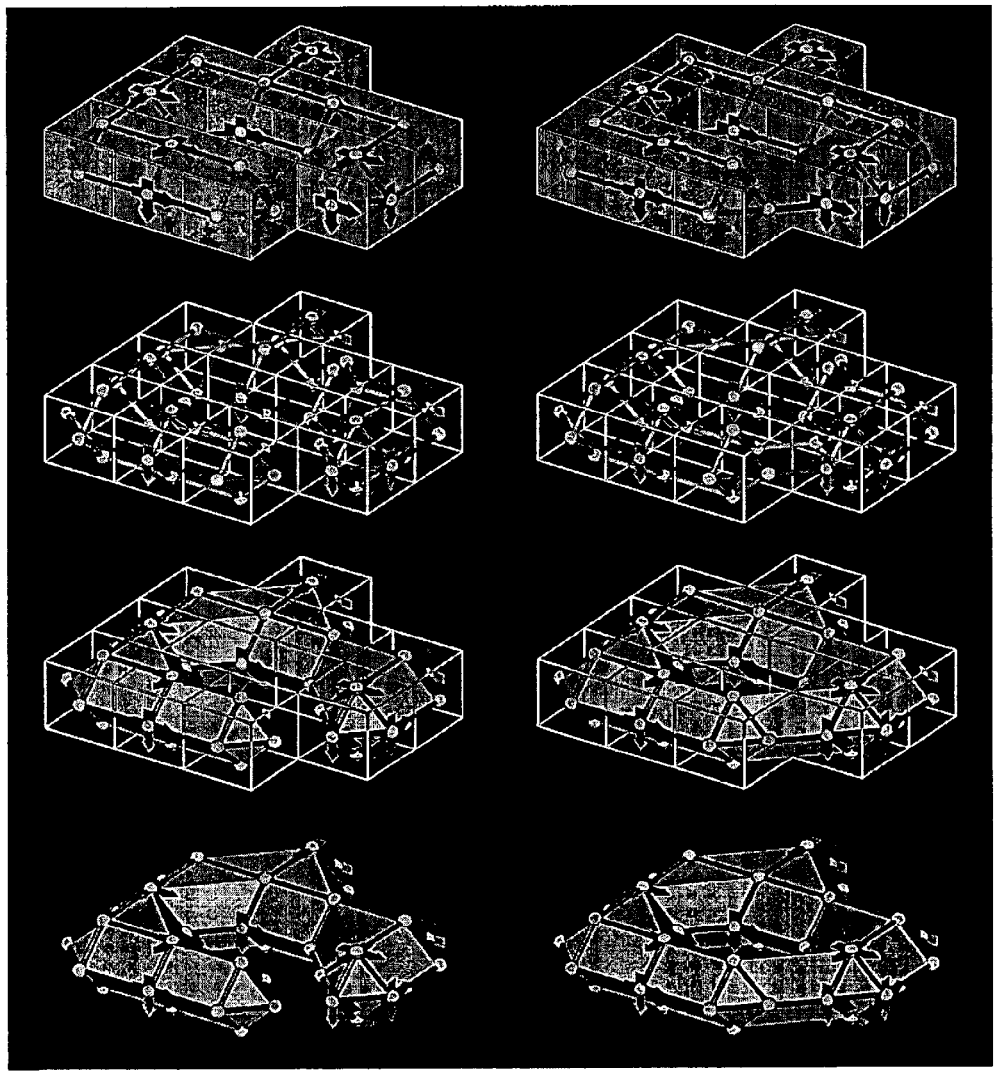
FIG. 46 illustrates connecting voxel's faces, and shows in addition to FIG. 45 the arrows of the scanning direction, using the Orthogonal Tracking Engine the left column, respectively the Ortho-Diagonal Tracking Engine the right column.
Figure 49A:
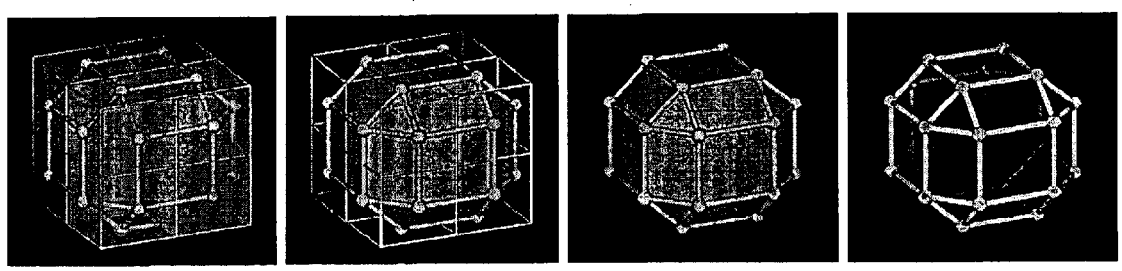
FIG. 49 shows images for the geometrical configurations of a 8-cube applied for the connectivity-wireframe, in order to compare with the cases of the MC algorithm.
Figure 49B:
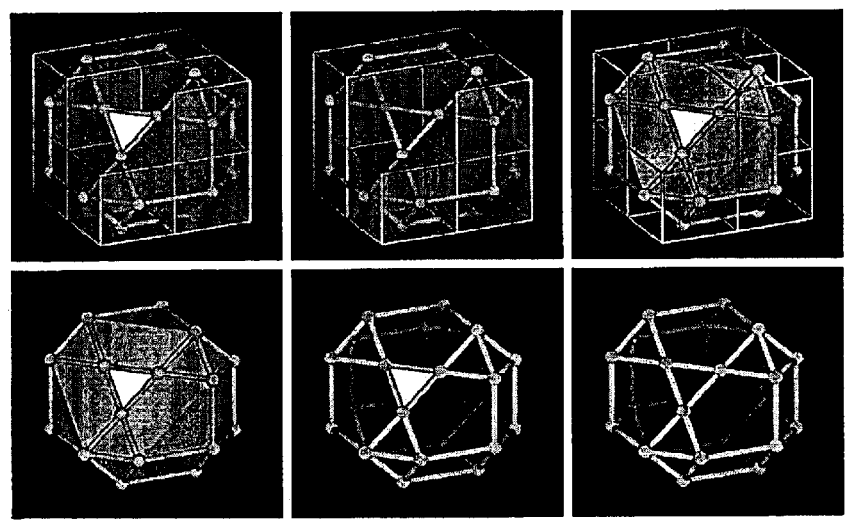
Figure 49C:
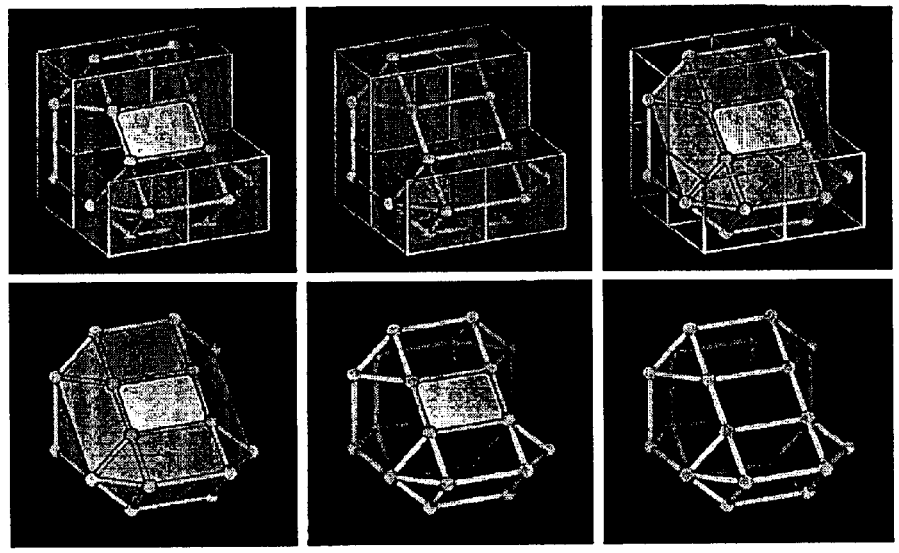
Figure 49D:
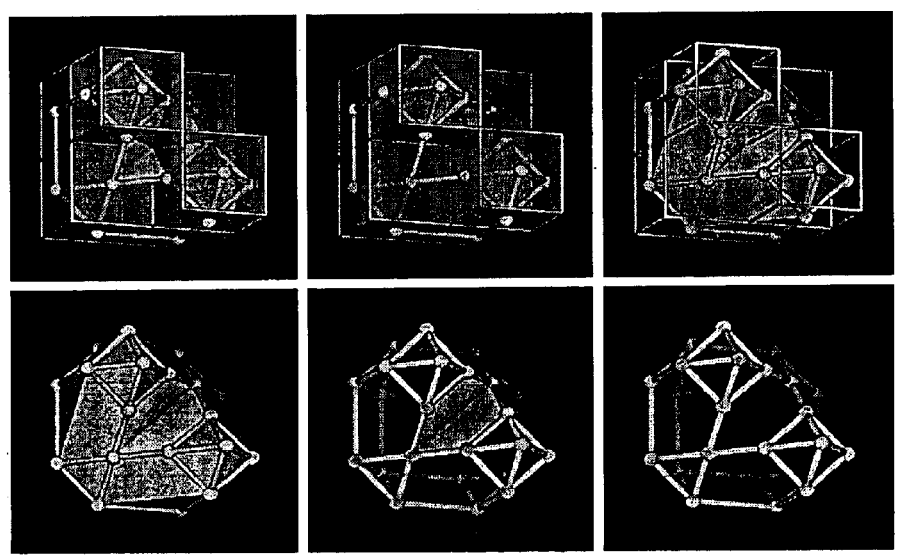
Figure 49E:
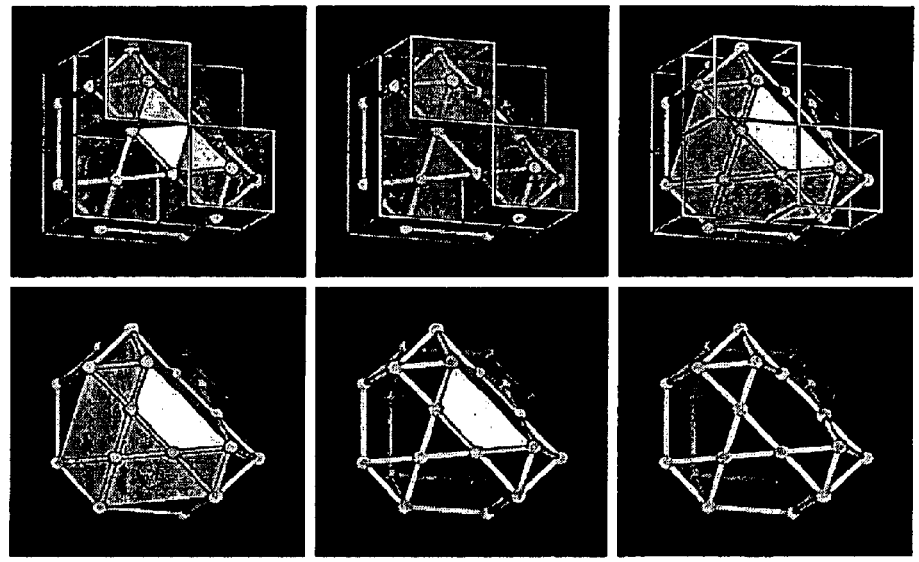
Figure 49F:
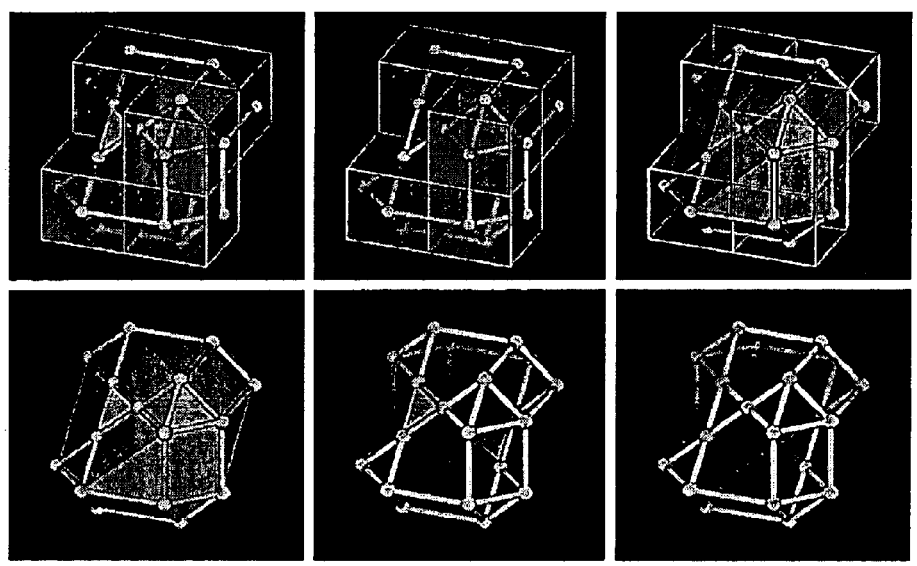
Figure 49G:
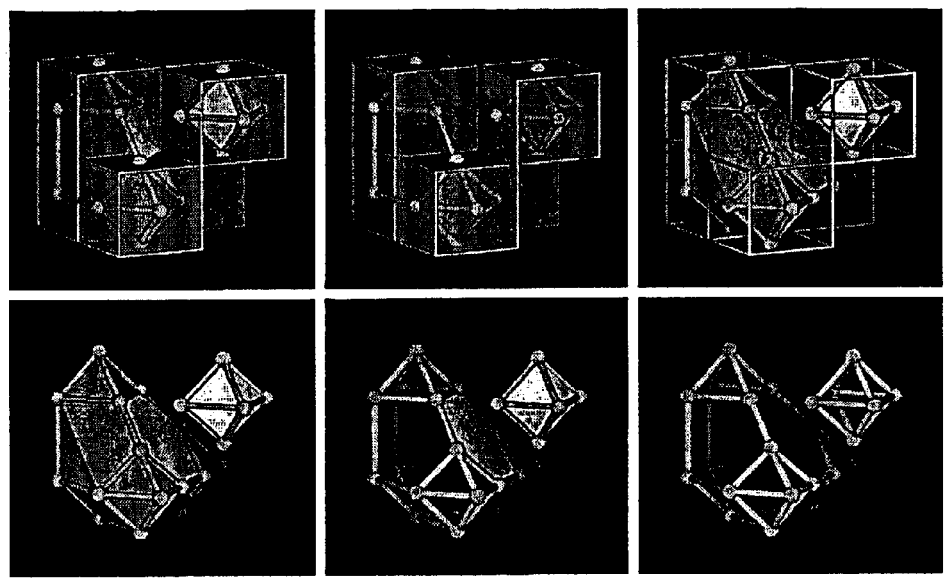
Figure 49H:
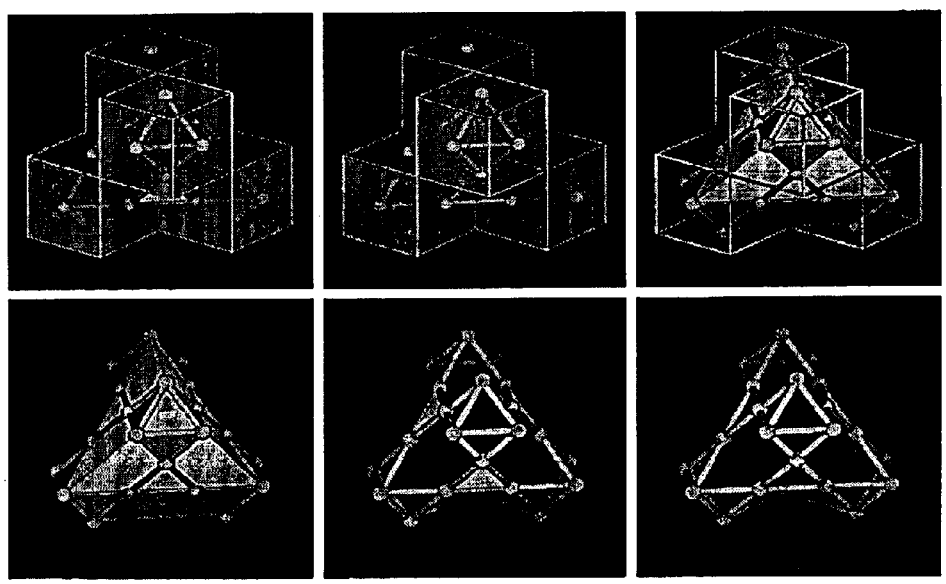
Figure 49I:
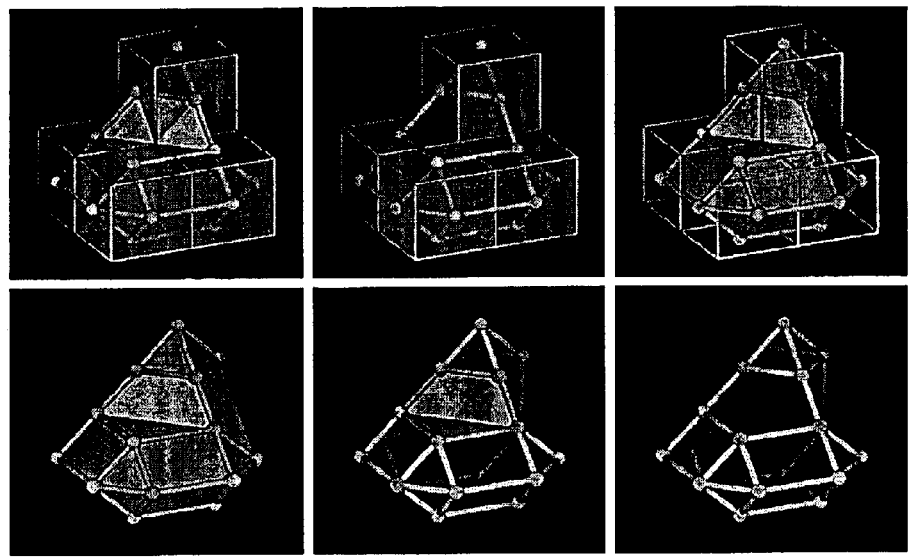
Figure 49J:
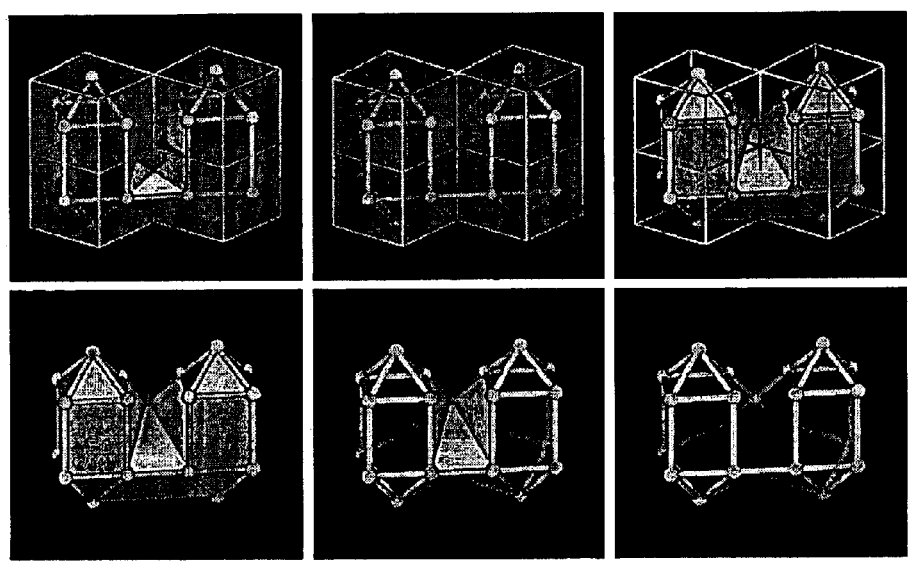
Figure 49K:
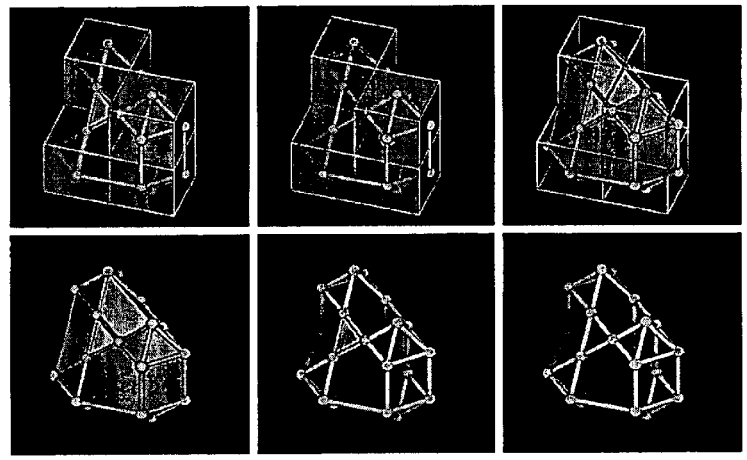
Figure 49L:
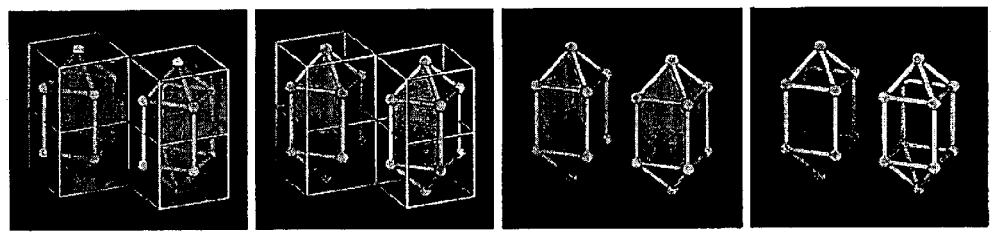
Figure 49M:
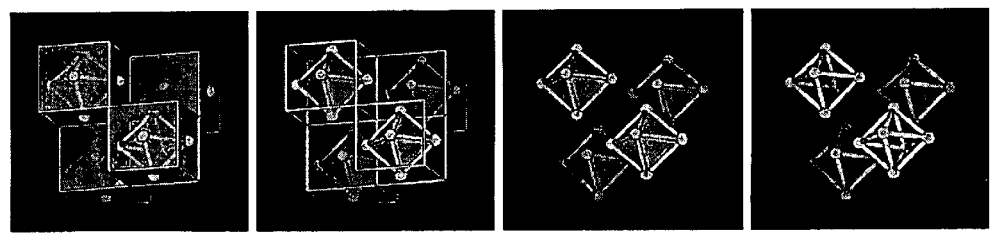
Figure 49N:
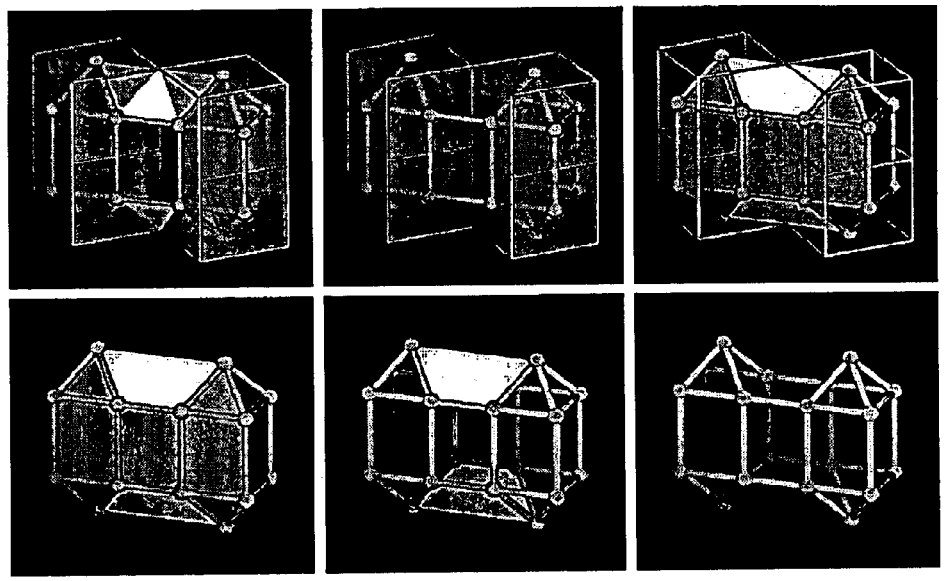
Figure 49P:
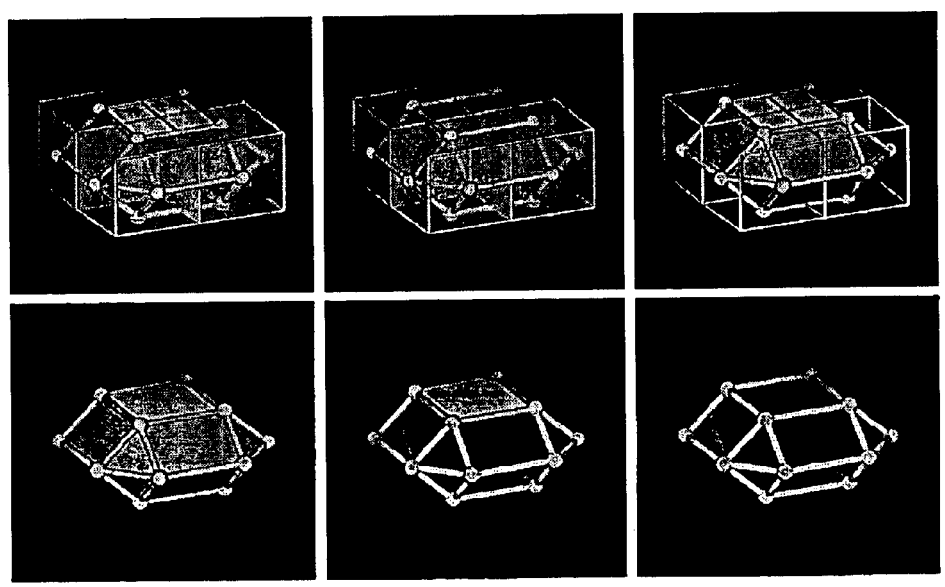
Figure 49Q:
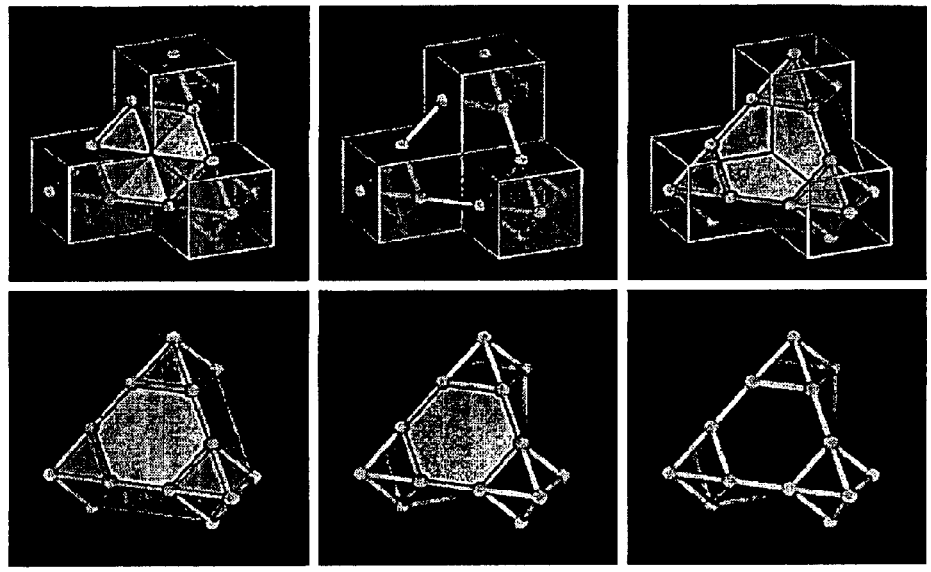
Figure 49R:
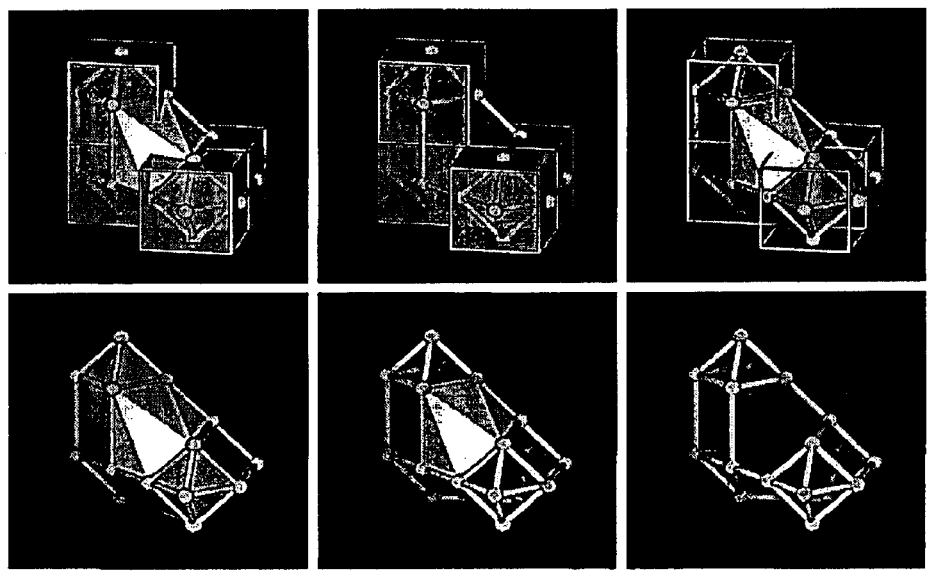
Figure 49S:
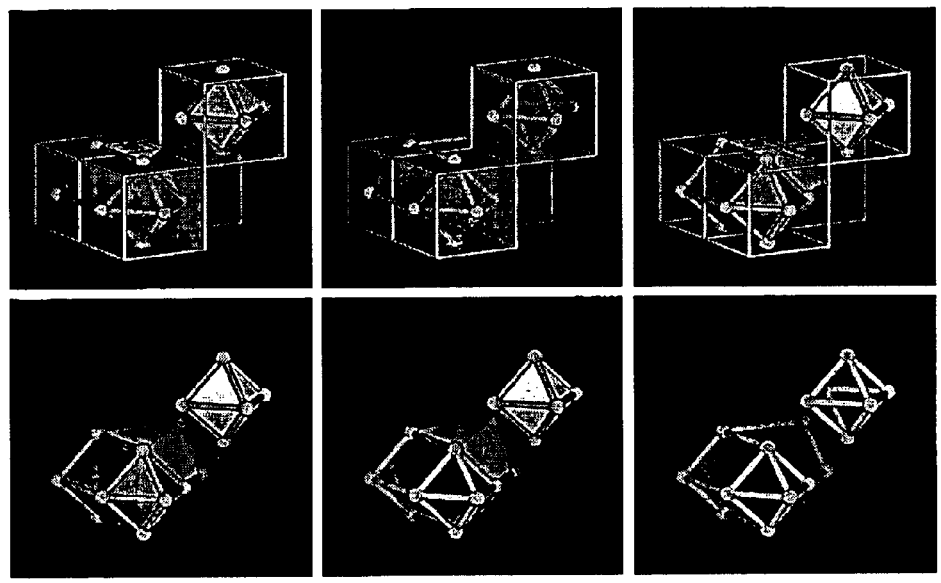
Figure 49T:
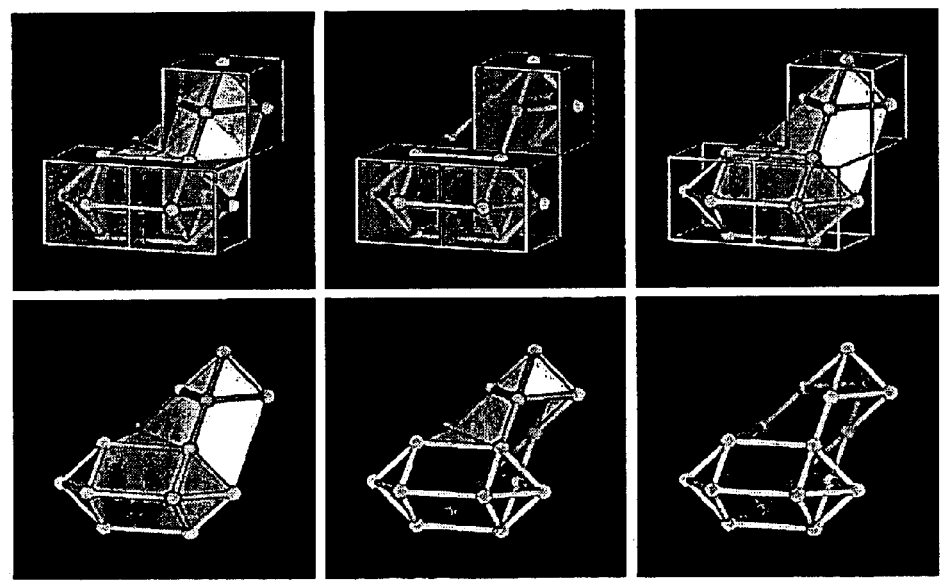
Figure 49U:
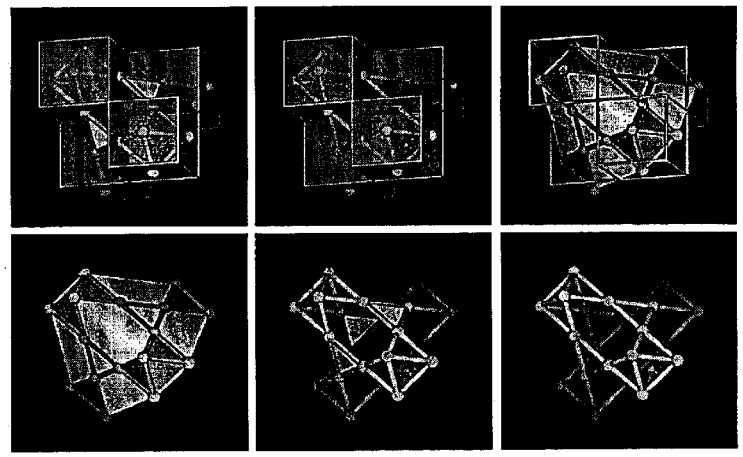

An example of the 3D connectivity-wireframe obtained with the TriScan method (either the 3D border-tracking approach or the Multiple 2D border-tracking approach) from a discrete object consisting of a single slice is shown in FIG. 45 and FIG. 46. Notice that the vertices of the connectivity-wireframe are connecting the voxel's faces. The results from the left column have been obtained using the Orthogonal Tracking Engine, respectively the results from the right column using the Ortho-Diagonal Tracking Engine. FIG. 46 has in addition to FIG. 45 the arrows of the scanning direction. The first row from FIG. 45 and FIG. 46 show the 3D connectivity as a wireframe and the object voxels rendered as transparent boxes, respectively the second row from the same figures displays the 3D connectivity as a wireframe and the object voxels rendered as wireframe boxes. The third row from FIG. 45 and FIG. 46 show the render of the polygonized connectivity-wireframe and the object voxels displayed as wireframe boxes, respectively the last row from the same figures displays only the render of the polygonized connectivity-wireframe.

Extracting the Surface Primitives

Figure 47A:
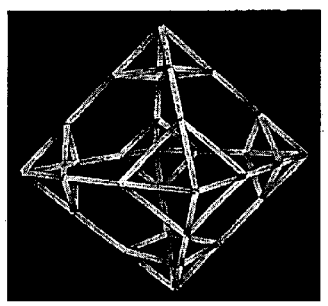
FIG. 47 displays the 3D connectivity-wireframe as a wire-frame in FIG. 47(*a*), together with the boundary nodes (vertices) in FIG. 47(*b*), and both overlaid on the surface in FIG. 47(*c*).
Figure 47B:
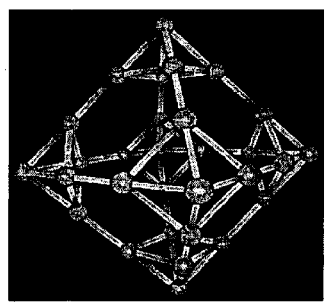
Figure 47C:
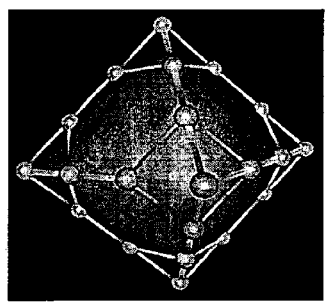
Figure 48A:
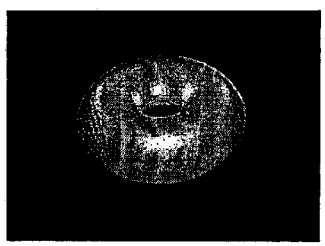
FIG. 48(*a*) shows rendering the 3D connectivity-wireframe as a wire-frame with a tick line compensating for the zooming factor of the scene, such that the opening in the connectivity-wireframe are not visible.
FIG. 48(c) shows that rendering of the polygonized connectivity-wireframe yields the best visual result, independent of the zooming factor.
Figure 48B:
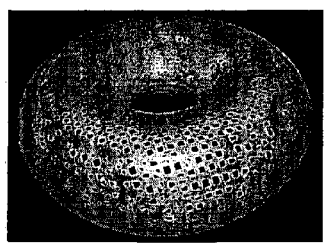
Figure 48C:
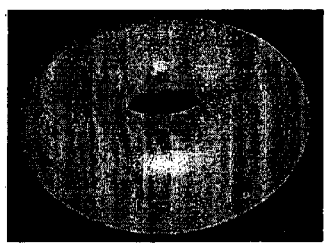

The connectivity-wireframe can be displayed as a wireframe by drawing the connectivity between the nodes, as a cloud of nodes, or as a combination of nodes and connectivity, which is illustrated in FIGS. 47(a), (b) and (c) respectively. The connectivity-wireframe is displayed by light gray and dark gray lines, corresponding to the connectivity vectors (-$L_1$-, -$L_2$-), while the nodes are shown as spheres. The openings in the connectivity-wireframe are not visible when displaying a connectivity-wireframe that has a sufficiently high density (number of reference-surfaces high compared to the size of the object), and when the zooming factor and/or viewing angle of the rendering scene are appropriate, as shown in FIG. 48(a). In such a case, the rendered result gives the impression of a filled surface. Even when the zooming factor increases one can compensate, at a certain extent, by drawing the wire-frame with a thicker line, as exemplified in image FIG. 48(b), but the precision and visual quality of the shape diminishes. The most accurate rendering of the connectivity-wireframe can be obtained by displaying the surface of each individual patch (opening) from the connectivity-wireframe as shown in image FIG. 48(c).

Deriving the surface primitives for the patches of the connectivity-wireframe, the polygonal representation of the surface description, is necessary for improving the quality and precision of the rendered image, and to be able to map textures on the polygonal representation for a more realistic display.

A set of rules has been designed in order to identify the shape and the orientation of a patch P from the connectivity-wireframe such that a right surface primitive can be inserted in the opening. A patch corresponds to the shortest circuit formed by navigating from one node to its neighbor. The connectivity in the resulting circuit is matched against the designed set of rules to identify the surface primitive matching the opening.

There are five groups of surface primitives when classified by the number of laterals: triangles, rectangles, pentagons, hexagons and heptagons. Each of these groups consists of several shapes or cases. There are different cases of triangles, pentagons and heptagons that fill concavities and convexities, two types of rectangles (one type where the nodes belong to the same reference-surface, and another where the nodes belong to different reference-surfaces), and three types of hexagonal shapes.

The total number of patches in the connectivity-wireframe is equal to the number of nodes V since each node has 4 distinct neighbors, and with each of its neighbors, V can build a distinct patch.

From the connectivity point of view, each node V in the connectivity-wireframe has two incoming connectivity vectors (or links) -$L_{P1}$- and -$L_{P2}$-, respectively two outgoing connectivity vectors -$L_{N1}$- and -$L_{N2}$-. The -$L_{P1}$- and -$L_{N1}$- (respectively -$L_{P2}$- and -$L_{N2}$-) links are oriented in the same direction and belong to a curve $C_1$ (respectively $C_2$). Curves $C_1$ and $C_2$ belong to reference-surfaces from a different set, and intersect each other in node V. The following notations will be made: the 4 neighbor nodes with V are named $P_1$, $P_2$, $N_1$ and $N_2$, and are connected with V via -$L_{P1}$-, -$L_{P2}$-, -$L_{N1}$- and -$L_{N2}$-. Going back to the initial ordered list of vertices (the contour) that generated the connectivity-wireframe, node $N_1$ (respectively $N_2$) follows node V (is the next one) in curve $C_1$ (respectively $C_2$), and node $P_1$ (respectively $P_2$) comes before node V (is the previous one) in curve $C_1$ (respectively $C_2$). It has been shown that the connectivity vectors change their meaning, which is illustrated in FIG. 38, such that the orientation of the normal vector at the surface in node V can be computed by the cross product given in eq. 2. The change in the meaning of the connectivity vectors is symbolically done by changing the numbering of the links (1→2 and 2→1). This implies that if there is gone from a node V to one of its neighbors $N_i$ with i={1, 2} via link -$L_{Ni}$- (respectively to $P_i$ via -$L_{Pi}$-), there may be returned from that position back to node V on one of the -$L_{P1}$- or -$L_{P2}$- links (respectively -$L_{N1}$- or -$L_{N2}$-) depending whether the numbering has changed or not. The number of the link connecting two neighboring nodes is determined by the position of the border-face the two neighbor vertices belong to. The following table shows all the possible connectivity cases between vertices, located on each of the 6 border faces, and its neighbor vertices, as illustrated in FIG. 38. The rows and the columns headers specify the position of the border face the node belongs to. The column header refers to a node V and its two outgoing links (-$L_{N1}$- and -$L_{N2}$-), while the rows indicate the incoming links (-$L_{P1}$- and -$L_{P2}$-) for a node that is neighbor with V. The links use the same coloring scheme as displayed in FIG. 38 (-$L_1$- in light gray color and -$L_2$- in dark gray color). As long as two consecutive nodes stay on the same border face, illustrated by the cases from the first column of the table, the connectivity vectors keep their numbering, otherwise they may change.

|  | Back | | Front | | Left | | Right | | Down | | Up | |
| --- | --- | --- | --- | --- | --- | --- | --- | --- | --- | --- | --- | --- |
|  | -$L_{N1}$- | -$L_{N2}$- | -$L_{N1}$- | -$L_{N2}$- | -$L_{N1}$- | -$L_{N2}$- | -$L_{N1}$- | -$L_{N2}$- | -$L_{N1}$- | -$L_{N2}$- | -$L_{N1}$- | -$L_{N2}$- |
| Back | -$L_{P1}$- | -$L_{P2}$- | ! | ! | ! | -$L_{P1}$- | -$L_{P1}$- | ! | -$L_{P2}$- | ! | ! | -$L_{P2}$- |
| Front | ! | ! | -$L_{P1}$- | -$L_{P2}$- | ! | -$L_{P2}$- | -$L_{P2}$- | ! | -$L_{P1}$- | ! | ! | -$L_{P1}$- |
| Left | -$L_{P2}$- | ! | ! | -$L_{P2}$- | -$L_{P1}$- | -$L_{P2}$- | ! | ! | ! | -$L_{P1}$- | -$L_{P1}$- | ! |
| Right | -$L_{P1}$- | ! | ! | -$L_{P1}$- | ! | ! | -$L_{P1}$- | -$L_{P2}$- | ! | -$L_{P2}$- | -$L_{P2}$- | ! |
| Down | ! | -$L_{P1}$- | -$L_{P1}$- | ! | -$L_{P2}$- | ! | ! | -$L_{P2}$- | -$L_{P1}$- | -$L_{P2}$- | ! | ! |
| Up | ! | -$L_{P2}$- | -$L_{P2}$- | ! | ! | -$L_{P1}$- | -$L_{P1}$- | ! | ! | ! | -$L_{P1}$- | -$L_{P2}$- |

In order to compare the surface primitives obtained by the method of the present invention with the results of the Marching Cubes (MC) algorithm (see prior art), the 16 geometrical configurations of the 8-cube as for MC are going to be generated. Based on the connectivity information, the TriScan algorithm of the present invention is able to correctly identify the surface primitive(s) that correspond(s) to each geometrical configuration of the 8-cube.

As shown in the different cases of FIG. 49, one geometrical configuration may contain several surface primitives, and each surface primitive matches several connectivity cases, as shown in the following tables. In cases 0, 1, 2, 4, 6, 9, 10 and 11 of FIG. 49, both the 90° and the 45° border-tracking algorithms generate the same connectivity. Cases 3a, 5a, 7a, 8a, 12a and 13a of FIG. 49 are specific for the 90° border-tracking algorithms, and cases 3b, 5b, 7b, 8b, 12b and 13b are specific for the 45° border-tracking algorithms.

Similar triangulation results with the TriScan approach have been obtained with the surface extraction methods explained previously. These methods use a modified lookup table and strategy to extract the surface.

The connectivity cases that are defined next, differentiate the TriScan surface extraction method of the present invention from the ones based on a look-up table. It has been shown that there are 16 geometrical configurations of the 8-cube, if all the symmetrical and complementary cases are removed, and in each of these geometrical configurations several primitives can fit. The same primitive appears in several geometrical configurations. The connectivity cases do not associate a particular geometrical configuration with a surface primitive; they define the rules to identify a surface primitive in any geometrical configuration. In the present case a surface primitive defines some geometrical configuration and not the opposite.

The following notations have been used to describe the connectivity cases and to define the connectivity rules:

V a starting vertex when describing the connectivity $N_1$ a next vertex from V that can be reached via $-L_{N1}$-

$N_2$ a next vertex from V that can be reached via $-L_{N2}$-

$P_1$ a previous vertex from V that can be reached via $-L_{P1}$-

$P_2$ a previous vertex from V that can be reached via $-L_{P2}$-

Figures 50A, 50B, 50C, 50D:
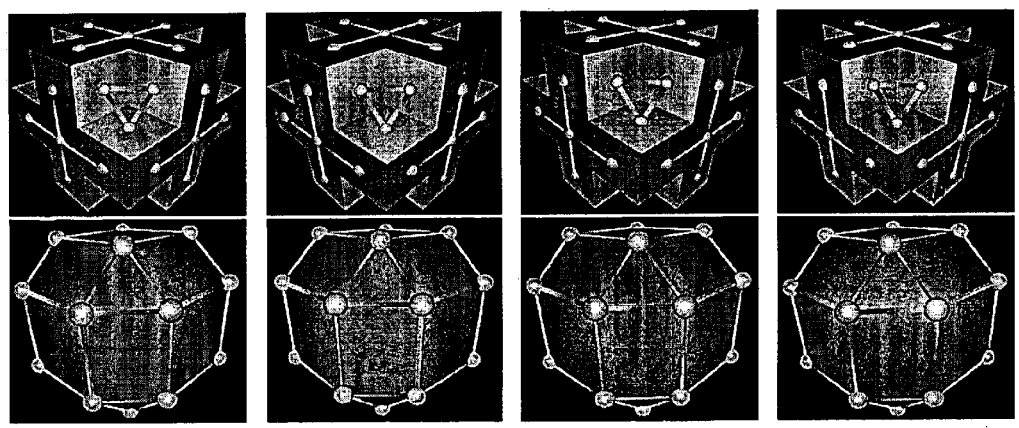
FIG. 50 shows images for the connectivity cases corresponding to the triangle primitive.

FIG. 50 shows images for the connectivity cases corresponding to the triangle primitive. There are 4 distinct connectivity cases, as shown in FIGS. 50(a), (b), (c) and (d), which are identical for both rows of images. The first row, rendering the voxel model, shows the different cases that correspond to concavities of the shape. The second row, rendering the surface extracted from the voxel model, illustrates the cases found for local convexities of the shape. Following table gives the connectivity rules for the triangle primitive.

| | Triangle | Comments |
|---|---|---|
| (a) | $N_1N_2 = N_2$ | Detected by the pentagon case (b) |
| (b) | $N_2N_1 = N_1$ | Detected by the pentagon case (a) |
| (c) | $N_1N_1 = P_2$ or $N_1N_1N_1 = V$ | Detected three times. The first time the rule is matched, a flag is set for all three vertices of the triangle, to avoid duplicates. |
| (d) | $N_2N_3 = P_1$ or $N_2N_2N_2 = V$ | Detected three times. The first time the rule is matched, a flag is set for all three vertices of the triangle, to avoid duplicates. |

FIG. 51 shows images for the connectivity cases corresponding to the rectangle primitive. There are 3 distinct connectivity cases, as shown in FIGS. 51(a), (b) and (c). The square shapes are obtained by the case from (a), while the rectangles are generated by any of the three cases. Following table gives the connectivity rules for the rectangle primitive.

| | Rectangle | Comments |
|---|---|---|
| (a), (b), (c) | $N_1N_2 = N_2N_1$ | Generates both square (all the nodes are located in the same slicing plane) and rectangles. |
| (b) | $N_1N_2 = N_2P_2$ or $N_1N_2N_2 = N_2$ | Detected by hexagon case (e) |
| (c) | $N_2N_1 = N_1P_1$ or $N_2N_1N_1 = N_1$ | Detected by hexagon case (f) |

FIG. 52 shows images for the connectivity cases corresponding to the pentagon primitive. There are 4 distinct connectivity cases, as shown in FIGS. 52(a), (b), (c) and (d), which are identical for both rows of images. The first column shows the voxel model used for each row, followed by the renderings of the surface extracted from the voxel model. The cases corresponding to the first row correspond to convexities in the shape, while the cases from the second row illustrate the cases found for local concavities in the shape. Following table gives the connectivity rules for the pentagon primitive.

| | Pentagons | Comments |
|---|---|---|
| (a) | $N_1P_1N_1 = N_2N_1$ if $N_1P_1N_1! = N_1$ | Detects triangle $N_2N_1 = N_1$ |
| (b) | $N_2P_2N_2 = N_1N_2$ if $N_2P_2N_2! = N_2$ | Detects triangle $N_1N_2 = N_2$ |
| (c) | $N_1N_2N_2 = N_2N_1$ | Detected by hexagon case (a) |
| (d) | $N_2N_1N_1 = N_1N_2$ | Detected by hexagon case (b) |

FIG. 53A shows images for the connectivity cases corresponding to the folded hexagon primitive. There are 4 distinct connectivity cases, as shown in FIGS. 53A(e), (f), (g) and (h), which are identical for both rows of images. The first column shows the voxel model used for each row, followed by the renderings of the surface extracted from the voxel model. The cases corresponding to the first row correspond to the 90° border-tracking engine, while the cases from the second row illustrate the cases found for the 45° border-tracking engine.

Figure 53B:
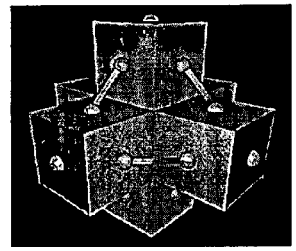
FIG. 53B shows images for the connectivity cases corresponding to the planar hexagon primitive.
Figure 53B:
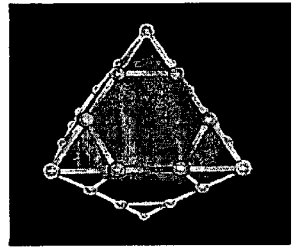
Figure 53B:
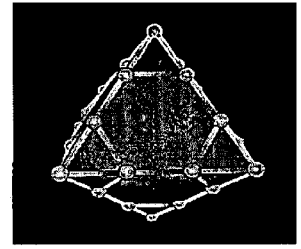

FIG. 53B shows images for the connectivity cases corresponding to the planar hexagon primitive. There are two distinct cases, as shown in FIGS. 53B (a) and (b), the same for both border-tracking algorithms.

FIG. 53C shows images for the connectivity cases corresponding to the arbitrary hexagon primitive. There are two distinct cases, the same for both border-tracking algorithms. Following table gives the connectivity rules for the hexagon primitive.

| | Hexagons | Comments |
|---|---|---|
| (a) | $N_1P_1N_1 = N_2P_2N_2$ | Detected three times. The first time the rule is matched, a flag is set for all three vertices of the triangle, to avoid duplicates. |
| (b) | $N_1N_2N_2 = N_2N_1N_1$ | |
| (c) | $P_2N_2N_1 = P_1N_1N_2$ | |
| (d) | $N_1N_2P_1 = N_2N_1P_2$ if $N_1N_2P_1! = N_2$ and $N_2N_1P_2! = N_1$ | |
| (e) | $N_1N_2N_2 = N_2P_2N_2$ if $N_2P_2N_2! = N_2$ | Detects rectangle $N_1N_2N_2 = N_2$ |
| (f) | $N_2N_1N_1 = N_1P_1N_1$ if $N_1P_1N_1! = N_1$ | Detects rectangle $N_2N_1N_1 = N_1$ |
| (g) | $N_1N_2N_2 = N_2N_1$ | |
| (h) | $N_2N_1N_1 = N_1N_2$ | |

FIG. 54 shows images for the connectivity cases corresponding to the heptagon primitive. There are 8 distinct connectivity cases, as shown in FIGS. 54(a)–(h), which are the same for both border-tracking algorithms. The voxel model, displayed in the first column, is different for each of the border-tracking engines. The cases for the 90° border-tracking engine are shown in the first row, while the second row shows the same connectivity cases but for the 45° border-tracking engine. Following table gives the connectivity rules for the heptagon primitive.

| | Heptagons | Comments |
|---|---|---|
| (a) | $N_1N_2N_2 = N_2N_1P_2N_2$ if $N_2N_1P_2N_2! = N_2N_1$ and $N_2N_1P_2N_2! = N_2N_2$ | Detects pentagon $N_1N_2N_2 = N_2N_1$ |
| (b) | $N_2N_1N_1 = N_1N_2P_1N_1$ if $N_1N_2P_1N_1! = N_1N_2$ and $N_1N_2P_1N_1! = N_1N_1$ | Detects pentagon $N_2N_1N_1 = N_1N_2$ |

-continued

| Heptagons | Comments |
|---|---|
| (c) $N_1N_2P_1N_1N_2 = N_2N_1$ if $N_1N_2P_1N_1N_2! = N_1N_2N_2$ and $N_1N_2P_1N_1N_2! = N_1N_1N_2$ | |
| (d) $N_2N_1P_2N_2N_1 = N_1N_2$ if $N_2N_1P_2N_2N_1! = N_2N_1N_1$ and $N_2N_1P_2N_2N_1! = N_2N_2N_1$ | |
| (e) $N_2P_2N_2N_1 = N_1N_2N_2$ if $N_2P_2N_2N_1! = N_2N_1$ | Detects pentagon $N_1N_2N_2 = N_2N_1$ |
| (f) $N_1P_1N_1N_2 = N_2N_1N_1$ if $N_1P_1N_1N_2 = N_1N_2$ | Detects pentagon $N_2N_1N_1 = N_1N_2$ |
| (g) $N_2N_1N_1N_1 = N_1N_2N_2$ if $N_1N_2N_2! = N_1P_1$ | |
| (h) $N_1N_2N_2N_2 = N_2N_1N_1$ if $N_2N_1N_1! = N_2P_2$ | |

Storing the Surface-Description: The Connectivity-Wireframe

Classical surface representations as polyhedral models require considerable amounts of storage, even when they only approximate precise shapes with limited accuracy. Such a model may consist of a list of vertices and a set of triangles (e.g. the IndexedFaceSet VRML representation). A triangle description consists of 3 indexes into the vertex list. In order to compute the storage needed for a surface consisting of n vertices, one vertex is considered, to be shared between 8 triangles (or 4 quadrilaterals), and since each triangle has 3 vertices, the corresponding number of triangles is 8/3 times n vertices. Considering that a 4 bytes (an integer) number is allocated to store the index (12 bytes for a triangle), and for the coordinates of a vertex 3 times 4 bytes (floating point) to hold each of the {x,y,z} coordinates, for n vertices there is needed:

$$n*(12+8/3*12)=44*n \quad \text{(eq. 3)}$$

bytes. An immediate optimization for the required storage, when saving the description in a stream, would be to allocate fewer bits for the indexes. Depending on the number of available vertices, the index into the vertex list can be stored as a m bit value such that the number of vertices is larger than $2^{m-1}$ and less than or equal to $2^m$. The previous equation can be written as:

$$n*(12+8/3*3*m/8)=n*(12+m) \quad \text{(eq. 4)}$$

In order to compress the information even more, it is needed to find some geometrical relationship between the vertices and/or their coordinates.

The TriScan method of the present invention generates a surface-description, represented by a 3D connectivity-wireframe. The minimal information stored in the 3D connectivity-wireframe is the connectivity between the vertices and the coordinates of the vertices. A polygonal representation can be obtained from the connectivity-wireframe, which can be stored non-optimally in the same way as described previous. The major advantage of the 3D connectivity-wireframe is the ability to derive the polygonal representation of the surface when needed. It will be shown later on that storing the connectivity-wireframe instead of the polygonal representation is more efficient in terms of compactness, and allows some extra scalability features as described later on. An efficient representation of the 3D connectivity-wireframe is the MeshGrid format, a novel representation that is part of the present invention, and which will be described next.

The MeshGrid Surface Representation

The basic idea of the MeshGrid representation is (1) to define a regular 3D grid of points, and (2) attach a wireframe to the grid. Each grid point g is identified by a discrete position (u,v,w), and by a coordinate (x, y, z). The wireframe is supposed to keep the connectivity information between the vertices in the wireframe. A vertex of the wireframe has a 3D coordinate. When attaching the wireframe to the 3D grid of points, we actually attach each vertex to a grid point, and it is allowed to attach several vertices to the same grid point. A vertex is locates the grid point it is attached to via the discrete position (u,v,w) of the grid point. Since the grid points already have 3D coordinates, we do not need to keep anymore the coordinates of the vertices. The coordinate of a vertex can be computed as the sum between the coordinate of the grid point it is attached and an offset vector. In the MeshGrid representation, the vertices of the wireframe need to store the discrete position (u,v,w) of the corresponding grid point, and an offset vector relative to that grid point.

Any type of wireframe, be it triangular, quadrilateral, or polygonal can be attached to the 3D grid of points. The interest for the present invention is to attach the 3D connectivity-wireframe obtained with the TriScan method to the 3D grid of points.

There are three steps involved in the procedure of representing the surface description of the TriScan method with the MeshGrid format: (1) obtain the appropriate 3D grid of points, (2) attach the connectivity-wireframe to the grid, (3) compute the offsets for each vertex. Before applying the TriScan method, one needs to design an appropriate slicing set-up, i.e. the reference-surfaces intersecting the object. The 3D grid of points, called reference-grid, used in the Mesh-Grid representation, is defined by the intersection points between the 3 sets of reference-surfaces. Such a reference-grid point has a discrete position (u,v,w) given by the indices of the reference-surfaces intersecting in that point, and the coordinate of the computed intersection point. The connectivity-wireframe obtained via the TriScan method for the specified reference-surfaces (reference-grid), contains the connectivity information between the vertices, and for each vertex its coordinate and an appropriate discrete position given by the indices of the reference-surfaces passing through that vertex. Since each vertex from the connectivity-wireframe knows its corresponding discrete position in the reference-grid, it is straightforward to attach the connectivity-wireframe and its vertices to the reference-grid and to obtain the MeshGrid representation. In the MeshGrid representation a vertex v is located on the grid-line segment between two grid positions $g_1$ and $g_2$, vertex v being attached either to $g_1$ or $g_2$. Grid positions $g_1$ and $g_2$ are the closest to vertex v. One of the grid positions $g_1$ and $g_2$ lie inside the object, be it grid $g_1$, while the other grid positions, be it $g_2$, lies outside the object. Grid positions with similar properties as $g_1$ and $g_2$ are called border-grid positions since the surface of the body passes between those positions. The explanation for the previous statements has been given in section "Locating and tracking boundaries of objects in volumetric data". We have chosen to attach the vertices to border grid positions located inside the object (e.g. $g_1$), but there is no error to attach the vertices to border grid positions outside the object (e.g. $g_2$). Once it has been determined for each vertex on which grid line segment, and between which border grid positions it is located, one can go to the third step and compute for each vertex the scalar offset. The offset is defined as the ratio between the distance from the vertex to grid point $g_1$, and the distance between grid point $g_2$ to grid point $g_1$. The offset may have a value between [0, 1).

Representing the MeshGrid in Memory

Figure 56:
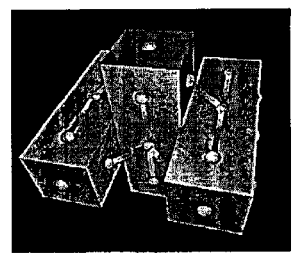
FIG. 56 illustrates the MeshGrid storage model for the vertices and their connectivity information.
Figure 56:
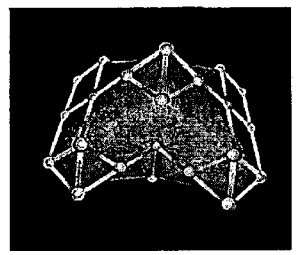
Figure 56:
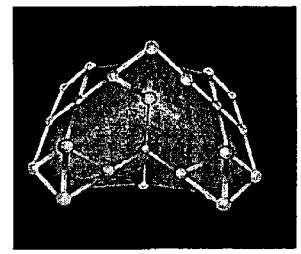
Figure 56:
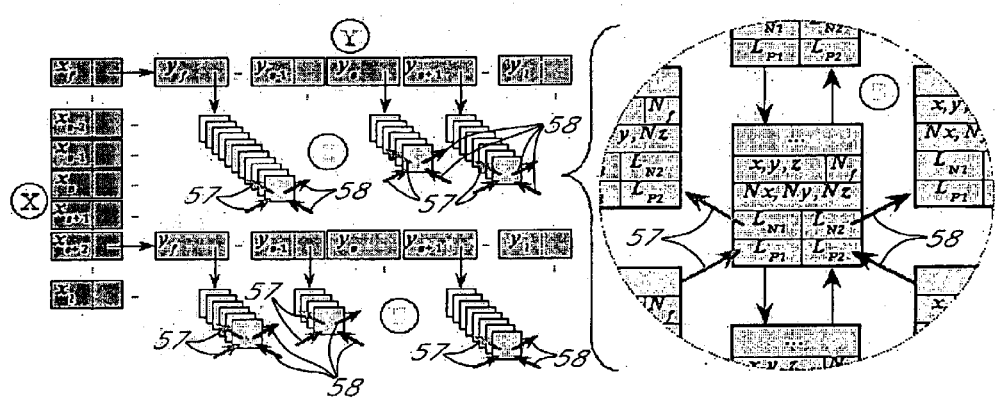

A storage example for the MeshGrid representation that preserves the connectivity-wireframe, i.e. connectivity between the vertices and their features (coordinates, normal direction, etc.), is shown in FIG. 56. In order to have a fast access to the vertices description without an excessive memory usage, the storage uses both an indexing and a hashing scheme, and consists of the following:

- A XBuffer of size equal to the number of slices in the x direction, as specified in the slicing set-up. Each entry knows the slicing position $x_s$, and keeps a pointer to a YBuffer.
- The YBuffer, of size equal to the number of slices in the y direction, as specified in the slicing set-up, is allocated dynamically for each XBuffer when the first vertex having the x coordinate corresponding to the entry is found during the border-tracking procedure. Each YBuffer entry knows the slicing position $y_s$, and keeps a pointer to a list of ZCells.
- A ZCell contains the description and the connectivity information of a vertex. The connectivity information is available by means of pointers to other ZCells and is represented by two -$L_1$- pointers 57 (next/previous), shown in light gray color, and two -$L_2$- pointers 58 (next/previous), shown in dark gray color. Both the -$L_1$- and -$L_2$- pointers indicate which are the previous and the next neighboring vertices that were found during the border tracking. The positions of the reference-surfaces are stored in (x,y,z), the direction of the border in $N_f$ as a 3-bit value, the normal direction to the surface in ($N_x, N_y, N_z$) Some extra bits are allocated for internal use by the TriScan algorithm of the present invention.

In FIG. 56, not all the YBuffers and lists of ZCells have been displayed for the sake of briefness.

By default the offset is 0.5, and should lie in the range [0,1). As shown in FIG. 38, every voxel is cut by three reference-surfaces $P_i$, $P_j$, $P_k$, each reference-surface belonging to a different set, as defined in the slicing set-up. It can be concluded that the coordinate of a vertex is given by the positions {x,y,z} of three reference-surfaces and an offset in the direction of the border, and can be expressed as (x,y,z,c). This conclusion is valid as well when deriving the MeshGrid from analytical objects (i.e. objects defined mathematically), which is explained later. For these kinds of objects the positions {x,y,z} are expressed as floating point numbers, while for volumetric objects in general the discrete nature allows the position to be represented as integers.

The MeshGrid storage is filled in the following way:

For each vertex v found during the border-tracking procedure, locate into the XBuffer the entry corresponding to the x coordinate of v. If no YBuffer has been allocated for this entry then allocate one.

Similar to the previous point, locate the entry into the YBuffer that corresponds to the y coordinate of vertex v.

If the corresponding ZCell list is empty, or there is no cell in the list that has the same (x,y,z) coordinates and border direction as voxel v, then add a new cell to the list. Fill the new cell with the coordinates (x,y,z) of the vertex, the border direction, and update the connectivity vector -$L_1$- or -$L_2$- next/previous pointers to point towards other ZCells.

In case a node with coordinates (x,y,z) already exists in the list, update the connectivity vector -$L_1$- or -$L_2$- pointers next/previous as in the previous case.

It is to be noted that the choice between -$L_1$- and -$L_2$- for storing the connectivity information depends on the border face convention as explained previously.

The Hierarchical Multi-Resolution MeshGrid

Figure 79:
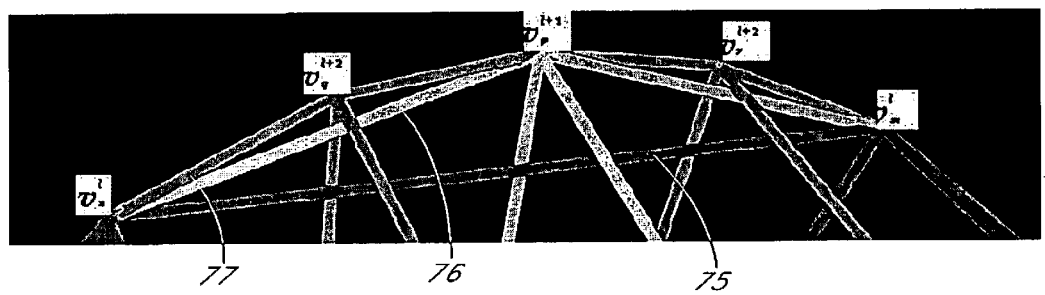
FIG. 79 illustrates the hierarchical connectivity-wireframe.

Building several MeshGrid representations with different resolutions of the same body is done by diversifying the slicing set-up, e.g. changing the number and/or position of the reference-surfaces. In order to generate a hierarchical MeshGrid representation of an object we need to enforce that vertices found in a lower level are available in all higher levels that follow. However, each level will alter the connectivity between the existing vertices. An example of a hierarchical MeshGrid is shown in FIG. 79, while FIG. 80 illustrating the reference-surfaces associated for each resolution of the hierarchical MeshGrid.

In the hierarchical connectivity-wireframe, each vertex from a lower level is available in all higher levels that follow. However, each level will alter the connectivity between the existing vertices: vertex $v_n^l$ is connected on level l with vertex $v_m^l$ via a line 75. This connection is replaced in level l+1 by another line 76 to vertex $v_p^{l+1}$, and replaced again in level l+2 by the line 77 that connects it to vertex $v_q^{l+2}$. It is to be noted that the level of a vertex indicates the position in the hierarchy when it first appears.

Figures 80A, 80B, 80C:
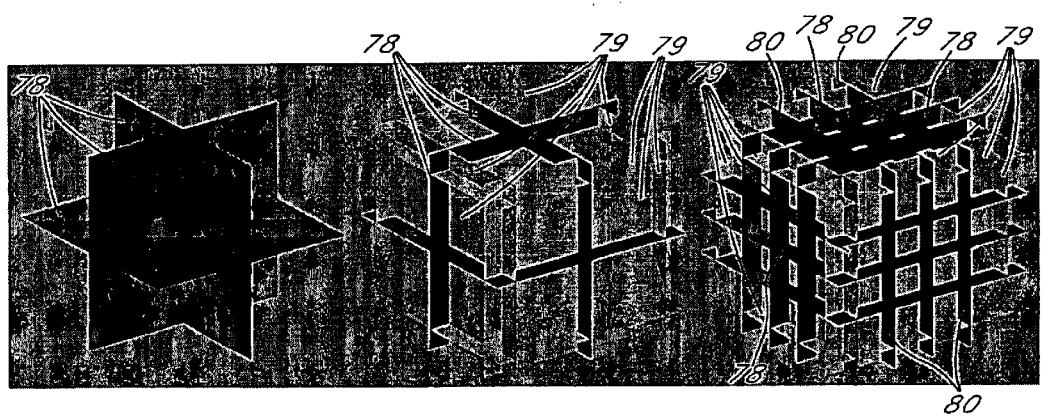
FIG. 80 illustrates the hierarchical reference-grid.
Figure 81:
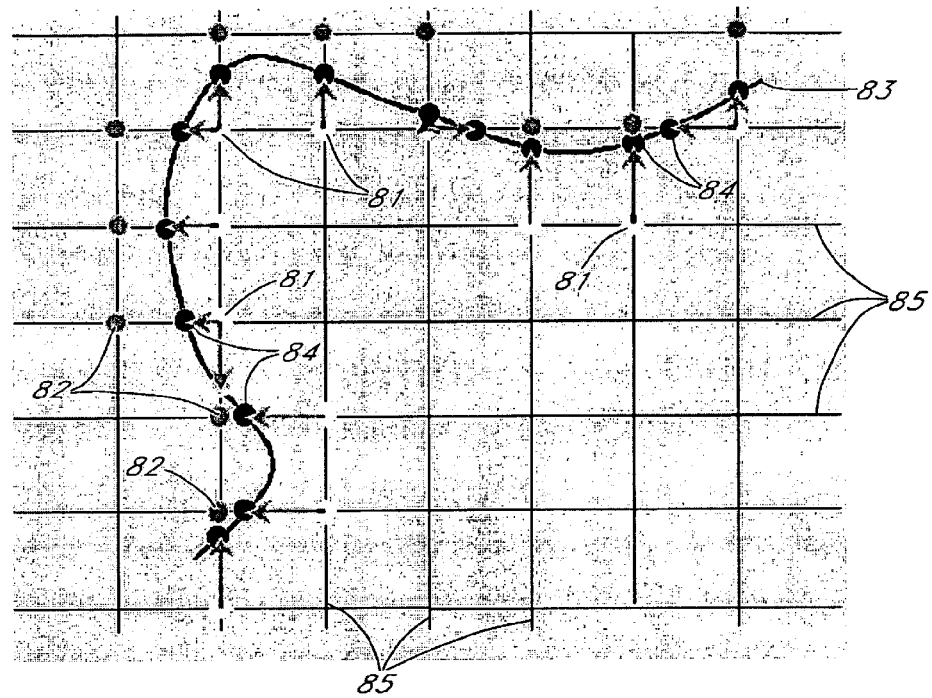
FIG. 81 displays a 2D section through the reference-grid, illustrating the fact that the vertices are located on grid-line segments and are attached to the reference-grid positions.

FIG. 80 shows the changes in the slicing set-up when generating a hierarchical MeshGrid with 3 levels: the first level in FIG. 80(*a*) consists of 3 reference-surfaces 78, the second level in FIG. 80(*b*) has in addition other reference-surfaces 79, and the third level in FIG. 80(*c*) contains besides the reference-surfaces 78, 79 of the previous levels also other reference-surfaces 80.

Hierarchical Multi-Resolution MeshGrid Features

MeshGrid can be efficiently exploited for "Quality of Service" (QoS) since it allows for three types of scalability in both view-dependent and view-independent scenarios, including: (1) mesh resolution scalability, i.e. the adaptation of the number of transmitted vertices, (2) shape precision, i.e. the adaptive reconstruction of the reference-grid positions, and (3) vertex position scalability, i.e. the change of the precision of known vertex positions (the offset) with respect to the reference-grid.

Figures 88A, 88B, 88C:
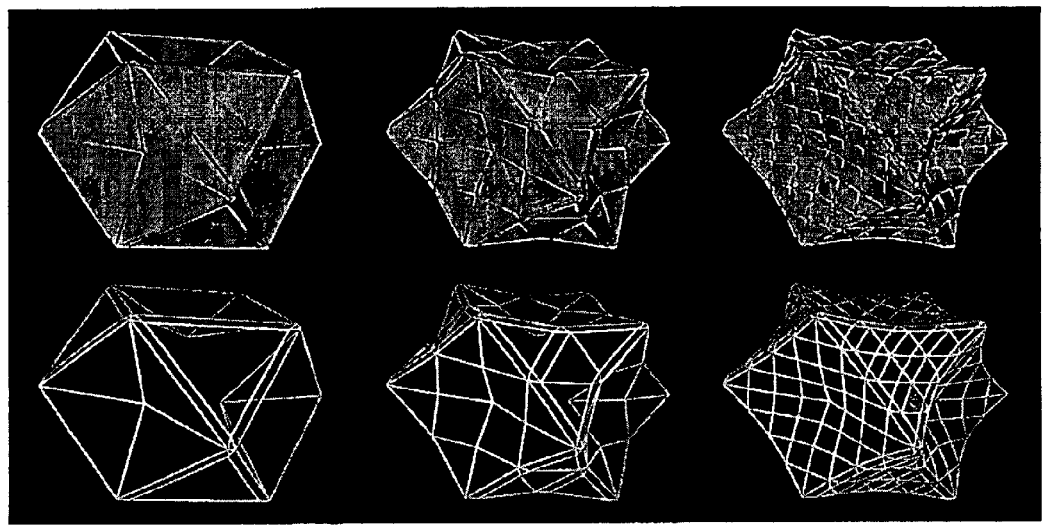
FIG. 88 illustrates scalability in mesh resolution: the number of vertices/triangles increases from the left image to the right image.

The mesh resolution scalability is illustrated in FIG. 100 for three different resolutions of an object. Different mesh resolutions represent different connectivity-wireframe descriptions of the same object. The first row of images show a shaded surface of its polygonal representation with the outline of the connectivity-wireframe drawn on top of the shaded surface, while the second row of images display the object as a wireframe of the polygonized representation. The mesh resolution is increasing from FIGS. 100(*a*) to (*c*). The following table shows the correspondence between the number of vertices, the number of triangles and the stream size of the single-resolutions respectively multi-resolution MeshGrid representation for the object from FIG. 88; the multi-resolution version containing all three single-resolution descriptions.

|  | Vertices | Triangles | Stream Size (bytes) |
|---|---|---|---|
| Resolution 1 | 13 | 21 | 222 |
| Resolution 2 | 54 | 112 | 351 |
| Resolution 3 | 150 | 314 | 750 |
| Multi-resolution |  |  | 886 |

Another example of a multi-resolution blob object is illustrated in FIG. 60. It consists of 6 resolution levels, and the details of the number of reference-surfaces, the number of vertices and the type and number of polygons are shown in the following table.

|  | Res. 1 | Res. 2 | Res. 3 | Res. 4 | Res. 5 | Res. 6 |
| --- | --- | --- | --- | --- | --- | --- |
| Slices in X | 2 | 7 | 13 | 15 | 25 | 73 |
| Slices in Y | 1 | 8 | 9 | 15 | 23 | 70 |
| Slices in Z | 1 | 1 | 3 | 7 | 7 | 19 |
| Vertices | 12 | 84 | 258 | 702 | 1114 | 9414 |
| Triangles | 16 | 40 | 130 | 280 | 344 | 2920 |
| Rectangles | 0 | 24 | 40 | 242 | 522 | 4048 |
| Pentagons | 0 | 24 | 70 | 104 | 176 | 1996 |
| Hexagons | 0 | 0 | 22 | 80 | 76 | 454 |
| Heptagons | 0 | 0 | 0 | 0 | 0 | 0 |
| Total primitives | 16 | 88 | 262 | 706 | 1118 | 9418 |
| Total (triangles) | 16 | 160 | 508 | 1396 | 2220 | 18820 |
| Triangles/Vertices | 1.333 | 1.905 | 1.969 | 1.988 | 1.993 | 1.999 |

Figure 76:
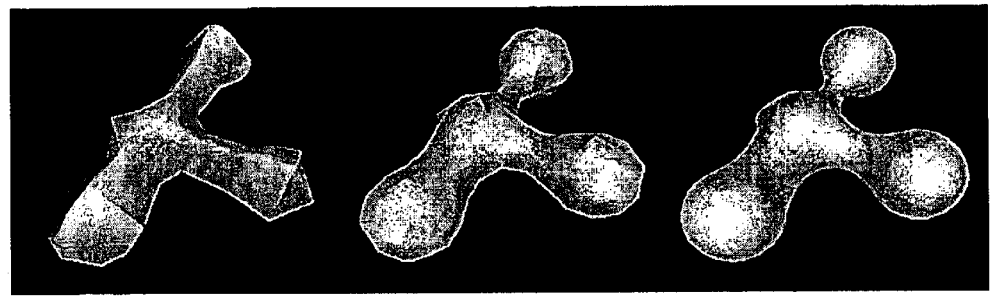
FIG. 76 illustrates scalability in resolution: the number of vertices/triangles increases from the left image to the right image.

An example of a multi-resolution blob object is shown in FIG. 76, the number of vertices/triangles increases from the left image to the right image.

Figures 87A, 87B, 87C, 87D, 87E:
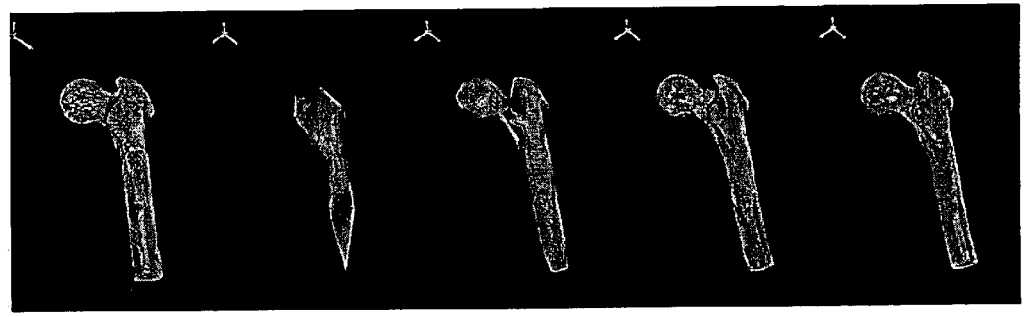
FIG. 87 shows the remeshing of an femur bone. Initial representation is an IndexedFaceSet (a), converted to a multi-resolution MeshGrid (b till e).

Another example of a multi-resolution MeshGrid is illustrated for two objects (FIG. 86 and FIG. 87) originally represented as single-resolution IndexedFaceSet models that have been remeshed and represented in the MeshGrid format. The object from FIG. 86, a 3D eight model, has been converted to a multi-resolution MeshGrid with 4 mesh resolutions, i.e. a hierarchical connectivity-wireframe consisting of 4 resolution levels and the corresponding reference-grid. The original object represented as an IndexedFaceSet is shown FIG. 86(a), while FIGS. 86(b)–(e) illustrate increasing resolutions of the MeshGrid representations of the object. The first row of images display the object as a wireframe, while the second row of images display the same object as a shaded surface of its polygonal representation obtained from the MeshGrid representation. In a similar way, the bone model from FIG. 87(a) represented as an IndexedFaceSet, has been converted to a multi-resolution MeshGrid, as shown for increasing mesh resolution levels in FIGS. 87(b)–(e). The images display the shaded surface of the polygonal representation of the MeshGrid object.

A multi-resolution MeshGrid surface description obtained from a single-resolution quadrilateral mesh is illustrated in FIG. 84. The different mesh resolutions are displayed as a shaded surface of the polygonal representation with the outline of the connectivity-wireframe, corresponding to that resolution level, drawn on top of the shaded surface (see FIGS. 84(a)–(c)).

Figures 89A, 89B, 89C, 89D:
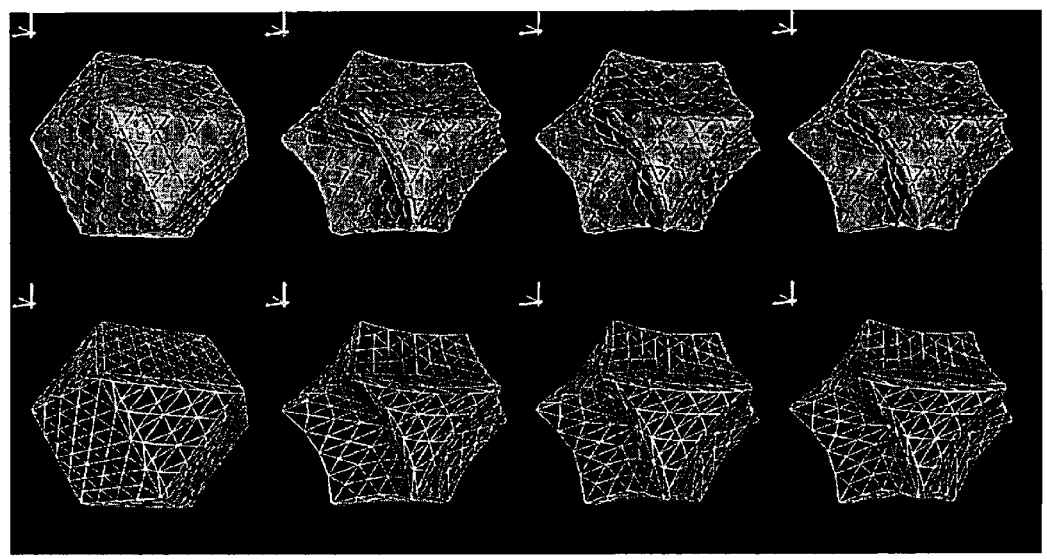
FIG. 89 illustrates scalability in shape: the reference-grid positions are updates from left to right.
Figures 91A, 91B, 91C, 91D:
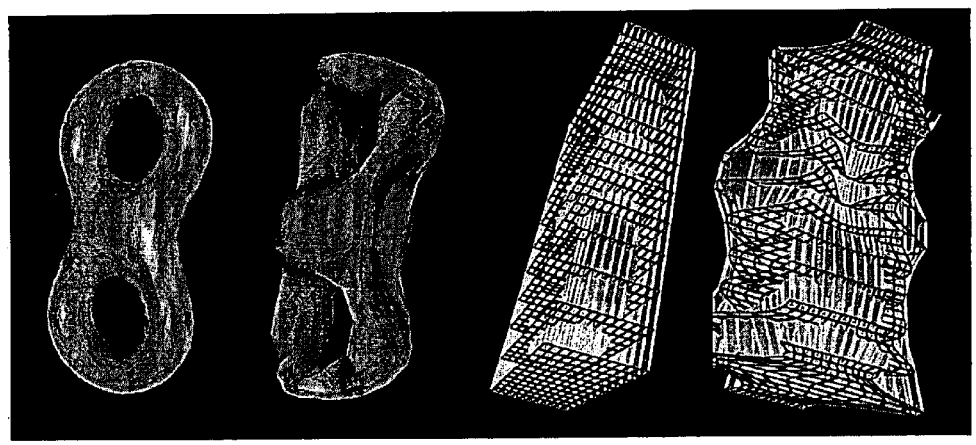
FIG. 91 shows the progressive refinement of the refrence-grid.
Figures 93A, 93B, 93C, 93D:
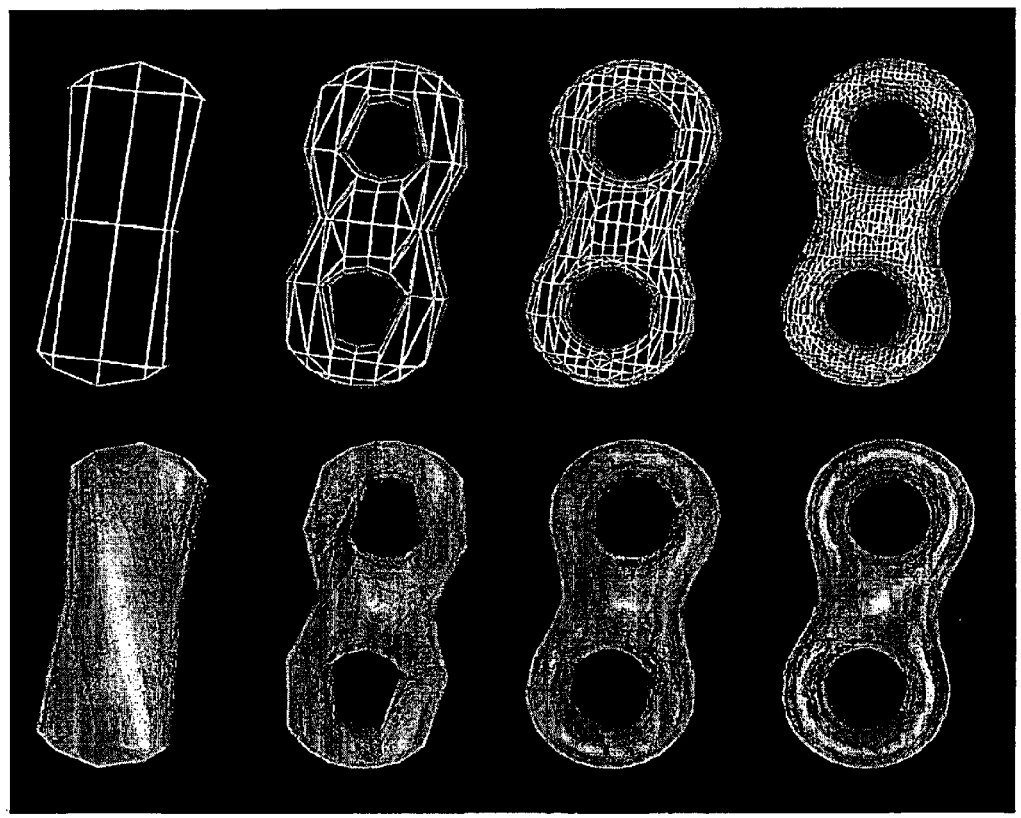
FIG. 93 illustrates a specific feature of the multi-resolution connectivity-wireframe: it allows topological changes between successive resolution levels.

Notice that both the multi-resolution connectivity-wireframe obtained with the TriScan method of the present invention, and the multi-resolution MeshGrid representation of a connectivity-wireframe allow, in different resolutions of the same object, topological changes, visible especially when displaying the polygonal representation of the connectivity-wireframe. As illustrated in FIG. 93 for increasing resolutions of the eight model, the lowest mesh resolution level (FIG. 93(a)) does not have any holes. They only appear at the second resolution level (FIG. 93(b)), and continue to exist for the higher resolution levels. The first row of images display the different resolutions as a wireframe, while the second row of images show the shaded polygonal surface. The scalability in shape precision is a particular feature of the MeshGrid representation and is supported by the reference-grid. The reference-grid contains the description about the volume of the object. The connectivity-wireframe standalone (not as part of the MeshGrid representation), as generated by the TriScan method, contains the boundary nodes, the connectivity between those nodes and at least the 3D coordinates of those nodes. When generating the MeshGrid representation, i.e. attaching the connectivity-wireframe to the reference-grid, the coordinates of the vertices (boundary nodes) from the connectivity-wireframe are obtained from the coordinates of the reference-grid points and the offsets associated to the vertices, as explained in section "The MeshGrid surface representation". This implies that the 3D distribution of the connectivity-wireframe for a certain mesh resolution level (the connectivity between the vertices is unchanged, only the 3D coordinates of the vertices may change) is given by the distribution of the reference-grid points to which vertices are attached to. The minimal description for a reference-grid consists of the coordinates of the eight corners of the reference-grid that in general define a non-regular deformed box. For this minimal description one obtains a uniform distributed reference-grid, by using trilinear interpolation based on the coordinate values of the corners. In case the 8 corners define a regular box (i.e. faces are two by two parallel and perpendicular) it suffices to apply three times (once for each coordinate) a linear interpolation to distribute the reference-grid points in a uniform way. An example illustrating this aspect is shown in FIG. 91. The uniform distributed reference-grid is displayed in FIG. 103(c) and the shaded polygonal representation of the connectivity-wireframe for the uniform distributed reference-grid is shown in FIG. 91(a). The reference-grid with the position of the grid points updated such that their distribution is non-uniform is displayed in FIG. 91(d) and the corresponding shaded polygonal representation in FIG. 91(b). Notice that the connectivity between the vertices did not change. The scalability aspect can be exploited for non-uniform distributed reference-grid points. Such an example is shown in FIG. 89 for a MeshGrid object. The coordinates of the reference-grid points are progressively refined from left, FIG. 89(a), to right, FIG. 89(d). The first row of images show a shaded surface of its polygonal representation with the outline of the connectivity-wireframe drawn on top of the shaded surface, while the second row of images display the object as a wireframe of the polygonized representation.

Figure 57:
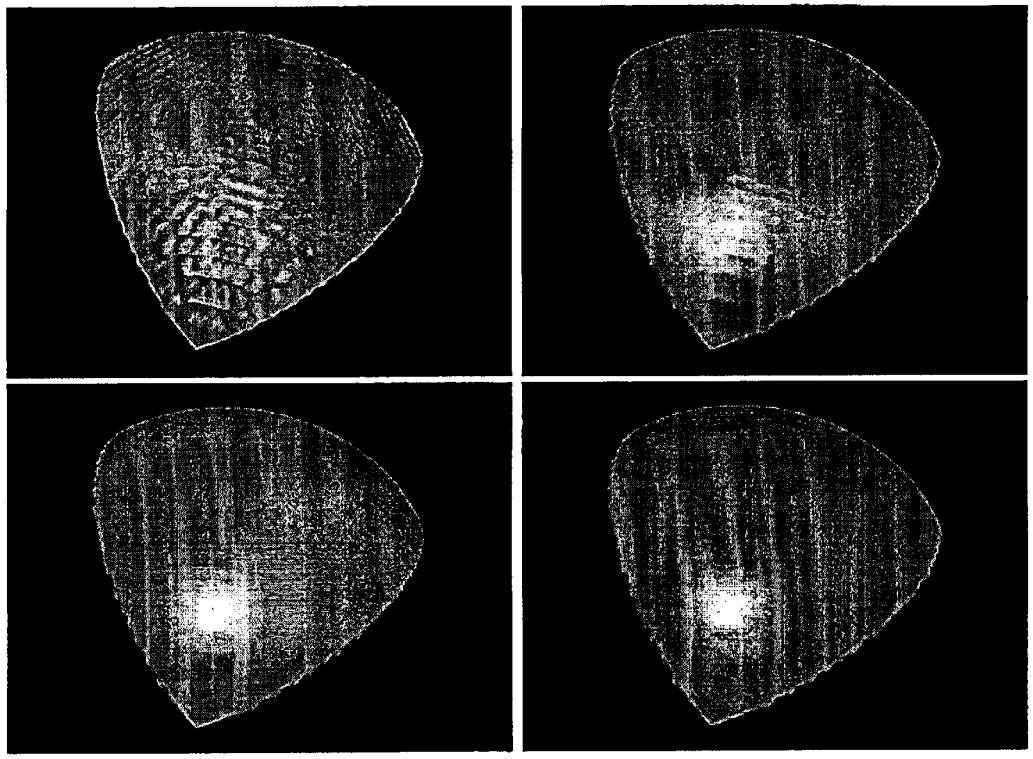
FIG. 57 illustrates the scalability in vertex-refinement (offset).
Figure 77:
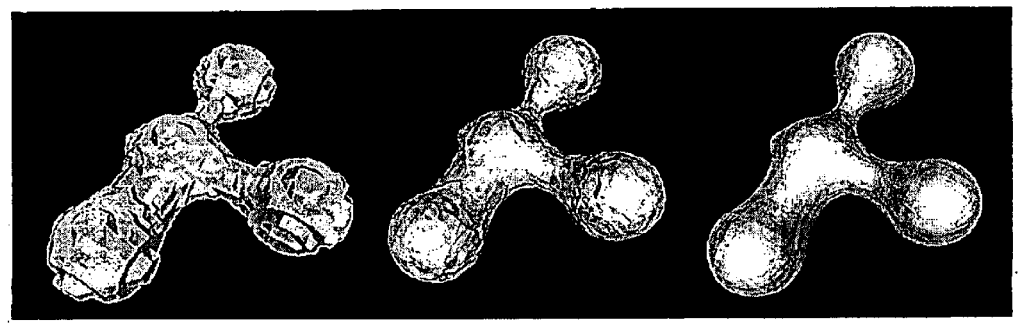
FIG. 77 illustrates scalability in vertices' refinement, the vertices converge to the "real" surface of the 3D model.
Figures 90A, 90B, 90C, 90D:
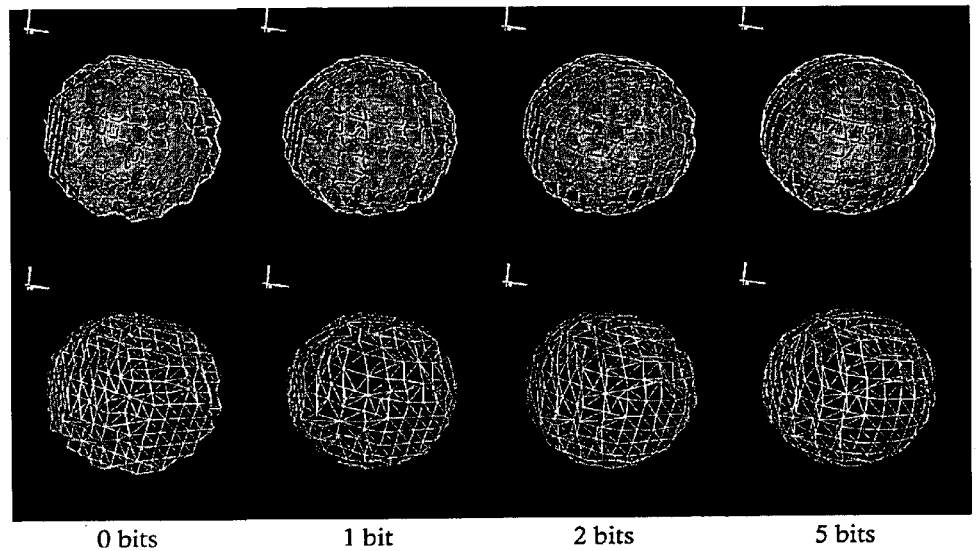
FIG. 90 illustrates scalability in vertices' refinement, the vertices converge to the "real" surface of the 3D model.

The vertex position scalability is a particular feature of the MeshGrid representation and is possible because the connectivity-wireframe vertices have one degree of freedom relative to the reference-grid points, i.e. the offset value that can vary between [0,1). This feature can either be exploited for animation, as discussed below, or as a scalability option. As explained in section "The MeshGrid surface representation", the offset is a relative value. When generating the stream of a surface description represented in MeshGrid format, the vertices' offset values are quantized on a specified number of bits, and are encoded bit-plane by bit-plane. The number of bit-planes is equal to the number of quantization bits, and a bit-plane contains for each vertex offset the value of the quantisation bit corresponding to that bit-plane. The topic is discussed in detail in section "Coding the refinement description". When receiving the stream, the vertices offset values are refined, using the progressive quantization approximation scheme, bit-plane by bit-plane. The default offset value is 0.5, which is set when the offset has no value specified yet. The progressive refinement of the vertices offset values is illustrated in FIG. 90 for a sphere. The first row of images show a shaded surface of its polygonal representation of the sphere with the outline of the connectivity-wireframe drawn on top of the shaded surface, while the second row of images display the sphere as a wireframe of the polygonized representation. The result for a default offset (0.5) is shown in FIG. 90(a), notice the local discrete effect. The refinement of the vertices offset initially quantized on 5 bits, is illustrated for increasing number of refinement bits from left, FIG. 90(b), to right, FIG. 90(d). Another example is shown in FIG. 57 and FIG. 77, the vertices converge to the "real" surface of the 3D model.

A view-dependent multi-resolution stream is versatile since it allows in both view-dependent and view-independent scenarios single resolution decoding or multi-resolution decoding. The stream description of the Mesh-Grid representation is discussed in section "View-dependent coding of the MeshGrid representation". As a summary, for the same multi-resolution stream, the view-independent scenario consists of decoding all the view-dependent information for a certain resolution level, while in the view-dependent scenario, one can retrieve the description of parts from a certain resolution level and decode them. In this case, different parts of the recovered MeshGrid may have different resolution levels. From the same multi-resolution stream, single resolution decoding relies on locating the appropriate resolution level of the MeshGrid description in the stream and decoding it. In the multi-resolution scenario the decoding will start at a certain resolution level (it does not have to be the first resolution level) and continue from that level on till a certain higher resolution level. This approach is very different from classical multi-resolution representations that typically need the decoding of the lower resolution versions of a mesh, before being able of enhancing some portions of it by incrementally decoding additional parts of the bitstream.

The MeshGrid representation is very flexible for animation purposes, since it allows in addition to the vertex-based animation typical for IndexedFaceSet represented objects, specific animation possibilities, such as (1) rippling effects by changing the position of the vertices relative to corresponding reference-grid points and (2) reshaping the regular reference-grid. The latter form of animation can be done on a hierarchical multi-resolution basis: i.e. deforming the reference-grid for a lower resolution mesh, will propagate the action to the higher levels, while applying a similar deformation at the higher resolution levels will only have a local impact. The vertices of the wireframe will be updated, each time the grid point, it is attached to, moves.

Vertex animation applies to the vertices of the connectivity-wireframe. This type of animation requires that each vertex retrieves its initial coordinates from the grid and its associated offset, and stores, updates these coordinates during the animation, without further referencing the grid.

Changing the vertices' offsets allows limited movements, oscillations (rippling effects) around the reference-grid points they are attached to. Such an example is given in FIG. 94. Both images show different frames during the animation. This type of animation is easier to perform if all the vertices' offsets have the same value, preferably equal to 0.5. Obtaining a constant offset of 0.5 for all the vertices is feasible by positioning the boundary grid positions in such a way that the vertices lie at half the distance in between two boundary grid positions.

If those offsets are not equal to 0.5 everywhere than one may run into problems e.g.: for an overall vertex movement of 0.3, vertices already having an offset of 0.8 will get an offset equal to 1.1, exceeding the theoretical accepted range of [0, 1).

Animating or deforming the reference-grid points will affect the global shape of the object. This type of animation will not affect the connectivity between the vertices, only their coordinates when they are updated from the corresponding reference-grid positions. The multi-resolution Mesh-Grid consists of a hierarchical reference-grid and a hierarchical connectivity-wireframe. Animating the hierarchical reference-grid can be done on a hierarchical basis, more precisely any change in the coordinates of reference-grid points at a certain resolution will trigger a local update of the coordinates of the reference-grid points belonging to a higher resolution level. The new positions of the reference-grid points belonging to a higher resolution level can be computed via interpolation methods from the new positions of the neighboring reference-grid points at a lower resolution level. Applications of this type of animation is morphing, face and body animations, resealing, shape matching, . . .

Figure 78:
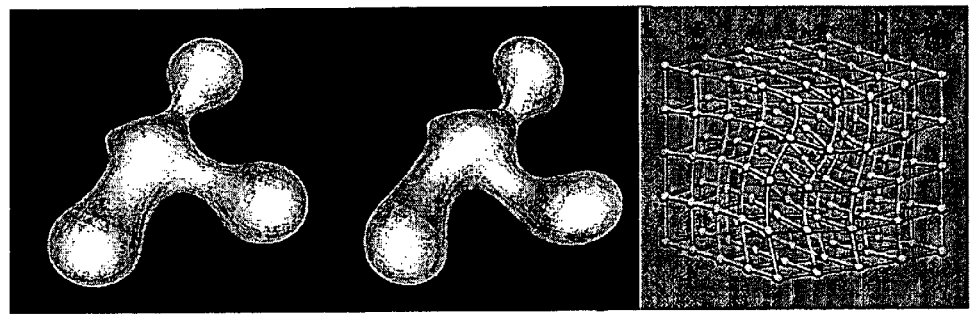
FIG. 78 illustrates modeling the object by deforming the underlying reference-grid.
Figure 92:
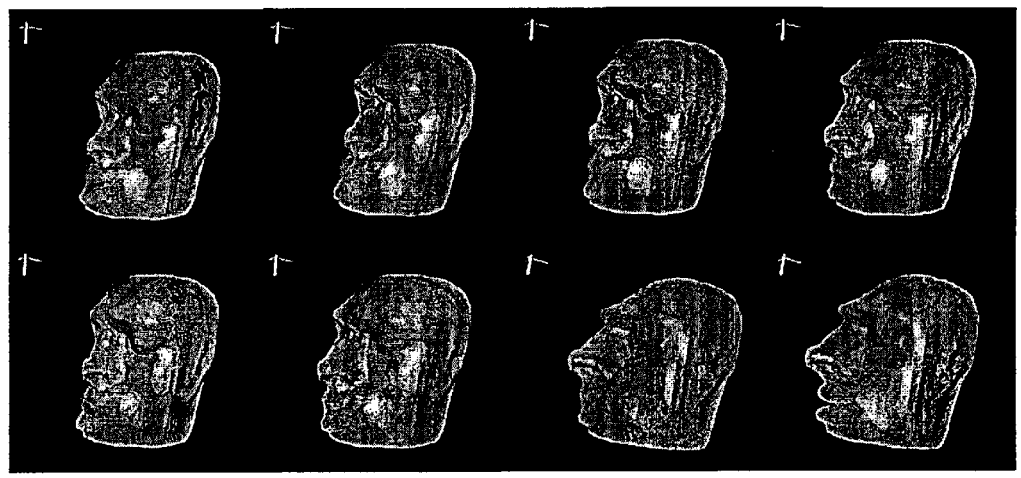
FIG. 92 shows an example of morphing a human head

An example of a sequence of reference-grid animation is illustrated in FIGS. 95(a)–(c). The first row of images shows the shading of the polygonal representation of the surface, while the second row of images displays the polygonal representation of the surface inside the reference-grid. Another example of reference-grid animation is the morphing of a face as illustrated in the sequence of images from FIG. 92. In FIG. 78, the blob object is modeled by deforming the underlying reference-grid, as shown in the right image; a similar animation result can be obtained while progressively refining the positions of the reference-grid from a stream that contains the encoded mesh description of the object.

View-Dependent Coding of the MeshGrid Representation

A stream containing the information about the MeshGrid representation of an object is called a MeshGrid stream and is part of the present invention. There are several possible types of MeshGrid streams, e.g. single-resolution MeshGrid streams, multi-resolution MeshGrid streams, both types of streams with or without view-dependent decoding features. In the current document, we explain the most general and flexible MeshGrid stream, i.e. the view-dependent multi-resolution MeshGrid stream.

View-dependent decoding of the MeshGrid stream can be enabled by coding the MeshGrid representation in separate local surface descriptions (LSDs), instead of coding the entire MeshGrid at once. To define the LSD we exploit the fact that the MeshGrid representation contains the reference-grid, which is regular in the space (u,v,w). Due to its regular nature, it is straightforward to divide this reference-grid into a number of 3D blocks (called ROIs), and it is possible to encode the surface locally in each of these ROIs (see FIG. 55). In principle, it is possible to define the ROI size as small as one: i.e. we encode the surface locally at the level of the grid positions in that case. Yet, such an encoding is far from optimal, because of the overhead as explained next.

The MeshGrid stream will in general consist of three parts: (1) a connectivity-wireframe description, (2) a reference-grid description, and (3) a vertices-refinement description (i.e. refining the position of the vertices relative to the reference-grid—the offsets). Each of these parts can be specified according to the type of stream in single-resolution, multi-resolution, view-dependent or view-independent mode, as explained in the following sections. A minimal stream may however only consist of the description of the connectivity-wireframe, which is mandatory for every stream. In that case a default equally distributed reference-grid, upon which the MeshGrid is based, will be derived from its 8 corners that where specified in the header of the stream.

The multi-resolution connectivity-wireframe is constructed in such a way that each single-resolution connectivity-wireframe from the multi-resolution description is the direct super-set of the preceding lower resolution connectivity-wireframe, and a super-set of all lower resolution connectivity-wireframes. In this way the multi-resolution connectivity-wireframe is truly hierarchic. By super-set we mean that a connectivity-wireframe from a higher resolution contains all the vertices of any lower resolution connectivity-wireframe. This redundancy in the multi-resolution connectivity-wireframe makes that a higher resolution mesh does not need any lower resolution connectivity-wireframe in order to display itself. Yet, there is no redundancy in the reference-grid description and in the vertices-refinement description, which means that a higher resolution mesh needs the information of the reference-grid and vertices-refinement of the preceding resolutions, or otherwise default values will be used to fill in the missing reference-grid positions and the final positions of the vertices. For ROIs, it is possible to use the same subdivision for all the resolution levels or to define a different subdivision at each resolution level. The subdivisions don't have to be present at each resolution level, and should be defined in a hierarchical way for the different resolution levels. It might be preferred, to code the surface for view dependent purposes at the highest resolution levels only.

Coding the Connectivity-Wireframe Description

The peculiarity of the MeshGrid representation is that the polygonal representation can be derived from the connectivity-wireframe. It has been proven that coding the connectivity is more efficient than coding the polygonal representation of the same surface description. In the following we show how the connectivity-wireframe can be encoded efficiently.

Although there are four connectivity-vectors for each boundary node in the connectivity-wireframe, we only need to encode either the outgoing connectivity vectors (-$L_{N1}$- and -$L_{N2}$-) or the incoming connectivity vectors (-$L_{P1}$- and -$L_{P2}$-). In our approach we store the outgoing connectivity vectors since they are defined in the scanning direction of the TriScan method, and used in the border-tracking procedure.

There are two aspects that we have to keep in mind: (1) we have to encode the connectivity between the vertices, and (2) the position of the reference-grid point the vertices are attached to. We will show that our encoding method of the connectivity allows to derive the reference-grid position when decoding the connectivity.

According to the border-tracking rules, two connected vertices may have three relative discrete border positions (see FIG. 38). They can either have the same discrete border direction, either be rotated 90° clockwise, or be rotated 90° counter clockwise, with respect to the border-scanning direction. For the starting vertex v (the ancestor) with its two outgoing links -$L_{N1}$- and -$L_{N2}$- pointing to node $v_1$ (sibling) respectively $v_2$ (sibling), we need to store in the stream its position (u,v,w) of the reference-grid point it is attached to, and the discrete direction of the border as shown in FIG. 38. Each of the connections to vertices $v_1$ and $v_2$, can be encoded with 2 bits each, since the relative discrete direction between two consecutive vertices may have only three values, as previously mentioned. The fourth value has to be used to indicate a broken connectivity when dealing with open meshes. This procedure is illustrated later on in this section. Every sibling node will become an ancestor node when it is its turn to be streamed and it will have two sibling nodes referred by its outgoing links -$L_{N1}$- and -$L_{N2}$-.

The relation between reference-grid positions of connected vertices and the discrete border direction is derived from the border-tracking rules explained in section "Locating and tracking boundaries of objects in volumetric data". The following table explores the aforementioned relationship between the positions (u,v,w) of reference-grid points of two consecutive nodes and the orientation of the border at the node positions. It is to be recalled that there are 6 possible choices for the border directions, i.e. "Left" -L-, "Right" -R-, "Front" -F-, "Back" -B-, "Up" -U- and "Down" -D-. The results from the table are visually illustrated in FIG. 38. The column header of the table has the labels of the border directions related to a node playing the role of an ancestor, while the row header displays the same border directions, but related to a sibling node. The table gives all the possible combinations between the directions of the ancestor node and the sibling nodes. Combinations that are not possible have been shown with an exclamation mark. It is to be noticed that, whatever the direction of the ancestor node is, there are always three valid border directions (with different combinations) for the sibling nodes. Moreover, the same relationship can be found between the direction of the ancestor node and the directions of the sibling nodes, i.e. one sibling direction is the same as the ancestor's direction, another is rotated 90° clockwise, and the other is rotated 90° counter clockwise. All the six directions can be encoded in 3 bits, but since there are always three possibilities for every direction, they can be encoded with 2 bits. They could for example be encoded with 0 if the direction does not change, with 1 if the relative difference is 90° clockwise, and with 2 for the third case. The value 3 will be used to indicate a broken connectivity vector, which may appear in case of an open connectivity-wireframe (e.g. non-closed objects as shown in FIG. 84).

For each valid case, the table gives the position (u,v,w) in the reference-grid of the sibling node relative to the ancestor's node (the table shows only the position coordinate in the reference-grid of the sibling that differs from the ancestor's position), and the connectivity vector from the sibling back to the ancestor. It is to be noticed that a link may change its local meaning from -$L_1$- (respectively -$L_2$-) to -$L_2$- (respectively -$L_1$-) when it leaves the ancestor and arrives to a sibling. It is to be recalled that the normal vector to the surface is computed as the cross product between -$L_1$- and -$L_2$-, and each border face assigns the directions for -$L_1$- and -$L_2$- such that the normal direction points outward. FIG. 38 illustrates the physical model employed by the TriScan procedure of the present invention, the border-tracking being performed in counter clockwise direction. The -$L_1$- direction is shown by the light gray arrows 43 in the centers of the border faces, while the -$L_2$- directions are shown by the dark gray arrows 44. In the table the -$L_1$- connectivity vector is shown in light gray color, while the -$L_2$- connectivity vector is shown in dark gray.

|  | Back | | Front | | Left | | Right | | Down | | Up | |
|---|---|---|---|---|---|---|---|---|---|---|---|---|
|  | $-L_{N1}^-$ | $-L_{N2}^-$ | $-L_{N1}^-$ | $-L_{N2}^-$ | $-L_{N1}^-$ | $-L_{N2}^-$ | $-L_{N1}^-$ | $-L_{N2}^-$ | $-L_{N1}^-$ | $-L_{N2}^-$ | $-L_{N1}^-$ | $-L_{N2}^-$ |
| Back | v − 1 | w + 1 | ! | ! | ! | v − 1 u + 1 | same | ! | same | ! | ! | w + 1 u + 1 |
| Front | $-L_{P1}^-$ ! | $-L_{P2}^-$ ! | w − 1 | v + 1 | ! | $-L_{P1}^-$ same | $-L_{P1}^-$ v + 1 u − 1 | ! | $-L_{P2}^-$ w − 1 u − 1 | ! | ! | $-L_{P2}^-$ same |
| Left | Same | ! | $-L_{P1}^-$ ! | $-L_{P2}^-$ u + 1 v + 1 | w − 1 | $-L_{P2}^-$ u + 1 | $-L_{P2}^-$ ! | ! | $-L_{P1}^-$ ! | w − 1 v + 1 | same | $-L_{P1}^-$ ! |
| Right | $-L_{P2}^-$ u − 1 v − 1 | ! | ! | $-L_{P2}^-$ same | $-L_{P1}^-$ ! | $-L_{P2}^-$ ! | u − 1 | w + 1 | ! | $-L_{P1}^-$ same | $-L_{P1}^-$ w + 1 v − 1 | ! |
| Down | $-L_{P1}^-$ ! | u − 1 w + 1 | same | $-L_{P1}^-$ ! | same | ! | $-L_{P1}^-$ ! | $-L_{P2}^-$ v + 1 w + 1 | u − 1 | $-L_{P2}^-$ v + 1 | $-L_{P2}^-$ ! | ! |
| Up | ! | $-L_{P1}^-$ Same $-L_{P2}^-$ | $-L_{P1}^-$ u + 1 w − 1 $-L_{P2}^-$ | ! | $-L_{P2}^-$ v − 1 w − 1 $-L_{P1}^-$ | ! | ! | $-L_{P2}^-$ same $-L_{P1}^-$ | $-L_{P1}^-$ ! | $-L_{P2}^-$ ! | v − 1 $-L_{P1}^-$ | u + 1 $-L_{P2}^-$ |

The first cases where the direction does not change from the ancestor to the sibling is shown in the table on the first diagonal. Specific for this case is that only one coordinate differs from the ancestor to the sibling, and that the meaning of the connectivity vectors does not change. Flat areas that are parallel with the reference-surface generate this case. The second case, when the border direction for the sibling is rotated 90° counter clockwise relative to the ancestor, is specific for convex areas, and is characterized by the fact that the position in the reference-grid of the sibling do not differ from the position in the reference-grid of the ancestor. This is true since both nodes are intersected by the same reference-surfaces (both nodes are located in the center of the border voxel), and it is only the offset that makes that the final vertices migrate in reciprocal perpendicular directions towards the boundary of the surface. The default offset, equal to 0.5, will position the vertices in the center of two different border faces belonging to the same border voxel. The connectivity vectors may change their meaning. In the third case (the change in border direction is 90° clockwise), there are two indices of the position in the reference-grid of the sibling node that differ from the ancestor node. This case is specific for concavities in the surface, and the connectivity vectors may change their meaning as well.

As mentioned before, the explanations are based on the discrete volumetric model, because it is more intuitive, but the conclusions are valid for any three sets of arbitrary reference-surfaces such that the reference-surfaces from one set do not change the ordering at the surface of the object, and do not self-intersect.

The coding of a multi-resolution connectivity-wireframe consists of encoding of each single-resolution connectivity-wireframe apart. In case of view-dependent coding each single-resolution will be split into LSDs, and the connectivity-wireframe from each LSD will be coded separately. In view-dependent mode the only challenge is to define artificial boundaries in the connectivity-wireframe (artificially cut the links of the connectivity-wireframe). The boundaries of a LSD are defined by the ROIs that subdivide the entire reference-grid into disjoint 3D blocks. In order to avoid coding twice the connectivity of the vertices at the limit in between two adjacent ROIs, the domain of the ROI has a closed interval for the minimum value and an open interval for the maximum value.

Figure 59:
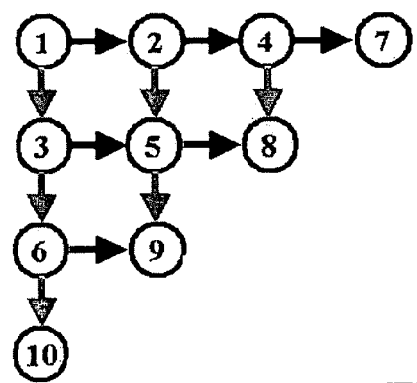
FIG. 59 coding the connectivity-wireframe inside a region of interest.
Figure 60A:
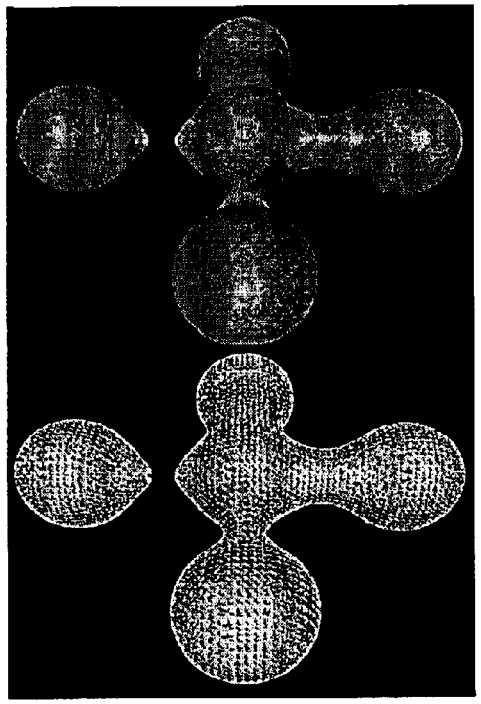
FIG. 60 shows different resolutions for a synthetic blob object. Each resolution step is illustrated with 4 images, i.e. a surface render, a wireframe, the surface with the connectivity-wireframe on top, and the surface with connectivity-wireframe and vertices.
Figure 60A:
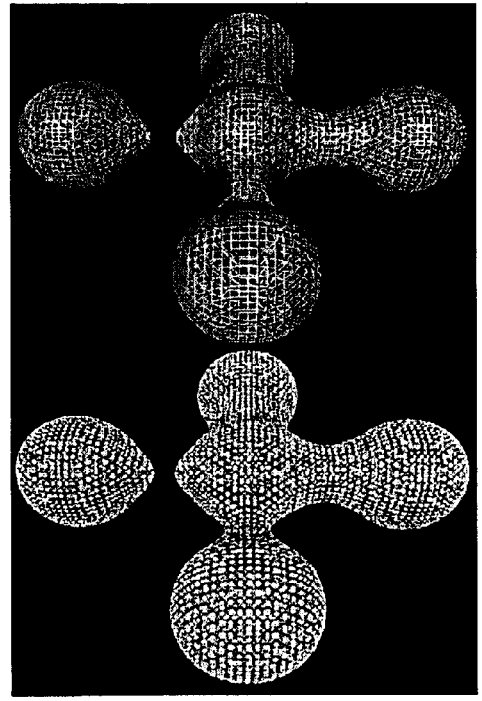
Figure 60A:
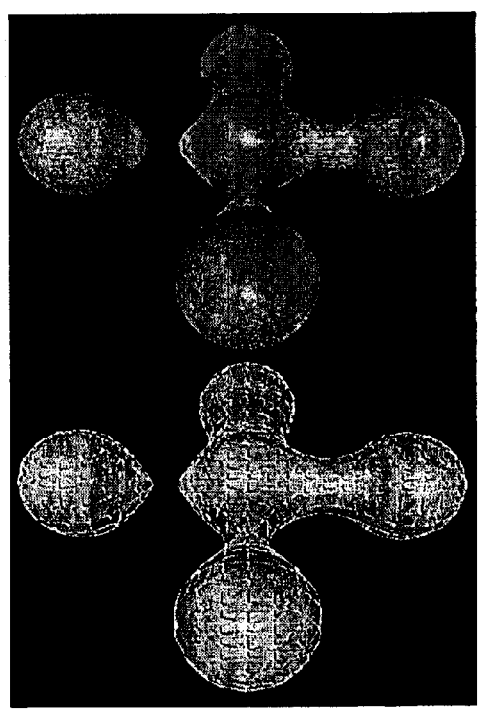
Figure 60A:
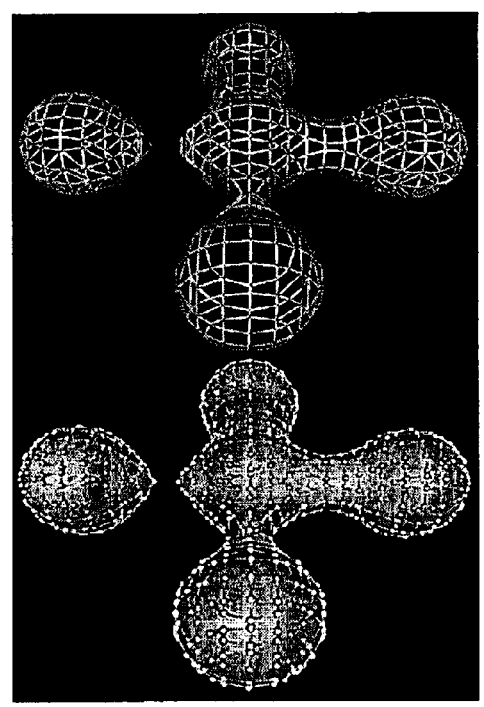
Figure 60B:
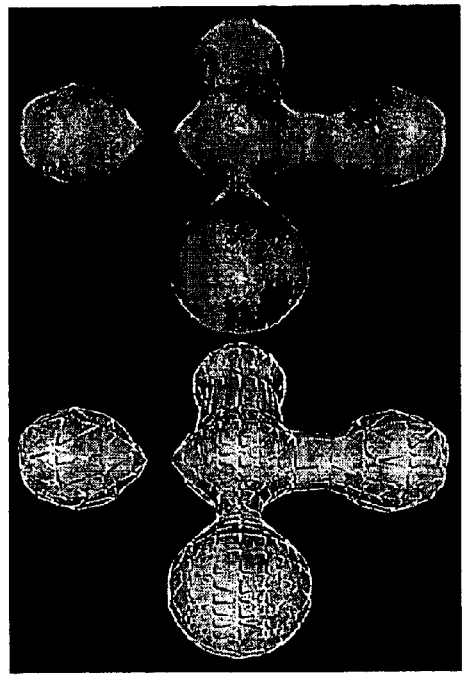
Figure 60B:
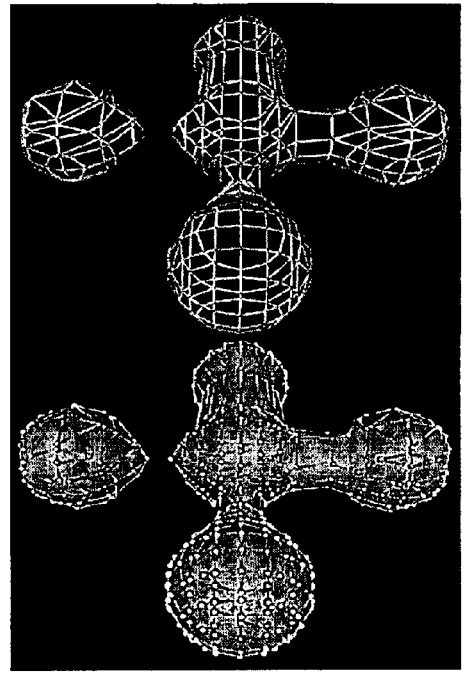
Figure 60B:
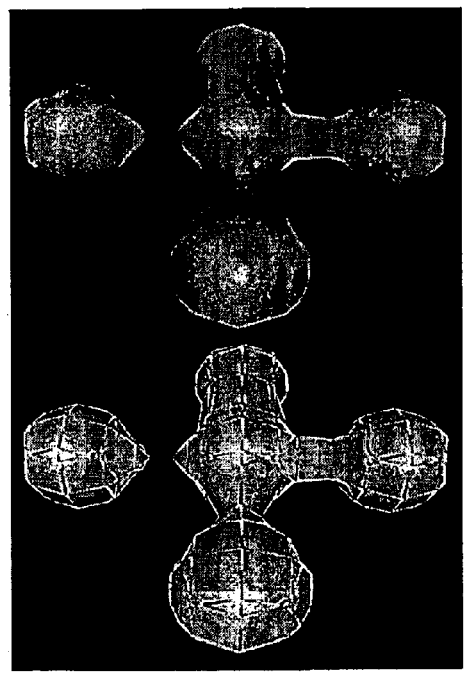
Figure 60B:
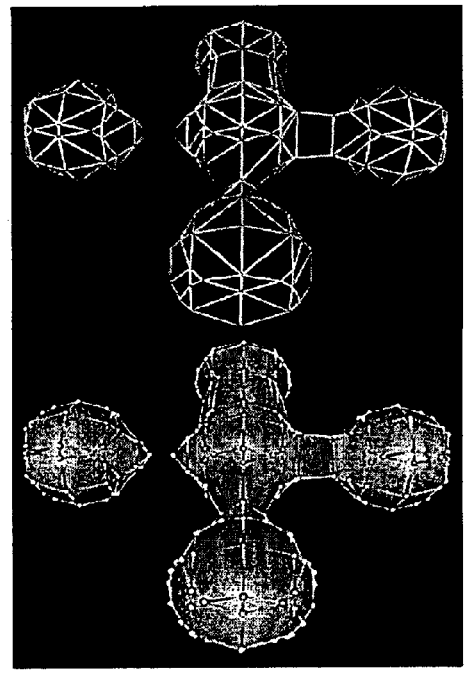
Figure 60C:
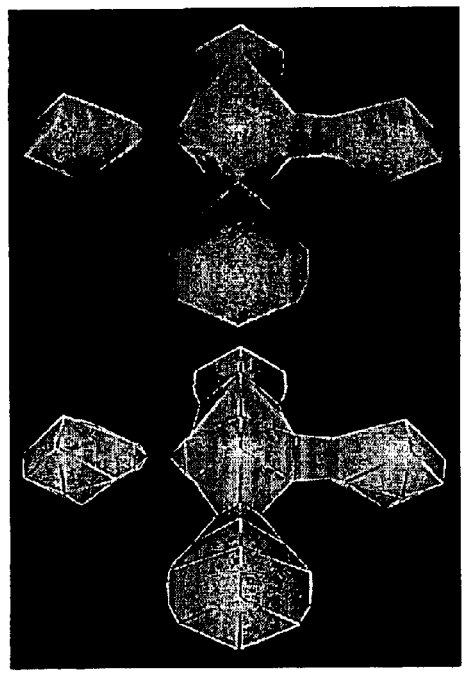
Figure 60C:
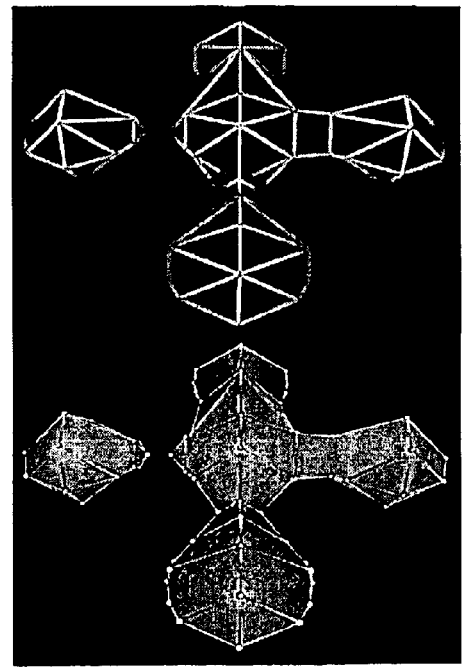
Figure 60C:
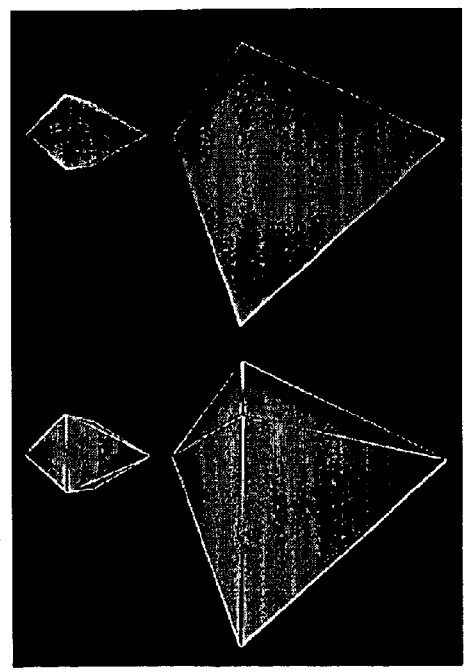
Figure 60C:
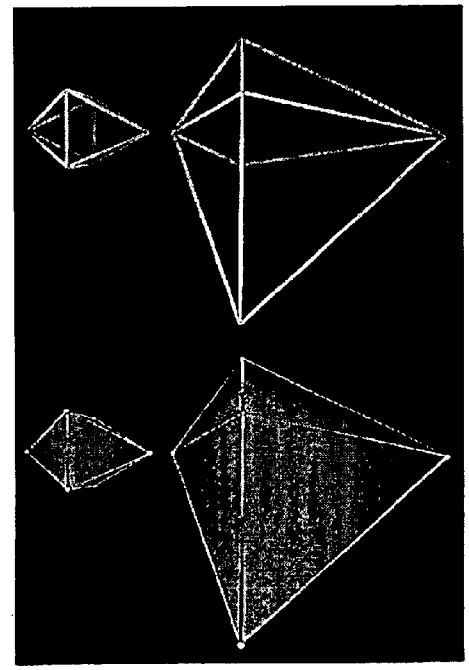

Next to encode the LSD, we start from a certain vertex, lying inside the ROI containing the local surface, and determine all the other vertices, belonging to the ROI, which can be reached through a connection path from the starting vertex. The connection paths are explored via the outgoing connections (as previously mentioned) of the vertices in an iterative way by using a FIFO buffer (see FIG. 59). The scenario is as follows:

The position of the $1^{st}$ vertex is stored in a FIFO. We consume the first vertex from the FIFO and put vertex 2 reached via the outgoing connection 1 and vertex 3 reached via outgoing connection 2 in the FIFO. Next we pop vertex 2 from the FIFO and place its connected vertices 4 and 5 in the FIFO. In case an outgoing connection is leading to a vertex, that was already visited before, or to a vertex that lies outside the ROI, the visited vertex will not be put in the FIFO. When consuming vertex 3 from the FIFO, we only put the connected vertex 7 in the FIFO, since the first connection leads to vertex 5, which has been already visited. The scenario will stop when all vertices in the FIFO are consumed and no new vertices are reached inside the ROI.

In order to obtain a stream, which can be decoded unambiguously, it suffices to encode the absolute position and orientation of the starting vertex and the outgoing connectivities of all the connected vertices including the starting vertex, as soon as they are visited. This way of encoding ensures that the vertices will be visited in the same order during the decoding and that their absolute position and directions can be derived from their predecessor in the FIFO. In the example, vertices 2 and 3 are coded relative to the starting vertex 1 via its outgoing connections, while vertices 4 and 5 are coded relative to the starting vertex 2 via its outgoing connections.

Some times, one starting vertex will not be sufficient to visit all the vertices from the local surface. In that case it might be necessary to repeat the same scenario for different starting vertices. We call a starting vertex and its connected vertices a patch. Hence a local surface will in general consist of one or more patches. For optimal coding, one should try to encode the local surface in a minimal number of patches, since each starting vertex of a patch introduces some overhead (i.e. its absolute position and absolute orientation have to be coded extra). A LSD can be coded in a minimal number of patches, by first determining all the singular vertices (i.e. a vertex which has no incoming connectivities inside the ROI containing the local surface). Since a singular vertex cannot be reached, it has to be considered as a starting vertex. If after coding the patches starting from all these singular vertices, there is still a remaining part of the local surface not coded (or there are no singular vertices) for that patch, only one starting vertex is needed to completely encode the rest of the vertices. In order to find one of those particular starting vertices, we apply a backtracking algorithm. Yet in general, for surfaces with a shape of moderate complexity, it is possible to describe the local surfaces in one patch and no extra overhead is encountered.

In this approach different local surfaces are connected to each other via the outgoing connections of the vertices lying at the edge of a ROI.

Figure 55A:
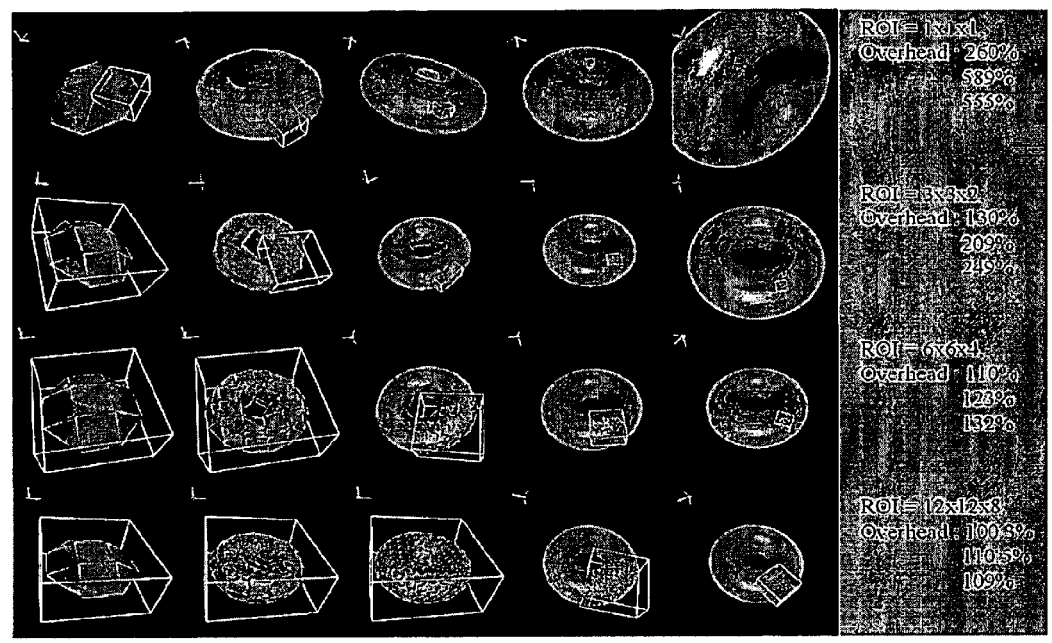
FIG. 55a illustrates the concept of view-dependent coding of the MeshGrid representation based on regions of interest.

In order to have more flexibility for the view-dependent decoding, the ROI sizes should be chosen small enough compared with the size of the entire reference-grid. The smaller the size of the ROI the more overhead is involved in the coding of the connectivity-wireframe because of the increasing number of starting vertices. The torus example from FIG. 55a shows visually the size of the ROI compared to the surrounding box of the object. High overhead is caused by very small ROIs.

Figure 55B:
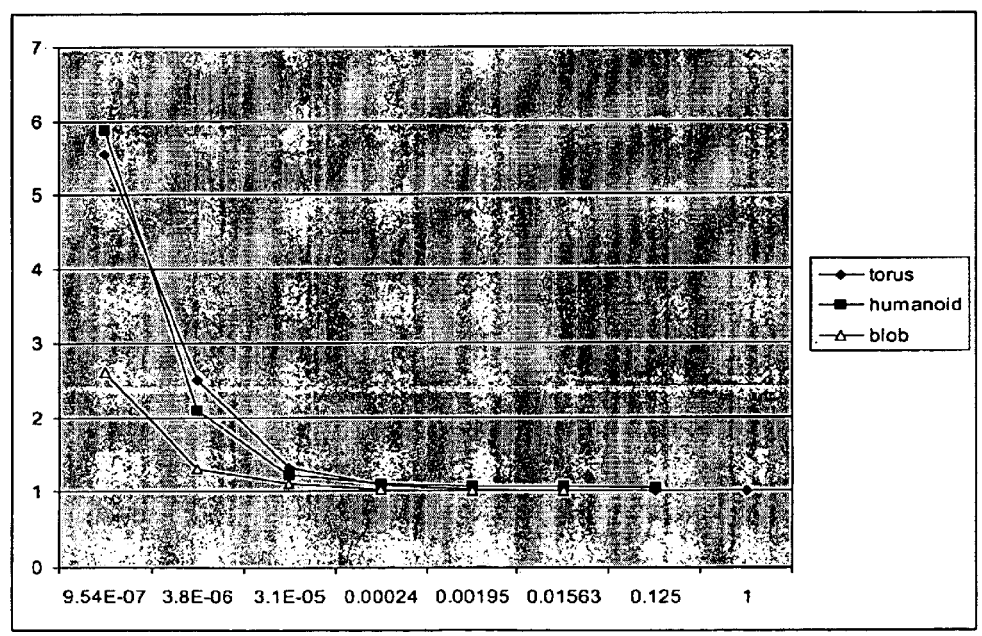
FIG. 55b illustrates the view-dependent coding overhead from FIG. 55a, depending on the ROI cubic size related to the cubic size of the reference-grid.
Figure 58:
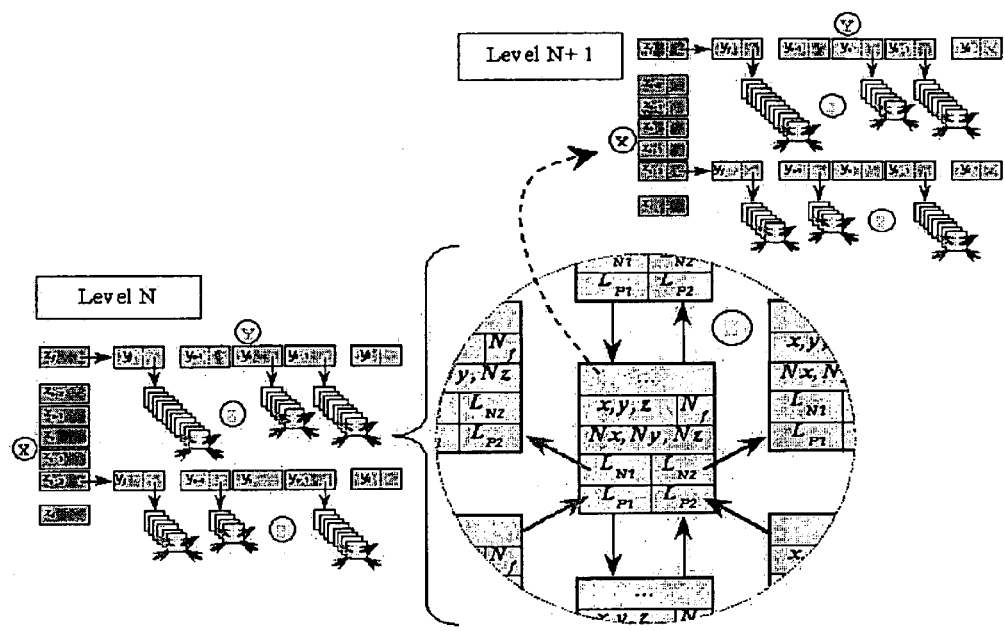
FIG. 58 illustrates a hierarchical storage model of the MeshGrid.

The chart of FIG. 55b illustrates the view-dependent coding overhead from FIG. 55a, depending on the ROI cubic size related to the cubic size (sizeU*sizeV*sizeW) of the reference-grid.

The following table shows the size of compressed meshes with and without view-dependent coding, and the corresponding ratio between the view-dependent stream and the globally coded mesh for the example from FIG. 55a. Different ROI sizes were considered for each mesh coding.

each component. In general, these coders consider all the subbands of the wavelet decomposition at once and generate an embedded stream, which includes even for high compression ratios the most prominent high-resolution components. These types of coders generally allow only multi-resolution in precision but not directly in scaling, since each decoding will yield a Reference-Grid with the size of the highest resolution. Therefore this approach is always very computing and memory demanding.

For encoding the Reference-Grid description we need to preserve the multi-resolution in scaling. We therefore apply a wavelet decomposition and code each sub-band separately for each component of the vector field. Yet, the number of decompositions of the reference-grid is larger or equal to the number of resolution levels of the mesh. Except for the first mesh resolution level, each decomposition level contains the wavelet values of the grid-points corresponding to a certain mesh resolution level. For the first resolution level, we will further decompose the reference grid until the low-pass (LLL) subband at the highest decomposition level corresponds to a cube with a size of 2×2×2, consisting of the 8 corner points of the grid. This makes that the first resolution level of the mesh, can consist of one or more decomposition levels and that we can still describe a Mesh-Grid description in a single resolution, if wanted. The following example illustrates the decomposition strategy. Suppose we have g=5 grid points at the first resolution level of the mesh for a certain direction dir (i.e. one of u, v, w). Then, there will be 2 decomposition levels of the grid (first the 5 points will be divided into 3 low pass and 2 high pass values and second

| Torus | | | Humanoid | | | Blob | | |
|---|---|---|---|---|---|---|---|---|
| Vertices | 7856 | | Vertices | 7836 | | Vertices | 28326 | |
| Stream View-indep. | 8878 (bytes) | | Stream View-indep. | 8855 (bytes) | | Stream View-indep. | 31906 (bytes) | |
| View-dependent coding | | | | | | | | |
| ROI Sz | Stream Sz | Ratio | ROI Sz | Stream Sz | Ratio | ROI Sz | Stream Sz | Ratio |
| 1.1.1 | 23125 | 2.604753 | 1.1.1 | 52159 | 5.890012 | 1.1.1 | 177268 | 5.555815 |
| 3.3.2 | 11582 | 1.304573 | 2.1.3 | 18528 | 2.092259 | 2.2.1 | 79719 | 2.4985 |
| 6.6.4 | 9766 | 1.100023 | 4.2.9 | 10915 | 1.232567 | 4.4.2 | 42378 | 1.328183 |
| 12.12.8 | 9190 | 1.035143 | 8.4.18 | 9790 | 1.105528 | 8.8.4 | 34789 | 1.090334 |
| 24.24.16 | 8915 | 1.004168 | 16.8.36 | 9540 | 1.077297 | 16.16.8 | 32723 | 1.025582 |
| 48.48.32 | 8884 | 1.000676 | 32.16.72 | 9449 | 1.06702 | 32.32.16 | 32345 | 1.013735 |
| | | | 64.32.144 | 9313 | 1.051663 | 64.64.32 | 31991 | 1.002641 |
| | | | | | | 128.128.64 | 31917 | 1.000321 |

Coding the Reference-Grid Description

The general representation of the Reference-Grid description is a vector (x, y, z) field defined on a regular discrete 3D space (u, v, w). In the simplest case (regular, discrete reference grid) each vector corresponds to its position in the discrete 3D space, i.e. x(u,v,w)=u; y(u,v,w)=v; z(u,v,w)=w. However in the general case, when dealing with curved reference surfaces, each component of the vector can be an arbitrary function of (u,v,w): i.e. x(u,v,w)=f(u,v,w); y(u,v,w)=g(u,v,w); z(u,v,w)=h(u,v,w). Yet in general, the vector field will have a smooth nature. This implies that it can be highly compressed. One can apply a progressive multi-resolution algorithm based on a combination of a 3D wavelet transform and an efficient coder, such as a zerotree coder, octree coder, embedded block coder, . . . (see P. Schelkens, X. Giro, J. Barbarien, A. Munteanu, and J. Cornelis, "Compression of Medical Volumetric Data," ISO/IEC JTC 1/SC29/WG 1, Aries, France N 1 7 1 2, Jul. 3–7, 2000) on the 3 low pass values will be further divided into 2 low pass values (i.e. the 2 the grid corners) and 1 high pass value. At the second mesh resolution level we will have ((g−1)*2+1) grid points for the direction dir. By induction, we find that the $n^{th}$ mesh resolution level will contain $((g-1)*2^{(n-1)}+1)$ for the direction dir. The wavelet filters we use are L=(1), H=(−0.5, 1, −0.5) for coding and L=(0.5, 1, 0.5) and H=(1) for decoding. The benefits of these filters are (1) that they are computationally very fast, (2) don't produce border effects, (3) can encode/decode small reference-grid sizes and (4) since the low pass filter L for the encoding is 1, there is no dependency of the values in the LLL band and the other subbands at the same or lower decomposition levels (note: the lowest decomposition level of the grid, corresponds to the highest mesh resolution level). Point (4) implies that the exact values of the grid positions for a certain mesh resolution can be computed from the coded grid information stored at that resolution level only: i.e. decoding the information from subbands at higher mesh resolution levels will not influence the values of the grid positions at lower resolution levels.

The wavelet coefficients are coded subband by subband by an octree-based coder.

For view-dependent coding in order to have local decoding possibilities for the reference-grid, one can identify in the wavelet domain the coefficients corresponding to the ROIs (for the LSD) specified in the spatial domein, and encode for each subband the coefficients of each ROI separately.

The short filter used has the benefit that for view-independent and especially for view-dependent coding avoids the so-called border effect at the ROI border, and is in addition very computational efficient. Since the vector field is very smooth, a short filter is sufficient to obtain a compact coding.

Coding the Refinement Description

Figure 82:
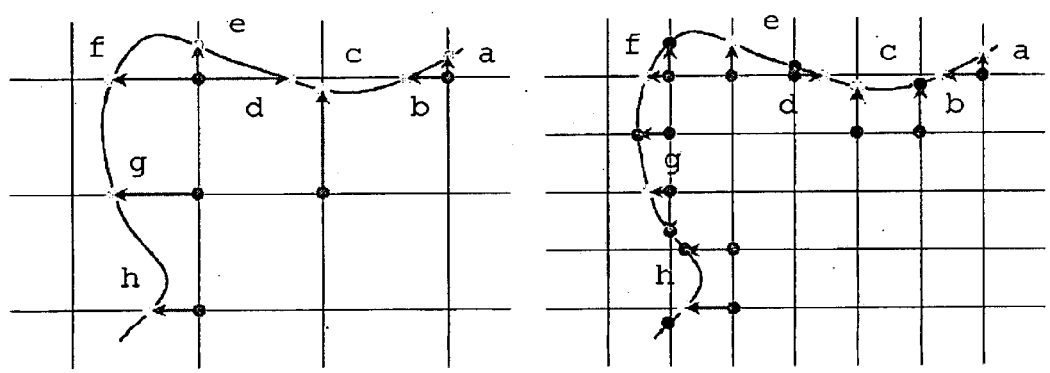
FIG. 82 is a demonstration of vertex migration via the Vertex-Refine bits.
Figures 86A, 86B, 86C, 86D, 86E:
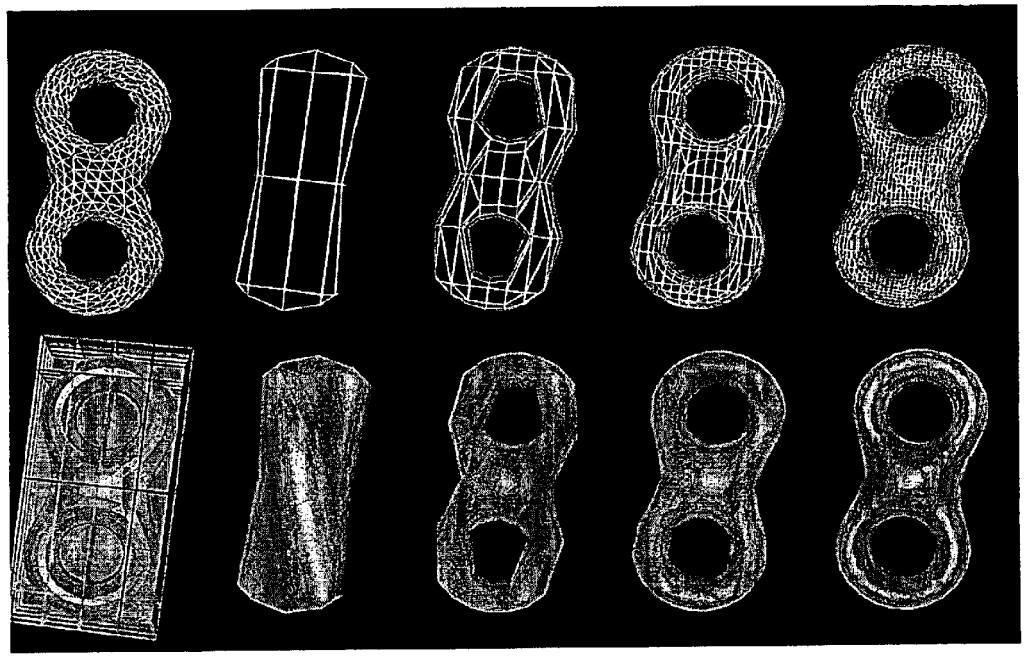
FIG. 86 shows the remeshing of an eight model. Initial representation is an IndexedFaceSet (a), converted to a multi-resolution MeshGrid (b till e).

The vertices are located at the intersection positions between the grid-lines and the object contour, at a certain ratio in between two reference-grid nodes. This ratio has a default value of 0.5, but can be modified by the Refinement description to fit a known position. The ratio can vary between 0 and 1. The update of the vertex position is done by a successive approximation method spanning all the levels in the hierarchy. For each resolution level, except the highest one, the most significant bit from the vertex-precision value is used to update the position of the vertex towards the next level. The used bit is consumed from the vertex-precision value, so that the next bit becomes the most significant one. When the most significant bit is than the existing vertex will migrate from its current grid-position to the new inserted grid-position as shown in FIG. 82. When it is 0, the position of the vertex is not affected. At the highest resolution level it is possible to consider more than one bit to update the refinement positions. We can summarize that a vertex that appears at a lower level needs more vertex-precision bits than a vertex located on a higher level. The number of precision bits required for a vertex can be computed as follows: nr bits=(maximum levels−vertex level)+(number bits at the highest level). Because of the possible vertex migration effect, the most logical way is to insert one vertex-refinement bit for each vertex of the current level after the mesh-description of that level. The remaining Vertices-Refinement description can be found after the highest-level Mesh-Description in order to further refine the position of all the vertices.

Progressive meshes are discussed in the following articles: H. Hoppe, "View-dependent Refinement of Progressive Meshes"; H. Hoppe, "Efficient Implementation of Progressive Meshes", Technical report MSR-TR-98-02, 1998; H. Hoppe, "Progressive Meshes"; Popovic, H. Hoppe, "Progressive Simplicial Complexes"; M. Eck, T. DeRose, T. Duchamp, H Hoppe, M. Lounsbery, W. Stuetzle, "Multi-resolution Analysis of Arbitrary Meshes".

TriScan Method—Optimizing the Speed

This section discusses an optimization method that applies only to the Multiple 2D border-tracking strategy. The optimization is not needed for the 3D border tracking approach since the border-scanning overhead is not present.

The basic approach of the present invention performs a border-location step before every border-tracking step in all the slices specified in the slicing set-up. The border-locating algorithm traverses the entire area inside each slice, searching for a new boundary, while the border-tracking algorithm only follows a detected boundary and generates the contouring. This implies that the border-locating algorithm visits a much larger amount of voxels than the border-tracking procedure, and will be consequently more time consuming than the latter one. The ratio of the visited voxels and execution times will to a certain extent depend on the smoothness of the boundary.

A possibility to optimize the global speed of the procedure of the TriScan method is to perform the border-location only in one set of slices (from the three mutually perpendicular sets of reference-surfaces), and to build a hash table (HTBV) containing the coordinates of all border voxels, and the corresponding direction(s) of the border face(s). During the border-tracking step the algorithm picks a border position from the HTBV, tracks the corresponding boundary and marks the visited boundary positions into the dirty-bit-buffer (DBB) to avoid duplicated contours. It is to be noted that one border voxel may belong to two different contours, which justifies the reason not to remove an entry from the HTBV immediately, and wait until the end. This procedure is repeated until all entries into the hash table have been explored. While this approach significantly improves the speed, it requires an extra temporary storage for the HTBV, which is not optimal.

An enhanced approach that improves the speed, but does not require any extra storage, has the following strategy: the basic approach is applied (i.e. locate and track the borders, and store the vertices with their connectivity into the Mesh-Grid for all the reference-surfaces from the first set of the slicing set-up (first slicing), while for the other two sets of reference-surfaces (second and third slicing) the border-locating procedure is substituted with a search into the MeshGrid storage (MGS) to locate the positions corresponding to the boundary. In this case the MGS has a dual purpose: i.e. (1) to store the mesh vertices and their connectivity information, needed for the final surface, and (2) to serve as a hash table with the same role as the HTBV, since a MGS cell contains the vertex position and the border direction, which is exactly the input needed for the border-tracking algorithm. The storage for the MeshGrid is illustrated in FIG. 56.

It has to be proven that the connectivity-wireframe generated with the enhanced approach of the TriScan method contains the same information as the one obtained with the basic TriScan approach. It is known that each vertex belongs to two contours located in two reference-surfaces from different sets. This means that all the vertices will be found during the first and second slicing while the third slicing only adds extra connectivity information. So, if it can be proven that during the first slicing enough border information is acquired into the MGS such that the second slicing can identify all the boundaries corresponding to a reference-surface and add the remaining positions on the surface to the MGS, then this approach generates the same result as the basic version. To prove it, the opposite assumption that there exists a border voxel that has not been detected either during the first slicing (border locating and tracking) or second slicing (border tracking), is made. The three possible geometrical positions of a border-voxel relative to a plane in one of the sets of slices is analyzed:

If voxel v is isolated, then it has six border faces, and four of them are oriented in the directions of the border-locating and -tracking engines of the first slicing, and will be detected in one of the reference-surfaces.

If voxel v is not isolated and it has a border face oriented in one of the directions of the border scanning and tracking engines of the first slicing, then it will be detected either during the scanning, tracking or both steps.

A not isolated border voxel v that does not have a border face in one of the four directions followed by the border-tracking engine from the first slicing will be adjacent to the first or higher level (i.e. adjacent to another voxel that is adjacent to the current voxel) in one of the reference-surfaces of the first slicing with another border voxel v', which has a border face that satisfies the condition of the second point. Since v' is detected during the first slicing, voxel v will be detected during the second slicing due to the adjacency relation that is exploited by the border-tracking engine.

It is shown that whatever the position of a border voxel is, it will be detected at least by the first or second slicing steps, which proves the algorithmic robustness of the enhanced approach of the present invention.

The vertex retrieval procedure (VRP) simulates in a sense the border-locating algorithm by picking a border position from the MGS and feeding it to the border-tracking procedure. Not all vertices stored in the MGS correspond to border positions that are valid for the border-tracking engine applied in the second and third slicing steps. The vertices can be classified according to the position of the border face it belongs in: -L-, -R-, -F-, -B-, -U- and -D-. Vertices of type -L-, -R-, -F- and -B- are found during the border-tracking in slices parallel with the xoy plane, respectively vertices of type -L-, -R-, -U- and -D- in slices parallel with the yoz plane, and vertices of type -F-, -B-, -U- and -D- in slices parallel with the zox plane. The order of the three sets of slicing set-ups has been chosen in such a way to obtain a fast memory access (minimize the CPU cache misses) and an optimal search time inside the MGS. If the 3D volume is stored contiguous in the memory in a slice-by-slice order in the xoy plane, then it makes sense to perform the first slicing in reference-surfaces parallel to xoy since the most memory accesses are performed during the border-locating step. Vertices of type -L- and -R- are shared between contours located in the xoy and yoz reference-surfaces, while vertices of type -F- and -B- are shared between contours located in the xoy and zox reference-surfaces. As the second slicing direction either the zox or the yoz plane may be chosen. The task of the VRP is to locate a specified type of vertex in the MGS and check with the DBB that the found vertex has not already being marked as visited by the border-tracking engine. If it is not the case, the found vertex is supplied to the border-tracking engine. For the second slicing the VRP has to locate vertices of type -F- or -B- (only one type is enough) given the z coordinate of the current slicing plane, while for the third slicing it has to search for vertices of type -L- or -R- given the y coordinate of the current slicing plane.

The enhanced approach of the present invention performs in average twice as fast as the basic version.

TriScan Method Applied on Analytical Data.

The TriScan surface extraction method of the present invention has been explained in the previous sections by means of the discrete volumetric model that allowed, in an intuitive way, to walk-through the different steps involved in the procedure, and to illustrate its basic features.

The steps involved in the procedure are briefly recalled, since this information is relevant for the next discussions.

When applied to a discrete space, the approach of the present invention can be split into three steps as follows:

S1: Locating and tracking the object's border as a series of contours defined in three sets of reference-surfaces obtaining a local 2D connectivity model.

S2: Build the 3D connectivity-wireframe out of the contour description from the previous step.

S3: Generate the surface primitives (for visualization, modeling, editing, etc., purposes) from the connectivity-wireframe according to some local connectivity rules.

In case the 3D border-tracking approach is used, the first two steps are performed in a single one, with the third step the same. By anticipating some conclusions, the following remark can be made: it is not imperative to follow all three steps in order to obtain the surface primitives for a certain slicing set-up. The border-tracking step can be replaced by another approach that retrieves the vertices and their connectivity (analytical way) or can be skipped if a mesh description exists (both for discrete and continuous space), as will be seen later.

In what concerns the procedure of the present invention, objects defined in the continuous space (known as analytical objects) can be classified in two groups: (1) objects having their surface represented by mathematical equations, and (2) objects that can be described as a series of contours in three sets of reference-surfaces through the object.

Deriving the surface from analytical objects of type (1) follows a similar strategy as explained for the discrete case. The main difference with the discrete case is that the decision function used by the 2D or 3D border-tracking approaches can have a tri state implementation (inside, outside and on the boundary) instead of a bi state implementation, since the exact position of the border is known. Such a tri-state decision function evaluates the function(s) f(x,y,z) of the object's surface in position p(x,y,z) and returns the result. This is an approach that is very similar to the discrete case where the decision function returns the result of the comparison between a computed local feature in point p(x,y,z), and a specified object's feature. The tri-state decision function has the benefit that the position of the vertices can be precisely adjusted to fit the real border, which is not the case for discrete objects where the exact position of the "real" border can only be guessed by performing some interpolation of the location of each vertex between two corresponding positions, one inside the object and the other outside the object, as explained in the section about MC. It is to be noticed that, when applied on continuous objects, the border-tracking approach does an implicit discretisation of the continuous function(s) f(x,y,z) in the positions defined by the reference-grid. Analytical objects of type (1) are discussed in the following section.

The category of type (2) analytical objects is quite general and refers to both physical models and computer-based models that allow generating contour(s) of cross-section through the objects as specified in the slicing set-up. Contouring physical objects can be done by slicing them literally (cutting the object and drawing the print of the cross-section such that a contouring can be made) or by using a range scanner to obtain the 3D points and their connectivity. For computer-based models, the contouring can be done by virtually slicing the model with reference-surfaces as specified in the slicing set-up, and computing the results of the intersections. Since for this category of objects the contouring is done using a different method, the border-tracking step of the procedure of the TriScan method of the present invention has to be skipped. Before deriving the connectivity-wireframe some pre-processing might be required if the position of the 3D points do not match the slicing set-up, i.e. interpolate missing points and remove those in excess. The strategy to remove the points in surplus is very similar to the method applied when deriving a lower resolution MeshGrid from an existing one, and is described later.

Objects Defined by Mathematical Functions

There are three types of mathematical functions describing surfaces: implicit ($f(x,y,z)=0$), explicit or non-parametric ($z=f(x,y)$) and parametric ($x=f(u,v)$, $y=g(u,v)$ and $z=h(u,v)$).

In order to be able to apply the border-tracking procedure, a bi-state decision function returning a boolean value has to be derived, as defined by eq. 5, or a tri-state decision function, which is defined in eq. 6.

$$\begin{cases} 1, & p(x, y, z) \in \{\text{inside the object, or on the border}\} \\ 0, & p(x, y, z) \in \{\text{outside the object}\} \end{cases} \quad (\text{eq. 5})$$

$$\begin{cases} < 0, & p(x, y, z) \in \{\text{inside the object}\} \\ = 0, & p(x, y, z) \in \{\text{on the border}\} \\ > 0, & p(x, y, z) \in \{\text{outside the object}\} \end{cases} \quad (\text{eq. 6})$$

Designing a decision function from implicit functions is quite easy since they return a tri-state value or can be brought to that form. A non-parametric function can be expressed as an implicit function as shown by the following equation: $f(x,y)-z=0$, and treated correspondingly. Parametric functions cannot always be brought in an exact implicit form, although approximations with implicit functions can be derived.

For parametric surfaces, there is another alternative. A uniform connectivity-wireframe can be obtained directly from the parametric description of the surface. A grid node $w_{u,v}$ is connected to other 4 nodes, i.e. 2 nodes, $w_{u-1,v}$ and $w_{u+1,v}$, in the direction v=const, and the other 2 nodes, $w_{u,v-1}$ and $w_{u,v+1}$, in the direction u=const. The triangulation of this regular grid is straightforward since all the openings in the grid are quadrilaterals. When displaying the surface of only one parametric surface, the direct way is to triangulate the regular grid of quadrilaterals and render it, and not to hand it over to the procedure of the present invention.

In case the surface is the result of a boolean operation or the sum (difference) between different functions then the approach of the TriScan method of the present invention is a very handy method to obtain the surface; the only requirement is to implement an adequate decision function. Some typical cases when a surface is described by several functions are the following:

The surface can be split into parts or patches, with each part being defined by another function.

Objects that have disjoint external and internal surfaces.

Approximating a model as a sum of radial basis functions (RBF).

The decision function is very powerful since it is the key to implement logical operations with surfaces. There are two examples in pseudo-code, shown next, that illustrate how to design a bi- and tri-state decision function. The first part shows the bi-state implementation of the decision function, while the second part shows the corresponding tri-state version.

Code sample 1: yields the difference between two surfaces represented by the implicit functions $f_1(x,y,z)$ respectively $f_2(x,y,z)$:

```
1.  bool DecisionFunction(x,y,z)
    {
        // subtract surface 2 from 1
        if (f1(x,y,z) <= 0)
        {
            if (f2(x,y,z) <= 0)    return false;
            else                    return true;
        }
        else                        return true;
    }

2.  int DecisionFunction(x,y,z)
    {
        // subtract surface 2 from 1
        float val1 = f1(x,y,z);
        if (val1 == 0.0)            return 0.0;
        else if (val1 < 0.0)
        {
            float val2 = f2(x,y,z);
            if (val2 == 0)          return 0.0;
            else                    return -val2;
        }
        else                        return val1;
    }
```

Code Sample 1 does the union of the same two implicit functions:

```
1.  bool DecisionFunction(x,y,z)
    {
        // add surface 1 and 2
        if (f1(x,y,z) <= 0 || f2(x,y,z) <= 0)   return true;
        else                                     return false;
    }
2.  int DecisionFunction(x,y,z)
    {
        // add surface 1 and 2
        float val1 = f1(x,y,z);
        if (val1 <= 0.0)            return val1;
        float val2 = f2(x,y,z);
        if (val2 <= 0.0)            return val2;
        return min(val1, val2);
    }
```

Figure 61:
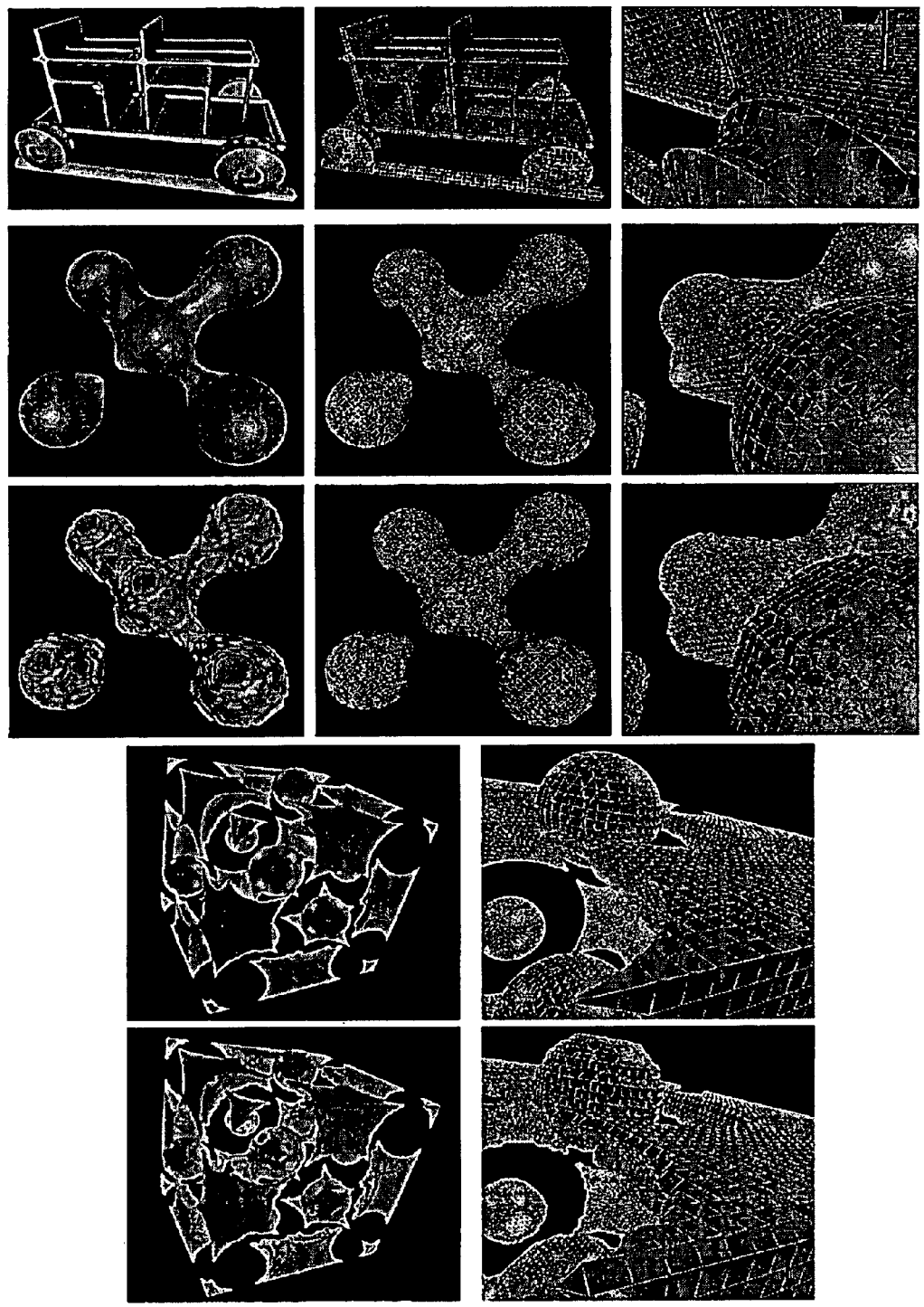
FIG. 61 shows examples of models obtained by means of implicit functions implementing a bi- and tri-state decision function.

Examples of surfaces extracted from implicit functions are illustrated in FIG. 61. It is shown that the tri-state decision function allows a very precise positioning of the surface vertices. The images show both the object's surface and the connectivity-wireframe. The first row of images illustrates a vehicle generated from the union and intersection of several implicit functions (cylinder, box, torus), using a tri-state decision function, which allowed a precise positioning of the surface vertices. The second and the third row show a blob object modeled by a sum of five implicit functions. For the images from the second row, a tri-state decision function has been designed, while for the images from the third row, only a bi-state decision function has been used, and the vertices have been positioned at the default position. The last two rows show the images of another synthetic object that was generated both with a tri-state and bi-state decision function.

Using a variable scanning step may improve the precision of the generated mesh, and less reference-surfaces might be required to obtain the same precision.

Objects Defined by Analytical Contours

Instead of applying the border-tracking engines to make the contouring of an object, defined in a discrete or continuous space, one could obtain a similar contouring in an analytic way. A contour should be defined as a series of connected dots. In order being able to build a connectivity-wireframe, the procedure of the TriScan method of the present invention requires that the contouring be performed in three sets of reference-surfaces. Moreover, in order to obtain a consistent surface description it is necessary that the slicing set-up matches the positions of the reference-surfaces were the contouring is performed. One might encounter the following two situations: (1) either a slicing set-up is defined first, followed by the contouring in the corresponding slices, or (2) a contouring already exists, and the slicing set-up has to be derived from the positions of the reference-surfaces where the contouring was done.

Building the connectivity-wireframe from analytical contours is not as straightforward as in the case of the contours obtained with one of the border-tracking engines. To explain this issue, the different aspects of the procedure of the TriScan method of the present invention should first be reviewed.

Figure 62A:
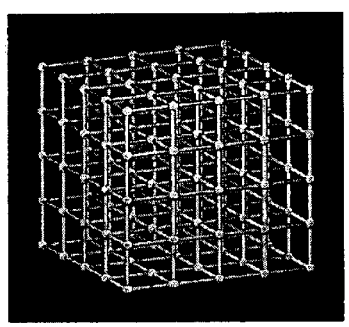
FIG. 62(a) shows the slicing set-up visualized as a 3D grid.

The slicing set-up defines the positions where the information about the object is required. There are two different interpretations of the slicing set-up, but with the same meaning:

It can be visualized as a regular cloud of points (the reference-grid as shown in FIG. 62(a)), where each point has a fixed position in space that is given by the intersection of three sets of reference-surfaces, with each reference-surfaces belonging to a set in a different direction {x,y,z} (in the general case when the reference-surfaces are not parallel to the orthogonal coordinate system, {x,y,z} should be replaced by {u,v,w}). The distance between a point $v_{x,y,z}$ and each of its 6-adjacent points ($v_{x-1,y,z}$, $v_{x+1,y,z}$, $v_{x,y-1,z}$, $v_{x,y+1,z}$, $v_{x,y,z-1}$, $v_{x,y,z+1}$) in the three direction each with two orientations, represents the step corresponding to position (x,y,z) in the given direction and orientation (see FIG. 2 for a description of the 6-adjacency model). The 3D border-tracking approach is based on this slicing set-up model.

Figure 62B:
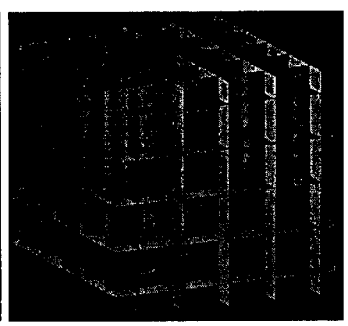
FIG. 62(b) shows the slicing set-up visualized as three sets of mutually perpendicular reference-surfaces.

From a 2D point of view, the slicing set-up consists of the positions of the reference-surfaces from the three mutually sets of perpendicular reference-surfaces (see FIG. 62(b) for the orthogonal case). This model is exploited by the 2D border-tracking engine.

Figure 62C:
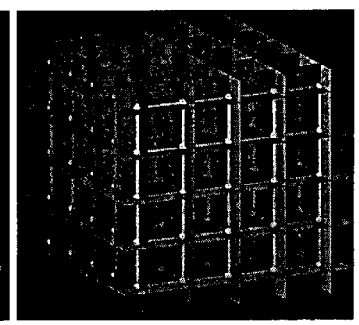
FIG. 62(c) shows the slicing set-up visualized as both representations.

Both interpretations of the slicing set-up show a dual representation of the same concept, and illustrate that there is a direct relation between the step defined inside a set and the position of the reference-surfaces (see FIG. 62(c)). The step $S_d(d_i)$, with d∈{x,y,z} the direction of the reference-surfaces in the set, and i∈[1,$n_d$] the number of the reference-surfaces in direction d, is equal to the distance between two reference-surfaces $P_{d+1}$ and $P_d$. There is spoken about a constant step $s_d$ for a set of reference-surfaces if these reference-surfaces are equally spaced, and a variable step in the contrary case. All three mutually perpendicular sets may have a constant step (different or same for each set), but each of them may have a variable step instead. This means that the steps (e.g. $s_x$ and $s_y$) inside the reference-surfaces of a set (e.g. in the z direction) is defined by the other two sets (e.g. in the x, respectively y directions), and cannot be chosen arbitrary once it has been decided where the reference-surfaces are located. The previous statement has a vice versa, i.e. if the steps (e.g. $s_x$ and $s_y$) inside the reference-surfaces of a set (e.g. in the z direction) have been specified, then the slicing positions in the other two sets (e.g. in the x, respectively y directions) are determined by the chosen steps and cannot be chosen arbitrary anymore. Usually the strategy is to first choose the position of the reference-surfaces in all three sets, and thereafter to derive the steps in the three directions. The positions of the vertices of a contour obtained with the border-tracking engine satisfy the constraints imposed by the slicing set-up, but the analytical contours most probably will not satisfy these constraints. It is to be noted that applying the border-tracking engine on continuous objects defined by mathematical functions does not cause any inconsistencies since the evaluation of the decision function is performed in discrete positions that match the slicing set-up.

When generating analytical contours, the position of the reference-surfaces should be chosen to conform with the slicing set-up (or vice versa), but inside a reference-surface, usually the resolution of the contour (number of points) is higher than imposed by the slicing set-up and/or the position of the points does not match the grid of the slicing set-up. In such a case, points that are in excess have to be removed (those that are not intersected by the grid lines and those that do not satisfy some connectivity rules as explained next), while some other points (at the intersection between the grid lines and the "real" contour) might not be available and have to be interpolated. It is to be noted that the grid lines result from the intersection of the reference-surfaces belonging to the other two sets with the current slice. An example of a contour on top of a voxel layer, and the grid lines from of the reference-surfaces is shown in FIG. 63.

Once the analytical contours are validated by removing the inconsistencies, one can generate the connectivity-wireframe in the same way as for discrete contours obtained via the border-tracking engine.

Next section makes an analogy between discrete and analytical contours, and derives the rules to transform an analytical contour into a valid version such that it can be used as input in the connectivity-wireframe generation procedure. The issues involved in this procedure are very similar to the vertex removal problem that is discussed hereinafter—the multi-resolution aspects of the connectivity-wireframe. An example is given of how to generate the analytical contours out of classical represented surfaces. (i.e. list of vertices and a set of triangles).

A comparison between an analytical contour (FIG. 63(a)) and its discrete version (FIG. 63(b)) will help elucidate the inconsistencies, that may appear in the description of an analytical contour, with respect to the border-tracking rules. All the examples show a cross-section through an object sliced by one reference-surface from a set, e.g. in the z direction, both as a continuous and discrete version, and use the following conventions. The cross-section 59 filled with gray color and in transparency mode, is overlaid on a voxel layer 60. The analytical contour 61 is drawn in black with a dotted line. The voxels 62 are represented by the square areas with the center 63 of each voxel marked by a gray dot. The voxels 64 that have at least 50% overlap with the cross-section are displayed in gray and considered to belong to the object. The outline of the cross-section is displayed with a dotted black line. According to the slicing model, the reference-surfaces cut the voxels through the middle. The intersections between the reference-surfaces from two sets different from the one the slice belongs to, and the current slice are shown by the grid lines 65 in light gray dotted line. The contour vertices 66 located at the intersection between the contour 61 and one of the grid lines 65 are marked by dots.

The example from FIG. 63(a) and FIG. 63(b) shows, next to each other, the cross-section 59 through an object, on the left side, and its discrete equivalent, on the right side. The slicing set-up has been chosen to be uniform, e.g. $s_x$ and $s_y$ are constant inside the cut for a slicing in the z direction.

The first phase in validating the analytical contour 61 is to make sure that the only connected points describing the contour 61 are located at the intersection positions of the original contour 61 with the grid lines 65, and that for each such intersection a single contour point is available. An analytical contour 61 may contain infinity of points, in which case it can be expressed by some mathematical functions, or it may contain just a collection of points. When the number of connected points defining the contour 61 is limited, it may occur that at a certain intersection position between the analytical contour 61 and a grid line 65, no contour point is available. In such a case a new point v has to be inserted between existing connected points $v_{i-1}$ and $v_i$, and the connectivity has to be restored such that contour passes through v. The position of point v can be approximated by some interpolation or curve fitting between the positions of $v_{i-1}$ and $v_i$. For the examples in the current section, it is considered that the analytical contours contain the points at least in the required positions.

The remaining contour points, after applying the vertex reduction phase on the analytical contour 61 from FIG. 63(*a*), are marked by the dots 66 in FIG. 63(*c*) and in FIG. 63(*d*). FIG. 63(*d*) connects the dots 66 with a line 67 that approximates the analytical contour 61. It is to be noted that each dot 66 is located at the intersection point between a grid line 65 and the original analytical contour 61. Contouring the discrete object by means of the border-tracking engine obtains the result from FIGS. 63(*e*) and (*f*). In FIG. 63(*e*) the contour vertices 66 have the default position, i.e. from the center 63 of the voxel 62 half of the step in the direction of the border, and are located on the border face, while in FIG. 63(*f*) a local correction in the range [0,s), where s represents the value of the step, has been applied. It is to be noted that each vertex 66 has only one degree of freedom in the direction of the border that allows tuning the preciseness of the surface within the specified range.

Comparing the contouring result for the analytical contour case if FIGS. 63(*c*) and (*d*), after applying the vertex reduction step, with the discrete version of FIGS. 63(*e*) and (*f*), with and without correction, it is noticed that the analytical contour 61 contains more vertices than the other. This fact suggests that there might be some inconsistencies in the description of the analytical contour. The answer to the inconsistency problem can be found in the specificity of the border-tracking rules. According to these rules, two consecutive vertices may either (1) be located on the same border direction (looking from the center 63 of the voxels 62), and in this case they belong to different border voxels that are adjacent, both having a border face in the same direction, or (2) they are located on reciprocal perpendicular border directions, in which case the vertices 66 either belong to the same voxel if there is a local convexity, or they belong to different voxels if there is a local concavity. The border-tracking rules exclude the possibility that two consecutive vertices have their border direction point into opposite directions. Such an inconsistent case is shown in FIG. 64(*a*) for an analytical contour (a local zoom into FIG. 63(*d*)), compared with consistent version obtained with the border-tracking engine for the discrete object in FIG. 64(*b*) (a local zoom into FIG. 63(*f*)). FIG. 64(*a*) shows an analytical contour with an inconsistent description according to the border-tracking strategy, while FIG. 64(*b*) shows a consistent contouring that was obtained with the border-tracking engine. The presence in FIG. 64(*a*) of two dots 68 that are in consecutive order and have their normal vectors to the border in opposite directions, causing the inconsistency, is to be noticed.

The second phase of the validation procedure for the analytical contour consists in removing cases similar to the one in FIG. 64(*a*), and bypassing the removed vertices to restore the connectivity. Although the second phase can be performed at the 2D level—the contour—it is preferable to be performed at the 3D level—the connectivity-wireframe—since certain cases require restoring the connectivity in 3D instead. It does not have to be forgotten that each node from the connectivity-wireframe is a vertex that belongs to two different 2D contours. The node removal at the level of the connectivity-wireframe is the subject of section "Mesh-grid and the multi-resolutions potential".

Another issue concerns the storing of the contour points and their connectivity into the mesh-grid such that a valid mesh description can be obtained. The storage model has been explained in the section "representing the MeshGrid in memory", and is shown in FIG. 56. It is recalled that for each vertex that is stored into the mesh-grid, it is needed to provide a discrete position (x,y,z), the direction of the border, and an offset in the direction of the border that serves as a correction value used to compute the absolute coordinate of the vertex. The default value of the offset is 0.5, and should lie in the range [0,1). When storing the vertices of contours obtained with the border-tracking engine, the discrete position of each vertex is determined by the coordinates of the border voxel it belongs to, which is equal to positions {x,y,z} of the three reference-surfaces passing through the center of the voxel, the direction of the border is given by the position of the border face where the vertex is located, and the offset in the direction of the border face can either have a default value, or a computed value in the specified range.

In case of analytical contours, in order to provide the required data for each vertex, the analogy with the discrete case has to be exploited. For any vertex v a discrete position has to be found (in analogy with the center of a border voxel), associate vertex v with that position, derive the direction of the border and compute the offset relative to the discrete position. Such a discrete position is given by the intersection of two grid lines $l_i$ and $l_j$, with one of the grid lines (e.g. $l_i$) passing through v, and such that vertex v is located in the interval between the other grid line (e.g. $l_j$) and another grid line (e.g. $l_{j+1}$ or $l_{j-1}$ depending which is appropriate). Grid lines $l_j$ and $l_{j+1}$ (or $l_{j-1}$) belong to the same set, and are in consecutive order.

A concrete example is given. For a contour derived in a reference-surface in the z direction, the discrete z coordinate of all vertices equals to the z position of the reference-surface, which is the same as the absolute z coordinate of those vertices. The discrete x (respectively y) coordinates of the vertices intersected by the grid lines in the x (respectively y) direction is equal to the position of the corresponding grid line (reference-surface), which is the same as the absolute x (respectively y) coordinate of those vertices. To derive the third discrete coordinate y (respectively x) of the vertices, it is needed to find the corresponding discrete position that is located at the intersection of two grid lines (the first grid line has been already localized, it is needed to localize the second one). All vertices intersected by the same grid line are ordered in terms of their absolute coordinate y (respectively x), and a scanning is applied along the ordered set, starting from the first towards the last vertex, in consecutive order. During the scanning, for each vertex from the ordered set a border orientation is attributed in the direction of the grid line (e.g. $l_i$), and in alternating orientations, such that two consecutive vertices from the ordered set have opposite border orientations. This scanning approach is shown in FIG. 65, for one grid line 69 only, in order to preserve the clarity of the image, and works for both simple and nested contours, as shown in FIGS. 65(*a*) and (*b*) respectively. It is obvious that the scanning has to be performed for each grid line, both in horizontal and vertical directions. After performing the scanning, the direction of the border for each vertex is known. In order to locate the second grid line (e.g. $l_j$) for a vertex v, there is moved from the position of vertex v along the first grid line (e.g. $l_i$) in the opposite direction of the border, and the grid line first intersecting the path is the one needed. Once the discrete position for vertex v (at the intersection between grid line $l_i$ and $l_j$) has been found, the offset can be computed as the absolute value of the difference between the coordinates of the discrete position and those of v.

Summarizing, a method to validate the description of the analytical contours has been described, such that they can be used as input to generate the mesh-grid. The absolute coordinates of the vertices belonging to an analytical contour can be brought to another representation, i.e. a discrete form with specified direction of the border, and an offset in the direction of the border, such that they conform to the discrete representation inside the mesh-grid. From the discrete representation the absolute coordinates of the vertices can be recovered.

The validation process of the vertices consists of three steps:

S1: For all the positions where the grid lines intersect the original contour and no vertex is found in the contour description, insert a new vertex. The position on the original contour where a vertex is inserted can be found by some interpolation or fitting.

S2: Remove all vertices that are not intersected by one of the grid lines. If two grid lines are passing through the same vertex, duplicate it.

S3: Remove those vertices that are illegal from the point of view of the border-tracking rules: two consecutive vertices cannot have opposite border directions. This implies that two consecutive vertices should be intersected by different grid lines. Although this step can be performed at the 2D level (the contour), it is recommended to be performed at the 3D level (the mesh-grid).

Storing Quadrilateral Meshes in MeshGrid Format

A quadrilateral mesh has the property that each vertex has 4 neighbors. The MeshGrid representation has the same constraint on the vertices' connectivities as the quadrilateral meshes. A quadrilateral mesh is in fact a subset of the possible mesh representations supported by the MeshGrid format, since the latter may combine: triangles, quadrilaterals, pentagons, hexagons and heptagons.

There are three steps involved in the representation of quadrilateral meshes in the MeshGrid format: (1) defining the constrained reference-grid (see FIG. 83(a)), (2) deforming and distributing the reference-grid to fit the quadrilateral mesh (see FIGS. 83(b)–(c)), and (3) derive the connectivity-wireframe from the quadrilateral mesh and attach it to the reference-grid (see FIGS. 84(a)–(c) displaying the multi-resolution MeshGrid).

Since the surface description is already known when building the MeshGrid representation for quadrilateral meshes, we have to define the 3D reference-grid in a constrained way: i.e. the number of reference-surfaces in the (u,v,w) directions are defined by the number of quadrilaterals in the mesh. This approach is contrary to the one explained for the TriScan method, where one has the freedom to choose the reference-surfaces cutting the object.

The reference-grid will be deformed to fit the volume of the quadrilateral mesh, and then uniformly distributed in order to have an efficient encoding of the reference-grid. The vertices of the quadrilateral mesh can be used as boundary conditions for the deformation of the bounding reference-surfaces and for the distribution of the reference-grid points. FIG. 85 illustrates the distribution of the reference-grid; for illustration purposes the deformed and distributed grid has been shown in one slice only.

The quadrilateral mesh already contains the connectivity information between the vertices. In order to derive the connectivity-wireframe, for the defined reference-surfaces, one retrieves the connectivity information between the vertices of the quadrilateral mesh and stores it for the corresponding vertices in the connectivity-wireframe as a connectivity vector on either -$L_1$- or -$L_2$- links as explained in section "Retrieving the 3D connectivity information".

Once the connectivity-wireframe has been derived it will be attached to the reference-grid as explained in section "The MeshGrid surface representation".

Notice that since the reference-grid is distributed to fit the volume of the quadrilateral mesh, the boundary grid positions can be chosen in such a way that the vertices lie at half the distance in between two boundary grid positions, thus yielding an offset of 0.5 (see FIG. 203, the vertices are located on the gridlines between the outside reference-grid points and immediate inside reference-grid points), which is the default value. This has two advantages: (1) a more compact stream can be obtained since default offset values do not have to be stored, (2) allow more easy and straightforward animation of the vertices relative to the reference-grid (rippling effects) by changing the value of the offset in the range [0,1); for instance, if those offsets are not equal to 0.5 everywhere than one may run into problems e.g.: for an overall vertex movement of 0.3, vertices already having an offset of 0.8 will get an offset equal to 1.1, exceeding the theoretical accepted range of [0, 1).

Storing IndexedFaceSet Meshes in MeshGrid Format

Arbitrary IndexedFaceSet models have to remeshed in order to be brought to the MeshGrid format. For this conversion one has to go through the following steps: (1) define the appropriate sets of reference-surfaces, (2) derive analytical contours by intersecting the polygons of the IndexedFaceSet model with the reference-surfaces, (3) generate the MeshGrid representation from the analytical contours, as explained in section "Objects defined by analytical contours".

The Mesh Grid Representation and the Multi-Resolutions Potential

The multi-resolution capability of an algorithm refers to the ability to obtain different approximations of the object's "real" surface by imposing certain constraints. In the case of the Triscan method of the present invention by means of the slicing set-up (i.e. positions of the reference-surfaces where to cut the object in order to extract cross-sectional information about surface vertices and their reciprocal connectivity), one specifies the roughness/correctness of the generated surface. The slicing set-up can be tuned using two parameters: the number of reference-surfaces through the object, and the position of each slice. Both parameters have similar weighting factors on the precision of the generated surface. A slicing set-up consisting of many slices that are badly chosen may generate a result of less quality, and possibly consisting of more triangles, than in case of a well chosen slicing set-up (e.g. the density of the reference-surfaces should be higher in areas where the shape changes). Since the method of the present invention performs an implicit sampling in the positions specified by the slicing set-up, and making an analogy with the Nyquist's sampling theory, implies that any changes in shape that are smaller than the local step, will not be detected by the algorithm. This is the reason why the slicing set-up has to be chosen carefully when generating low-resolution mesh descriptions.

The simplest way to obtain different resolutions of the same object is to apply the entire the TriScan method of the present invention all over again with different slicing set-ups. Even though it is not efficient, it is straightforward. Another possibility is to use the available connectivity-wireframe, or the MeshGrid representation of the present invention, to obtain successive resolutions of the same object. Two possibilities can be envisaged: (1) a top-down approach that generates a lower resolution mesh description from an existing connectivity-wireframe or MeshGrid (e.g. to display a simplified surface for more interactivity), and (2) a bottom-up approach used to increase the resolution level of the connectivity-wireframe or the MeshGrid representation. The top-down and bottom-up can be applied both on the connectivity-wireframe of an object, or on the Mesh-Grid representation of the same connectivity-wireframe. The connectivity-wireframe and the reference-surfaces used to generate it, and the MeshGrid representation are related to each other, and both descriptions can be used to generate a multi-resolution representation. In this section when we refer to the MeshGrid representation we refer as well to the standalone connectivity-wireframe.

The top-down approach consists of two phases, which are going to be explained next.

For a given object, between the MeshGrid representation and the slicing set-up used to obtain that MeshGrid representation there is a one to one relation. Applying the top-down approach to extract a lower resolution MeshGrid from an existing MeshGrid requires that the slicing set-up for the lower resolution version is a subset of the slicing set-up of the existing MeshGrid. This means that the lower resolution MeshGrid will consist of a subset of the nodes (vertices) from the original MeshGrid, and will not contain any new nodes (e.g. that might result from some interpolation). The lower resolution connectivity-wireframe results from a modified connectivity information between the nodes, compared to the original connectivity-wireframe.

The new slicing set-up designed for the lower resolution MeshGrid is needed to identify those nodes, from the original MeshGrid, that do not belong to the new connectivity-wireframe, which is the first phase of the down sampling procedure. Either a new MeshGrid can be generated from the original by removing the nodes that do not fit in, according to the new slicing set-up, or the original can be reordered in place. The connectivity information has to be restored such that the removed nodes (vertices) are bypassed, a task that is feasible since each vertex knows its neighbors in two directions.

The main concern is to obtain a valid MeshGrid after removing those vertices that are not intersected by a reference-surface. Similar to the discussion when deriving the MeshGrid from analytical contours, the vertex removal procedure introduces some particular cases, due to the stripped vertices, that conflict with the border-tracking strategy. The second phase of the down sampling procedure handles those particular cases.

A MeshGrid generated from contours obtained with the border-tracking engine, for a specified set-up, contains a consistent connectivity-wireframe, as explained in the section "Deriving the surface from the connectivity", which is not always the case if the same procedure is performed from analytical contours. For analytical contours the first reduction phase can be performed on the analytical contour itself, and the second phase on the MeshGrid, since some connectivities have to be restored in 3D.

Three rules for vertex connectivity that impose a valid (consistent) connectivity-wireframe will be introduced:

R1: In case the connectivity-wireframe represents a closed object then each node should have two incoming and two outgoing links (Link1, Link2) from, respectively to, other nodes (see FIG. 66(a)). If the object is open, it is required that a node has two incoming or two outgoing links. In any case it is not acceptable that a connection exists only on one link (see FIG. 66(b)).

R2: Two consecutive nodes can either have the same orientation or perpendicular orientations. They cannot have opposite orientations. This rule was already mentioned before, and it is derived from the rules of the border-tracking engine.

R3: Two consecutive nodes cannot be consecutive on both, incoming or outgoing, Link1 and Link2.

The first rule R1 specifies that each vertex should belong to two contours from different slicing sets such that the connectivity is known in two directions as shown in FIG. 66(a). A typical case that does not satisfy this rule is FIG. 66(b), vertex v being intersected only by one reference-surface (missing connectivities are grayed and displayed with a dotted line). The case of FIG. 66(b) can only be encountered if the connectivity-wireframe was generated from analytical contours without applying the first phase reduction procedure.

Rule R2 restricts R1 by excluding those pairs of consecutive vertices that are not feasible according to the border-tracking rules. An argument in favor of this rule is that, for a specified slicing set-up, the resulting connectivity-wireframe should be the same whether it was obtained directly using the method of the present invention or from a higher resolution connectivity-wireframe. Vertices violating this rule may result from the mesh reduction procedure as the consequence of eliminating intermediate vertices (first reduction phase) or in case the contouring has been performed in an analytical way.

Imposing the third rule is necessary to eliminate those vertices, belonging to contours obtained in an analytical way, which would introduce extra inconsistencies. It imposes two extra constraints: no outgoing or incoming connections can be made to itself, FIG. 66(c) showing the inconsistency, and each link should connect the central vertex v with a new vertex (no double connectivity to the same vertex), FIG. 66(d) showing the bad connectivity. FIG. 66(e) shows one of the possible combinations between the cases of FIGS. 66(b) through (d). Vertices matching one of the cases of FIGS. 66(b) through (e) have to be removed during the second phase in order to obtain a valid connectivity-wireframe.

A valid connectivity-wireframe contains an even number of vertices, because of the nature of the border-tracking algorithm. Obtaining a lower resolution connectivity-wireframe from an existing one should preserve this feature. There will be an even number of vertices that fail to satisfy rule R1 (FIG. 66(b)) since for each vertex $v_m$ there exists another vertex $v_n$ located on the opposite side of the border, intersected by the same reference-surface as $v_m$, and having the normal vectors to the surface in reciprocal opposite orientations. Vertices removed by rule R2 are always eliminated in pairs as well as imposed by the rule itself.

During the first phase reduction, all the nodes of the connectivity-wireframe are checked against the slicing set-up, and those that do not match are removed. The node removal is done one by one, and each time the connectivity is restored in the following way: for a node v the vertex located on the previous link1 (respectively link2) of v is connected to the vertex located on the next link1 (respectively link2) of v, and vice versa.

If any of the cases of FIGS. 66(b), (c), (d), or a combination between them as illustrated by FIG. 66(e), are found, the nodes should be removed before the second reduction phase in order to avoid any interference. These cases should not be present in the connectivity-wireframe.

The second phase reduction cleans the connectivity-wireframe from pairs of vertices that violate rule R2. The resulting shape is very sensitive to the order in which the vertices are removed, and is discussed hereinafter. The connectivity is restored in a different way from the first phase reduction.

According to the border-tracking rules, two consecutive vertices cannot have their border direction point in opposite orientations. There are three situations when this case occurs: either both vertices belong to an internal or external contour (inside the reference-surface) or one to an external and the other one to an internal contour. For vertices located on internal opposite faces, after their removal, the connectivity is restored in such a way that the effect of object dilation is simulated (hole disappears). When removing two internal vertices, the internal contour is shrinked and a dilation effect is obtained. For vertices located on external opposite faces, after their removal, the connectivity is restored such that an effect of object erosion is created (part of the object disappears). When removing two external vertices the effect of erosion is produced since the external surface moves towards the inside of the object.

It has to be kept in mind that the vertices are removed, because of the limited number of reference-surfaces used, which leads to a loss of information. There are three choices to remove those vertices. The first strategy is to eliminate them two by two in the order they are detected during the removal procedure, but asymmetries in the output may result even if the original high-resolution object is symmetric and the slicing positions are in mirror. So this strategy is not recommended. A second strategy is to eliminate first connected vertices from which at least one is located on an external boundary. Since this procedure is similar to performing erosion, the final object will shrink, which is not recommendable. The preferred strategy is first to eliminate connected vertices on opposite internal faces, before removing the remaining vertices in conflict with rule R2. Only the last approach obtains the same connectivity-wireframe as the one that would be generated by applying the full procedure of the present invention for the new slicing set-up.

Both reduction phases are now illustrated on examples of the multi-resolution procedure, for different low-resolution slicing set-ups.

Figure 67A:
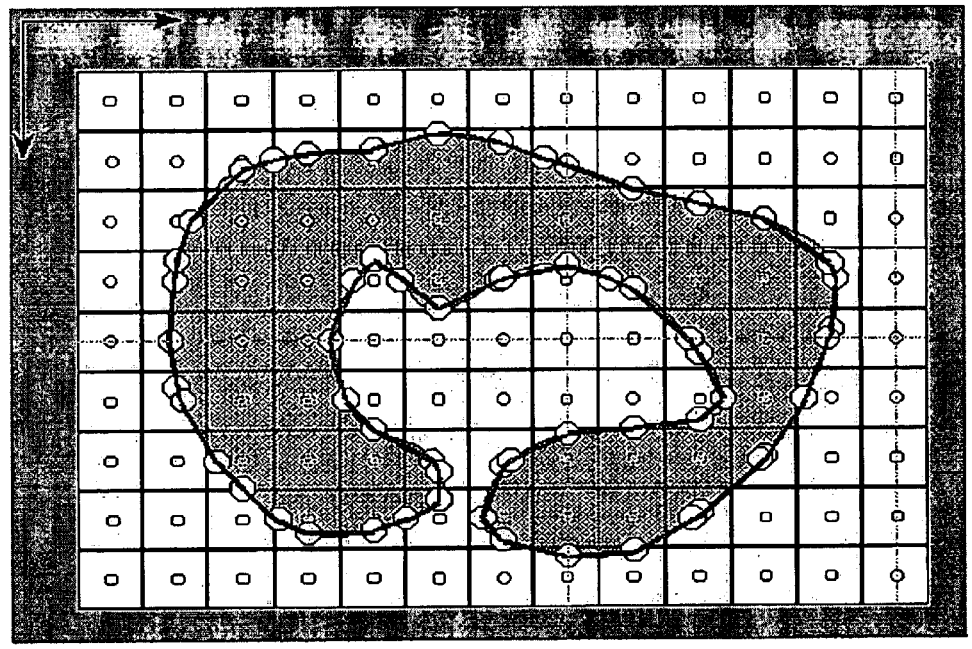
FIG. 67 shows cases, both for an analytical or discrete contour, that do not satisfy rule 2.
Figure 67A:
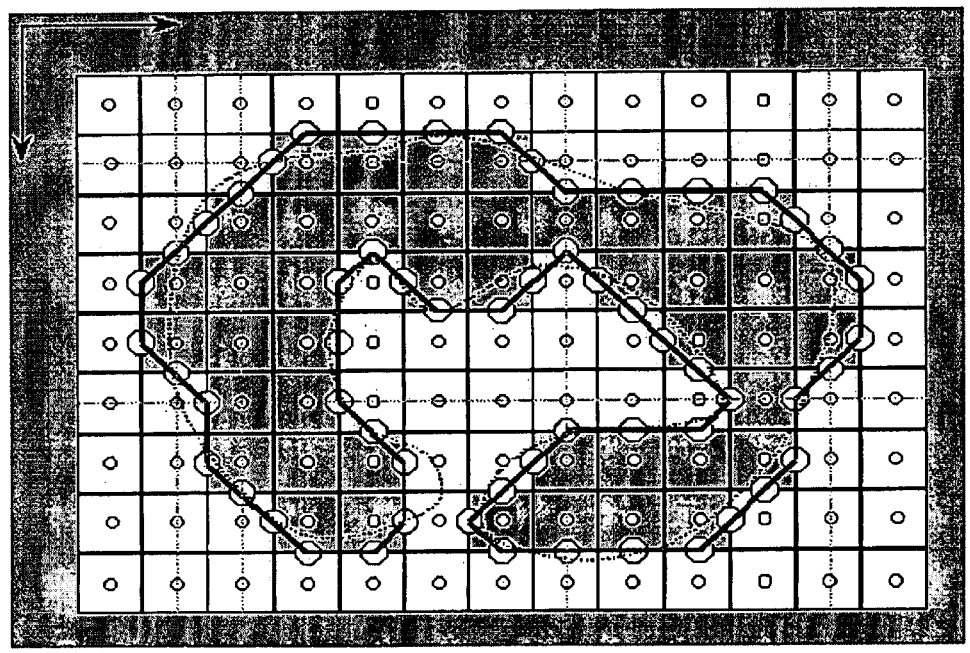
Figure 67A:
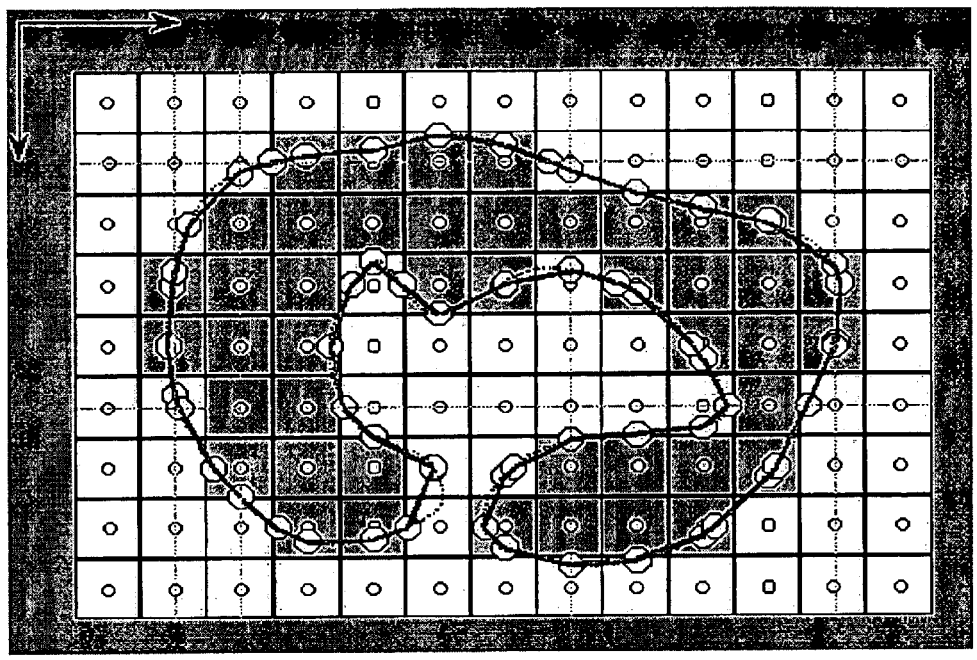
Figure 67A:
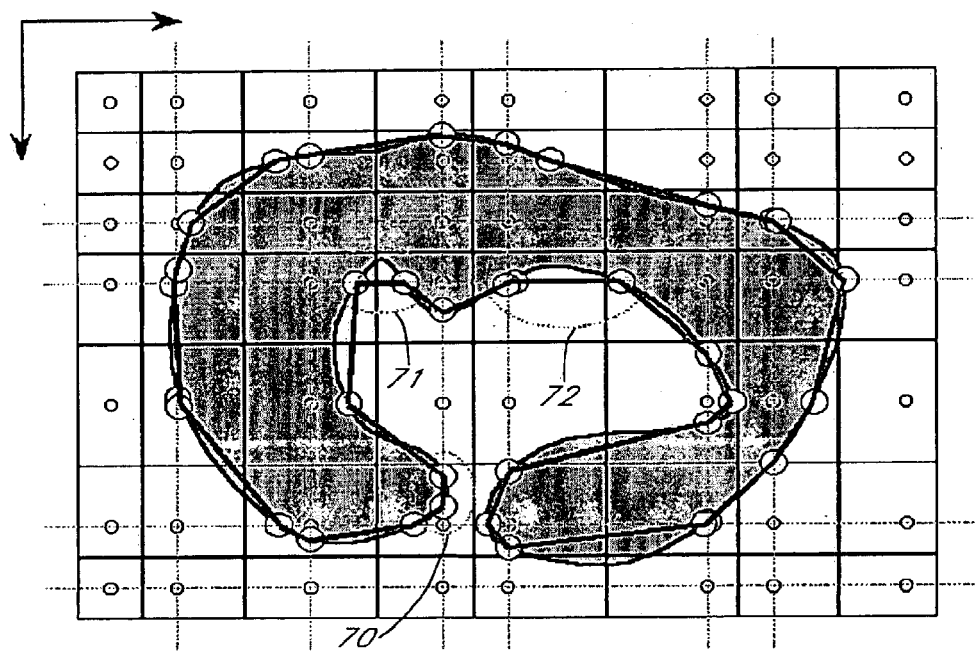
Figure 67A:
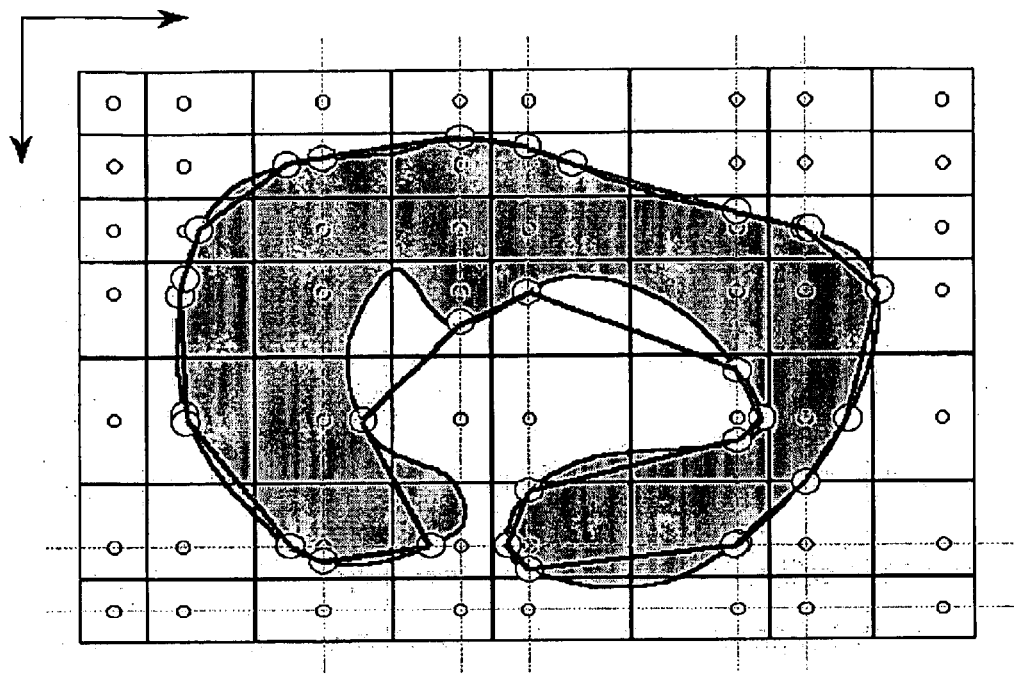
Figure 67A:
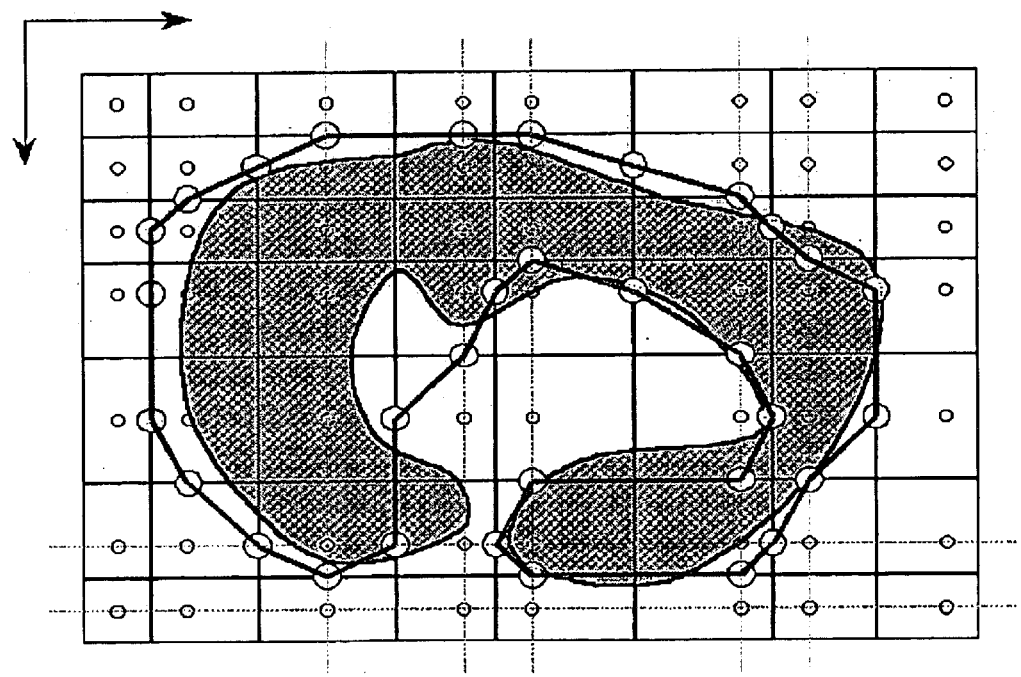
Figure 67A:
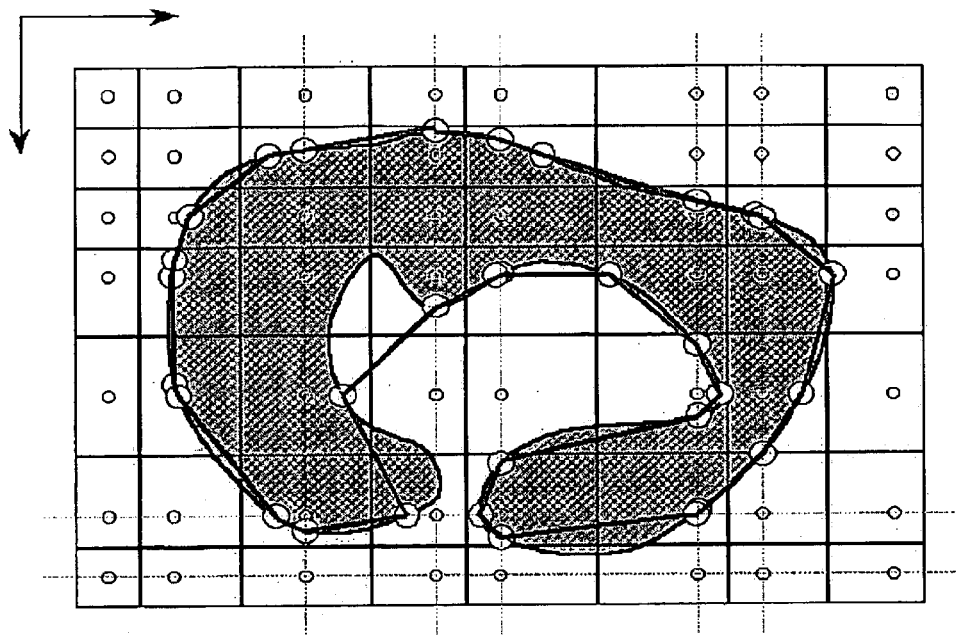
Figure 67B:
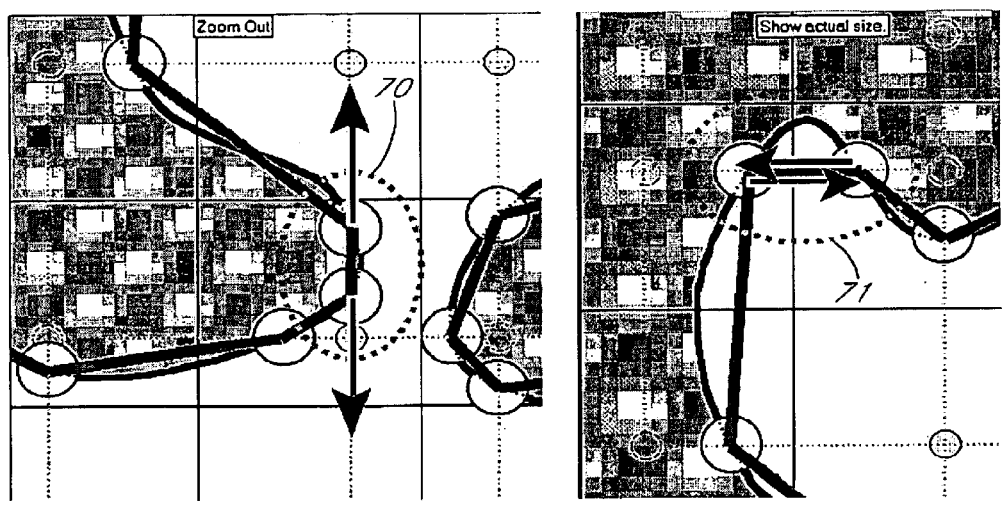
Figure 68:
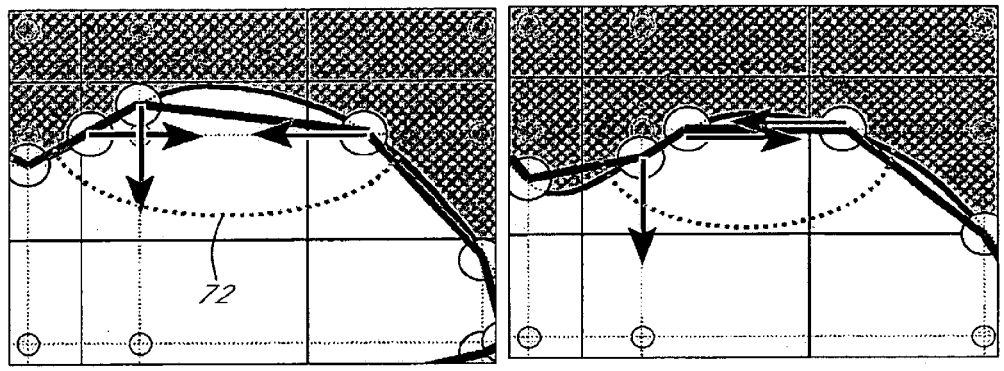
FIG. 68 shows that a small change in the shape of the contour can turn an inconsistent case into a consistent one.

The procedure of the connectivity-wireframe reduction is the following:
1. Specify a new slicing set-up that is a sub-set of the one employed in building the existing connectivity-wireframe.
2. Remove from the connectivity-wireframe those vertices that are not intersected by two reference-surfaces as specified in the new slicing set-up (see rule R1). Each time a vertex is removed, restore the connectivity information, Link1 independent from Link2, to bypass the removed vertex.
3. Locate and remove pairs of vertices that create inconsistencies (see rule R2).
4. Generate the surface primitives from the connectivity-wireframe These steps are illustrated in FIG. 67A, FIGS. 67A(a)–(c) displaying the primary slicing set-up that is used to build a connectivity-wireframe from which it is intended to extract a lower resolution version. Next a new slicing set-up for the lower resolution version of the connectivity-wireframe is specified, and thereafter the first phase reduction is applied. The image from FIG. 67A(d) is obtained. In this image are marked three spots 70, 71, 72 that introduce inconsistencies according to rule R2. The spots are shown in more detail in FIG. 67B and in FIG. 68. FIG. 67B shows spots 70 and 71, both for an analytical or discrete contour, that does not satisfy rule R2. The two consecutive vertices are intersected by the same reference-surface, and have the normal vectors in opposite directions. These two vertices have to be removed in both cases. A small change in the shape of the contour can turn an inconsistent case into a consistent one, as shown in FIG. 68. FIG. 68 shows two variants for the spot 72. In the first one, the center of the background border voxel is outside the analytical curve, while in the second one it is located inside the object. While the first case does not create any problem, the second one generates a similar case as shown in FIG. 67B.

The corrected image with the inconsistent spots removed is shown in FIG. 67A(e) for the analytical contour, in FIG. 67A(f) for the discrete contour generated by the border-tracking engine, with vertices located on default positions, and in FIG. 67A(g) with adjusted vertices positions.

The bottom-up multi-resolution approach will now be explained. The bottom-up approach can be exploited during a progressive refinement procedure, and requires that a connectivity-wireframe already exists in a persistent storage. The procedure of loading the progressive connectivity-wireframe has the following steps:
1. Initialize an empty MeshGrid to accommodate the connectivity-wireframe at its highest resolution as coded into the persistent storage.
2. Load the slicing set-up corresponding to the lowest resolution connectivity-wireframe.
3. Read the absolute coordinates of a node, since all the following nodes are coded relative to its predecessor.
4. Continue to read the coded stream until the connectivity-wireframe contains all nodes corresponding to the lowest resolution.

At this moment, the connectivity-wireframe corresponding to the lowest resolution is complete, and the surface primitives can be derived and displayed. For the first loaded connectivity-wireframe no special care is necessary.

Loading a higher resolution connectivity-wireframe works in the following way:
1. Load the slicing set-up corresponding to the next resolution connectivity-wireframe.
2. The connectivity-wireframe consists of a series of patches that have to be inserted in the existing connectivity-wireframe. Each patch description consists of the absolute coordinates of an initial node followed by the rest of the nodes, belonging to the patch, that are coded relative to the initial node. It is needed to supply the absolute coordinates for the first node of a patch in order to be able to localize the node in the connectivity-wireframe, and consequently to derive the coordinates of the other nodes.
3. Next, each patch is inserted in the existing connectivity-wireframe.

Similar to the two-phase reduction procedure discussed in the section concerning the top-down multi-resolution approach, there are two different types of insert possibilities for the nodes of a patch. If a node has already been allocated restore the connectivity, otherwise insert the new node in the connectivity-wireframe and change an existing connectivity to fit the description from the stream.

Enhancements and Specific Applications
1. Mapping a texture on a MeshGrid represented model can be done in the traditional way by associating to each vertex a position into a texture map. An easier and more efficient approach would be to associate the regular (u, v, w) Reference-Grid points to the texture map instead. Both approaches would result in an extra part in the stream.
2. Combining two models, both of them represented by a MeshGrid, can be done at the level of the reference-grid instead of the level of vertices. Knowing for both models some reference positions inside the reference-grid that have to match, one can bring a model $M_1$ to the orientation, scaling, or deformation of the other model $M_2$ by modeling/morphing the reference-grid of $M_1$ to match the reference positions of $M_2$. This might find an application in the following examples: character animation in movies/cartoons, applications where predefined models have to be brought to a specific model (e.g. personalization of clothes, hairstyle, glasses, attributes worn by a virtual mannequin).

3. Computation of physical phenomenon, e.g. elastic deformations of models, could be performed more efficient on the regular reference-grid instead of the non-regular wire-frame.

Improving the Preciseness of the Contouring

In case the original intensity image is available, the coordinates of the contour nodes can be adjusted, in the direction of the border, in the range of −0.5 to +0.5 pixels, to better approximate the original object.

A solution was proposed by W. E. Lorensen and H. E. Cline, "Marching Cubes: A high resolution 3D surface construction algorithm", in M. C. Stone, editor, Computer Graphics (SIGGRAPH '87 Proceedings), volume 21, pages 163–169, 1987, which is to linearly interpolate the position of the contour node between the border voxel and the adjacent voxel in the direction of the border with the following formula:

$$\text{offset} = (T - V_B)/(V_A - V_B) \quad \text{(eq. 7)}$$

Some experiments have been done on an artificially created image, the original shape of which is well known, and then it is attempted to recover the shape as precise as possible. The image consists of a rectangular grid area of size 11×11 voxels, initially filled, half of them with black (RGB<0, 0, 0>) and the other half with 50% gray (RGB<128, 128, 128>), and next a white circular area with a diameter of 8 units on that grid has been digitized.

Figure 69:
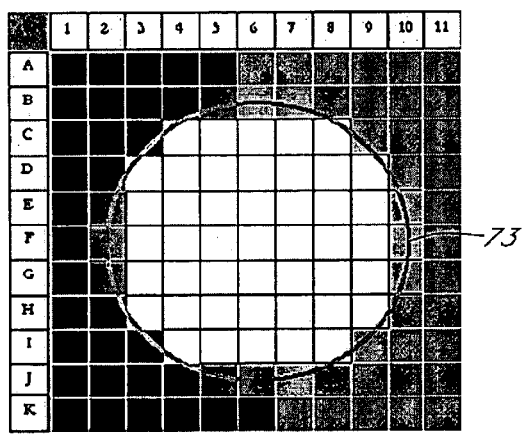
FIG. 69 shows a digitized circular area on a rectangular grid filled with two different backgrounds, black and 50% gray.

The result of this digitized circular area on a rectangular grid filled with two different backgrounds, shown in FIG. 69, is a gray intensity image. On the left image has been drawn the original circle 73, while on the right image have been displayed the associated gray intensity values.

The color of each cell is computed as follows:

$$\text{value} = C_1 * O + C_2 * B \quad \text{(eq. 8)}$$

with $C_1 + C_2 = 1$ and
$C_1 = (V - B)/(O - B)$, $C_2 = (O - V)/(O - B)$
where O is the object's color (i.e. the white circle 73), B is the cell's background color (i.e. black or gray), $C_1$ is the percentage of overlap of the circle's area over the cell in question and $C_2$ the uncovered percentage of the cell.

It is noticed that during digitizing both the object's and background's color are preserved except for the border area where the color is varying.

Experiments have been done with different threshold values to extract the object from the image and the border-tracking algorithm explained in the section "2D border tracking approach" has been used to get the connectivity.

Adjusting the contour nodes to better fit the original shape can be done by adding or subtracting an offset computed with the following equation:

Positive Offset = $(V_A - B)/(O - B)$;

Negative Offset = $-(O - V_B)/(O - B) = -(1 - (V_A - B)/(O - B))$; (eq. 9)

If a border voxel has a value equal to the object (O), then the adjacent voxel ($V_A$) in the direction of the border is used to compute a positive offset. Otherwise the border voxel's intensity ($V_B$) is used to compute a negative offset. Usually the background (B) does not have a constant value, so it is needed to estimate an average of the intensity of the area surrounding the border of the object.

Figure 70:
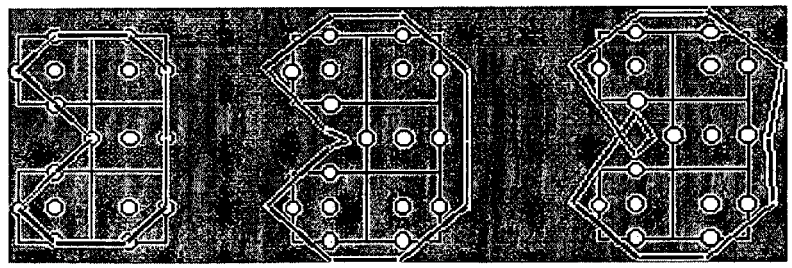
FIG. 70 shows that the offset should be in the range [0,1), otherwise loops can occur (rightmost image).

Eq. 9 takes into account both the object's and background's intensity and computes an offset that has to be added or subtracted from the contour's nodes. For all the positive border directions (S, E) the offset is added and for the negative border directions the offset is subtracted (see FIG. 32 and FIG. 33). The computed offset should be less than 0.5 otherwise situations like the one in FIG. 70 will generate loops. FIG. 70 shows a contouring performed on a slice with and without correction, with left no correction, central correction limited to 0.5 and right correction larger than 0.5, which will generate loops in the contouring.

Actually the same formula is retrieved as the one used when digitizing Eq. 8.

The formula is valid both if the object's intensity is higher or lower than the background. In the general case when the object's intensity lies somewhere in between two background values, then two formulae have to be generated. For that object a certain range can be found where the majority of its values lie, and the object's lower value is used with the lower intensity backgrounds to compute one formula, and the object's higher value with the higher intensity backgrounds for the other formula. In that case, care has to be taken that the right formula is used when calculating the offset.

A summary of the experiments is shown in the following table:

| O | B | T | C4 | C8 | E2 | E10 | F2 | F10 |
|---|---|---|----|----|----|-----|----|-----|
| 255 | 0 | 255 | 0.92 (P) | 0.96 (P) | 0.33 (P) | 0.66 (P) | 0.48 (P) | 0.73 (P) |
|  | 64 |  | 0.89 (P) | 0.95 (P) | 0.10 (P) | 0.55 (P) | 0.31 (P) | 0.64 (P) |
|  | 128 |  | 0.84 (P) | 0.92 (P) | 0.35 (P) | 0.32 (P) | 0.04 (P) | 0.46 (P) |
| 255 | 0 | 230 |  |  | 0.33 (P) | 0.66 (P) | 0.48 (P) | 0.73 (P) |
|  | 64 |  |  |  | 0.10 (P) | 0.55 (P) | 0.31 (P) | 0.64 (P) |
|  | 128 |  |  |  | 0.35 (P) | 0.32 (P) | 0.04 (P) | 0.46 (P) |
| 255 | 0 | 185 |  |  | 0.33 (P) | 0.66 (P) | 0.48 (P) |  |
|  | 64 |  |  |  | 0.10 (P) | 0.55 (P) | 0.31 (P) |  |
|  | 128 |  |  |  | 0.35 (P) | 0.32 (P) |  |  |
| 255 | 0 | 160 |  |  | 0.33 (P) |  | 0.48 (P) |  |
|  | 64 |  |  |  | 0.10 (P) |  | 0.31 (P) |  |
|  | 128 |  |  |  | 0.35 (P) |  | 0.04 (P) |  |

The object's gray value is 255. For the border, three values (0, 64 and 128) have been tried, and four different thresholds have been used. For the border cells (C4, C8, E2, E10, F2, F10) an offset has been computed that will be added to or subtracted from the coordinates of the contour nodes. The computed values have to be constrained between 0 and 0.49999 as previously mentioned. The (P) behind the value means that the computed offset has a positive value, while (N) means that the value is negative.

It is noted that there are three parameters that need to be set in order to obtain an accurate contouring. The following strategy can be defined to speed-up the tuning of the right parameters:

1. First Step:
The object's intensity is estimated, and the threshold is chosen the same as the object's value. Next the contouring is performed without any correction, or the color of the voxels is just changed into background (all voxels less than the threshold) and foreground (all voxels larger or equal to the threshold). By performing a visual inspection on the result, the average distance between the presumed border and the found one is checked. If the distance is less than 2 pixels, then the estimated object's intensity is well chosen.

2. Second Step:
An average of the background is estimated, and the threshold is chosen in the following range:

$$\text{Threshold} = O(1-p) + p*B \text{ where } 0.05 < p < 0.5$$

Specifying a threshold value equal to the object's intensity will result in a shape that is smaller than the original object because of the missing border.

The threshold range mainly depends on the variability of the background. For a constant background, the threshold should be chosen towards the background's value in the specified range, while for a variable background, the threshold should be chosen towards the object's value.

It can be noticed that the optimal range is reduced proportionally with the maximum intensity difference between the surrounding backgrounds, and a range of 5% to 25% is optimal.

3. Third Step:
Once the contour passes through the right border voxels, one could further adjust at sub-pixel range (expand or shrink) the contour by tuning the values specified for the background.

The result is that all the pixels having a value less than the threshold are considered as background and yield a dark color (black or gray), and the rest of pixels with an intensity larger than or equal to the threshold are considered as belonging to the object and yield a white color. The resulting contouring is displayed in FIGS. 71–74 with a line 74.

In FIGS. 71–74, the left images show the contouring without any corrections, while the images on the right show a contouring adjusted with an offset computed with Eq. 9.

Figure 71:
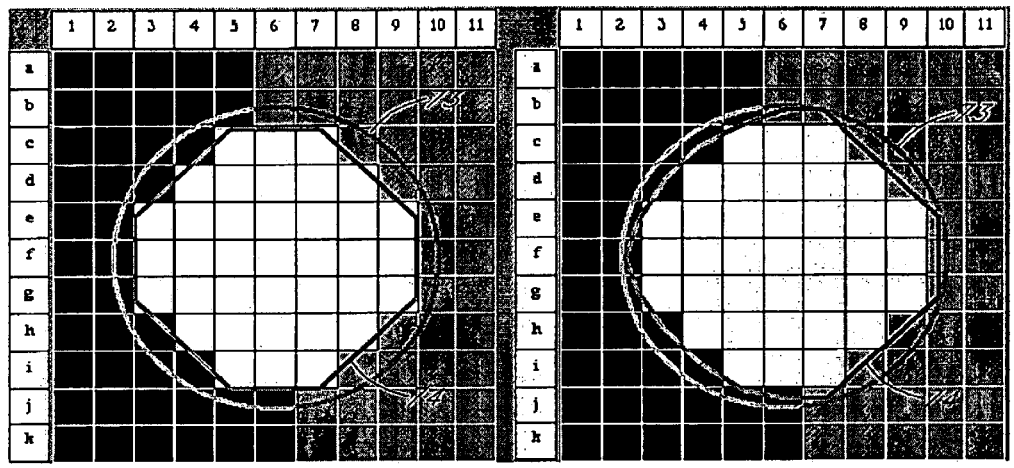
FIG. 71 shows an example of contouring where the threshold value is 255, the object value is 255 and the border value is 64.

For the first example, shown in FIG. 71, the threshold value is 255, the object value is 255 and the border value is 64. The result is that the voxels located on the visible border are not considered as belonging to the object because they are below the threshold. The left part of the drawing shows the contouring without taking into account the border's intensity. Adjusting the contour nodes slightly improves the result but is still far from perfect. The resulting shape and area is smaller than the original circle, as can be seen in the right part of the drawing, which shows the contouring corrected with the offset formula.

Figure 72:
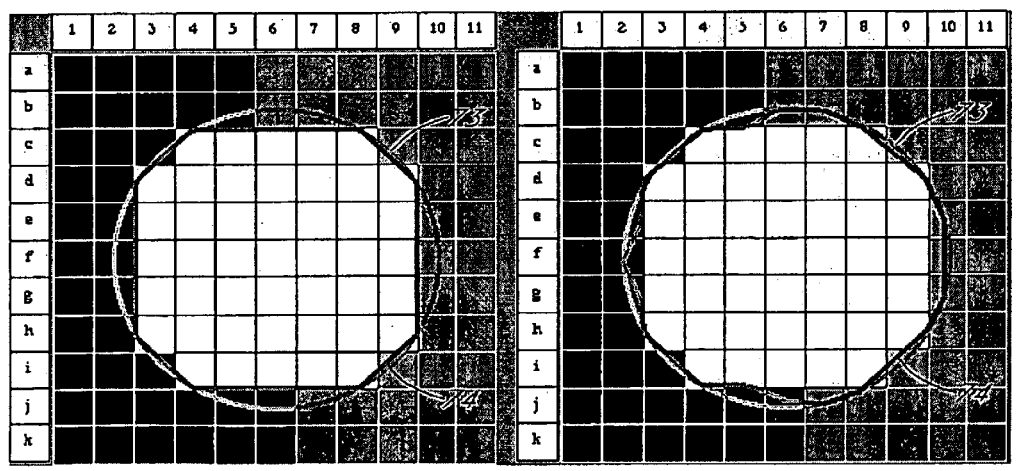
FIG. 72 shows an example of contouring where the threshold value is 230, the object value is 255 and the border value is 64.
Figure 73:
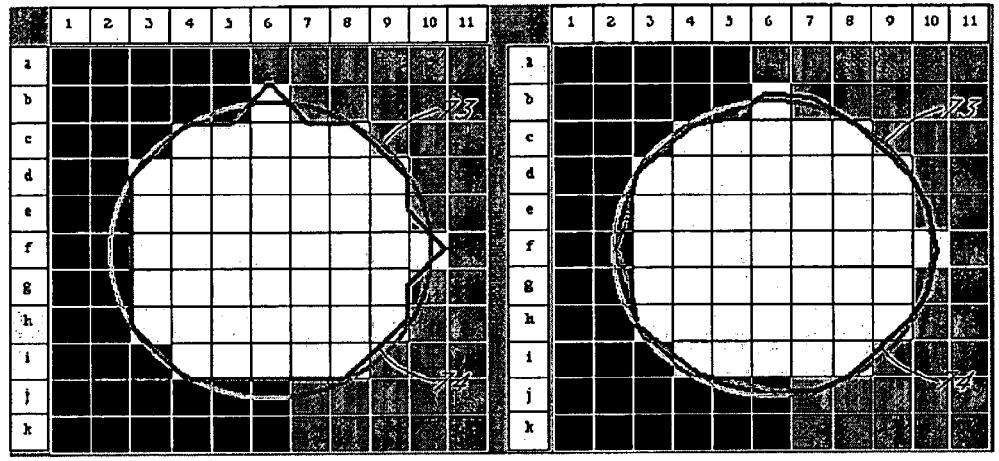
FIG. 73 shows an example of contouring where the threshold value is 180, the object value is 255 and the border value is 64.
Figure 74:
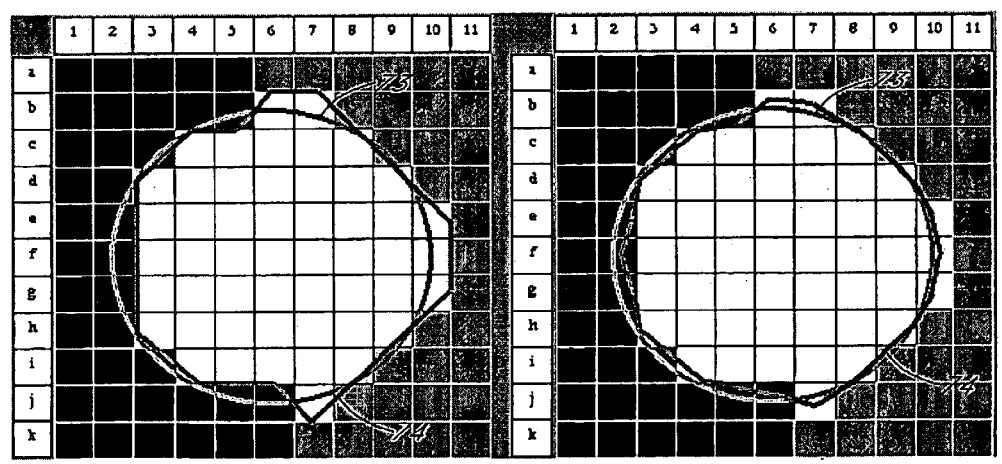
FIG. 74 shows an example of contouring where the threshold value is 160, the object value is 255 and the border value is 64.
Figure 75:
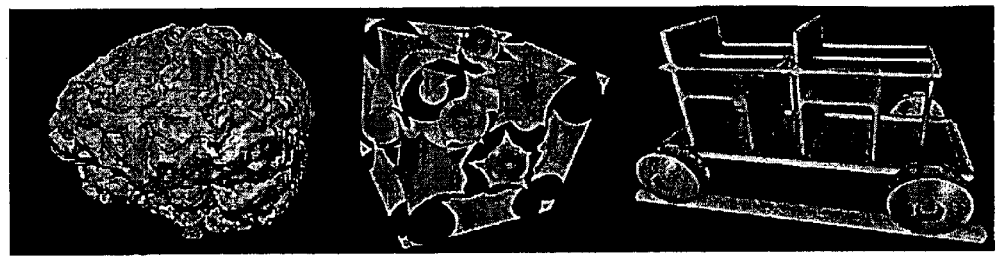
FIG. 75 shows shaded surfaces of triangulated MeshGrid representations of discrete and analytical models.

The threshold is dropped to 13% from the intensity interval between the object and the background (FIG. 72—the threshold value is 230, the object value is 255 and the border value is 64). Border voxels C4 and C8 and the similar ones are now considered as belonging to the object. Both the left and the right part of the image become closer to the original shape. For the right image an asymmetry can be noticed along the vertical axis because of the different underlying background. The resulting shape is still smaller than the original circle.

Dropping the threshold even more, to 40% (FIG. 73—the threshold value is 180, the object value is 255 and the border value is 64), will still grow the object's area. The resulting contouring, with and without adjustment, will give positive and negative errors compared to the original. For the current background values, the current threshold might be the limit. Going beyond this threshold percentage will create more artifacts.

The last example (FIG. 74) was performed with a threshold of 160 (50%), and is in this case already too much. The asymmetry, in both the left and the right parts of the images, between the left half and the right half of the contour is big, considering the fact that there has been started from a circle.

Figure 96:
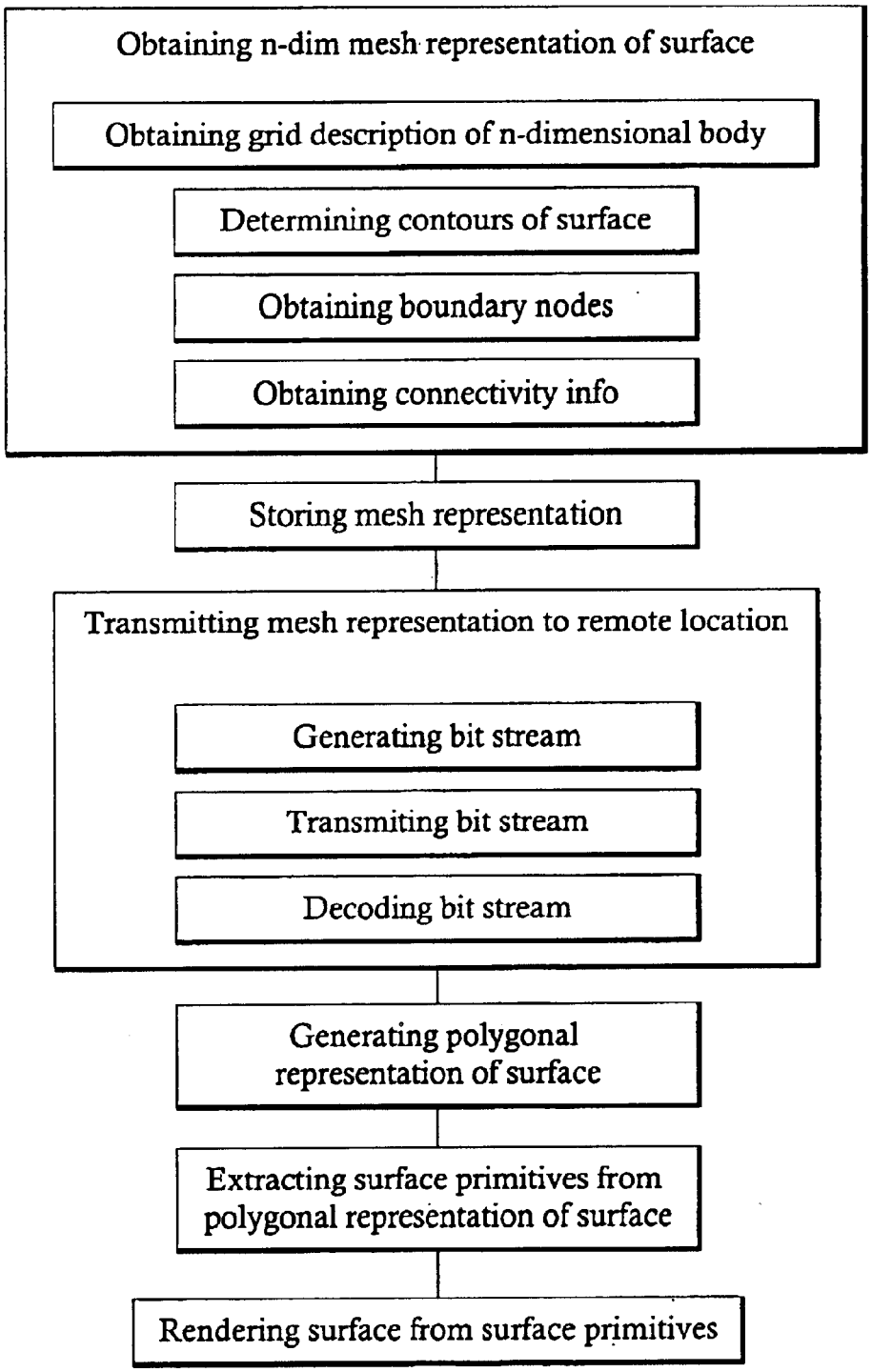
FIG. 96 shows a flow diagram of a coding and decoding embodiment of the present invention which can be used with the TriScan technique.
Figure 97:
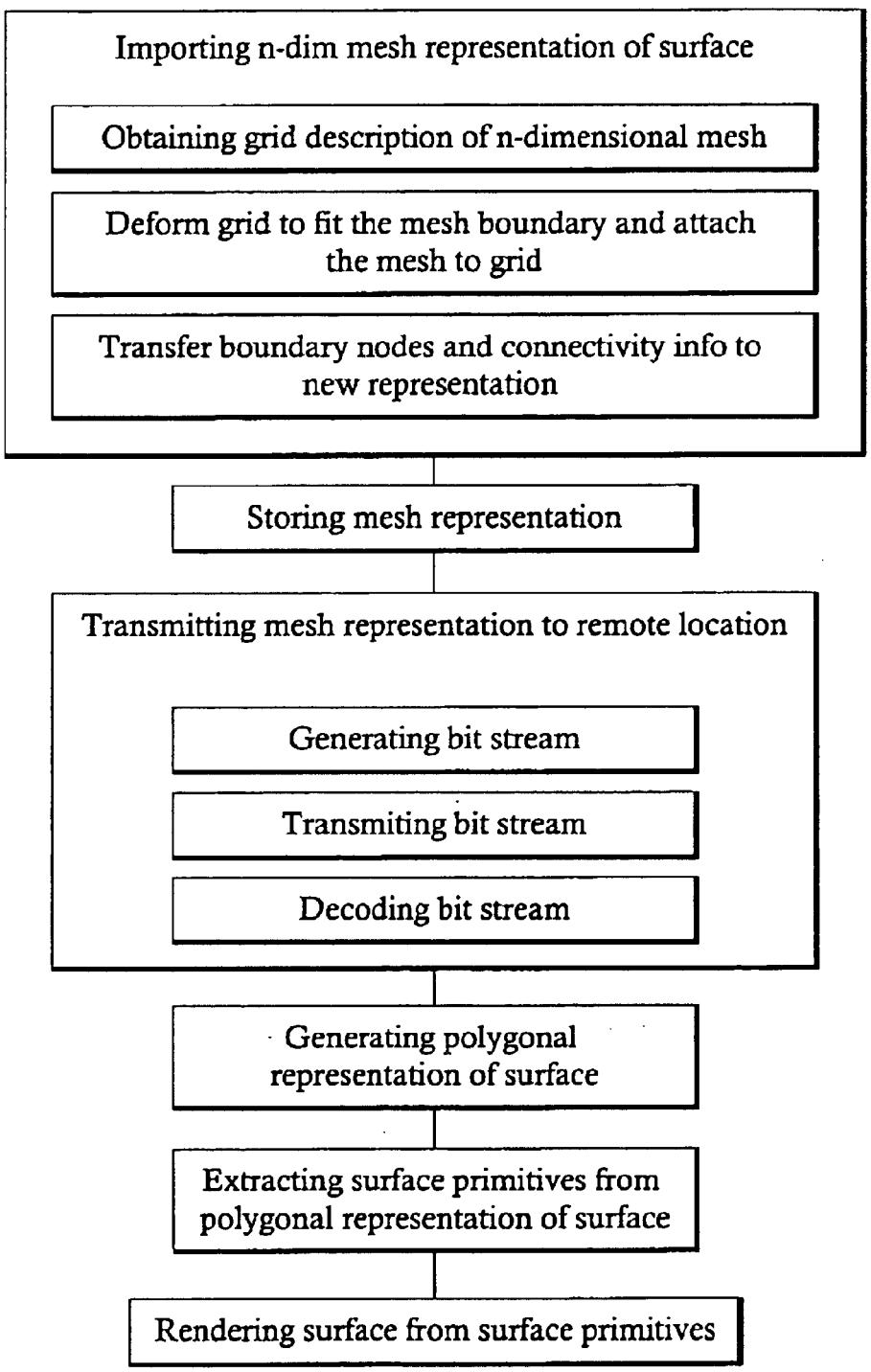
FIG. 97 shows a flow diagram of a coding and decoding embodiment of the present invention based on importing an n-dimensional representation of a surface mesh.

The present invention also includes a computer program product which may be used to prepare digital data for display of a n-dimensional object as well as to display it, to code or decode a representation of an n-dimensional object, e.g. in the form of a bit stream, to transmit this bit stream across a communications channel, e.g. the Internet in accordance with any of the embodiments of the present invention when executed on a suitable computer. Flow diagrams for complete coding and decoding systems are shown in schematically in FIGS. 96 and 97. The computer program product according to the present invention may be provided as a dedicated computer program, e.g. on a suitable storage medium such as a CD-ROM. The computer program may use other standard programs, e.g. may import a polygonal representation of an object such as a quadrilateral representation as well as make use of other standard graphics packages.

Figure 98:
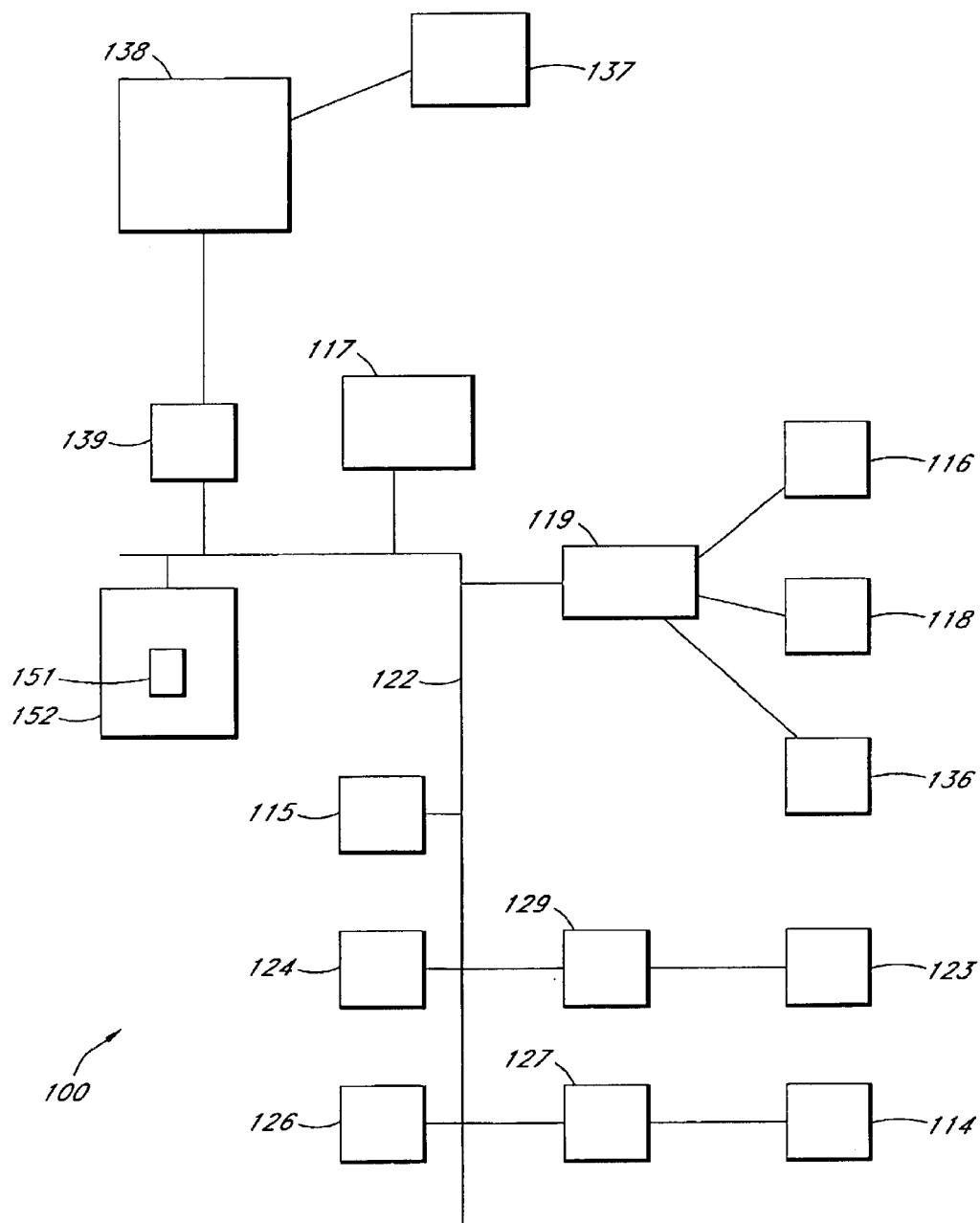
FIG. 98 is a schematic representation of a computer system which may be used with embodiments of the present invention.

FIG. 98 is a schematic representation of a computing system which can be utilized with the methods and in a system according to the present invention. A computer 100 is depicted which may include a video display terminal 114, a data input means such as a keyboard 116, and a graphic user interface indicating or pointing means such as a mouse 118. Computer 100 may be implemented as a general purpose computer, e.g. a UNIX workstation or a personal computer.

Computer 100 includes a Central Processing Unit ("CPU") 115, such as a conventional microprocessor of which a Pentium IV processor supplied by Intel Corp. USA is only an example, and a number of other units interconnected via bus system 122. The computer 100 includes at least one memory. Memory may include any of a variety of data storage devices known to the skilled person such as random-access memory ("RAM"), read-only memory ("ROM"), non-volatile read/write memory such as a hard disc as known to the skilled person. For example, computer 100 may further include random-access memory ("RAM") 124, read-only memory ("ROM") 126, as well as an optional display adapter 127 for connecting system bus 122 to an optional video display terminal 114, and an optional input/output (I/O) adapter 129 for connecting peripheral devices (e.g., disk and tape drives 123) to system bus 122. Video display terminal 114 can be the visual output of computer 100, which can be any suitable display device such as a CRT-based video display well-known in the art of computer hardware. However, with a portable or notebook-based computer, video display terminal 114 can be replaced with a LCD-based or a gas plasma-based flat-panel display. Computer 100 further includes user interface adapter 119 for connecting a keyboard 116, mouse 118, optional speaker 136. Bus 122 may be connected via a communication adapter 139 for connecting computer 100 to a data network 138 such as the Internet, an Intranet a Local or Wide Area network (LAN or WAN) or a CAN. This allows transmission of a representation of a an object over a telecommunications network, e.g. entering a coded bit stream in accordance with the present invention at a far location 137 and transmitting it to a near location, e.g. via the Internet, where a processor such as computer 100 carries out a decoding and displaying method in accordance with the present invention. Hence, the present invention contemplates that a interchange of multi-dimensional and optionally multiresolutional representations of objects may be provided via the Internet or a Local Area or Wide Area network, whereby a suitable computer program product is loaded onto a computer.

In addition the present invention contemplates that relevant data for generating object surface representations in accordance with the present invention may be provided to computer 100. For example, 3D data sets may be acquired with different parameters and/or different equipment and be provided by means of a data carrier such as a CD-ROM, or data tapes or transmitted to the computer 100 by means of the connection to the telecommunications network such as the Internet. These representations may be medical data obtained from scanning patients. These representations may also be state-of-the art surface representations such as quadrilateral representations.

Computer 100 also includes a graphical user interface that resides within machine-readable media to direct the operation of computer 100. Any suitable machine-readable media may retain the graphical user interface, such as a random access memory (RAM) 124, a read-only memory (ROM) 126, a magnetic diskette, magnetic tape, or optical disk (the last three being located in disk and tape drives 123). Any suitable operating system and associated graphical user interface (e.g., Microsoft Windows) may direct CPU 115. In addition, computer 10 includes a control program 151 which resides within computer memory storage 152. Control program 151 contains instructions that when executed on CPU 115 carry out the operations described with respect to any of the methods of the present invention.

Those skilled in the art will appreciate that the hardware represented in FIG. 98 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already described.

In the example depicted in FIG. 98, the computer program product (i.e. control program 151, can reside in computer storage 152. However, a preferred embodiment of the present invention is that the decoder according to the present invention is provided as an accelerator board 117 connected to, the bus system 122. The accelerator board may be optimized in order to carry out a decoding method in accordance with the present invention efficiently, e.g. an optimized hardware/software configuration which provides coprocessing functions for the CPU 115 and therefore frees up processor time of the latter.

It is important that while the present invention has been, and will continue to be, that those skilled in the art will appreciate that the mechanisms of the present invention are capable of being distributed as a program product in a variety of forms, and that the present invention applies equally regardless of the particular type of signal bearing media used to actually carry out the distribution. Examples of computer readable signal bearing media include: recordable type media such as floppy disks and CD ROMs and transmission type media such as digital and analogue communication links.

While the invention has been shown and described with reference to preferred embodiments, it will be understood by those skilled in the art that various changes or modifications in form and detail may be made without departing from the scope and spirit of this invention.

What is claimed is:

1. A method of preparing data for displaying a surface of an n-dimensional body, n being at least 3, the method comprising the steps of:

obtaining an n-dimensional discrete mesh representation of the surface, the mesh representation of the surface comprising a plurality of boundary nodes, each boundary node lying on or adjacent to the surface, each boundary node being associated with connectivity information comprising representations of up to (n−1) incoming and/or up to (n−1) outgoing directions towards up to 2*(n−1) adjacent boundary nodes adjacent to the said boundary node, the directions being defined in such a way that the cross product of the up to n−1 incoming or outgoing directions associated with any boundary node represents a further vector which points away from the surface at that boundary node.

2. The method according to claim 1, further comprising: generating a polygonal representation of the surface of the object from the plurality of boundary nodes and the connectivity information of those boundary nodes.

3. The method according to claim 1, wherein the step of obtaining a discrete mesh representation of the surface comprises obtaining a grid description of the n-dimensional body, the grid being defined by intersection points of n sets of reference surfaces.

4. The method according to claim 3, wherein at least one boundary node is defined by an intersection point of the grid and an offset.

5. The method according to claim 1, further comprising the step of: obtaining surface primitives from the polygonal representation of the surface.

6. The method according to claim 5, further comprising rendering the surface from the union of the surface primitives.

7. The method according to claim 1, wherein the step of obtaining a mesh representation of the surface comprises the step of: determining contours of the surface, each contour lying in a reference surface of up to n−1 lower dimensions.

8. The method according to claim 3, further comprising the step of storing the mesh representation of the surface in a memory as a plurality of boundary node representations, each representation being a definition of an intersection point in the grid and an associated offset.

9. The method according to claim 1, further comprising the step of transmitting the mesh representation of the surface to a remote location.

10. The method according to claim 9, wherein the transmission step comprises the step of: generating a bit-stream from a representation of at least one boundary node and the connectivity information of a plurality of boundary nodes as a list of directions starting from the at least one boundary node to reach the plurality of other boundary nodes.

11. A system for preparing digital data for displaying a surface of an n-dimensional body, n being at least 3, comprising:

means for obtaining an n-dimensional discrete mesh representation of the surface, the mesh representation of the surface comprising a plurality of boundary nodes, each boundary node lying on or adjacent to the surface, each boundary node being associated with connectivity information comprising representations of up to (n−1) incoming and/or up to (n31 1) outgoing directions towards up to 2*(n−1) adjacent boundary nodes adjacent to the said boundary node, the directions being defined in such a way that the cross product of the up to n−1 incoming or outgoing directions associated with any boundary node represents a further vector which points away from the surface at that boundary node; and means for generating a polygonal representation of the surface of the object from the plurality of boundary nodes and the connectivity information of those boundary nodes.

12. The system according to claim 11, wherein the means for obtaining a discrete mesh representation of the surface comprises means for obtaining a grid description of the n-dimensional body, the grid being defined by the intersection points of n sets of reference surfaces.

13. The system according to claim 11, further comprising: means for generating a bit-stream from a representation of at least one boundary node and the connectivity information of a plurality of boundary nodes as a list of directions starting from the at least one boundary node to reach the plurality of other boundary nodes.

14. A computer program product comprising code segments which when executed on a computer carries out any of the methods in accordance with any of claims 1 to 10.

15. A computer program product stored on a data carrier, the computer program product comprising code segments which when executed on a computer carry out any of the methods in accordance with any of claims 1 to 10.

16. The method of claim 7, wherein the contours are multivoxel contours.

17. A decoder for receiving a data bit-stream representing a surface of an n-dimensional body, n being at least 3, comprising:

means for receiving the bit-stream comprising a representation of at least one boundary node, and connectivity information as a list of directions starting from the at least one boundary node to reach a plurality of other boundary nodes of the surface to be represented, the directions being defined in such a way that the cross product of incoming or outgoing directions associated with the at least one boundary node represents a further vector which points away from the surface at that boundary node;

means for initializing an n-dimensional mesh at a first resolution;

means for reading the representation of the at least one boundary node;

means for reading the connectivity information of a first number of boundary nodes and for initializing nodes of the mesh in accordance with the connectivity information.

18. The decoder according to claim 17, further comprising:

means for receiving connectivity information of a second number of boundary nodes; and means for initializing a further set of boundary nodes in the mesh to allow a higher resolution display of the surface.

19. A method of decoding a data bit-stream representing a surface of an n-dimensional body, n being at least 3, comprising:

receiving a bit-stream comprising a representation of at least one boundary node, and connectivity information as a list of directions starting from the at least one boundary node to reach a plurality of other boundary nodes of the surface to be represented, the directions being defined in such a way that the cross product of incoming or outgoing directions associated with the at least one boundary node represents a further vector which points away from the surface at that boundary node;

initializing a grid at a first resolution;

reading the representation of the at least one boundary node;

reading the connectivity information of a first number of boundary nodes and initializing boundary nodes within the grid in accordance with the connectivity information.

20. The method according to claim 19, further comprising the step of receiving connectivity information of a second number of boundary nodes; and initializing a further set of boundary nodes in the grid to allow a higher resolution display of the surface.

21. The method according to claim 19, further comprising generating a polygonal representation of the surface of the object from the plurality of boundary nodes and the connectivity information of those boundary nodes.

22. The method according to claim 21, further comprising the step of obtaining surface primitives from the polygonal representation of the surface.

23. The method according to claim 22, further comprising the step of rendering the surface from the union of the surface primitives.

24. The method according to claim 19, further comprising the step of: receiving in the bit-stream for at least one node a precision definition; and modifying the position of the at least one boundary node in the grid in accordance with at least a part of the precision definition.

25. A decoder for receiving a data bit-stream representing a surface of an n-dimensional body, n being at least 3, comprising: means for receiving the bit-stream comprising a representation of at least one boundary node and connectivity information as a list of directions starting from the at least one boundary node to reach a plurality of other boundary nodes of the surface to be represented, the directions being defined in such a way that the cross product of incoming or outgoing directions associated with the at least one boundary node represents a further vector which points away from the surface at that boundary node; means for initializing an n-dimensional mesh at a first resolution;

means for reading the representation of the at least one boundary node means for reading the connectivity information of a first number of boundary nodes and for initializing nodes of the mesh in accordance with the connectivity information; and means for generating a mesh description of the surface, the mesh description comprising a set of boundary nodes defined by intersection points in the grid and offsets from this grid.

26. A coder for preparing data for displaying a surface of an n-dimensional body, n being at least 3, the coder comprising:

means for generating an n-dimensional discrete mesh representation of the surface, the mesh representation of the surface comprising a plurality of boundary nodes, each boundary node lying on or adjacent to the surface, each boundary node being associated with connectivity information comprising representations of up to (n−1) incoming and/or up to (n−1) outgoing directions towards up to 2*(n−1) adjacent boundary nodes adjacent to the said boundary node, the directions being defined in such a way that the cross product of the up to n−1 incoming or outgoing directions associated with any boundary node represents a further vector which points away from the surface at that boundary node.

27. A bit-stream coding an n-dimensional discrete mesh representation of a surface, the mesh representation of the surface comprising a plurality of boundary nodes, each boundary node lying on or adjacent to the surface, each boundary node being associated with connectivity information comprising representations of up to (n−1) incoming and/or up to (n−1) outgoing directions towards up to 2*(n−1) adjacent boundary nodes adjacent to the said boundary node, the directions being defined in such a way that the cross product of the up to n−1 incoming or outgoing directions associated with any boundary node represents a further vector which points away from the surface at that boundary node; the bit-stream comprising: a representation of at least one boundary node and the connectivity information of a plurality of boundary nodes as a list of directions starting from the at least one boundary node to reach the plurality of other boundary nodes.

28. A method of decoding a data bit-stream representing a surface of an n-dimensional body, n being at least 3, comprising:

receiving a bit-stream comprising a representation of at least one boundary node, and connectivity information as a list of directions starting from the at least one boundary node to reach a plurality of other boundary nodes of the surface to be represented, the directions being defined in such a way that the cross product of incoming or outgoing directions associated with the at least one boundary node represents a further vector which points away from the surface at that boundary node;

initializing a grid at a first resolution;

reading the representation of the at least one boundary node;

reading the connectivity information of a first number of boundary nodes and initializing boundary nodes within the grid in accordance with the connectivity information; and generating a mesh description of the surface, the mesh description comprising a set of boundary nodes defined by intersection points in the grid and offsets from this grid.

29. A computer program product comprising code segments which when executed on a computer carries out the methods comprising:

receiving a bit-stream comprising a representation of at least one boundary node, and connectivity information as a list of directions starting from the at least one boundary node to reach a plurality of other boundary nodes of the surface to be represented, the directions being defined in such a way that the cross product of incoming or outgoing directions associated with the at least one boundary node represents a further vector which points away from the surface at that boundary node;

initializing a grid at a first resolution;

reading the representation of the at least one boundary node;

reading the connectivity information of a first number of boundary nodes and initializing boundary nodes within the grid in accordance with the connectivity information; and generating a mesh description of the surface, the mesh description comprising a set of boundary nodes defined by intersection points in the grid and offsets from this grid.

30. A computer program product stored on a data carrier, the computer program product comprising code segments which when executed on a computer carry the methods comprising:

receiving a bit-stream comprising a representation of at least one boundary node, and connectivity information as a list of directions starting from the at least one boundary node to reach a plurality of other boundary nodes of the surface to be represented, the directions being defined in such a way that the cross product of incoming or outgoing directions associated with the at least one boundary node represents a further vector which points away from the surface at that boundary node;

initializing a grid at a first resolution;

reading the representation of the at least one boundary node;

reading the connectivity information of a first number of boundary nodes and initializing boundary nodes within the grid in accordance with the connectivity information; and generating a mesh description of the surface, the mesh description comprising a set of boundary nodes defined by intersection points in the grid and offsets from this grid.

* * * * *